US008488845B1

(12) United States Patent
Tang et al.

(10) Patent No.: US 8,488,845 B1
(45) Date of Patent: *Jul. 16, 2013

(54) SEMI-AUTOMATIC EXTRACTION OF LINEAR FEATURES FROM IMAGE DATA

(75) Inventors: Matthew Tang, Denver, CO (US); Richard Clelland, Boulder, CO (US); Jacek Grodecki, Thornton, CO (US); Seth Malitz, Aurora, CO (US); Joshua Nolting, Thornton, CO (US)

(73) Assignee: Geoeye Solutions Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,568

(22) Filed: Mar. 12, 2012

Related U.S. Application Data

(63) Continuation of application No. 12/606,918, filed on Oct. 27, 2009, now Pat. No. 8,155,391, which is a continuation-in-part of application No. 11/764,765, filed on Jun. 18, 2007, now Pat. No. 7,653,218, which is a continuation-in-part of application No. 11/416,282, filed on May 2, 2006, now abandoned, and a continuation-in-part of application No. 11/416,276, filed on May 2, 2006, now abandoned.

(51) Int. Cl.
   *G06K 9/00* (2006.01)
(52) U.S. Cl.
   USPC ............................................. 382/113
(58) Field of Classification Search
   USPC .............................................. 382/113
   See application file for complete search history.

(56) References Cited

U.S. PATENT DOCUMENTS

| 6,493,465 | B2 | 12/2002 | Mori et al. |
| 6,766,043 | B2 | 7/2004 | Zeng et al. |
| 6,777,679 | B2 | 8/2004 | Nagaoki et al. |
| 8,155,391 | B1 * | 4/2012 | Tang et al. ................. 382/113 |
| 2003/0059091 | A1 | 3/2003 | Kambe et al. |
| 2003/0172365 | A1 | 9/2003 | Fukagawa |
| 2005/0111756 | A1 | 5/2005 | Turner et al. |
| 2005/0114354 | A1 * | 5/2005 | Singh et al. ................. 707/10 |
| 2007/0009156 | A1 | 1/2007 | O'Hara et al. |

OTHER PUBLICATIONS

Haverkamp, et al., "Complementary Methods for Extracting Road Centerlines from IKONOS Imagery," 9th Annual Intl. Symposium on Remote Sensing; proc. SPIE vol. 4885, p. 501-511, Image and Signal Processing for Remote Sensing VIII; Sebastiano B. Serpico; Ed. (2003).

(Continued)

*Primary Examiner* — Timothy A Brainard
(74) *Attorney, Agent, or Firm* — Fennemore Craig, P.C.

(57) ABSTRACT

Method for editing a vector set associated with an extracted linear feature in a remotely sensed image, the vector set defining a path and being tied to a geographical location. The method includes displaying the path in a graphical display. Once the user activates a smart editing tool, the user establishes a region of influence centered around a cursor. The region of influence is configured to respond to cursor movements. The user specifies a point near the path and moves the cursor to it, bringing the region of influence along. Any error in the vector set of the path is automatically corrected in real time using image-based logic. The user then previews the correction on the graphical display and implements it, updating the path. The updated path is displayed in real time in the graphical display.

34 Claims, 136 Drawing Sheets

OTHER PUBLICATIONS

Dial, et al., "IKONOS Satellite Imagery and Its use in Automated Road Extraction," Automatic Extraction of Man-Made Objects from Aerial and Space images (III); Proceedings of the Centro Stefano Franscini Ascona, Baltsavias, et al. Eds., pp. 357-367, Swets & Zeitlinger, The Netherlands, (2001).

Steger, et al., "Model-Based Road Extraction from Images," Automatic Extraction of Man-Made Objects from Aerial and Space Images; Proceedings of the Centro Stefano Franscini Ascona, Gruen, et al. Eds., pp. 275-284, Birkhauser Verlag, Basel, Switzerland, 1997, (1995).

Baumgartner, et al., "Context-Supported Road Extraction," Automatic Extraction of Man-Made Objects from Aerial and Space Images (II); Proceedings of the Centro Stefano Franscini Ascona, Gruen, et al. Eds., pp. 299-308, Birkhauser Verlag, Basel, Switzerland, 1997.

Baumgartner, et al., "Automatic Road Extraction Based on Multi-Scale, Grouping, and Context," Photogrammetric Engineering & Remote Sensing 65(7), pp. 777-785, (1999).

West, et al., "Automatic Extraction and Identification of Lines of Communication from High-Resolution Multispectral Imagery," SPIE Proceedings, vol. 2758, (Apr. 9-11, 1996).

Trinder, et al., "Artificial Intelligence in 3-D Feature Extraction," Automatic Extraction of Man-Made Objects from Aerial and Space Images (II); Proceedings of the Centro Stefano Franscini Ascona, Gruen, et al. Eds.; pp. 257-266, Birkhauser Verlag, Basel, Switzerland.

Tonjes, et al., "Knowledge Based Road Extraction from Multisensor Imagery," ISPRS Symposium "Object Recognition and Scene Classification from Multispectral and Multisensor Pixels," Jul. 6-10, Columbus, OH, (1998).

Wang, et al., "A Knowledge-Based System for Highway Network Extraction," IEEE TGARS 26(5), pp. 525-531, (1988).

Gruen, et al., "Linear Feature Extraction with Dynamic Programming and Globally Enforced Least Squares Matching," Automatic Extraction of Man-Made Objects from Aerial and Space Images; Proceedings of the Centro Stefano Franscini Ascona, Gruen, et al. Eds., pp. 83-94, Birkhauser Verlag, Basel, Switzerland, (1995).

Vosselman, et al., "Road Tracing by Profile Matching and Kalman Filtering," Automatic Extraction of Man-Made Objects from Aerial and Space Images; Proceedings of the Centro Stefano Franscini Ascona, Gruen, et al. Eds., pp. 265-274, Birkhauser Verlag, Basel Switzerland, (1995).

Hu, et al., "Interactive Road Finding for Aerial Images," IEEE Workshop on Applications of Computer Vision; pp. 56-63, (1992).

Barzohar, et al., "Fast Robust Tracking of Curvy Partially Occluded Roads in Clutter in Aerial Images," Automatic Extraction of Man-Made Objects from Aerial and Space Images (II); Proceedings of the Centro Stefano Franscini Ascona, Gruen, et al. Eds., pp. 277-286, Birkhauser Verlag, Basel, Switzerland, (1997).

Gruen, et. al, "Linear Feature Extraction with LSB-Snakes from Multiple Images," International Archives of Photogrammetry and Remote Sensing; vol. 31, Part B3, pp. 266-272, (1996).

Trinder, "Extraction of Man-Made Features by 3-D Active Contour Models," International Archives of Photogrammetry and Remote Sensing, vol. 31, Part B3, pp. 874-879, (1996).

Merlet, et al., "New Prospects in Line Detection by Dynamic Programming," IEEE Trans. PAMI, vol. 18, No. 4 (Apr. 1996).

Haverkamp, "Extracting Straight Road Structure in Urban Environments Using IKONOS Satellite Imagery," Optical Engineering, vol. 41, No. 9, pp. TBD, (Sep. 2002).

* cited by examiner

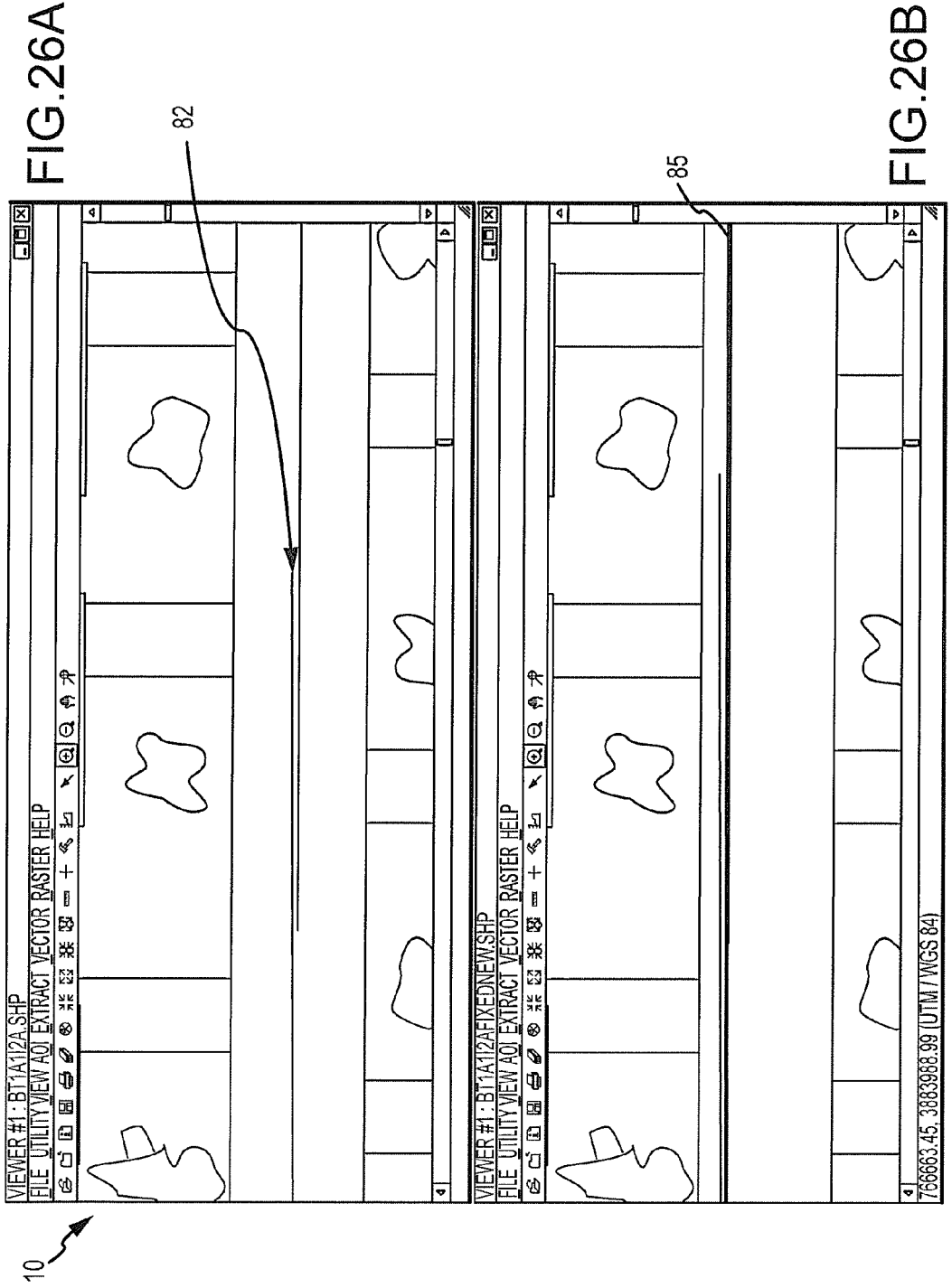

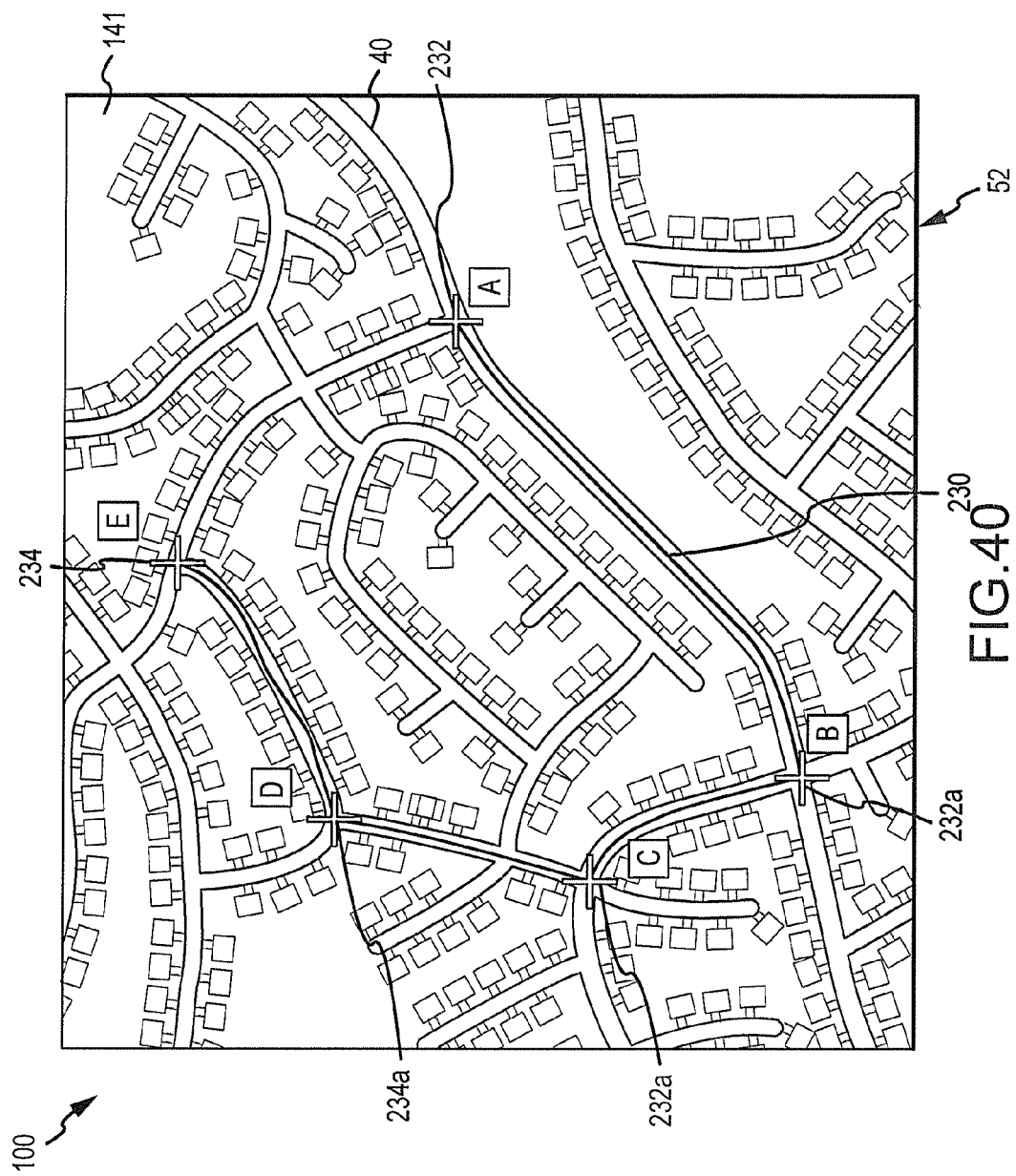

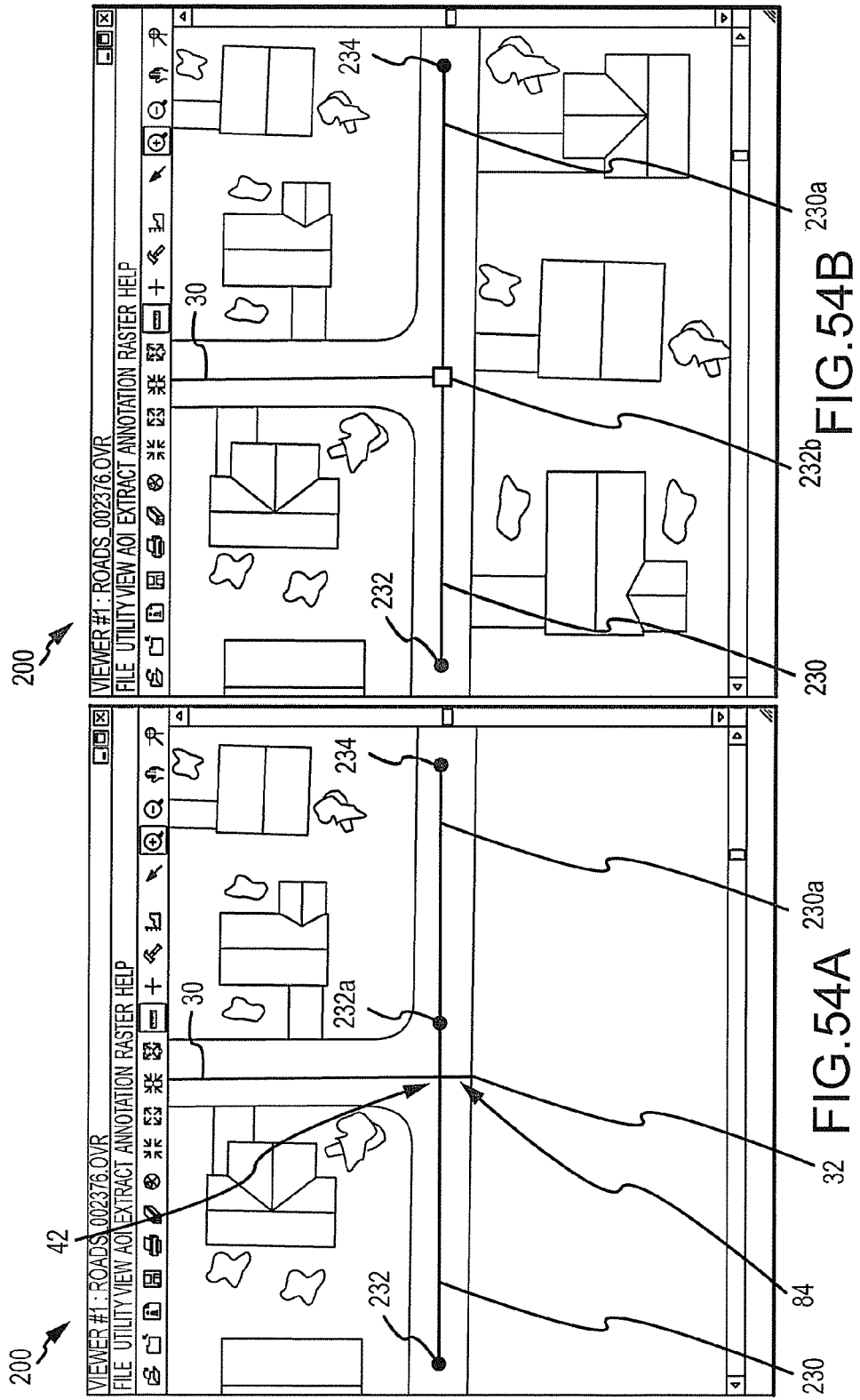

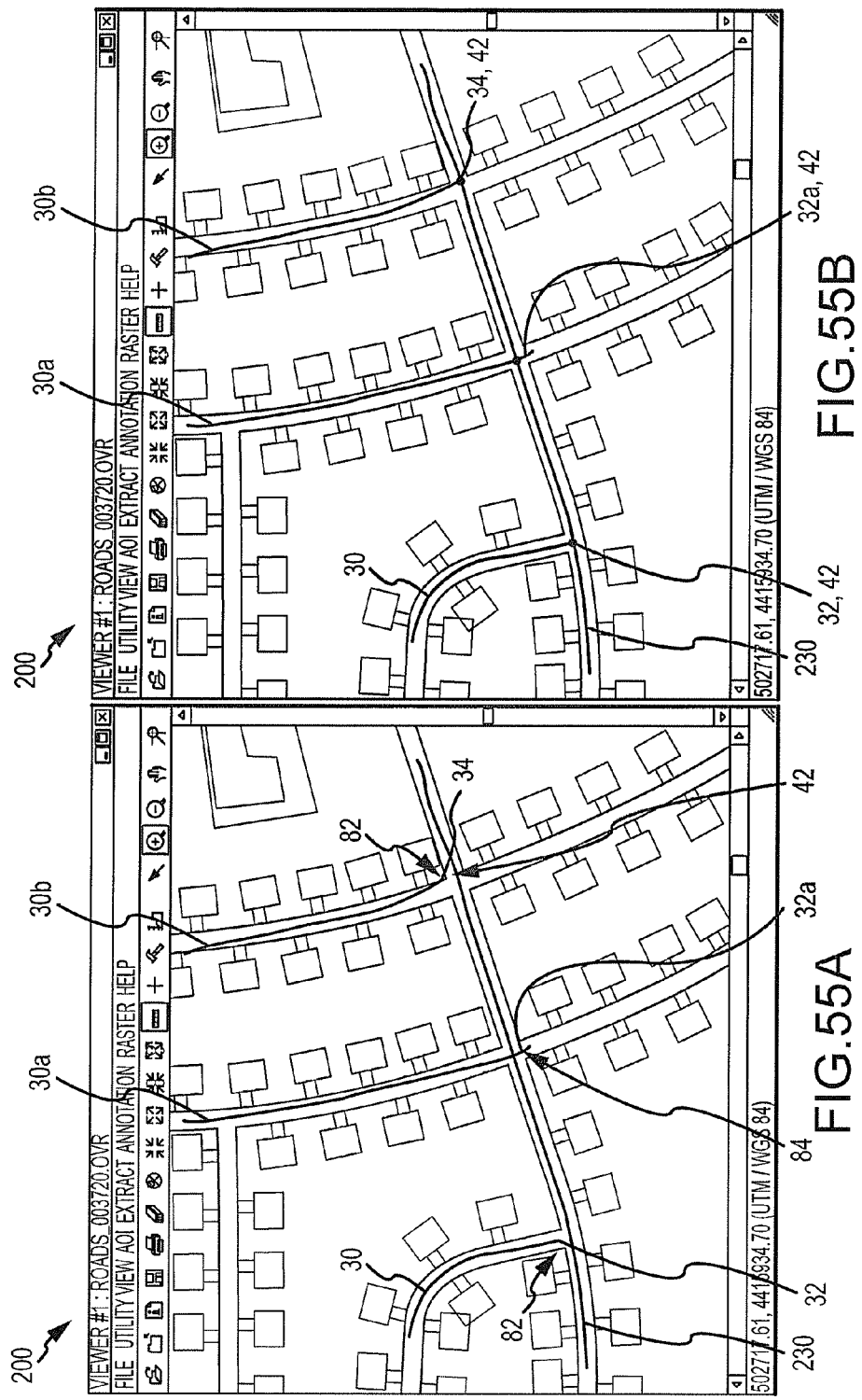

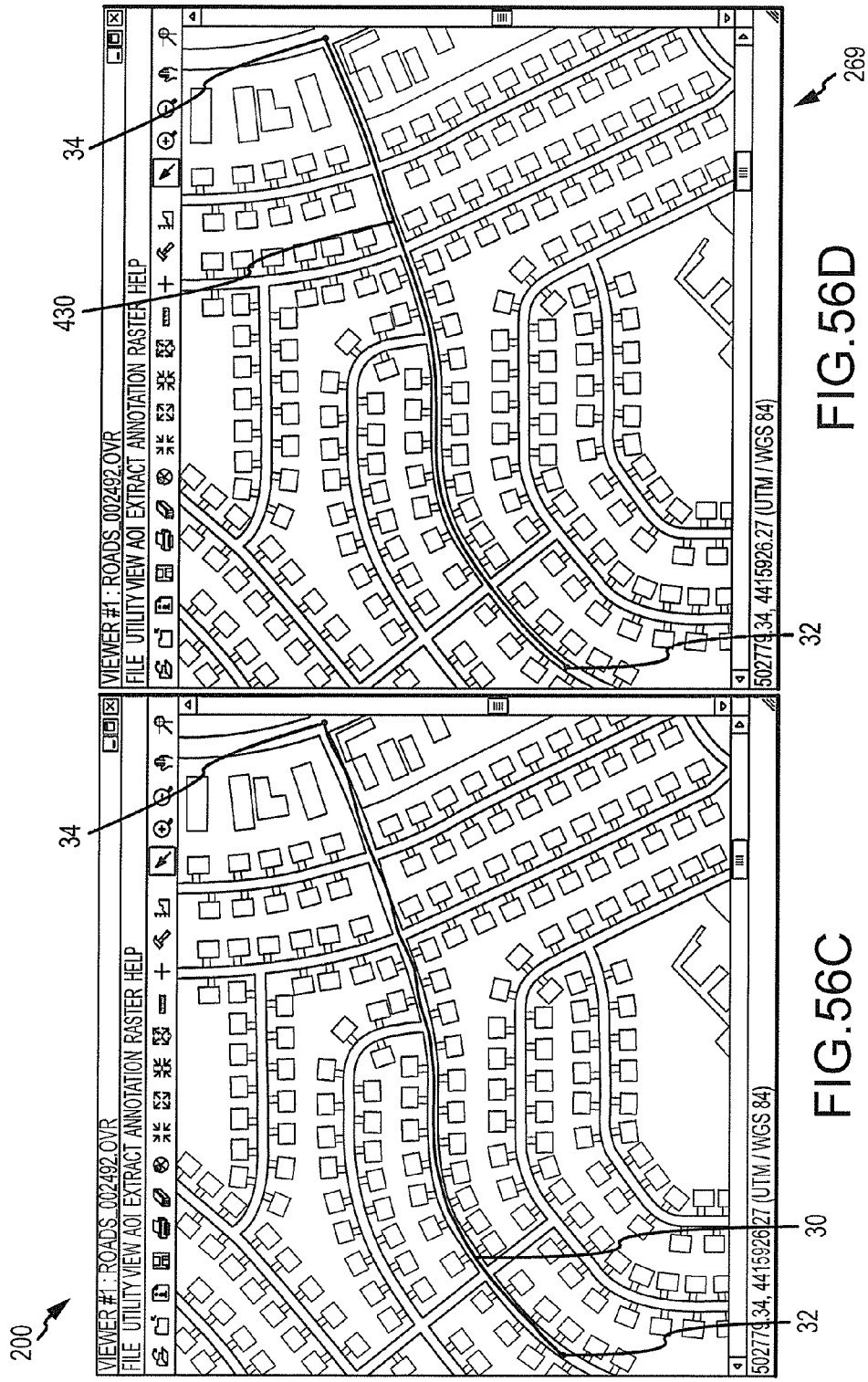

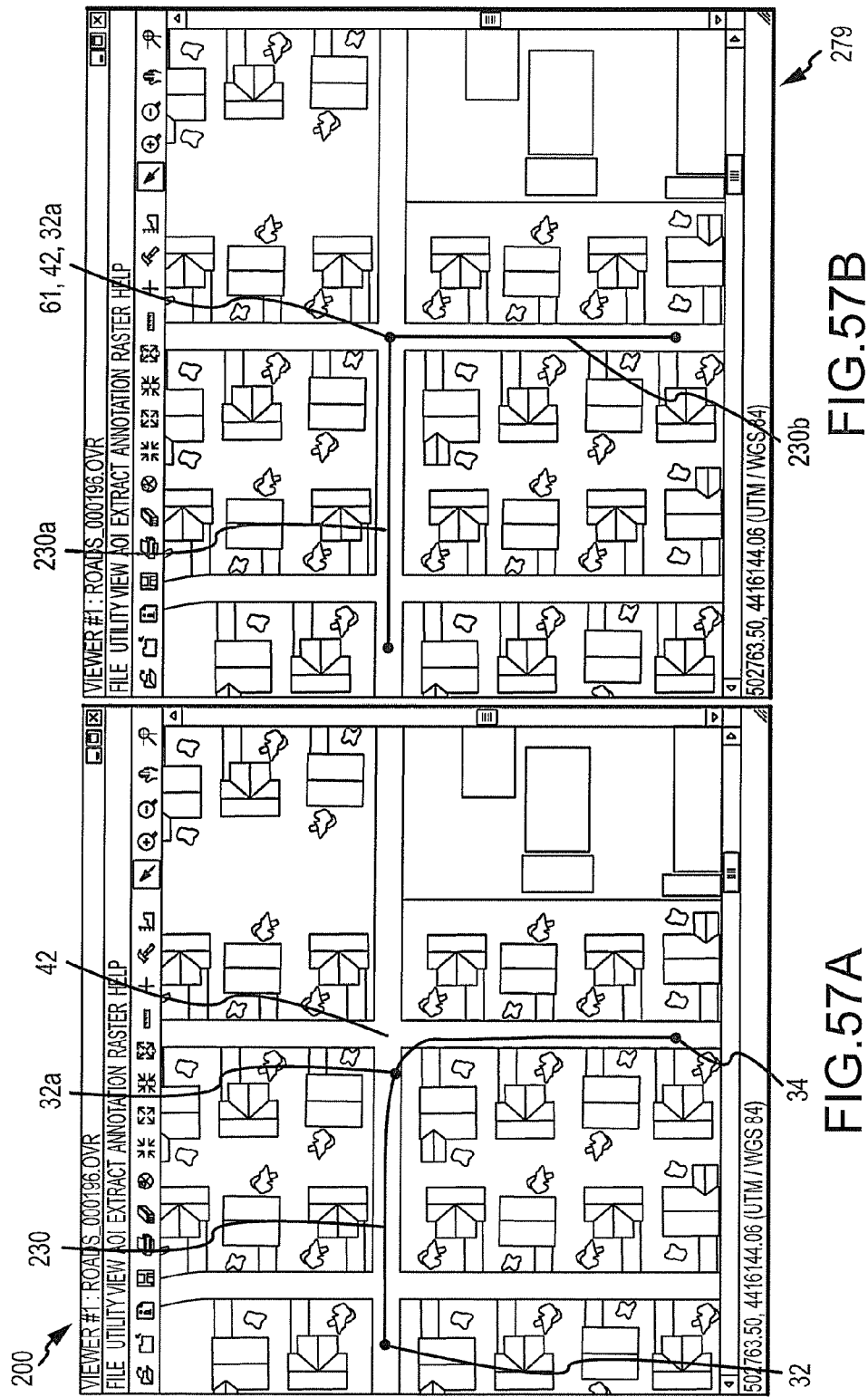

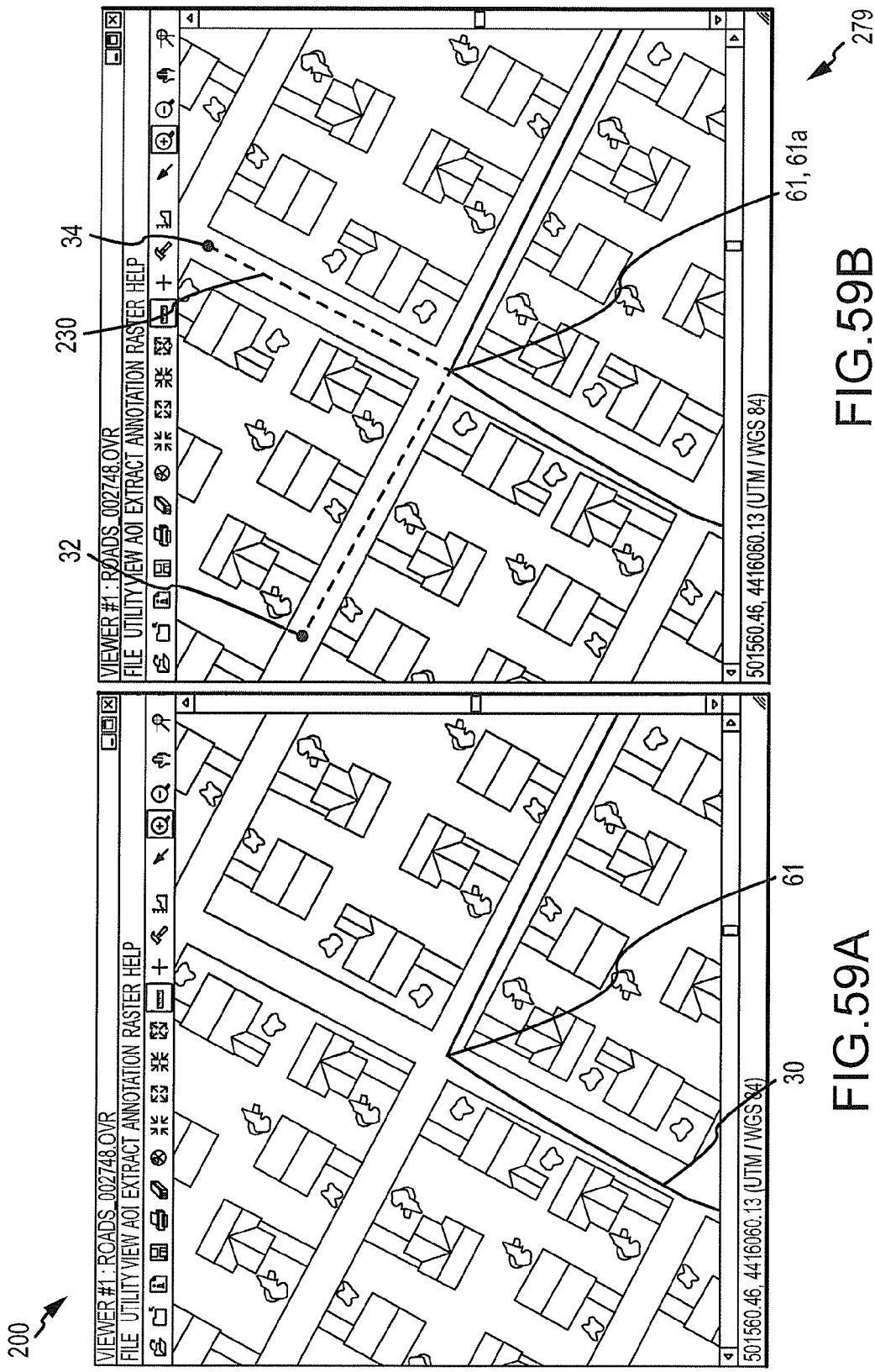

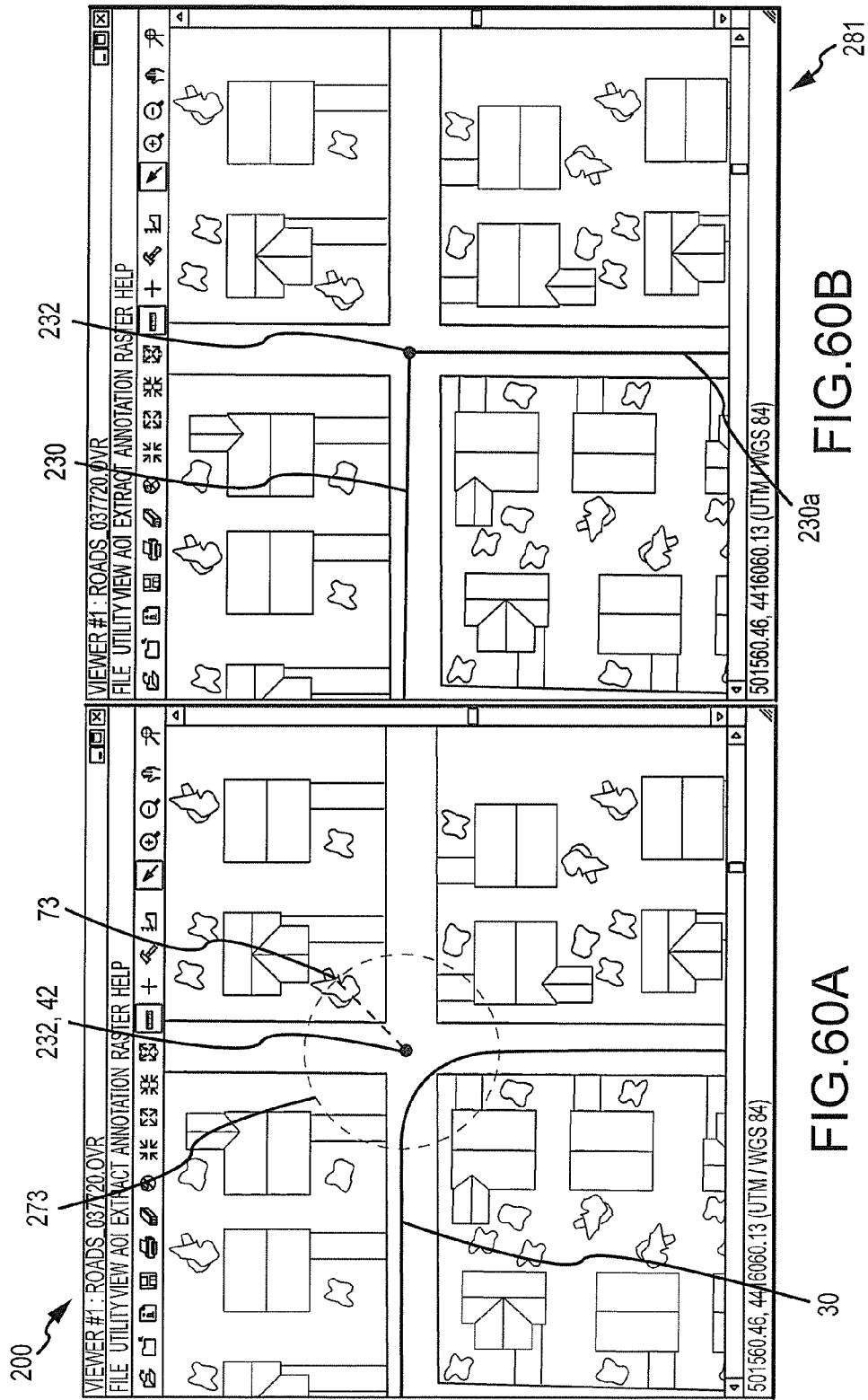

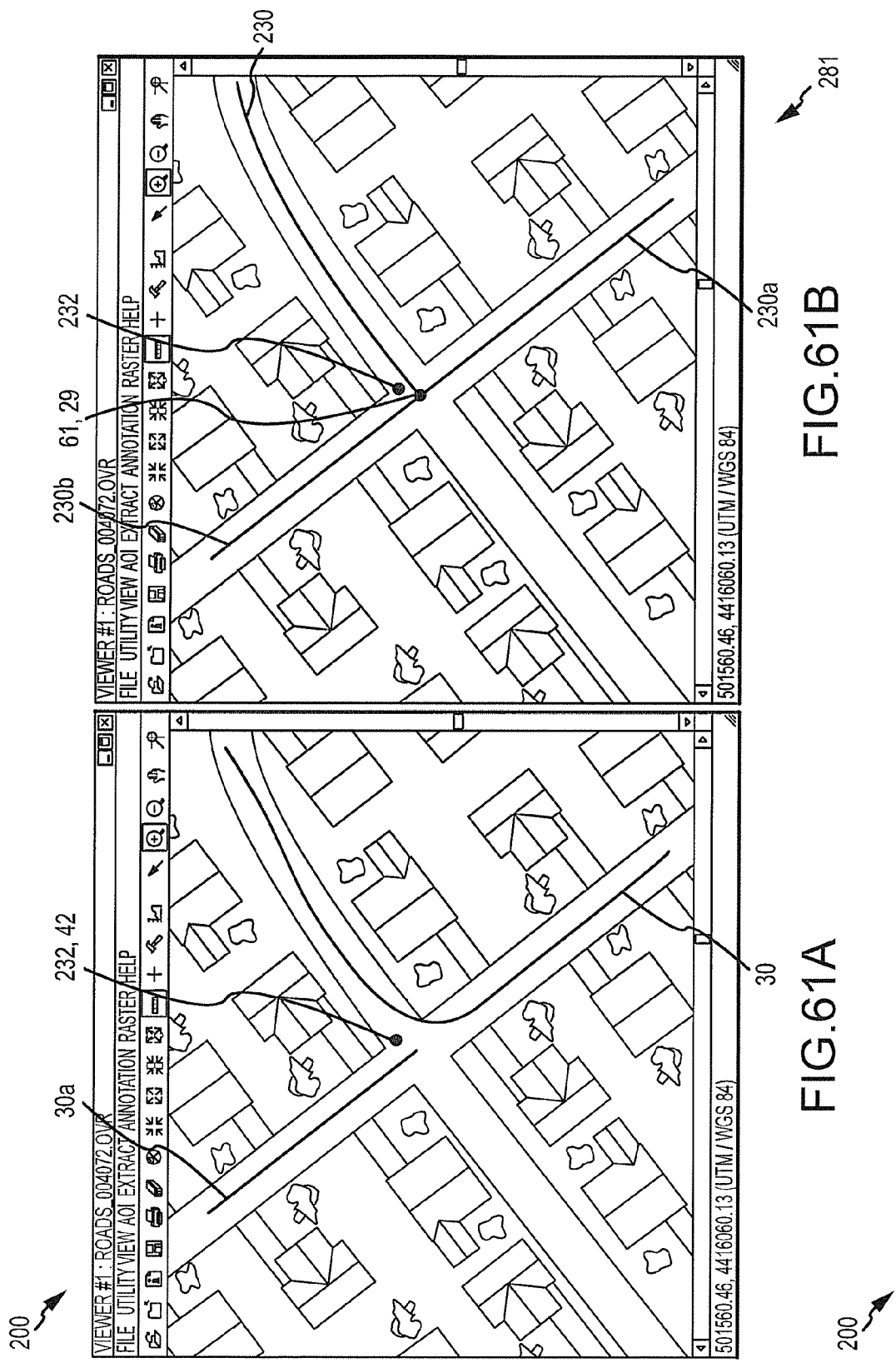

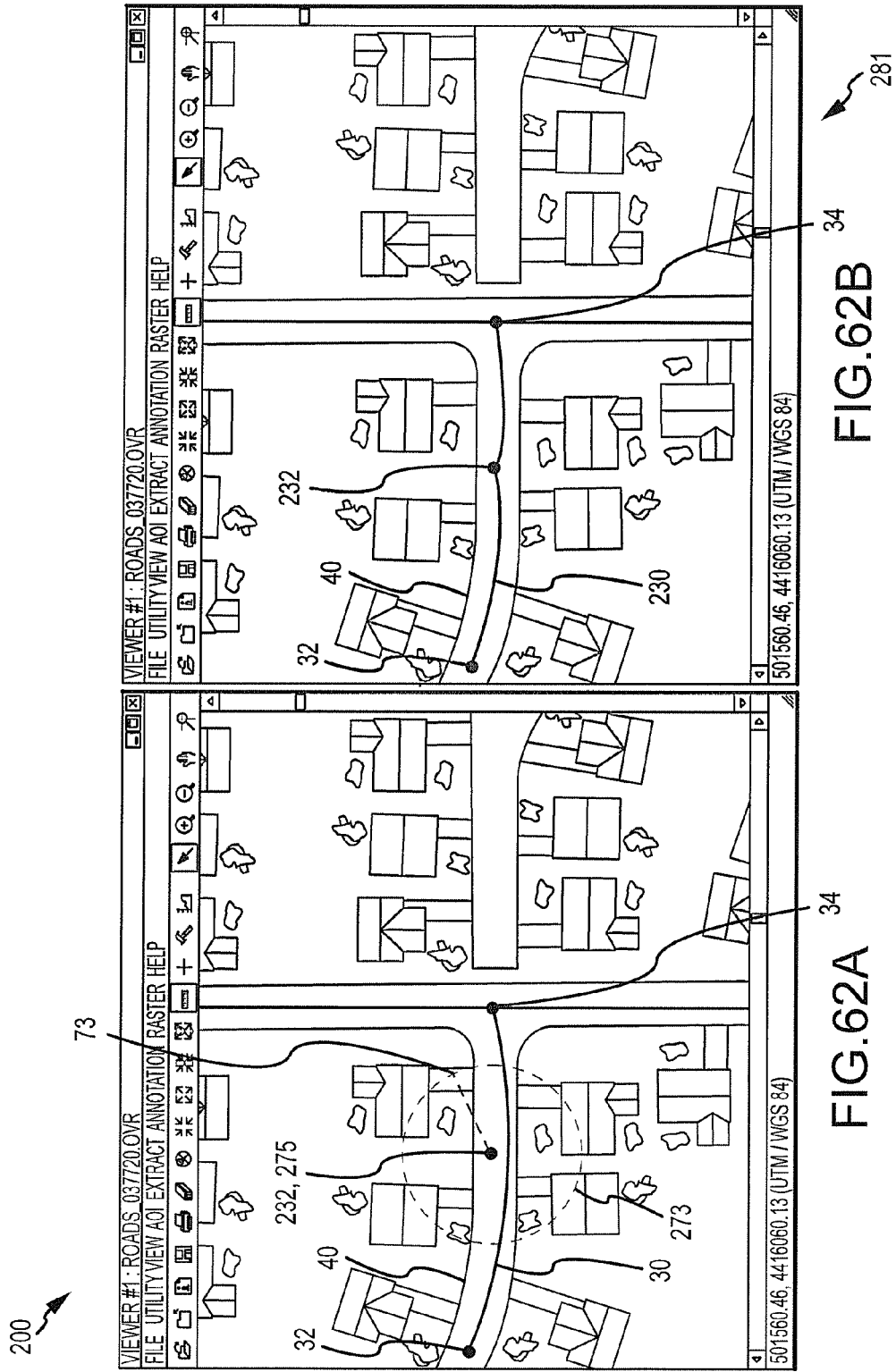

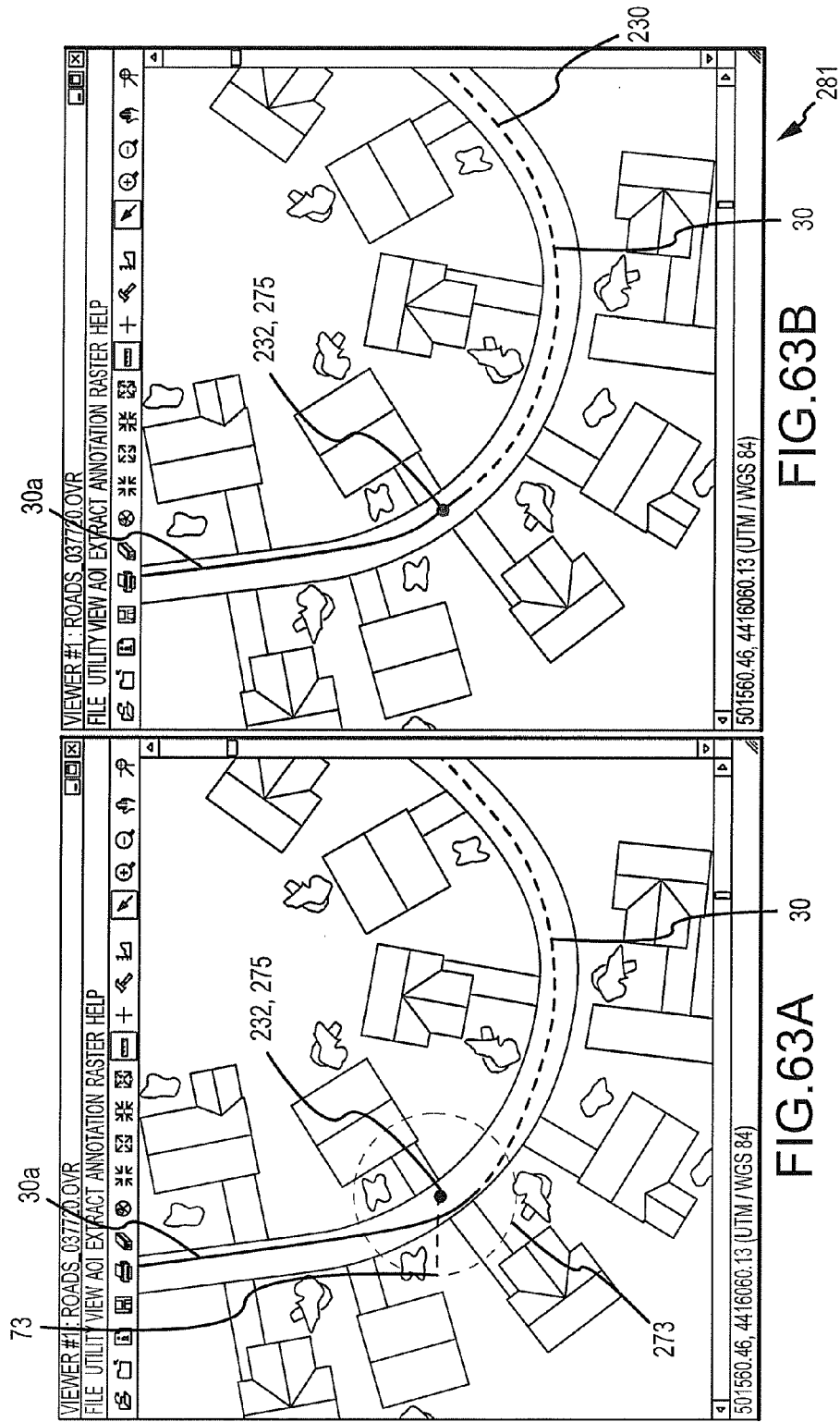

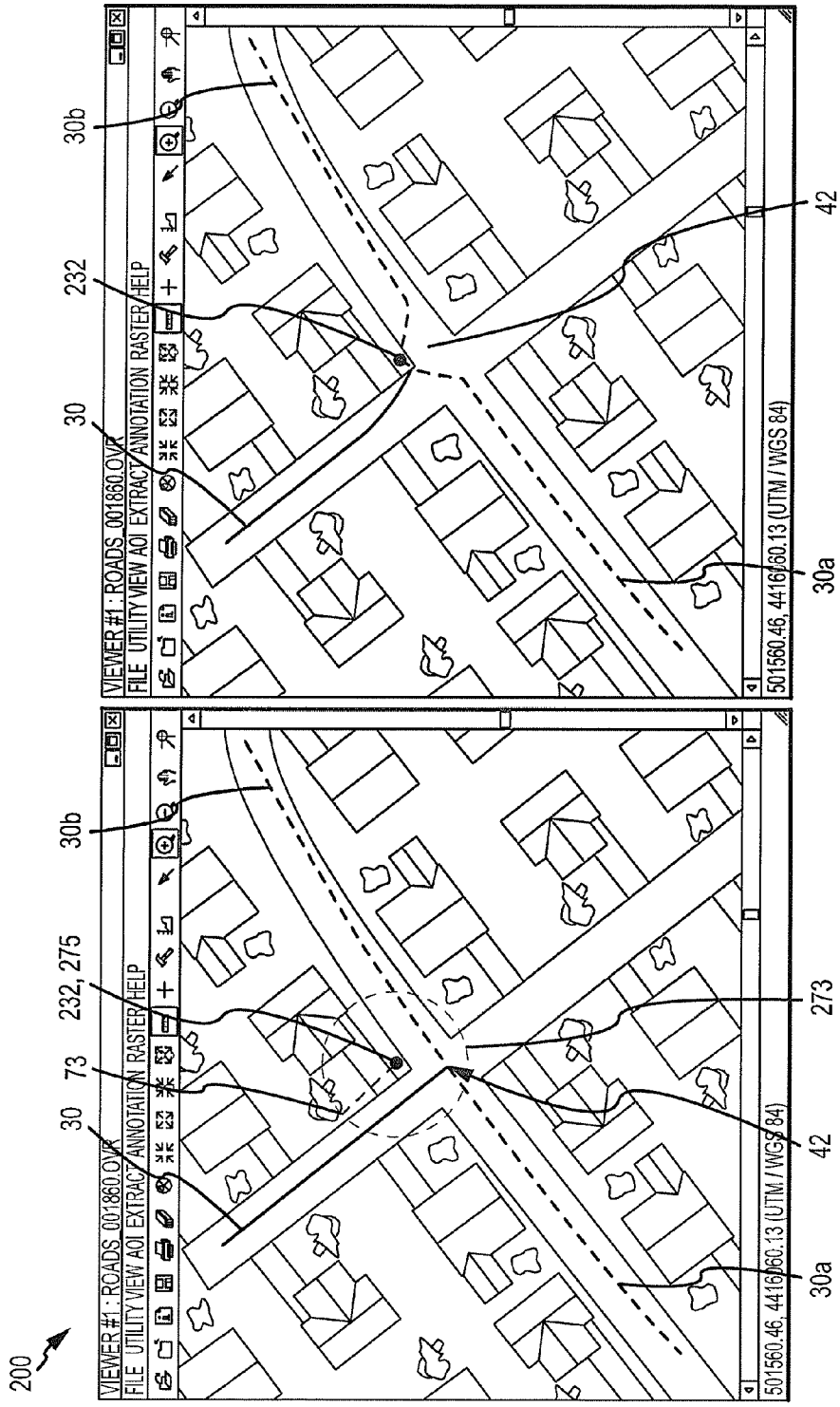

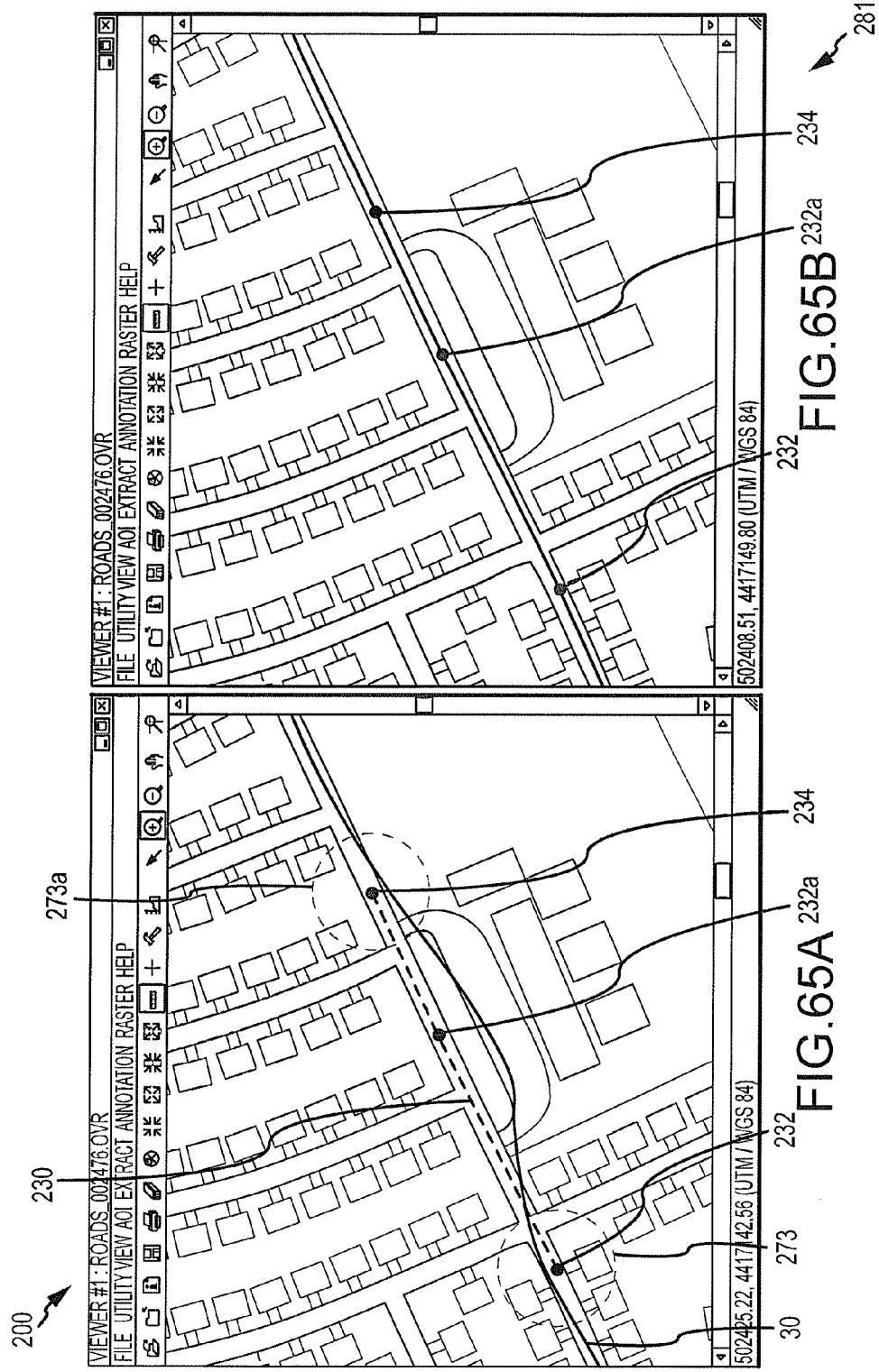

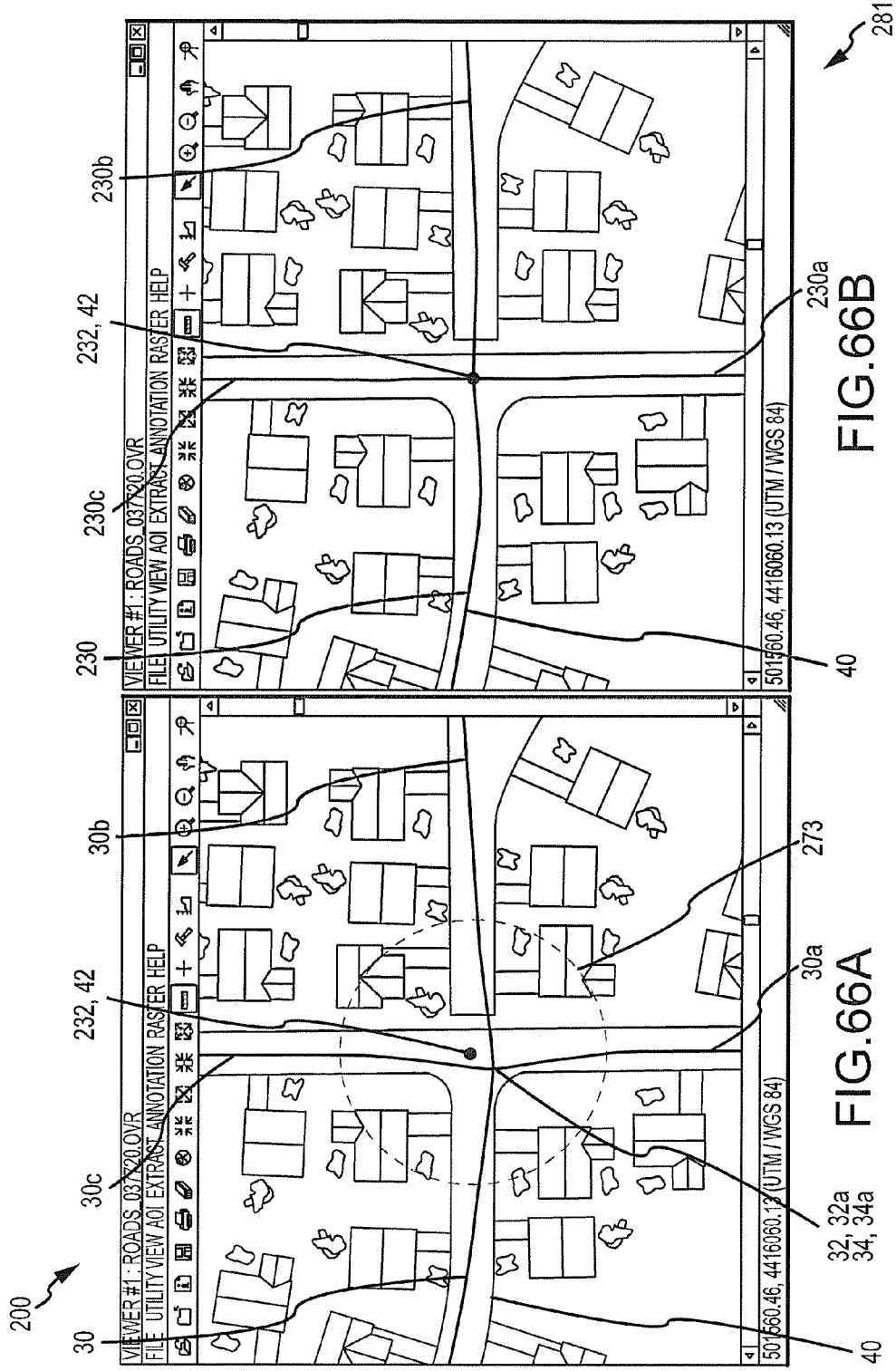

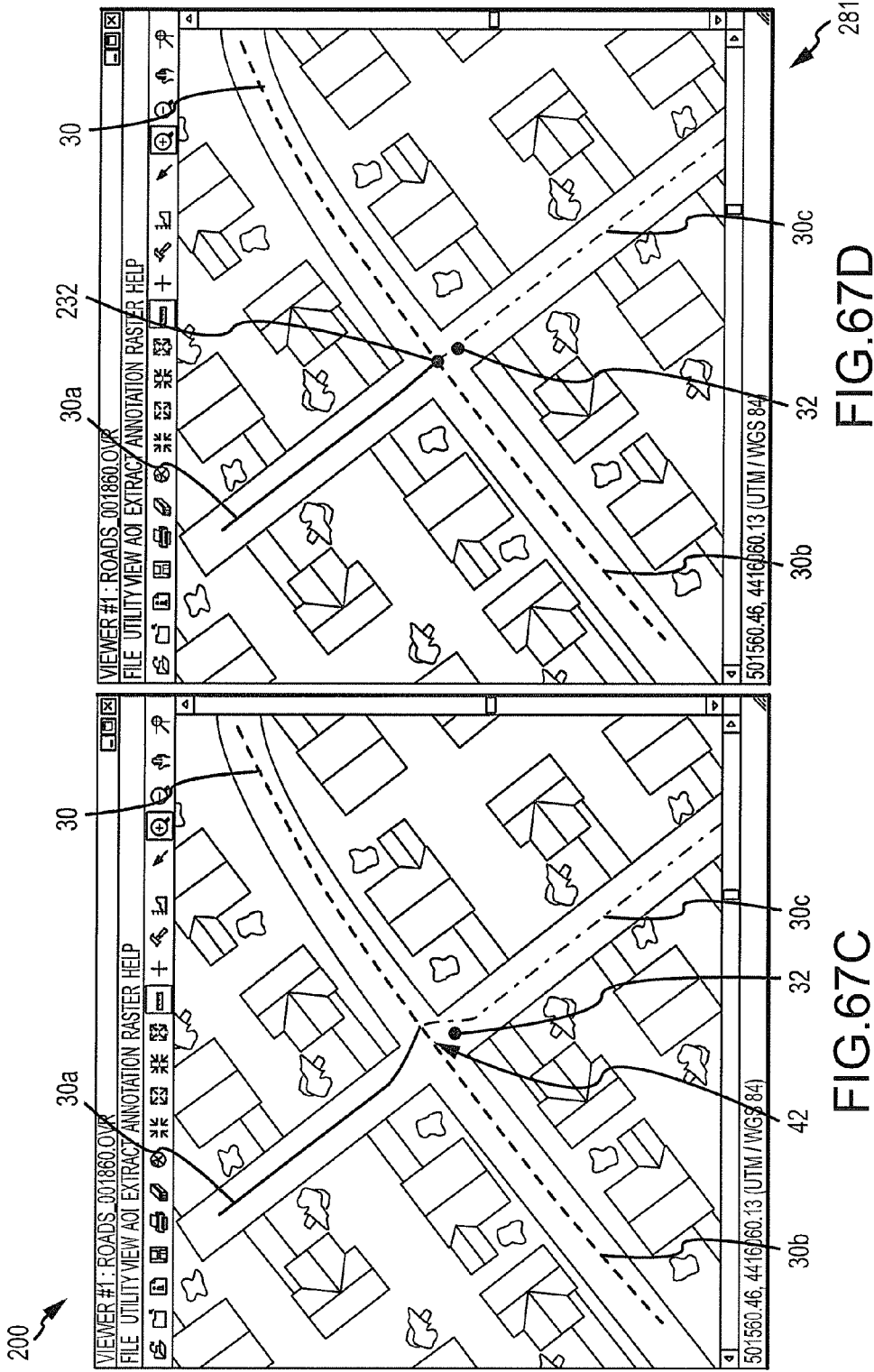

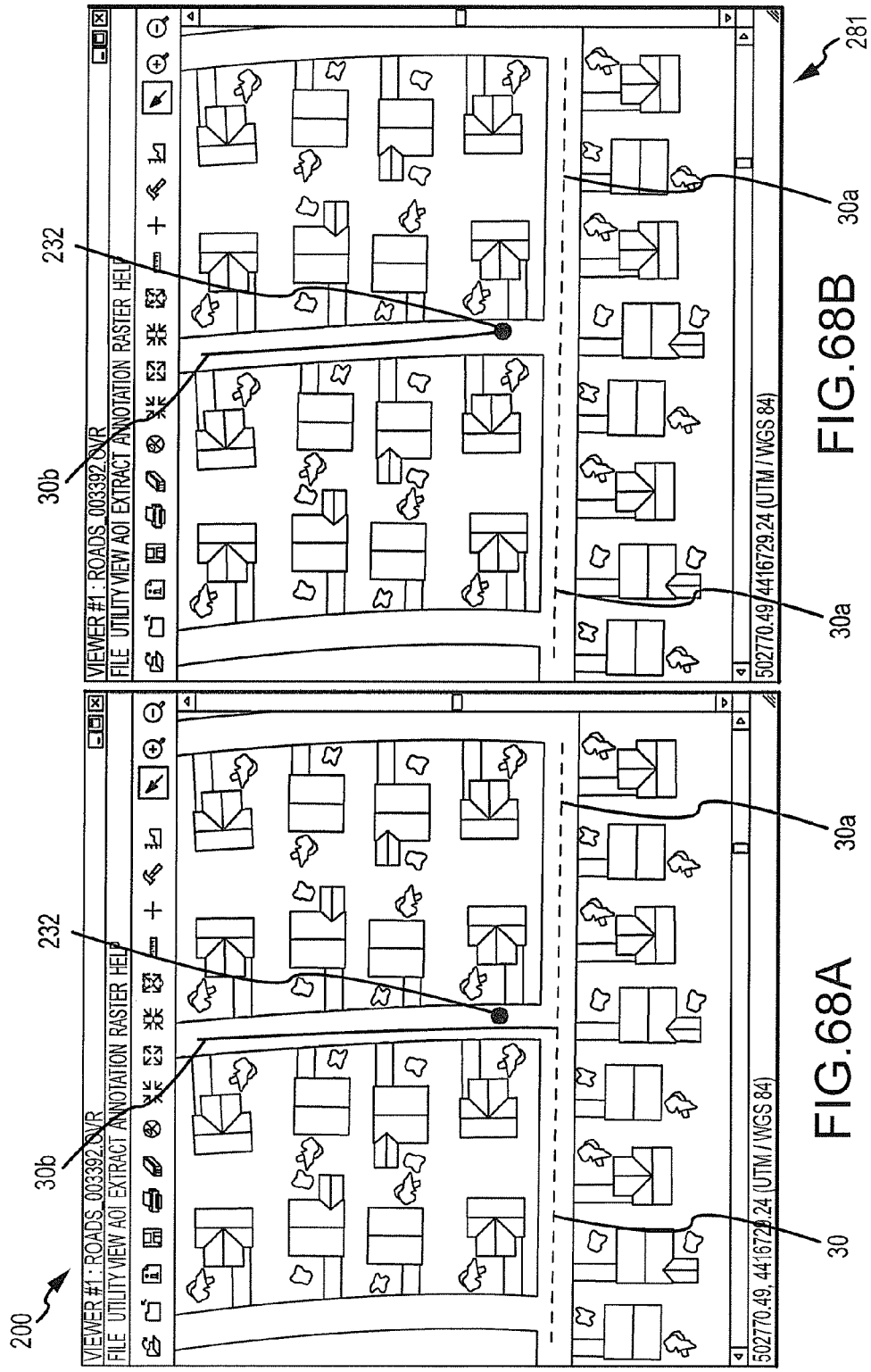

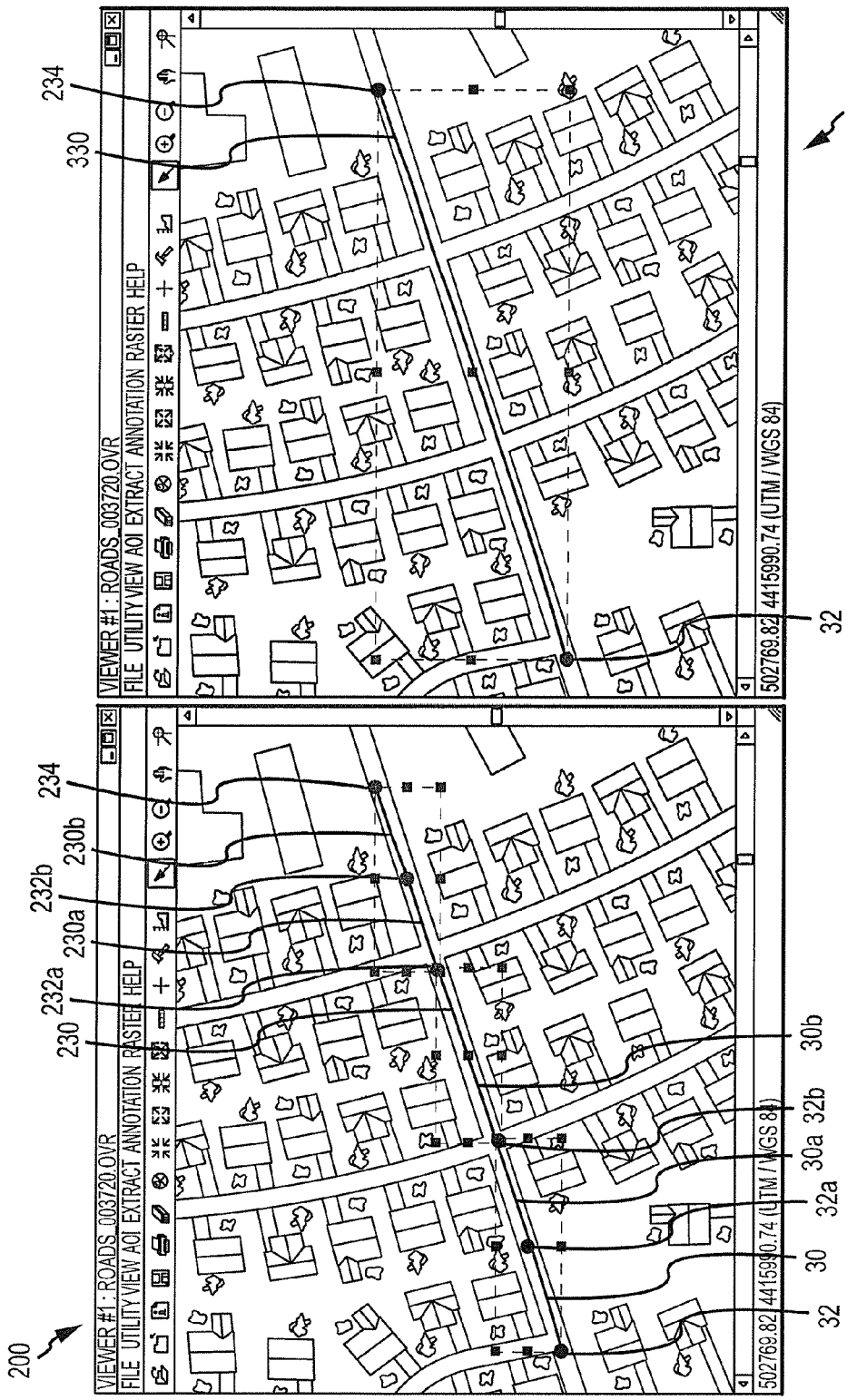

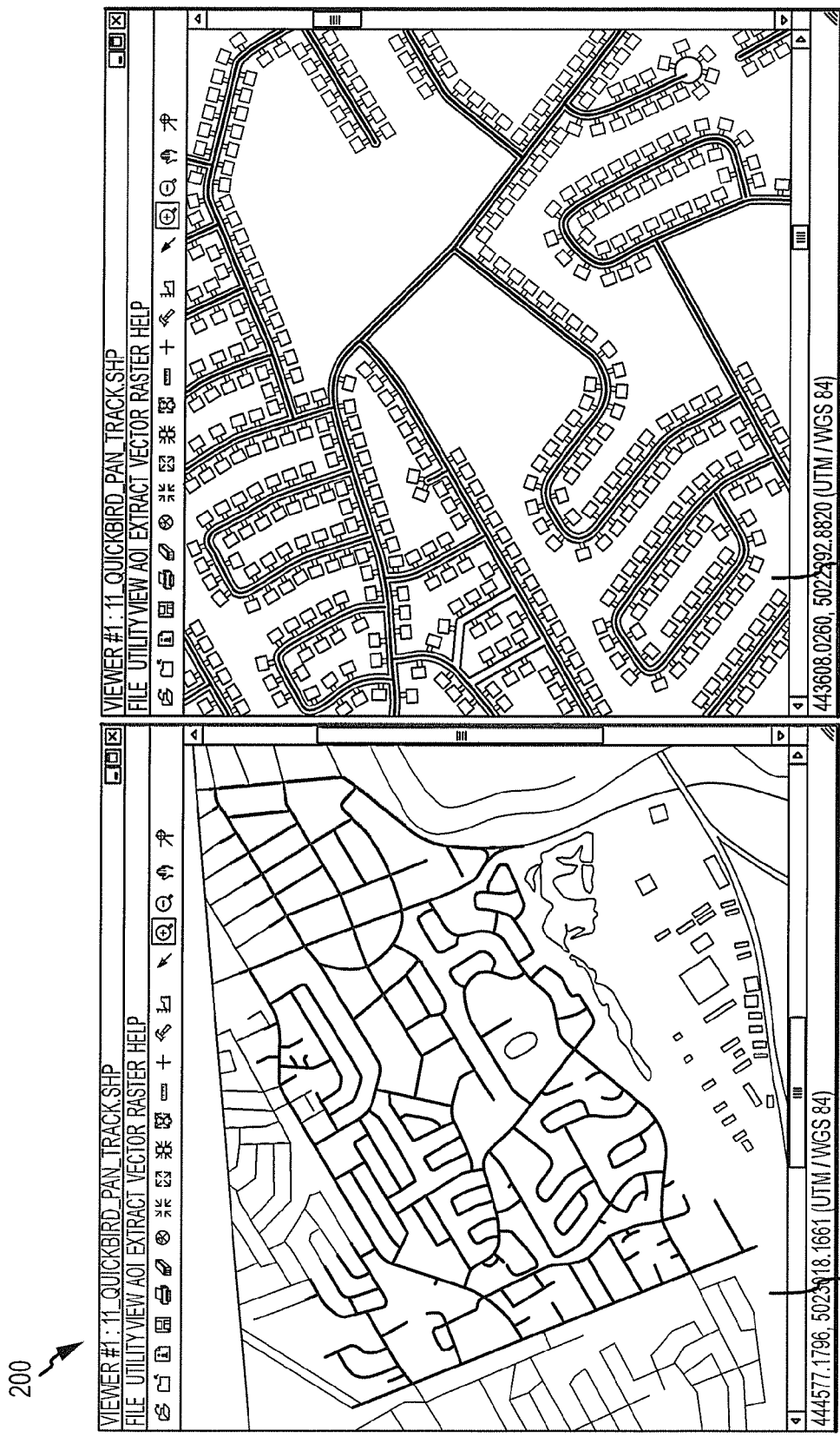

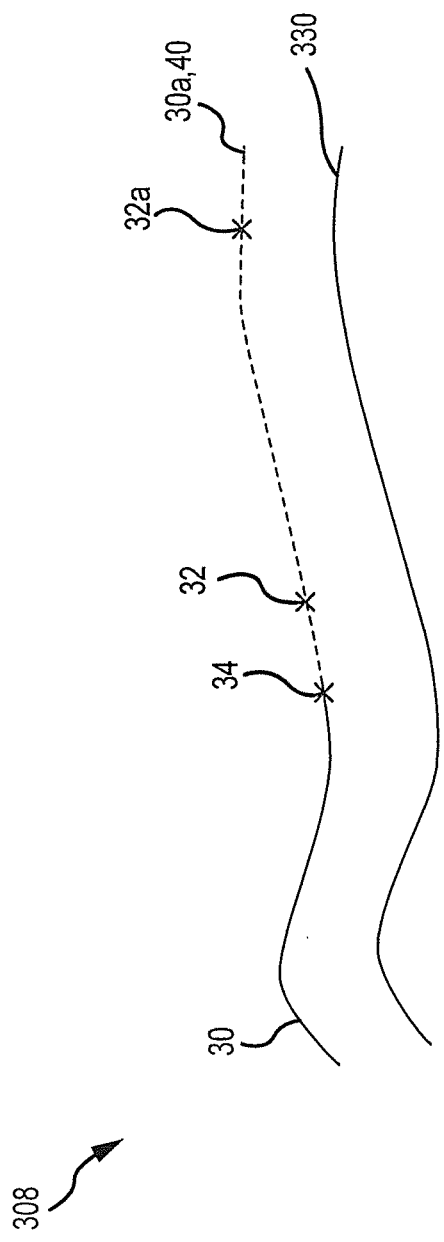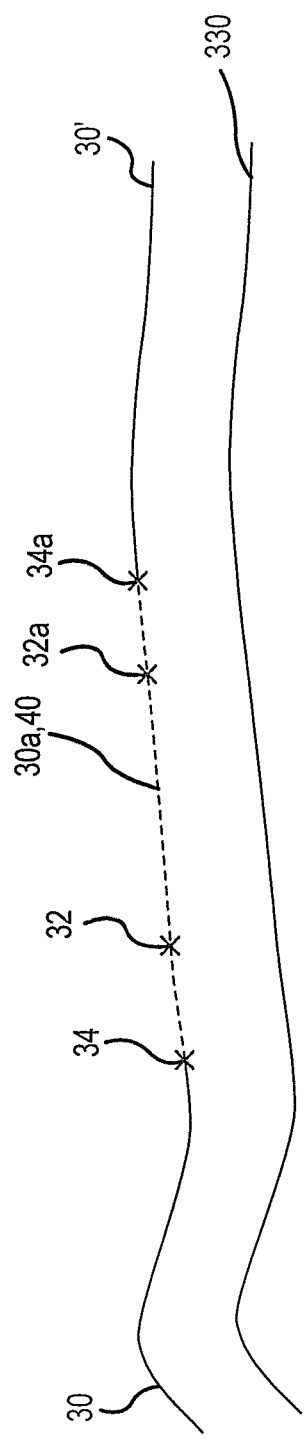
FIG.94A
FIG.94B

SEMI-AUTOMATIC EXTRACTION OF LINEAR FEATURES FROM IMAGE DATA

CROSS-REFERENCES TO RELATED APPLICATIONS

This application is a continuation of continuation-in-part application Ser. No. 12/606,918 filed on Oct. 27, 2009, which is a continuation-in-part of continuation-in-part application Ser. No. 11/764,765, filed Jun. 18, 2007, issued as U.S. Pat. No. 7,653,218, which is a continuation-in-part of nonprovisional application Ser. No. 11/416,282, and application Ser. No. 11/416,276, both filed May 2, 2006, which are abandoned. The aforementioned applications are incorporated herein for all that they disclose.

STATEMENT REGARDING FEDERALLY SPONSORED DEVELOPMENT

This invention was made with Government support under HM1582-07-C-0014 awarded by the National Geospatial Intelligence Agency. The Government has certain rights in this invention.

FIELD OF THE INVENTION

This invention relates generally to the field of geospatial analysis and specifically to extracting features of remotely-sensed image data.

BACKGROUND OF THE INVENTION

Geographical information systems (GIS), including remotely-sensed imagery from satellites and aircraft, have revolutionized mapping. To the naked eye, while this imagery may appear to be merely an aerial view of a particular location captured at a particular point in time, there is significant spatial data associated with the imagery.

Spatial data associated with such imagery may be stored, manipulated and displayed in a raster layer. Each GIS image is divided into a grid made up of rows and columns, forming a matrix. Each rectangle defined by the grid is a pixel or cell. Geographical location coordinates and information regarding other attributes, including spectral component bands (e.g., blue, green, red, and near-infrared in the case of multispectral and hyperspectral imagery), may be associated with each cell in the raster layer. Raster data may be stored for each cell in the matrix or may be compressed, particularly in the case of panchromatic images.

Instead of measuring reflected radiation as would be the case for multispectral imagery, radar imagery is the product of bombarding an area with microwaves and recording the strength and travel-time of the return pulses. Radar imagery has particular utility for geographical mapping, monitoring and military applications because the radar imagery may be acquired in any type of weather or at any time, day or night. Since the microwaves used by radar are longer than those associated with optical sensors, radar is not affected by clouds, smoke, pollution, snow, rain or darkness. While radar imagery may appear to be merely a black and white aerial view of a particular geographical location, there is significant spatial data associated with radar imagery. Spatial data associated with such radar imagery may be stored, manipulated and displayed in a raster layer. Each radar image is divided into a grid made up of rows and columns, forming a matrix. Each rectangle defined by the grid is a pixel or cell. Geographical location coordinates and signal strength may be associated with each cell in the raster layer. Raster data may be stored for each cell in the matrix or may be compressed.

Prior art methods have been developed for extracting road locations from raster data to make road maps. However, the prior art methods have been limited to a specific type of imagery such that methods useful for multispectral imagery would not have worked well on radar imagery, panchromatic, or hyperspectral imagery. Indeed, it is not known whether hyperspectral imagery has even been used for linear feature extraction, since its applications have been primarily limited to agricultural ground use, detection and identification of military targets, ocean and forestry observation, and oil, gas, and mineral exploration. Even given a particular type of imagery, the prior art methods have serious drawbacks. With respect to multispectral imagery, automatic methods for extracting road features are unreliable, often locating roads where none exist. Extracting road features manually may be accurate, but manual extraction is inefficient and tiring for cartographers. With respect to radar imagery, prior art methods have largely been limited to manual extraction. While manual extraction may be accurate for those experienced in working with radar imagery, it is tedious, especially when extracting curved roads. However, given the noise, inconsistent brightness and relative low resolution of radar imagery, prior art automatic methods for extracting road features from radar imagery have proved completely unreliable, often veering off the roads or locating roads where none existed.

Thus, there developed a need for an interactive method of extracting linear features from remotely-sensed imagery of all kinds, using spatial data contained in raster layers.

BRIEF SUMMARY OF THE INVENTION

The following summary is provided as a brief overview of the claimed invention. It shall not limit the invention in any respect, with a detailed and fully enabling disclosure being set forth in the Detailed Description of the invention section. Likewise, the invention shall not be limited in any numerical parameters, hardware, software, platform or other variables unless otherwise stated herein.

An embodiment of the present invention comprises a method for editing a vector set associated with an extracted linear feature in a remotely sensed image, the vector set defining a path and being tied to a geographical location. The method comprises: displaying the path in the remotely sensed image in a graphical display; by user interface, activating a smart editing tool; using a motion sensitive device linked to a cursor on the graphical display, establishing a region of influence operatively associated with the motion sensitive device and the smart editing tool, the region of influence being centered around the cursor, displayed on the graphical display and being configured to change location in the graphical display in response to movement of the cursor as directed by the motion sensitive device; using the motion sensitive device to move the cursor to a user-specified point in the vicinity of the path, thereby changing the location of the region of influence to encompass at least a portion of the path; automatically evaluating the path for an error in the vector set using image-based logic; using image-based logic, automatically suggesting a proposed correction for the error and displaying the proposed correction in real time on the graphical display; by user interface, previewing the proposed correction on the graphical display; using the motion-sensitive device, implementing the proposed correction in a final correction to the vector set resulting in a revised path; and displaying the revised path in real time on the graphical display.

Another embodiment comprises a method for modifying a segment from a path associated with an extracted linear feature in a remotely sensed image, the segment being tied to a geographical location and stored in a file. The method comprises: displaying the path on a graphical display; using a motion sensitive device operatively associated with a cursor to select a first point in the vicinity of path, the first point being associated with a first end point of the segment; by user interface, using the motion sensitive device to move the cursor along the path in a direction away from the first end point to a temporary end point, the temporary end point and the first end point being connected by a temporary segment; using the motion-sensitive device, converting the temporary end point to a second end point, thereby changing the temporary segment to the segment; automatically modifying the segment in real time on the graphical display to a modified segment; and saving the modified segment in the file.

In yet another embodiment, the present invention comprises a method for excising a plurality of vector sets contained within a final polygon, the plurality of vector sets defining paths associated with a plurality of extracted linear features in a remotely sensed image, the vector sets being tied to geographical locations and stored in a file. The method comprises: displaying the paths on a graphical display; using a motion sensitive device operatively associated with a cursor to select a first vertex in the vicinity of the paths by marking the first vertex with the cursor; using the motion sensitive device to move the cursor to select at least a second vertex and a third vertex, the first vertex, second vertex and third vertex being connected in real time in the graphical display to form a polygon encompassing the vector sets; converting the polygon into the final polygon; automatically excising the vector sets contained within the final polygon in real time in the graphical display; and removing the vector sets contained within the final polygon from the file.

The present invention also comprises a method for attributing a geometry to a path defined by a vector set associated with an extracted linear feature, comprising: displaying the path on a graphical display; using a motion sensitive device to select the path by locating a cursor associated with the motion sensitive device on the path; using the motion sensitive device to continuously change the geometry of the path in real time resulting in a changed geometry; and associating the changed geometry with the vector set in the file.

In another embodiment, the present invention comprises a method for modifying a plurality of vector sets associated with extracted linear features in a remotely sensed image displayed in a graphical display, comprising: activating a paint selection mode; selecting the plurality of vector sets by using a motion-sensitive device operatively associated with a cursor to move the cursor along a trajectory in the remotely sensed image; adding each vector set in the trajectory to a selection ensemble; and performing a universal modification action on the vector sets in the selection ensemble.

The present invention also comprises a method for reviewing the accuracy of extracted linear features in a remotely-sensed image, each extracted linear feature being defined by a vector set. The method comprises: displaying the remotely sensed image on a graphical display; partitioning the remotely sensed image into a plurality of cells, the plurality of cells being displayed in the graphical display; selecting one of the plurality of cells to be a focused cell; reviewing at least one vector set within the focused cell, the at least one vector set being a reviewed vector set and other vector sets being unreviewed vector sets; in real time, designating the reviewed vector set as committed and the unreviewed vector sets as uncommitted; and storing the committed vector set.

The invention further comprises a method for modifying a plurality of vector sets associated with a plurality of extracted linear features in a remotely sensed image, the vector sets being tied to geographical locations and stored in a file. The method comprises: displaying the remotely sensed image on a graphical display; using a motion sensitive device operatively associated with a cursor to select a first vertex in the remotely sensed image, marking the first vertex with the cursor; using the motion sensitive device to move the cursor to select at least a second vertex, the first vertex and the second vertex being connected in real time in the graphical display to form a polyline crossing the vectors sets resulting in selected vector sets; automatically distinguishing the selected vector sets in the graphical display; and modifying the selected vector sets.

An embodiment of the present invention comprises a method for extracting a linear feature in a remotely-sensed image comprising pixels, the linear feature being of a user-selected type and associated with a geographical location. The method comprises: displaying the linear feature on a graphical display; dividing the pixels into a first group and a second group, the first group of pixels being associated with the linear feature and the user-selected type; storing the first group of pixels and second group of pixels in a file; selecting by user-interface a point in the vicinity of the linear feature in the remotely sensed image; using image-based logic and the first group of pixels, automatically snapping the point to the linear feature; and extracting the linear feature, the extracted linear feature being defined by a vector set.

The present invention also comprises a method for extending a first path in a remotely sensed image, the first path being defined by a first vector set associated with an extracted linear feature and a first geographical location. The method comprises: displaying the first path in a graphical display; by user-interface, selecting an additional linear feature oriented substantially in tandem with the path; by user interface, selecting an anchor point for the additional linear feature; using image-based logic and the anchor point, automatically calculating a second vector set, the second vector set being associated with the additional linear feature and a second geographical location and defining a second path; and in real time, automatically connecting the second path to the first path.

BRIEF DESCRIPTION OF THE DRAWINGS

The accompanying figures, which are incorporated herein and form a part of the specification illustrate various embodiments of the present invention, and together with the description, serve to explain the invention. In the figures:

FIG. 26, with subparts 26A and 26B, shows automatically fixing a gap.

FIG. 40 shows anchor point selection for loop with sharp bend.

FIG. 55 shows an embodiment using point snapping algorithm and establishing orthogonal crossroads.

FIG. 57 shows using automatic corner installation.

FIG. 59 shows yet another embodiment of using automatic corner installation.

FIG. 60 shows using corner break installation tool.

FIG. 61 shows another embodiment of using corner break installation tool.

FIG. 62 shows using 1-point detour tool.

FIG. 63 shows another embodiment of using 1-point detour tool.

FIG. 65 shows using N-point detour tool.

FIG. 66 shows using move terminals tool.

FIG. 68 shows yet another embodiment of the move terminals tool.

FIG. 71 shows using a fuse tool.

FIG. 77 shows QuickBird Pan image with (a) semi-automatic extraction according to a method of the invention and (b) manual extraction.

FIG. 94 shows using embodiments of vector extension mode.

DETAILED DESCRIPTION OF THE INVENTION

Broadly described, a method 10 of the present invention comprises extracting at least one linear feature from remotely-sensed imagery. As used herein, "remotely-sensed imagery" is satellite or aerial imagery of a geographical location that measures reflected or emitted radiation in spectral bands ranging from ultraviolet to infrared on the electromagnetic spectrum, and maintains spatial data in a raster GIS format. A "multispectral image" is an image collected in multiple bands ranging from ultraviolet to infrared. A "panchromatic image" is an image collected in the broad visual wavelength range (plus near-infrared) but rendered in black and white. As used herein, "radar imagery" is imagery produced by illuminating a geographical area with microwaves and measuring and recording the strength and travel time of the received signals or the transmitted and received signals. Radar imagery includes but is not limited to imagery produced from real aperture and synthetic aperture radar (SAR). Generally, radar imagery includes single-band imagery of varying resolutions and dynamic ranges. "Hyperspectral imagery" is an image collected in hundreds of narrow and contiguous spectral bands. Hyperspectral imagery differs from multispectral imagery in the number of bands and the fact that the bands are contiguous. In addition, hyperspectral image data may be viewed in three dimensions of two spatial dimensions and one spectral dimension. A "linear feature" is any feature captured in remotely-sensed imagery such that its pixels lie within a neighborhood distance of a polygonal line, where the neighborhood distance is small by comparison to the total length of the polygonal line. Linear features may include but are not limited to paved roads, unpaved roads, trails, rivers, paths and runways. The linear feature is not limited in any respect to a straight line; thus, the linear feature may be irregular, curved, zigzagged, or meandering, as may be the case of a rural road or a trail. In addition, the linear feature may be characterized by a geometric shape indicative of an aspect of a road, including but not limited to a circle, an oval, loop, or cloverleaf. "Extracting" is a term broadly used to describe a process for locating and identifying the linear feature by reference to at least one data component (e.g., geographical location) associated with the linear feature.

Figure 1:
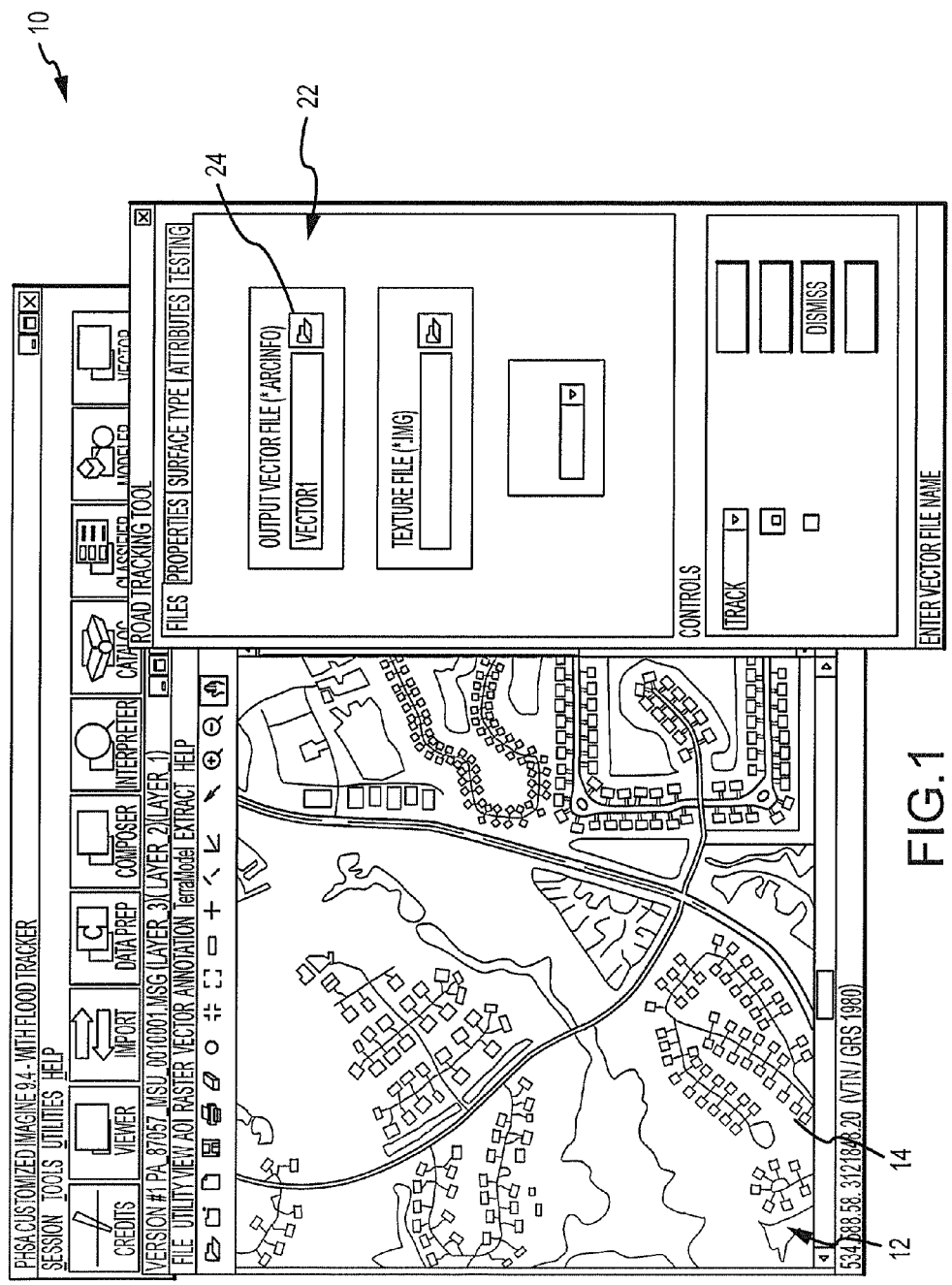
FIG. 1 shows the selecting of a multispectral image.

According to an embodiment of a method 10 of the invention, using a commercially-available geospatial imaging raster-based software, the user may select 12 a four-band multispectral image 14 that has previously undergone atmospheric correction according to methods that are well-known in the art, although such atmospheric correction is not required. By way of example, the four bands of the multispectral image 14 are blue, green, red and near-infrared. However, other spectral bands or additional or fewer bands may be used. FIG. 1 shows the selecting 12 of four-band multispectral image 14 as used in an embodiment herein. The multispectral image 14 has a spatial resolution of about 3.28 meters. The commercially-available software is ERDAS IMAGINE® sold by Leica Geosystems Geospatial Imaging, LLC of Norcross, Ga. The four-band multispectral image 14 was produced by the IKONOS® satellite owned by GeoEye, Dulles, Va.

Figure 2:
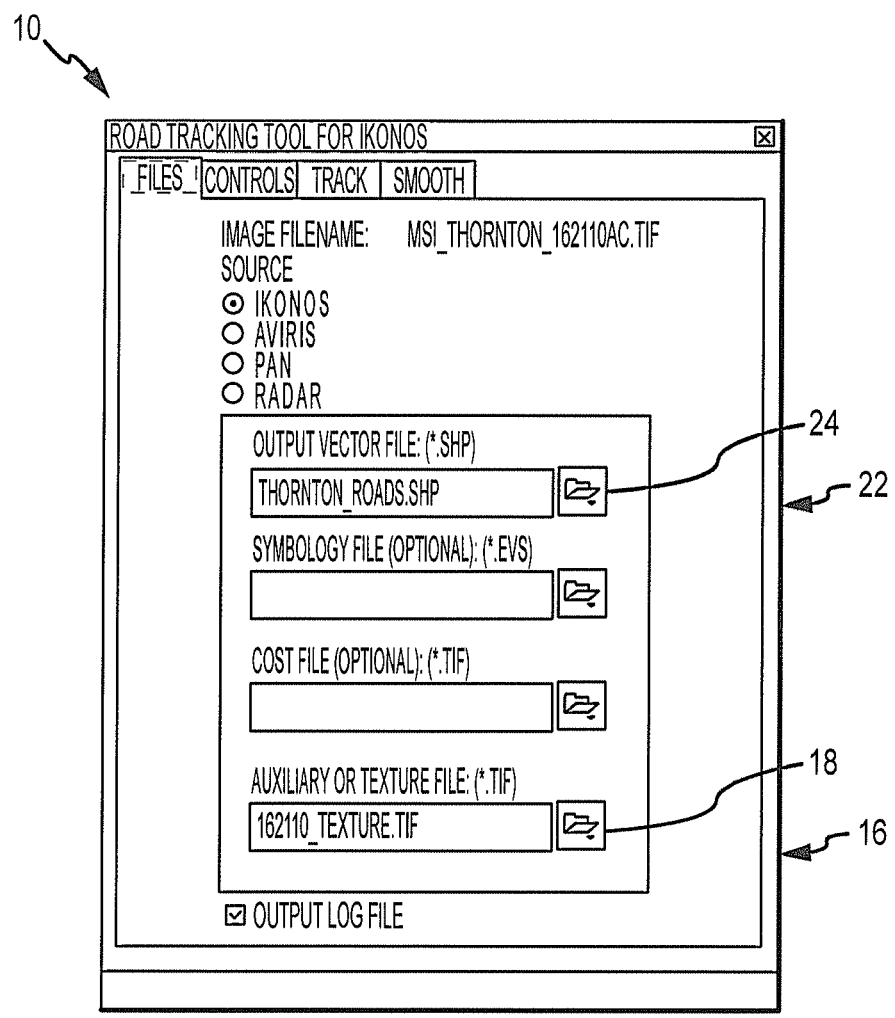
FIG. 2 shows selecting output vector file and texture file for the multispectral image.

The method 10 may further comprise selecting 22 an output vector file 24, as shown in FIGS. 1 and 2. The output vector file 24 may comprise at least one vector set, a material type 56 and a geometry 46, as explained more fully below. As used herein, a "vector set" comprises a sequence of points (coordinate pairs (x, y)) (e.g., vector) defining a polygonal path 30 through user-specified anchor points 32, 34. By virtue of its creation, the polygonal path 30 may introduce zero to many additional intermediate points 38 between anchor points 32, 34.

Figure 3:
FIG. 3 shows a panchromatic image associated with a multispectral image.
Figure 4:
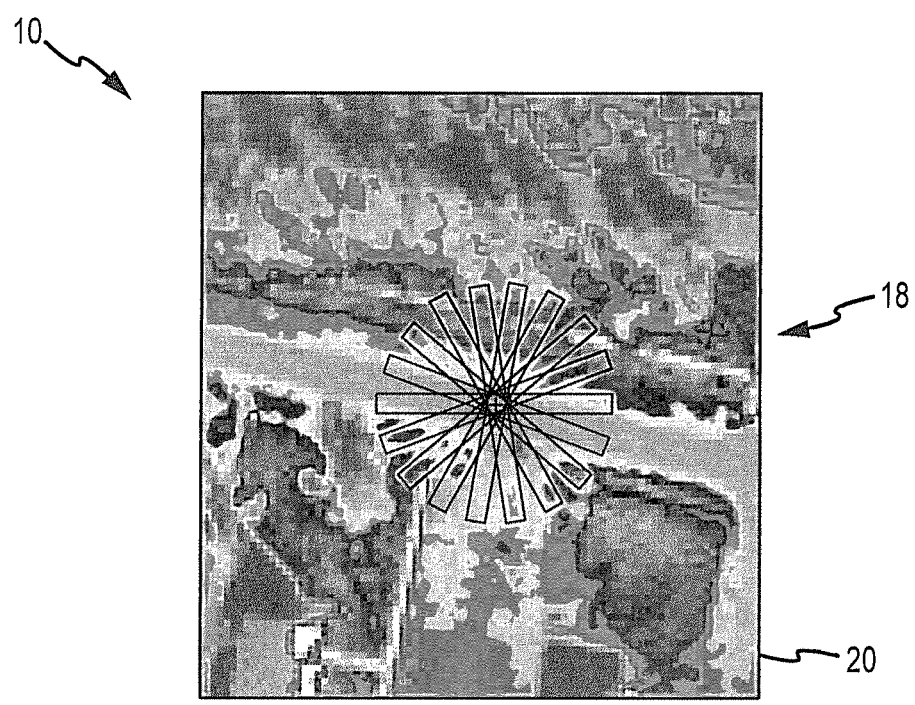
FIG. 4 shows compiling a texture measure at a pixel from a panchromatic image.

A preferred embodiment of the method 10 may comprise inputting 16 a texture file 18, as well. By way of example, the texture file 18 is generated from a panchromatic image 20 from the IKONOS® satellite related to the selected multispectral image 14. In this example, the panchromatic image 20 has a spatial resolution of about 0.82 meters. FIG. 2 shows the inputting 16 of texture file 18. FIG. 3 shows the panchromatic image 20 associated with the multispectral image 14. The texture file 18 comprises information derived from measuring, at each pixel in the panchromatic image 20, the variance over a rectangular area, minimized over angular orientation of the rectangular area about the pixel. As shown in FIG. 4, the image variance is computed over the one-sided rectangular area, rotated by angles separated by 20°. The texture measure is the square root of the minimum variance over these angles. While inputting 16 the texture file 18 may be preferred, it is not required as explained more fully below with respect to other embodiments of the method 10. Generating 223 and using texture file 18 has been described with additional detail in D. Haverkamp and R. Poulsen, "Complementary methods for extracting road centerlines from IKONOS imagery", Image and Signal Processing for Remote Sensing VIII (Sebastiano B. Serpico; Ed.), Proc. SPIE Vol. 4885, p. 501-511 (2003), which is incorporated herein by reference for all that it discloses.

Figure 5:
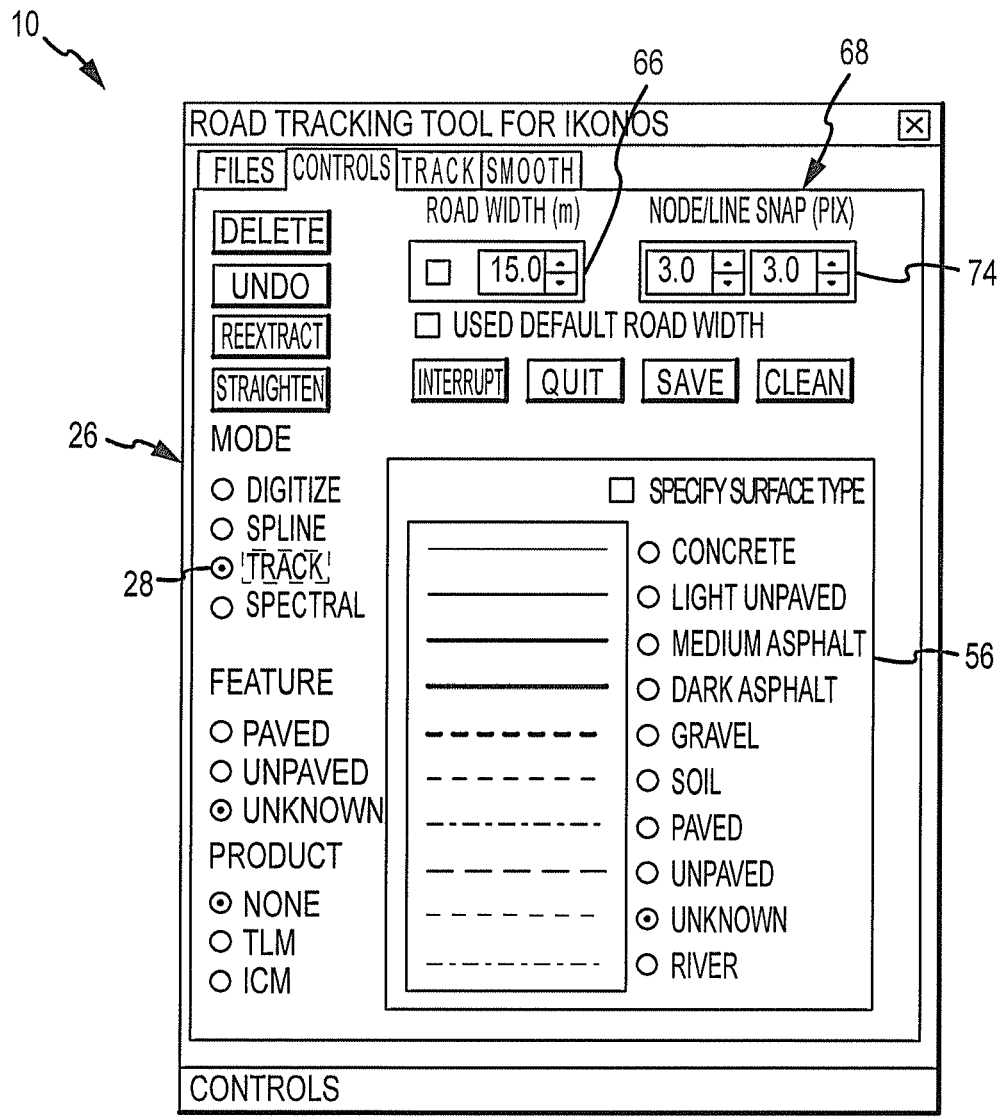
FIG. 5 shows selecting a track mode for the multispectral image.
Figure 6:
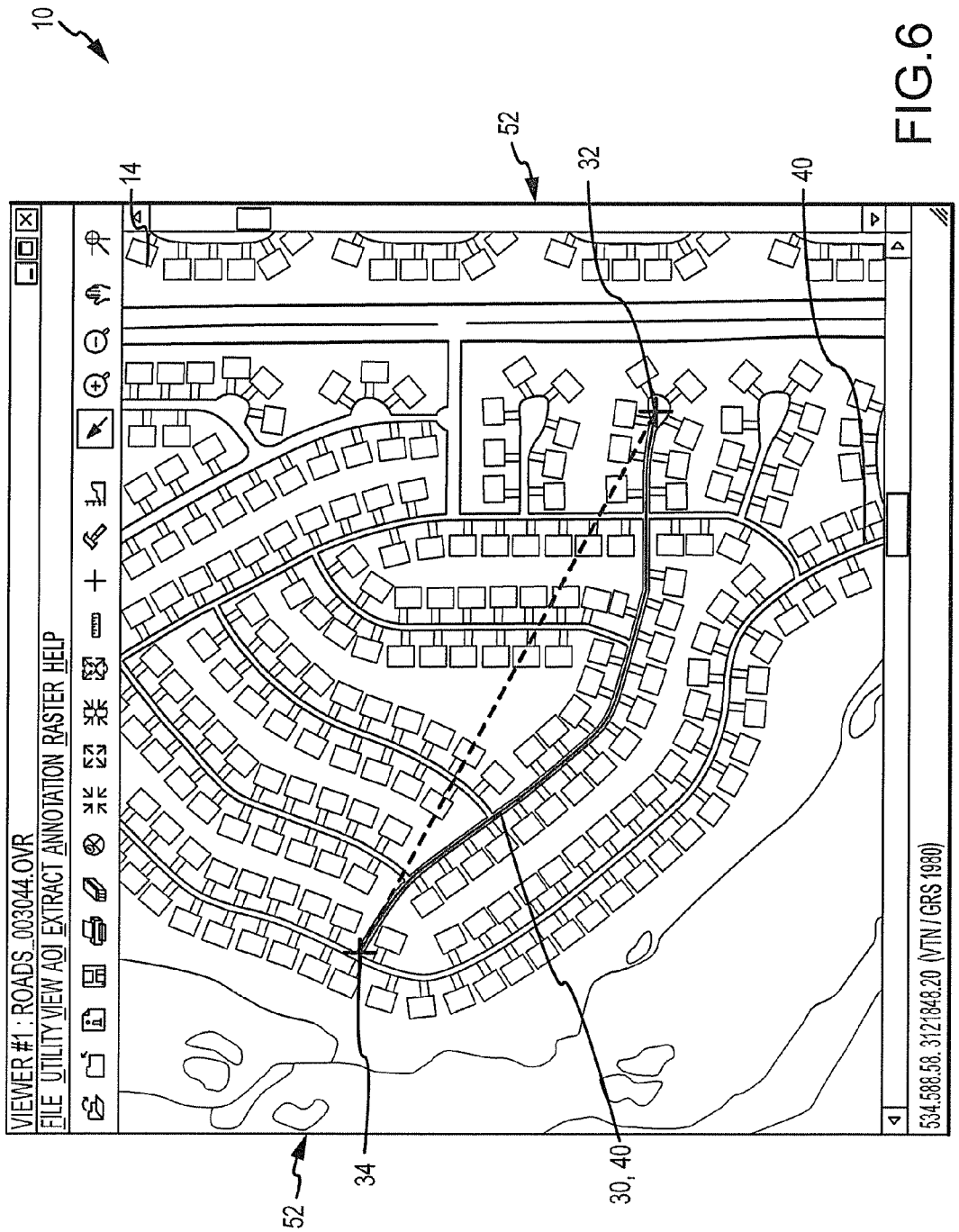
FIG. 6 shows tracking a path between anchor points for a road.

According to the method 10, after inputting 16 the texture file 18, the user may select 26 a track mode 28, as shown in FIG. 5. The track mode 28 comprises using image-based logic to automatically calculate the appropriate vector sets associated with the anchor points 32, 34, tracking path 30 between first anchor point 32 and second anchor point 34 selected 52 by the user to create a near centerline for a road 40 in multispectral image 14, as shown in FIG. 6. As used herein, "path" 30 may be defined by the vector set.

By way of example, the track mode 28 image-based logic may comprise a least cost path algorithm incorporated in software, such as Djikstra's algorithm or any other least cost path algorithm known in the art. Least cost path algorithms are well known in the art for constructing a least cost path between two points as a function of "cost." Assigning costs to different variables represents a way to distinguish between desirable paths and undesirable paths. In the case of the present invention, "cost" may distinguish between image features that are highly correlated, somewhat correlated, or not correlated with the presence of a selected linear feature (e.g., road 40), such that high correlation defines low cost. Thus, the least cost path algorithm may assign a cost to moving from one pixel to another (e.g., along path 30). By way of example, a preferred cost function may have a lower cost associated with image features related to the middle of road 40, with a higher cost associated with image features related to areas away from road 40. In an embodiment of the method 10, the algorithm may determine the lowest cost path 30 by assigning a cost to each of several factors and then determining a total combined cost which in turn dictates path 30 between the user-selected 52 anchor points 32, 34. A first factor in assigning cost may be path 30 length associated with moving from one pixel to another. A second factor in assigning cost may be "spectral roadlikeness," which may be considered to be the degree to which pixels associated with path 30 are spectrally similar to typical pixels of a desired class of linear feature (e.g., paved roads). By way of example, spectral roadlikeness is computed by using known Tasseled Cap transformations of the multispectral image 14. It has been found that while vegetation is strong in the near infrared band, roads 40 are weak in the near infrared band. Thus, Tasseled Cap transformations can be used to separate roads 40 from vegetation. A third factor in assigning cost may be textural roadlikeness, or road 40 texture. Texture may be derived from the panchromatic image 20, as mentioned above, and used as part of image-based logic to identify and locate linear features. A fourth factor in assigning cost may be adjacency to previously extracted roads 40. For example, the algorithm adds an increased cost to finding path 30 that may coincide with or closely parallel portions of previously extracted path 30. Another cost factor may be associated with proximity to delimiting edges of road 40. Another cost factor may be pixel intensity along axes (bands) of a red, green, blue, infra-red coordinate system or along axes (bands) of a Tasseled Cap coordinate system. Yet another cost factor may be associated with pixel adjacencies along path 30. In other embodiments, "image-based logic" may comprise using image data, including spatial relationships and relationships between pixels, to make at least one correlation in data related to a linear feature, possibly to prefer one correlation over another.

Track mode 28 may be used when panchromatic texture is available. Since panchromatic image 20 may not always be available, another embodiment may comprise using multispectral image 14 without the benefit of panchromatic image 20 and its associated texture. In this embodiment, the user may select a spectral mode. The spectral mode may be used either when panchromatic texture is not available, or when panchromatic texture is available but not a good indicator for road 40. Like the track mode 28, the spectral mode comprises using image-based logic to track path 30 between first anchor point 32 and second anchor point 34 selected by the user by evaluating spectral similarity to the anchor points 32, 34 and ignoring panchromatic texture. Use of the spectral mode may be beneficial in extracting linear features where the texture is rough, such as in the case of dirt roads, or streets with a lot of overhanging trees, building shadows, or vehicles on the road 40 surface. The image-based logic of the spectral mode may comprise a least cost path algorithm incorporated in software, such as Djikstra's algorithm or any other least cost path algorithm known in the art. In the spectral mode, the cost factors used to determine the lowest cost path between the user-selected 52 anchor points 32, 34 may comprise: (1) path 30 length, (2) spectral similarity to the user-specified anchor points 32, 34, and (3) adjacency to previously extracted roads. By way of example, adjacency to previously extracted roads adds an additional cost, because road 40 should not be extracted more than once. For example, the algorithm adds an increased cost to finding path 30 that may coincide with or closely parallel portions of previously extracted path 30. Another cost factor may be associated with proximity to delimiting edges of road 40. Another cost factor may be associated with pixel adjacencies along path 30. By way of example, the spectral mode may not create least cost path 30 quite as near the centerline of road 40 as that created using track mode 28. The spectral mode is working with less information than the track mode 28; texture is not being used to help guide the path near the road centerline.

It is preferred that the multispectral image 14 be displayed in a manner known in the art that provides high color contrast, such as using false color bands. It is also preferred that the user zoom in on the multispectral image 14 to about 150-200% of one image pixel to display pixel.

Figure 7:
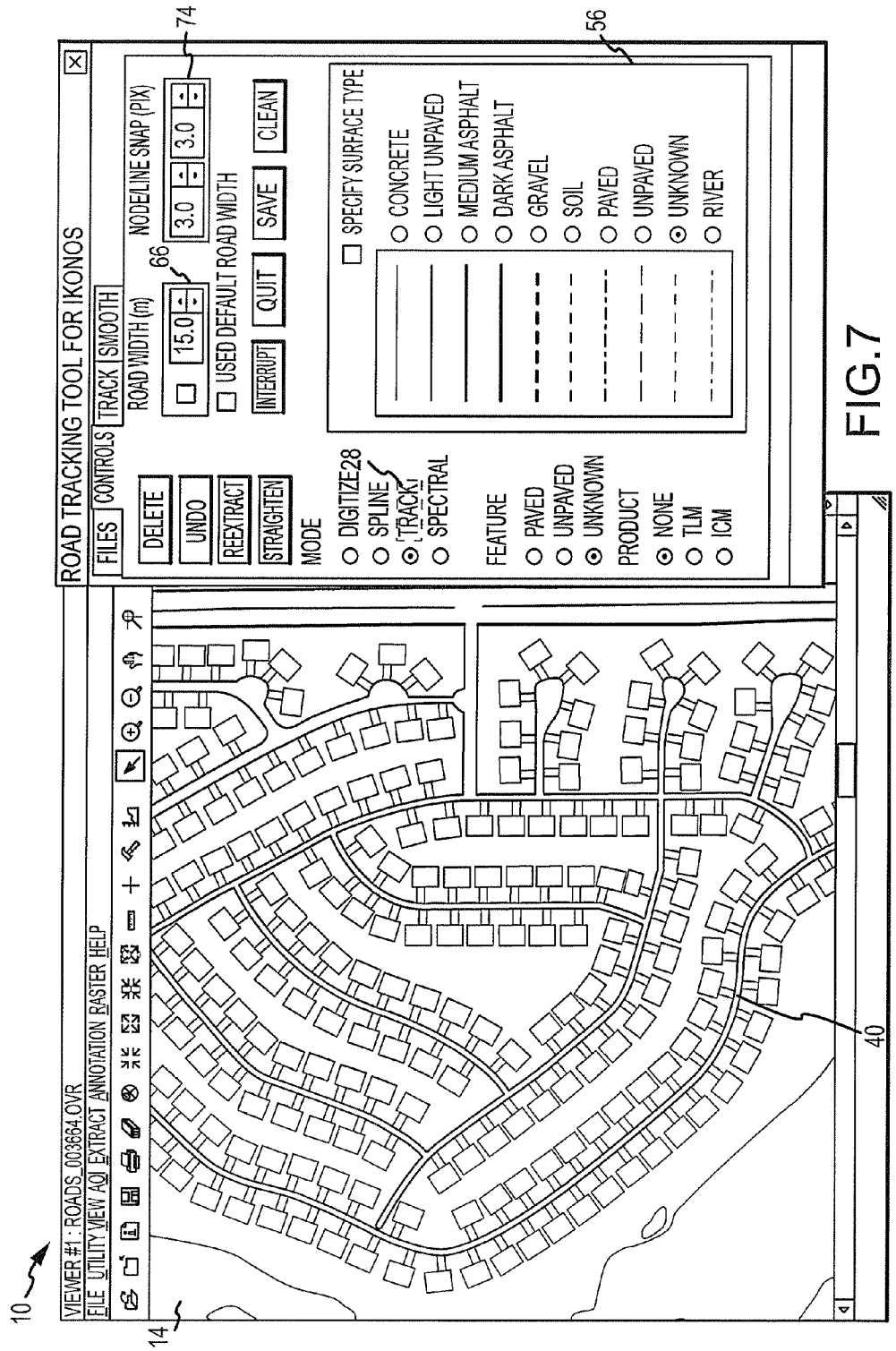
FIG. 7 shows the multispectral image after selecting track mode.
Figure 8:
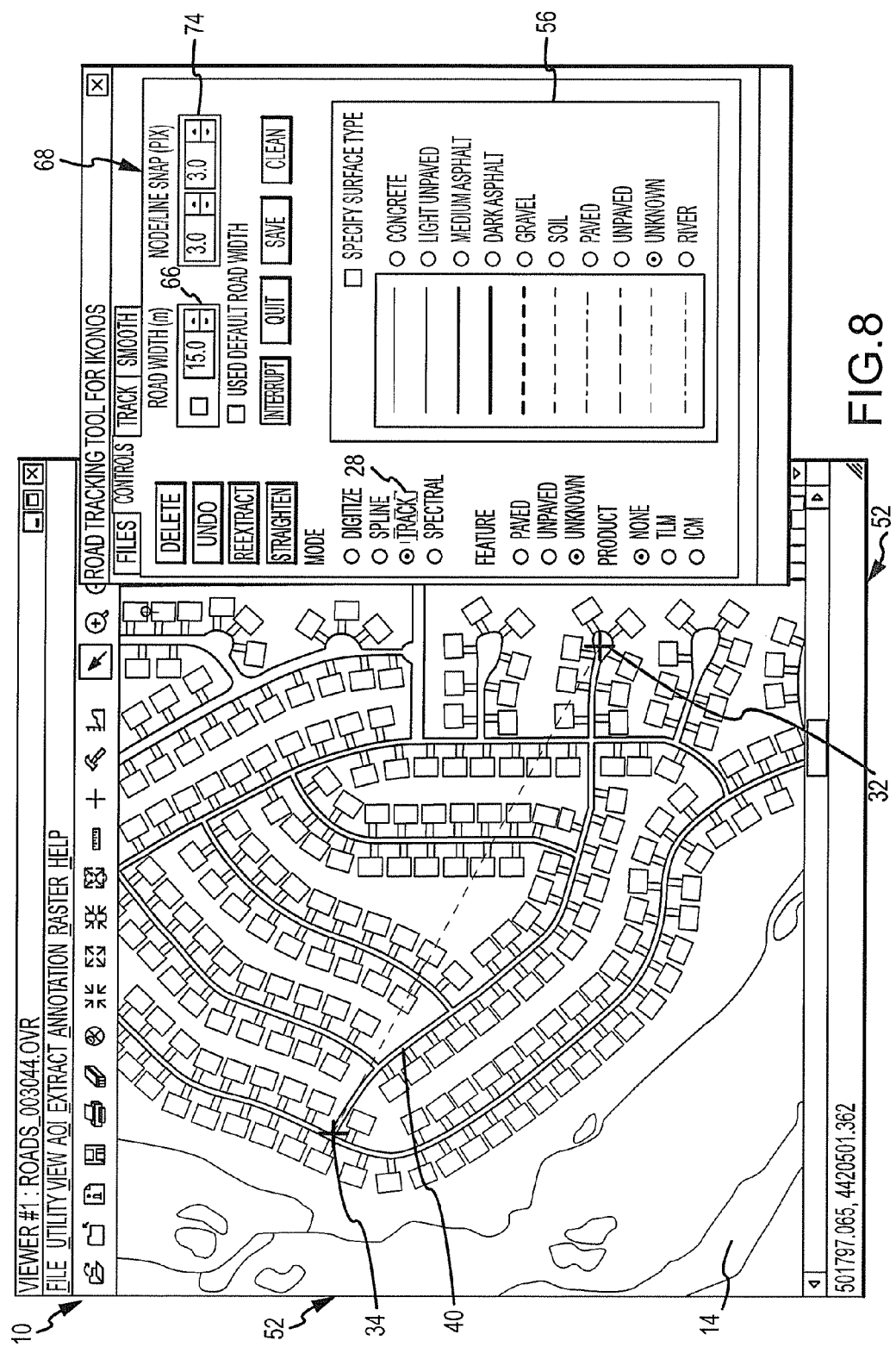
FIG. 8 shows selecting a plurality of anchor points associated with a road.

As shown in FIG. 7, having selected 26 the track mode 28, the user visually locates road 40 in multispectral image 14. Referring to FIG. 8, the user may select 52 a plurality of anchor points 32, 34 associated with road 40, anchor points 32, 34 being tied to a geographical location in the raster data associated with multispectral image 14. The user may then position a cursor on anchor point 32, click on it and drag the cursor to anchor point 34 and double-click on anchor point 34.

Figure 9:
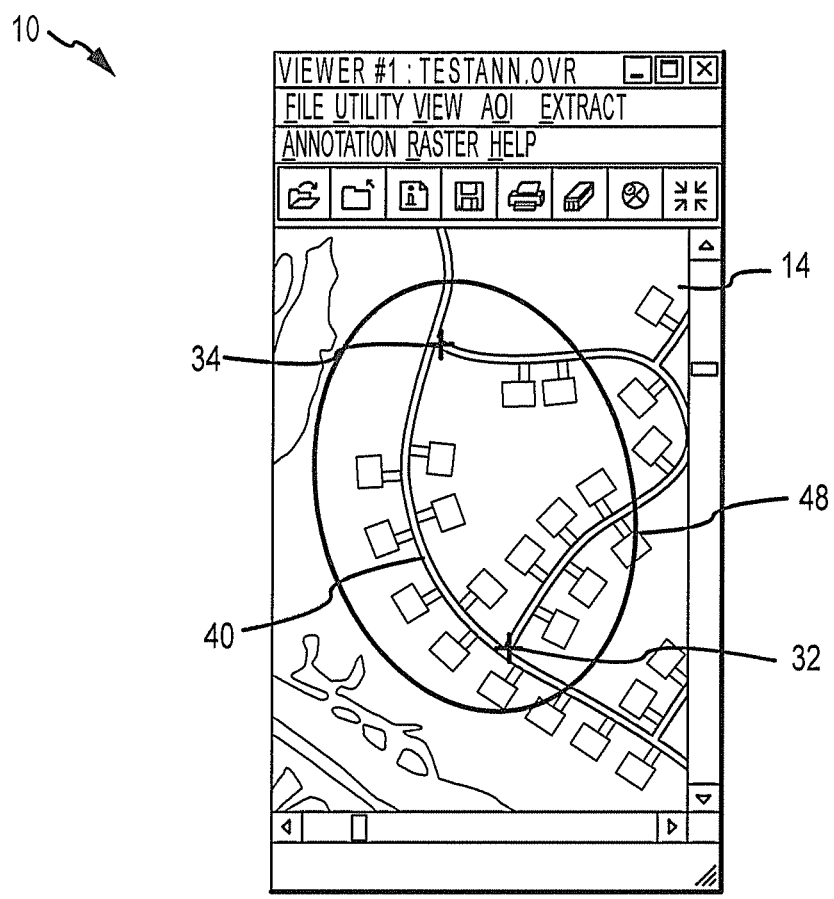
FIG. 9 shows an elliptical search region defined by anchor points.

In a preferred embodiment of the method 10, the anchor points 32, 34 may define an ellipse 48 that has the anchor points 32, 34 as its foci, as shown in FIG. 9. As shown in FIG. 9, the major and minor axes of the ellipse 48 are 1.4 and 1.0 times the distance between the anchor points 32, 34. In a preferred embodiment, ellipse 48 comprises a search region, such that intermediate point 38 generated for path 30 connecting anchor points 32, 34 must occur within the area defined by the ellipse. In a preferred embodiment, a purpose of the search region is to manage the tradeoff between search space size and computational speed.

Figure 10:
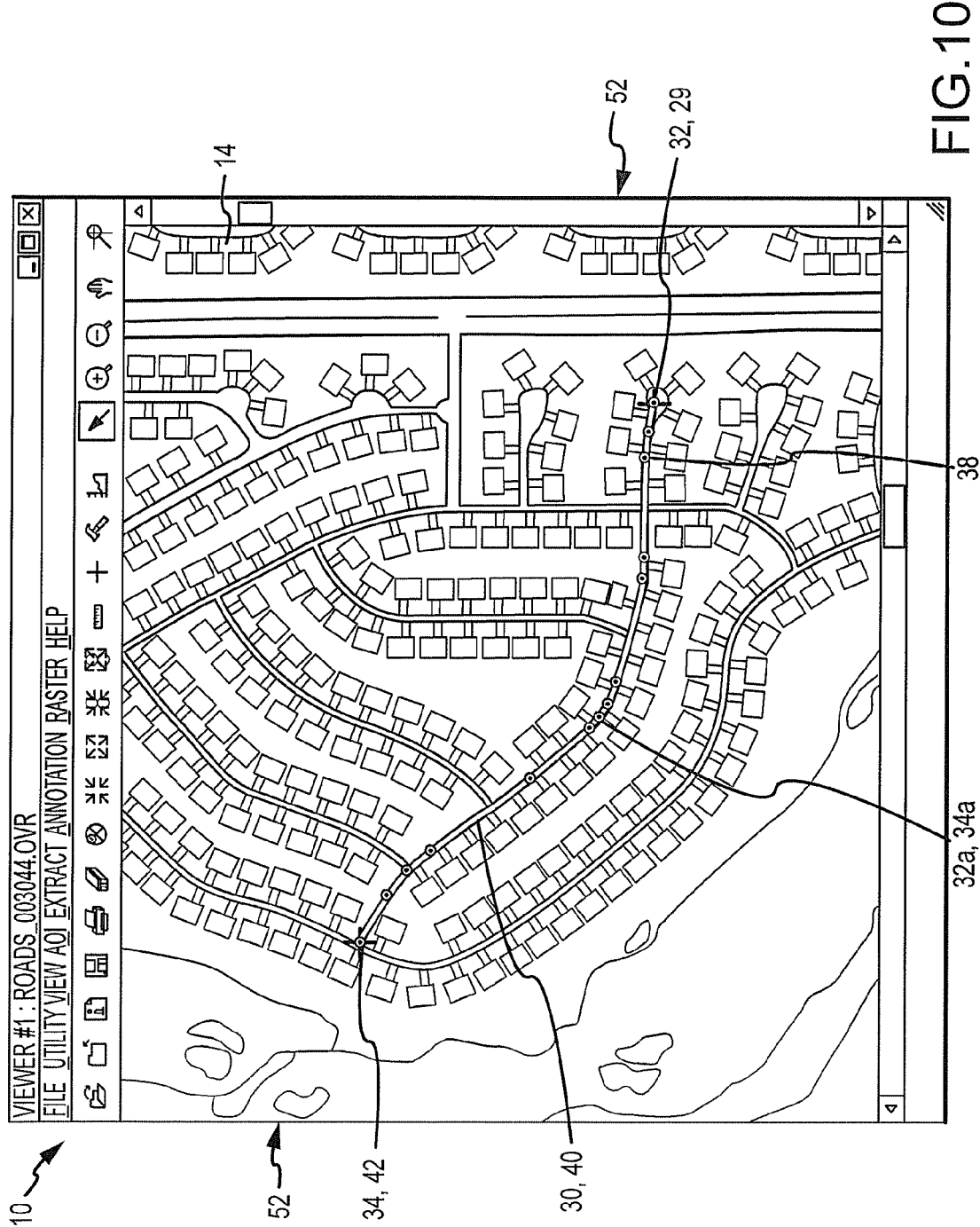
FIG. 10 shows addition of intermediate points and segments in creating a path.

According to the method 10, once the user has selected 52 at least anchor points 32, 34, image-based logic embedded in software may be employed to automatically create the vector set and connect the anchor points 32, 34 via path 30. Path 30 may include intermediate points 38 automatically generated in such location and in sufficient quantity to accurately reflect the character of road 40. For instance, in the case of a curve in the road, where the user selects 52 two anchor points 32, 34 by clicking on them, the software may add intermediate points 38 in between the two anchor points 32, 34 using image-based logic to create additional vectors in the vector set so that the path 30 can be preferably substantially smooth and located substantially along the near centerline of the road 40, as shown in FIG. 10. It may be that path 30 contains no such intermediate points 38. In addition, depending on the character of the road 40 to be extracted, the user may designate additional anchor points 132*a*, 134*a*, in between anchor points 32, 34, as explained in more detail below.

Figure 11:
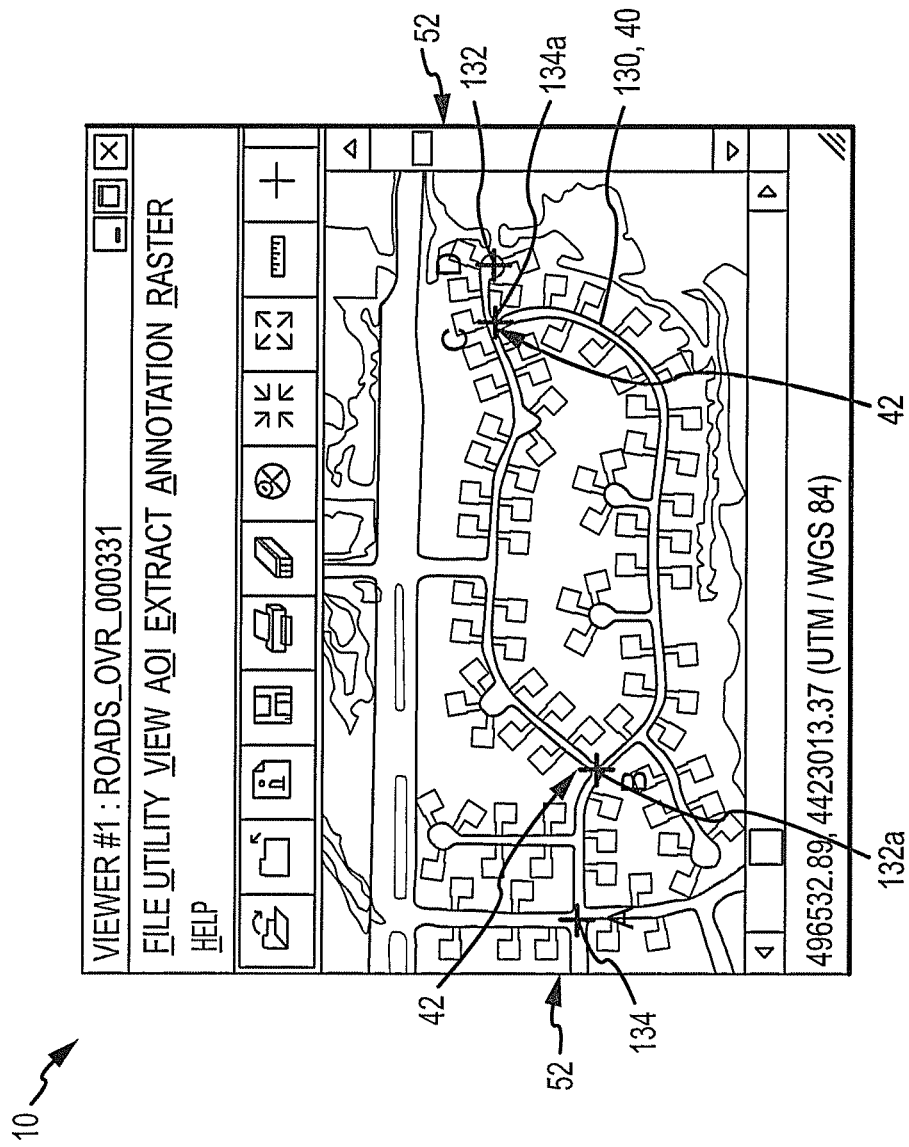
FIG. 11 shows selecting anchor points for a road.
Figure 12:
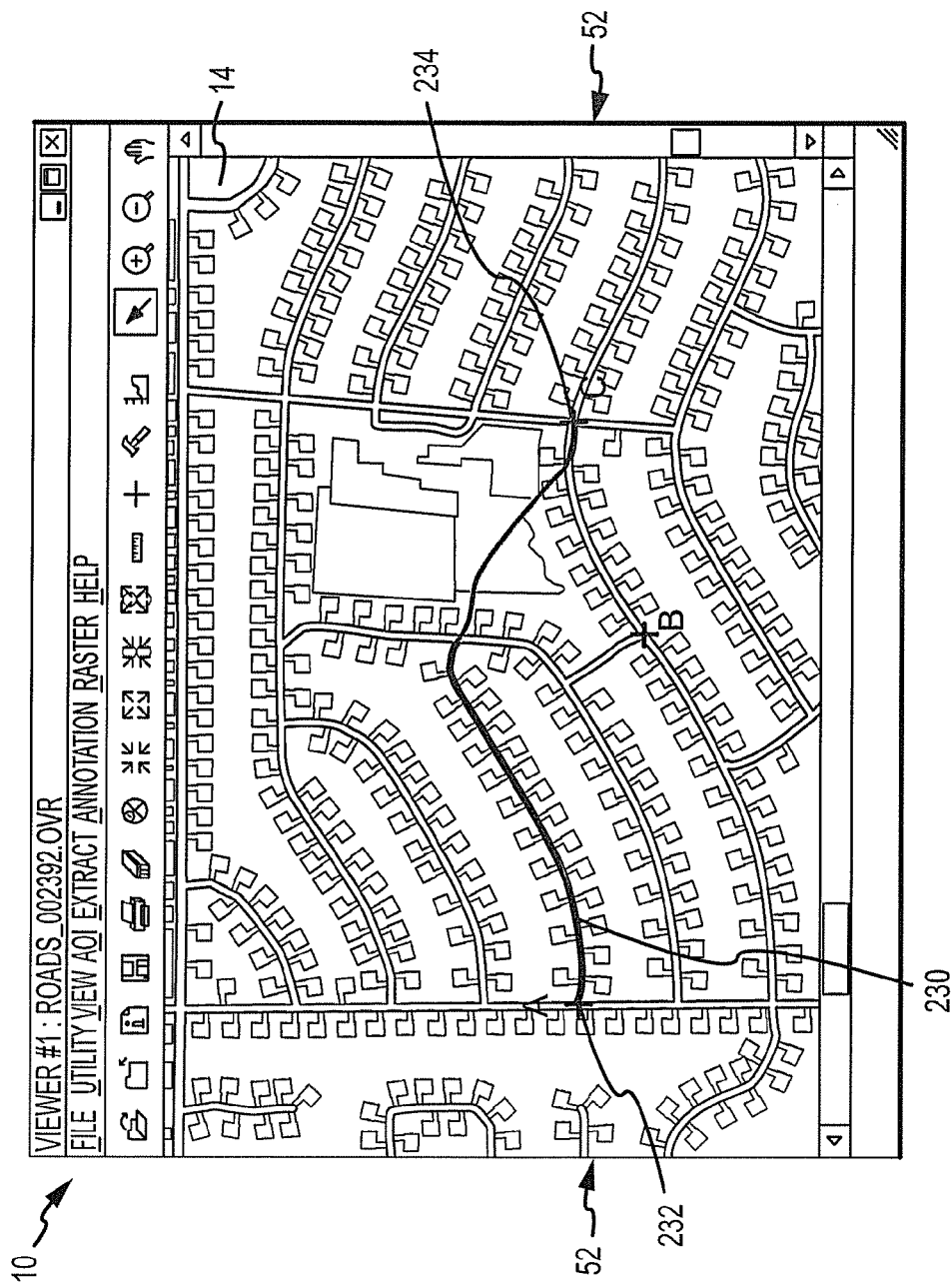
FIG. 12 shows anchor point selection.
Figure 13:
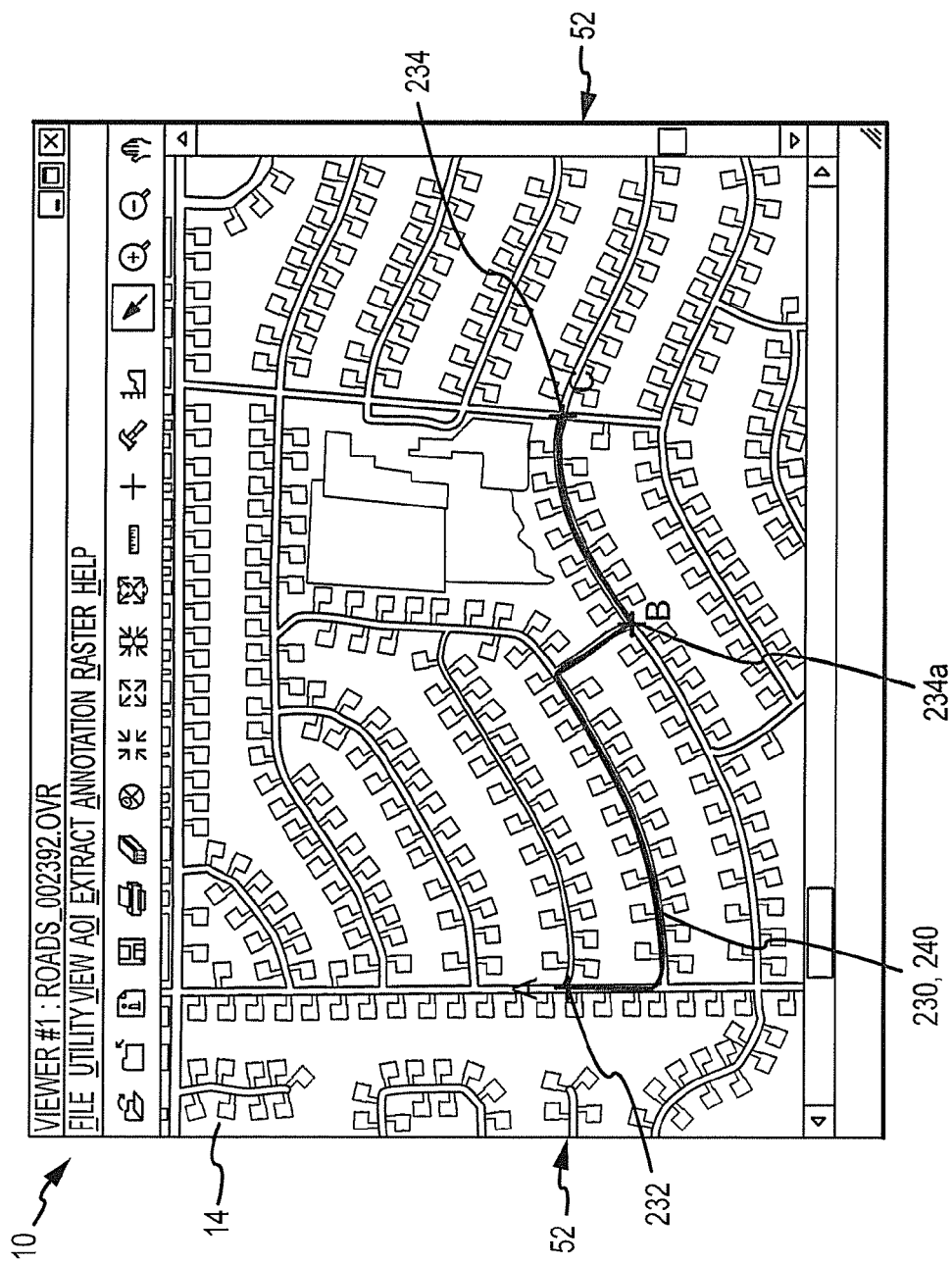
FIG. 13 shows anchor point selection.

For optimal accuracy of road 40 extraction, a preferred embodiment of method 10 may comprise a strategy for selecting 52 the plurality of anchor points 32, 34. Using the multispectral image 14 representation of road 40, it is preferred that the user select 52 each anchor point 132*a* (B), 134*a* (C) by locating them in a road intersection 42, or road terminal 29 (cul-de-sac) as shown in FIGS. 10 and 11. In addition, it is preferred that the user click on the road 40 instead of near the road 40 as shown on the multispectral image 14. It may be beneficial for the user to extract the unambiguous road first, as shown in FIG. 11, by designating anchor points 132*a* ("B" in FIG. 11) and 132 ("D" in FIG. 11) first. After the path between anchor points 132*a* and 132 is determined automatically, the user may select 52 anchor points 134*a* ("C" in FIG. 11) and 134 ("A" in FIG. 11) so path 130 may be automatically constructed between them. In this example, the least cost path algorithm inhibits path 130 from being constructed where one already exists. Further, it may be beneficial for the user to extract primary streets first and then move to secondary streets. Additional anchor points 132a, 134a should be placed in natural locations, such as bends and junctions. Anchor points 32, 34 should be located at no more than a maximum distance apart, depending on the character of the linear feature to be extracted. For instance, in the case of a straight road 40, the maximum distance between anchor points 32, 34 may be greater than in the case of a winding road 40 while still attaining accuracy in road 40 extraction. As shown in FIGS. 12 and 13, if only anchor points 232 ("A" in FIGS. 12 and 13) and 234 ("C" in FIGS. 12 and 13) are specified, then the generated path 230 would not properly extract the road 40 between anchor points 232 and 234. However, when additional anchor point 234a ("B" in FIG. 13) is selected 52, then the generated path 230 does properly extract road 240.

Figure 14:
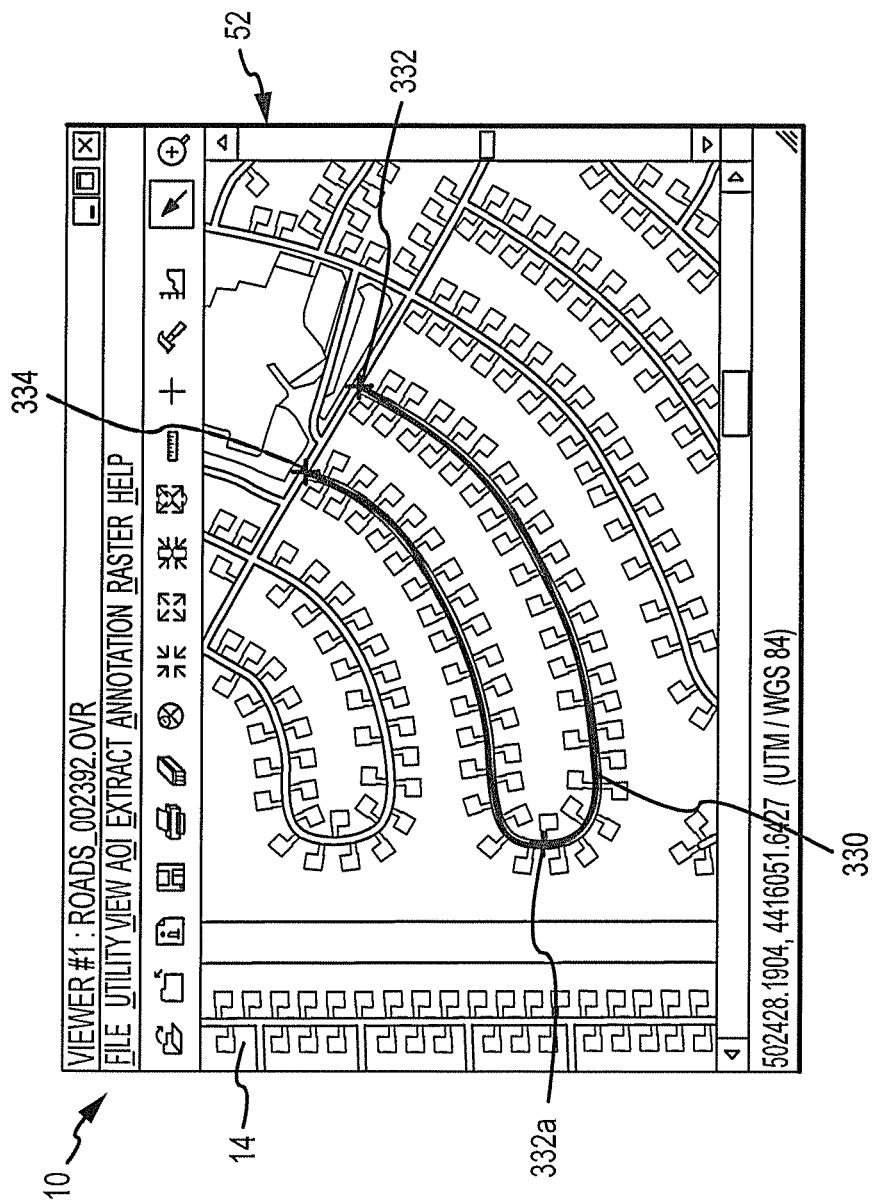
FIG. 14 shows anchor point selection for simple loop.
Figure 15:
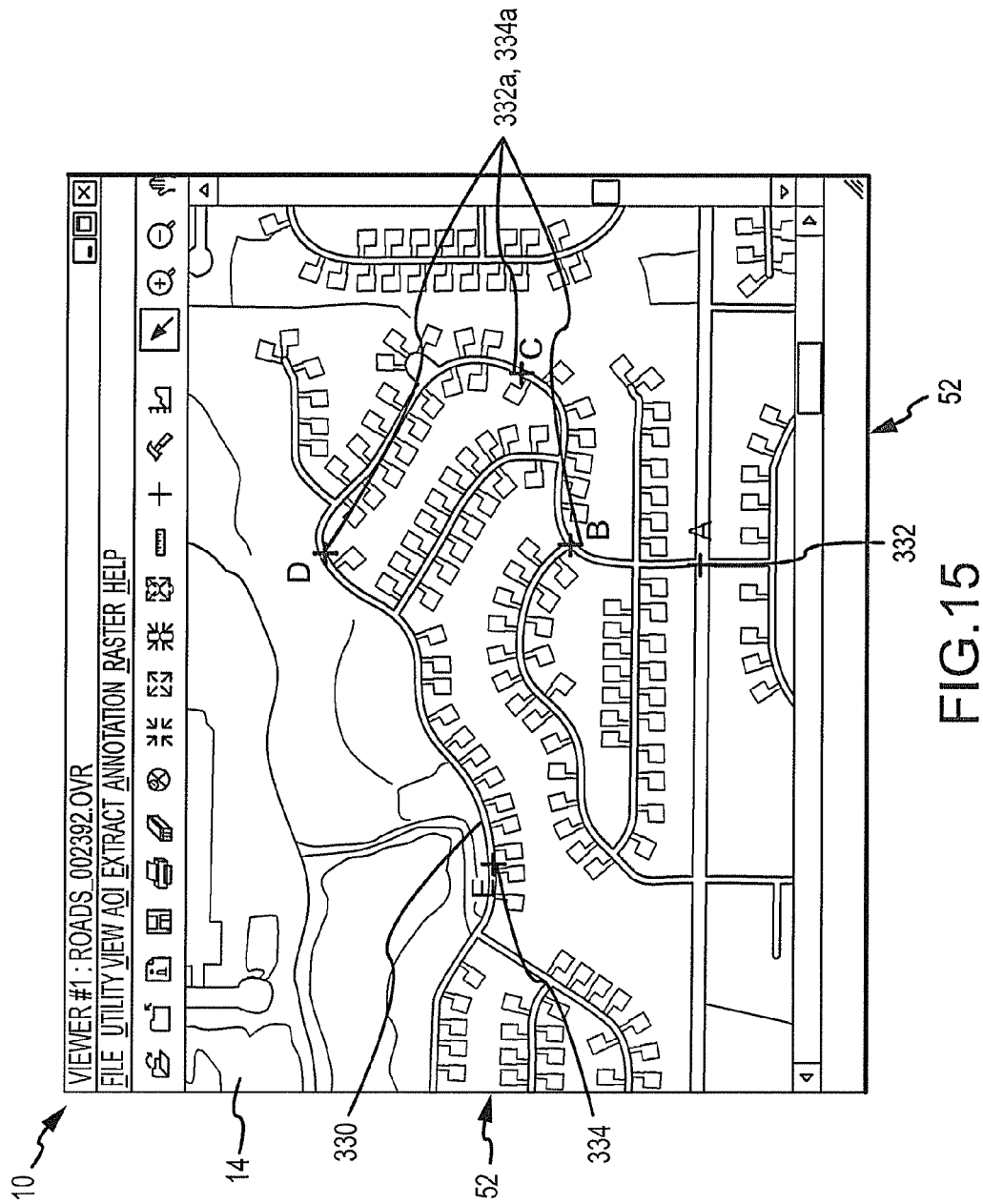
FIG. 15 shows anchor point selection for loop with sharp bend.

In the case of a loop in the road 40, the number of user-specified anchor points 32, 34, 32a, 34a required for accurate extraction of the road 40 may be a function of the loop shape. For example, as shown in FIG. 14, in the case of a U-shaped loop, selecting 52 two anchor points 332, 334 and additional anchor point 332a may allow the road 40 to be properly extracted. However, FIG. 15 shows a tight loop with a severe bend. In that case, anchor points 332 ("A" in FIG. 15) and 334 ("E" in FIG. 15), as well as three additional anchor points 332a, 334a ("B," "C," "D" in FIG. 15) may need to be selected 52 to correctly extract the road 40.

In addition, a preferred embodiment of the method 10 may also comprise use of manual modes (e.g., without image-based logic) for extracting roads 40 so that the user may have the option of switching between track mode 28 or spectral mode (e.g., both using image-based logic), or the manual modes—spline mode or digitize mode (e.g., both not using image-based logic). It may be beneficial to use the digitize mode for manually extracting straight roads 40. It may be beneficial to use the spline mode to manually extract large roads 40 with little curvature (e.g., highways).

When path 30 corresponding to road 40 is determined, the method 10 of the present invention further comprises automatically attributing 54 material type 56 to the road 40. In a preferred embodiment of the method 10, the step of automatically attributing 54 material type 56 to the road 40 may be performed while using the track mode 28 or the spectral mode.

Figure 16:
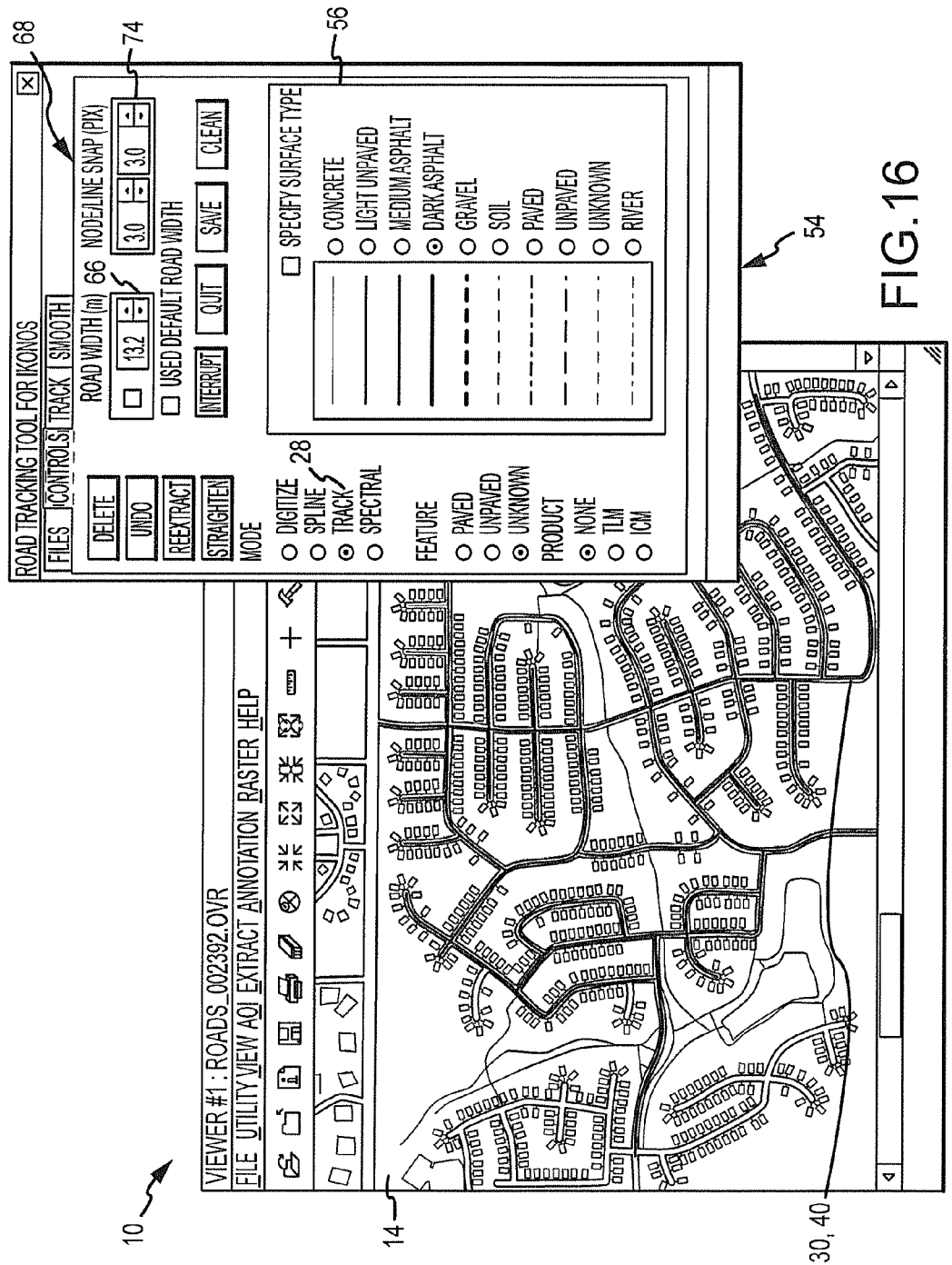
FIG. 16 shows automatically attributing a material type to a road.

Automatically attributing 54 material type 56 to the road 40 may be performed by using image-based logic comprising a Maximum Likelihood algorithm to attribute material type 56 from one of six classes: concrete (CO), medium asphalt (MA), dark asphalt (DA), light unpaved (sand or limestone) (SA), gravel (GR), and soil (SO). As shown in FIG. 16, to automatically have the material type 56 assigned to the least cost path 30, the user may designate feature 58 as "unknown." The path 30 may then be automatically attributed 54 material type 56 by assigning to path 30 a particular color associated with the appropriate material type 56. Once the material type 56 has been automatically assigned, this information may be stored in the output vector file 24.

By way of example, the material attribution algorithm uses a four-band multispectral vector with spectral components blue, green, red, and near-infrared. According to a preferred embodiment, a raw multispectral measurement M for multispectral image 14 may be corrected using atmospheric level A, such that M'=M−A. Ensemble statistics may be computed by normalizing for solar elevation effects, such that M"=M'/sin($\epsilon$*$\pi$/180), where $\epsilon$ is the solar elevation angle, and then computing unweighted averages over all scenes for each class. A Tasseled Cap (TC) transform may be applied to improve class separation, such that T=TM", where matrix T is given by the array:

| | | | |
|---|---|---|---|
| 0.388 | 0.333 | 0.305 | 0.316 |
| −0.257 | −0.152 | −0.241 | 0.706 |
| −1.836 | 4.915 | −2.547 | −0.533 |
| −1.460 | 0.236 | 1.546 | 0.043 |

Class means $\{\underline{\mu}_i\}_{i=1,\ldots,6}$ and covariances $\{\Sigma_i\}_{i=1,\ldots,6}$ of the TC values may be recorded for each scene and class. Generally, the four TC components can be described as brightness, greenness (vegetation), green−(blue+red)/2, and red−blue. The Maximum Likelihood algorithm comprises estimated prior probabilities $\{P_i\}_{i=1,\ldots,6}$ using the Regularized Mahalanobis distance, which is known in the art. The regularization step offsets the limitations of covariances that may be obtained from small samples. For TC vector T, the class may be chosen that minimizes the expression:

$$(T-\underline{\mu}_i)'\Sigma_i^{-1}(T-\underline{\mu}_i)-2\ln(P_i)+2\ln(|\Sigma_i|).$$

The prior probabilities may be established empirically, with lower weights given to the asphalt classes in the spectral mode. Using the two-letter abbreviations given to material classes set forth above, the P, estimates may be given by:
Prob {CO, SA, MA, DA, GR, SO}={0.054, 0.054, 0.540, 0.162, 0.162, 0.027} in track mode 28, or
Prob {CO, SA, MA, DA, GR, SO}={0.133, 0.133, 0.133, 0.133, 0.400, 0.067} in spectral mode.

Figure 17:
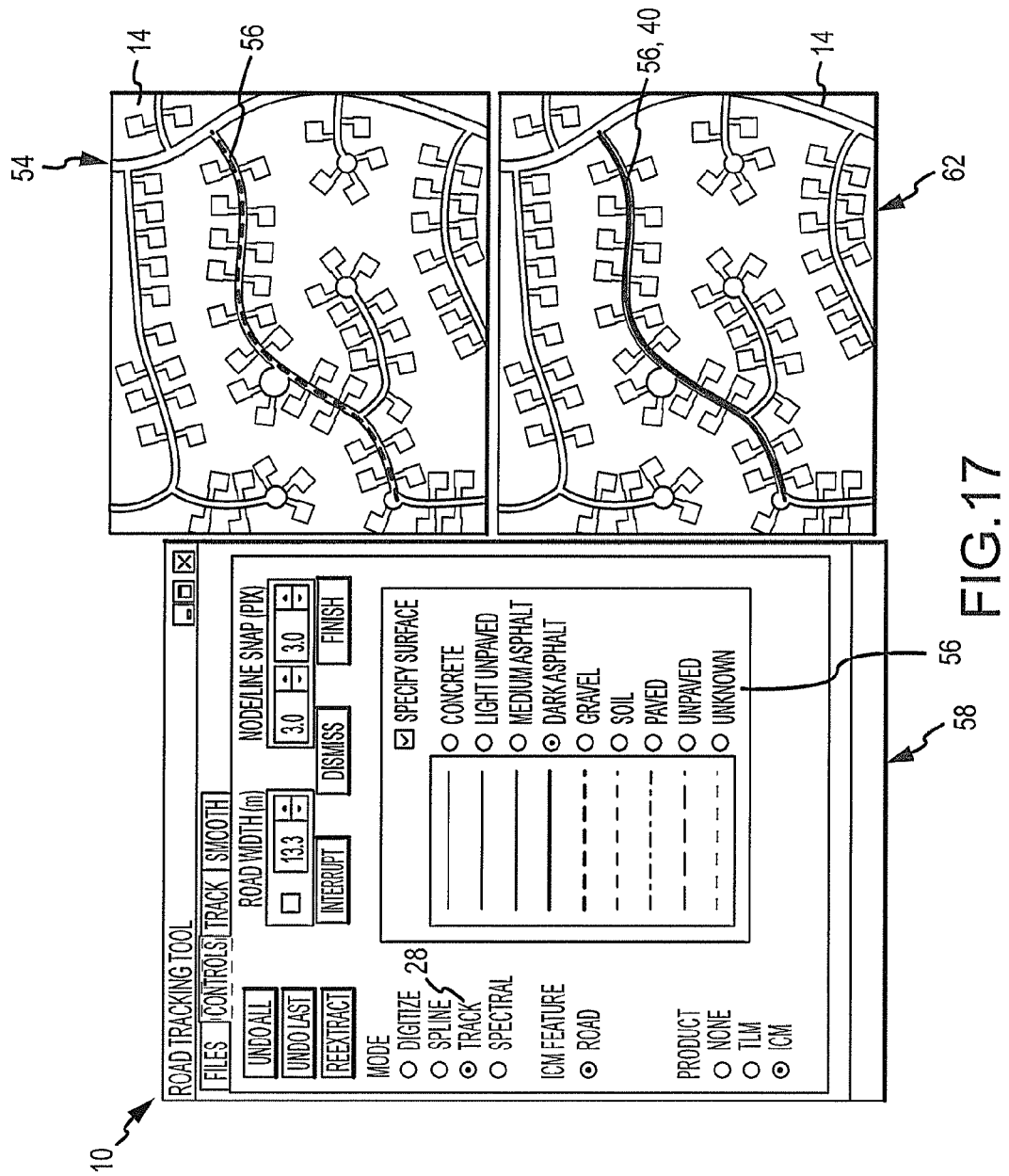
FIG. 17 shows manually changing material type.

Another embodiment of the method 10 may comprise manually changing 58 the automatically attributed material type 56 by specifying the material type 56 and re-extracting 62 the affected road 40, as shown in FIG. 17.

Figure 18:
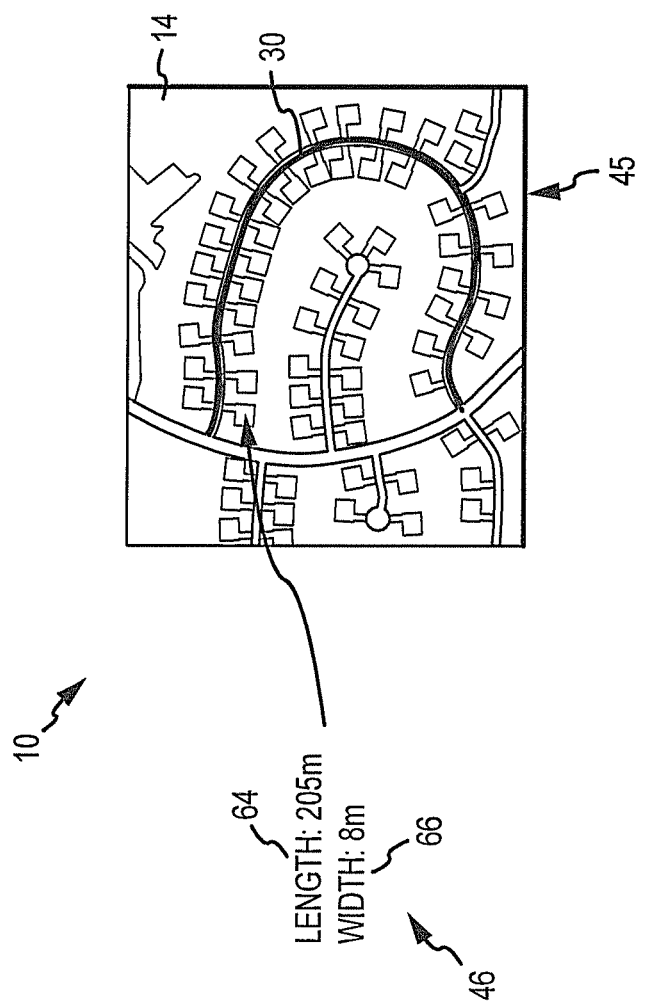
FIG. 18 shows attributing a geometry to a road.
Figure 19:
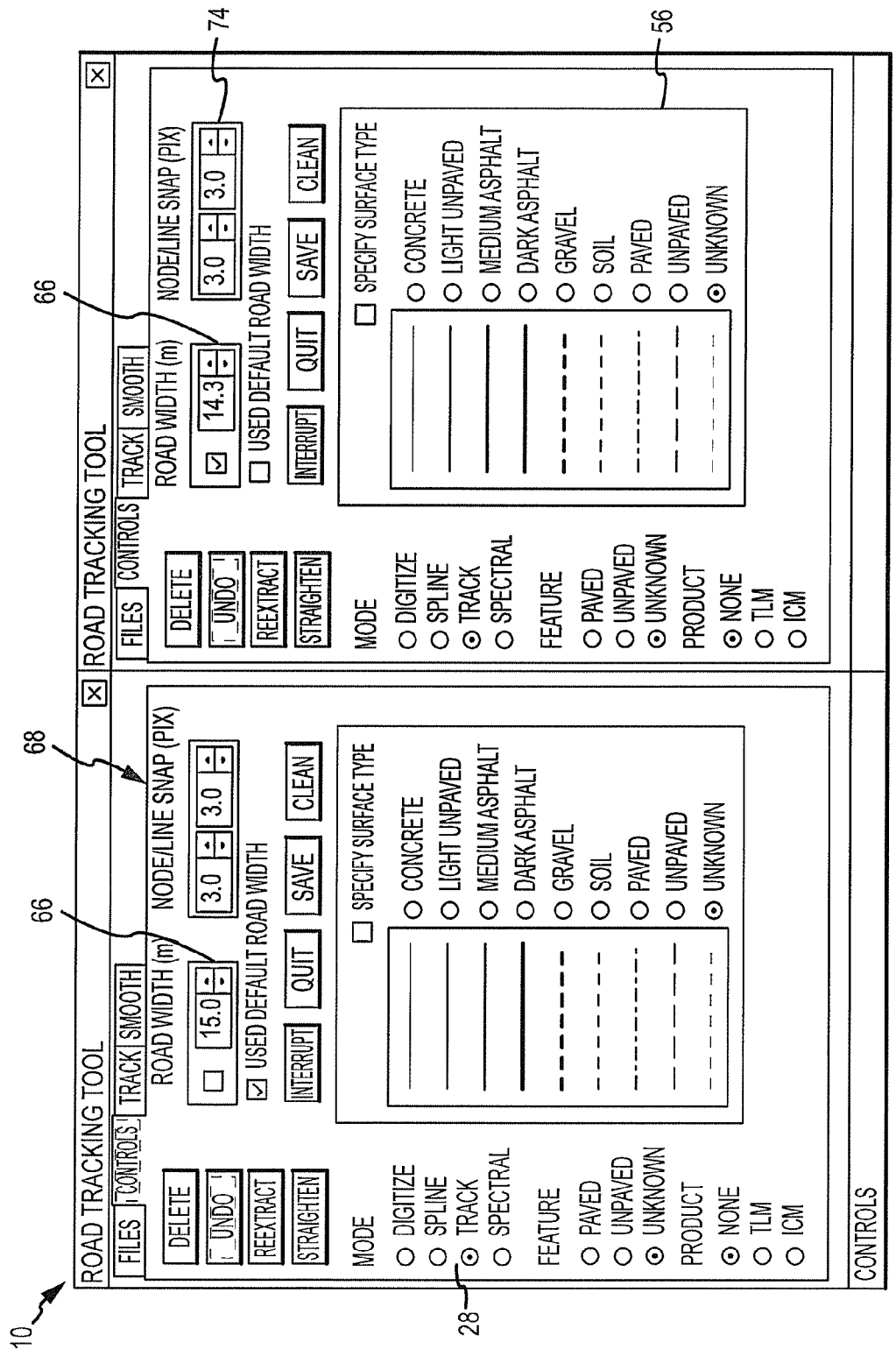
FIG. 19 shows default road width and changing road width.

When path 30 corresponding to road 40 is determined, the method 10 of the present invention may preferably comprise automatically attributing 45 a geometry 46 to the road 40. Geometry 46 comprises length 64 and width 66 of path 30 corresponding to road 40, as shown in FIG. 18. Road width 66 may be attributed 45 automatically using image-based logic, preferably road texture. However, if the width 66 of given road 40 is inconsistent or may not be measured reliably, a default road width 66 may be entered as shown in FIG. 19. In a preferred embodiment, the default road width 66 was 15 meters. However, road width 66 may also be indicated manually.

Length 64 of path 30 may be attributed 45 automatically from the corresponding vector set, preferably, after a topology cleaning step, which is described below.

A preferred embodiment of the method 10 comprises topology cleaning. Topology cleaning may comprise using at least an anchor point snapping algorithm 68, a smoothing algorithm 70 and a vector cleaning algorithm 72.

Figure 20A:
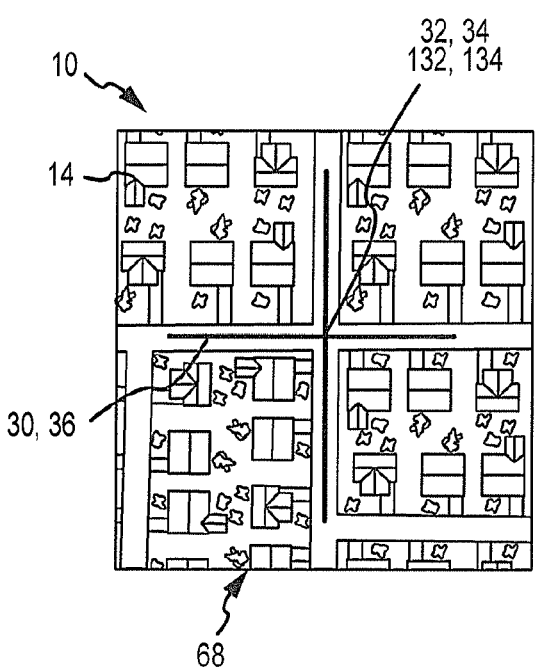
FIG. 20, with subparts 20A and 20B, shows node and line snapping of anchor points.
Figure 20B:
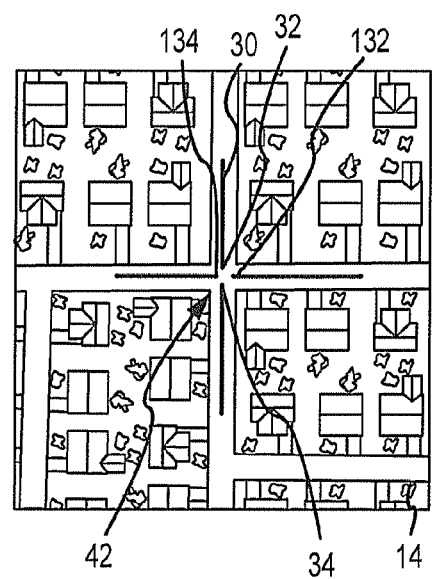

The anchor point snapping algorithm 68, or node and line snapping algorithm, may assist in cleaning road topology for a new path 30 after path 30 has been extracted. When the user selects 52 new first and second anchor point, 32a, 34a, the anchor point snapping algorithm 68 may determine whether the anchor points 32a, 34a are within a snap distance 74 of existing anchor point 32, 34 on path 30. The snap distance 74 may be a predetermined distance, preferably three pixels, as shown in FIG. 20, within which corrections to the road topology may be made. The anchor point snapping algorithm 68 may be disabled. If the new anchor points 132, 134 are within the snap distance 74 of an existing anchor point 32, 34 on path 30, the anchor point snapping algorithm 68 moves or "snaps" the new anchor points 132, 134 to coincide with the existing anchor point 32, 34 or path 30 as shown in FIG. 20. FIG. 20B illustrates the result with respect to intersection 42 if the user fails to click precisely in the same place for each anchor point

32, 132. FIG. 20A illustrates the result when the anchor point snapping algorithm 68 is employed so that the anchor points 32, 132 are properly joined.

Figure 21:
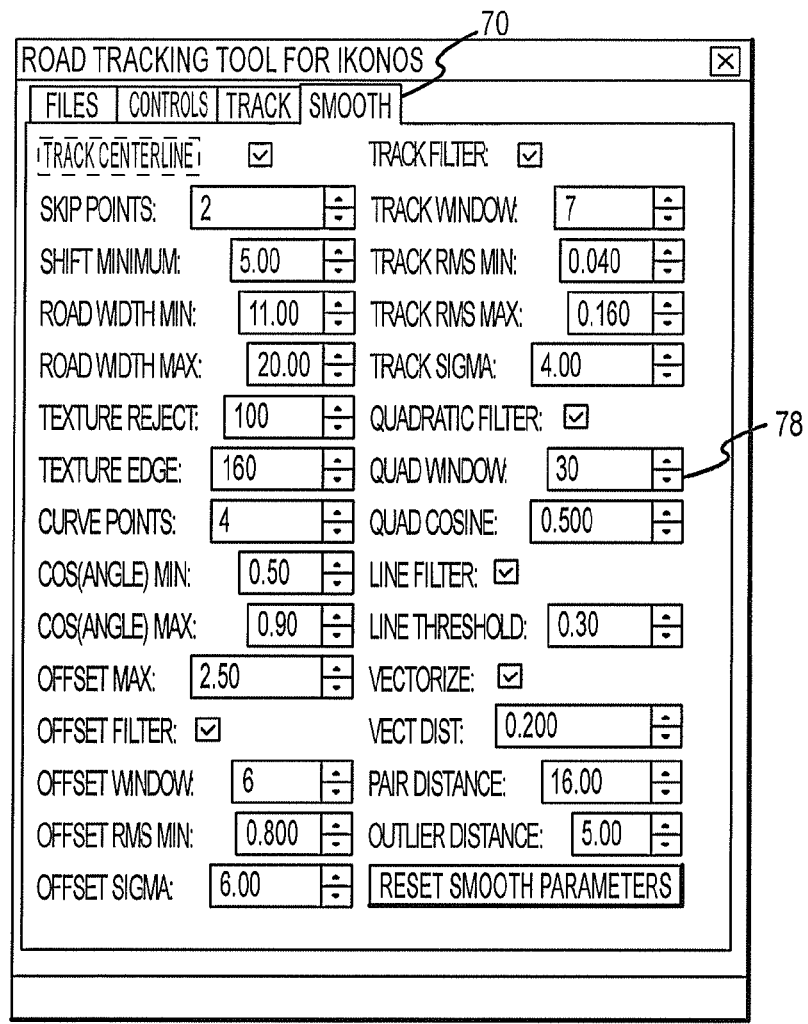
FIG. 21 shows smoothing parameters.

Using 76 smoothing algorithm 70 "smoothes" the least cost path 30 between anchor points 32, 34 to give it a smooth appearance, rather than what might have been a jagged appearance had smoothing not been used. The various smoothing parameters are shown in FIG. 21. The user may choose to adjust a quad window parameter 78. Increasing the quad window parameter 78 may cause extra smoothing to be applied to path 30.

Figure 22:
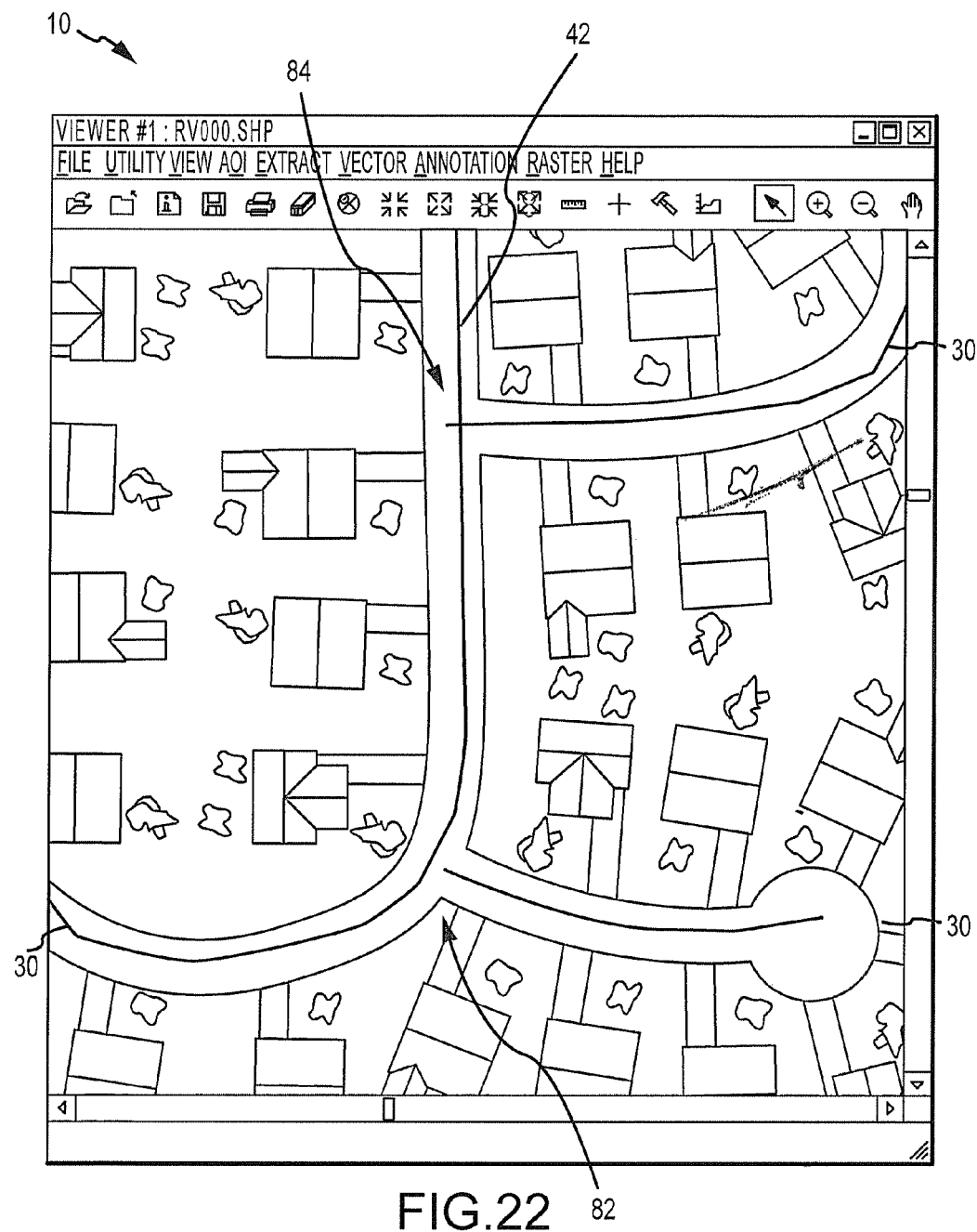
FIG. 22 shows an example of a gap and a dangle.

The vector cleaning process comprises using image-based reasoning for automatically correcting 80 or "cleaning" topological errors, and using interactive review and editing of the automatically generated results, including topological errors that were automatically corrected as well as ones that could not be resolved. FIG. 22 illustrates two common problems—gap 82 and dangle 84—that may result from the generated path 30. Gap 82 may result from a situation where paths 30 comprising two vector sets should intersect, but one falls short of reaching the other as illustrated in FIG. 22. The gap 82 may be corrected by closing it. Dangle 84 extends beyond the point of intersection 42. Dangle 84 may be corrected by trimming the overhanging portion until the two paths 30 comprising two vector sets intersect precisely. While different examples of gaps 82 and dangles 84 are explained below, the definition of gap 82 and dangle 84 should not be limited in any way to the specific examples disclosed herein.

Figure 23:
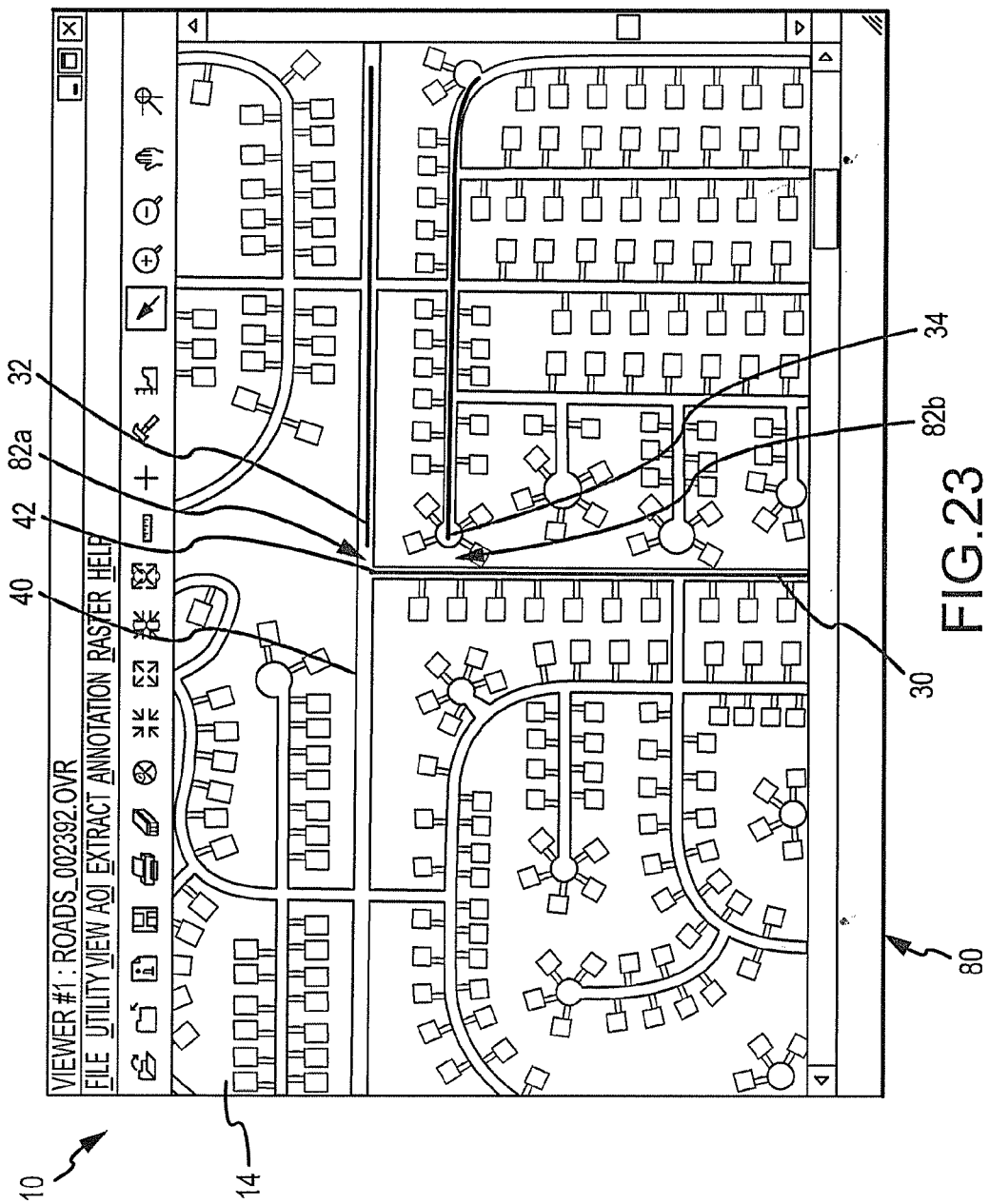
FIG. 23 shows two different gaps.

While the anchor point snapping algorithm 68 may fix some gaps 82 and dangles 84 within the snap distance 74, as illustrated in FIG. 20, it does not solve the problem for gaps 82 and dangles 84 exceeding the snap distance 74. For example, FIG. 23 shows two gaps 82a, 82b of equal length (about 20 m). From the image context, it can be seen that gap 82a should logically be closed because the region between the anchor point 32 and the intersection 42 comprises the road 40. From the image context, it can also be seen that gap 82b should not logically be closed because the region between the vectors is not road 40, but rather anchor point 34 properly terminates indicating a cul-de-sac. The vector cleaning algorithm 72 uses image-based logic in light of the multispectral image 14 and the panchromatic image 20 to determine that gap 82a should automatically be cleaned 80 (i.e. should logically be closed) while gap 82b should not be closed. By way of example, the vector cleaning algorithm 72 may determine that gap 82 should be closed if there is a short path 30 across the gap 82 that is spectrally similar to the endpoints of the gap 82 or shows smooth texture along its trajectory.

Figure 24:
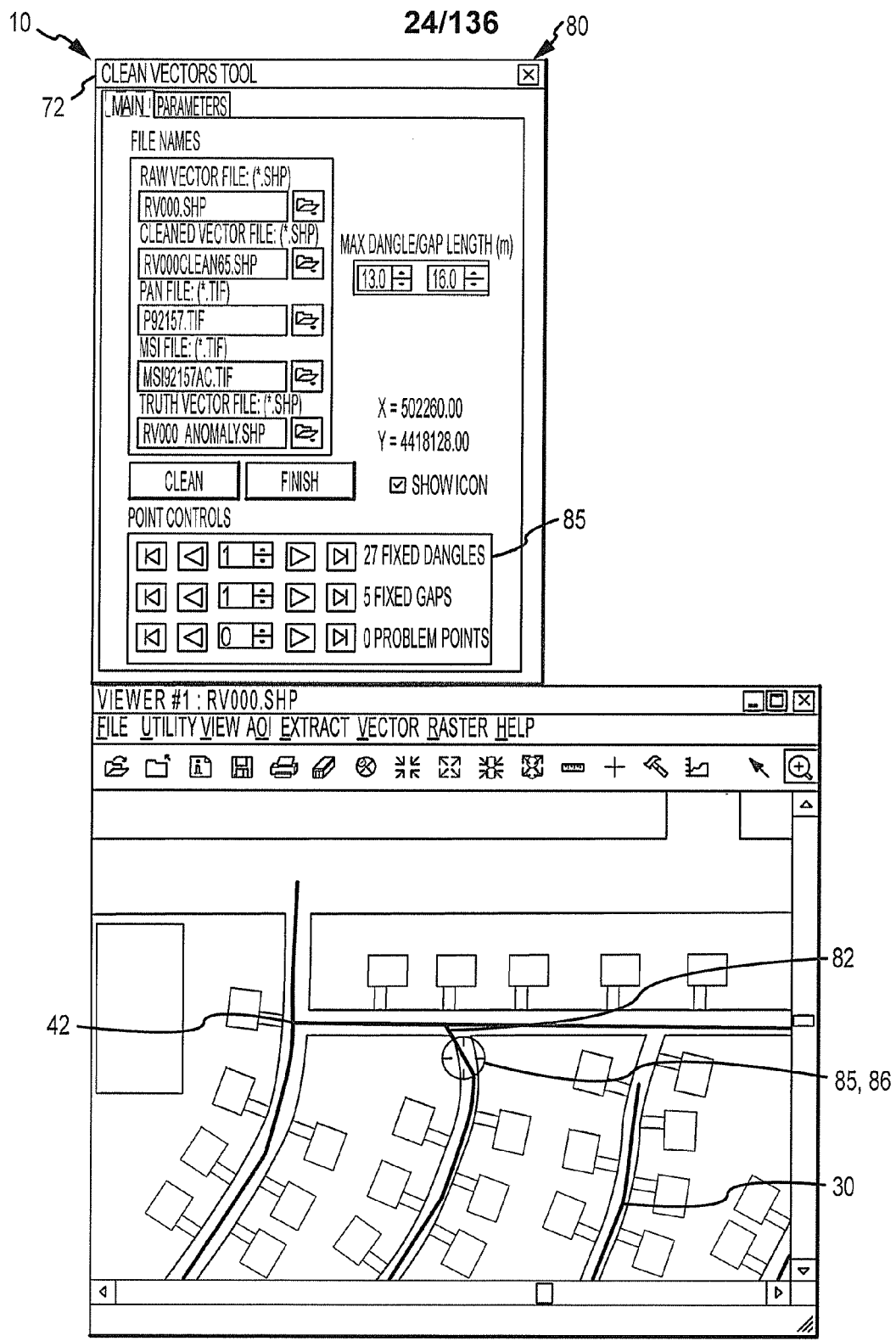
FIG. 24 shows cleaning vectors.

A preferred embodiment of the method 10 comprises automatically cleaning 80 topological errors. Method 10 further comprises automatically reviewing the path 30 for topological errors, such as gaps 82 and dangles 84; automatically using image-based reasoning to clean 80 or fix the topological errors that can be fixed in that manner; and leaving uncorrected any other topological errors. After the cleaning vectors algorithm 72 has automatically cleaned 80 certain gaps 82 and dangles 84, it marks and identifies the fixes 85 and the topological errors that it could not fix using image-based logic (e.g., problem point) and displays the results as shown in FIG. 24. For each category (fixed dangles, fixed gaps, and problem points) the viewer can be staged to the appropriate location with a marker 86 placed at the site of the fix 85 or the problem point. FIG. 24 illustrates marker 86 highlighting fix 85 to gap 82. The user may then review the fixes 85 to verify that they are proper; if the fixes 85 are not proper, the user may correct them. In addition, the user may review the problem points and correct them manually.

Figure 25:
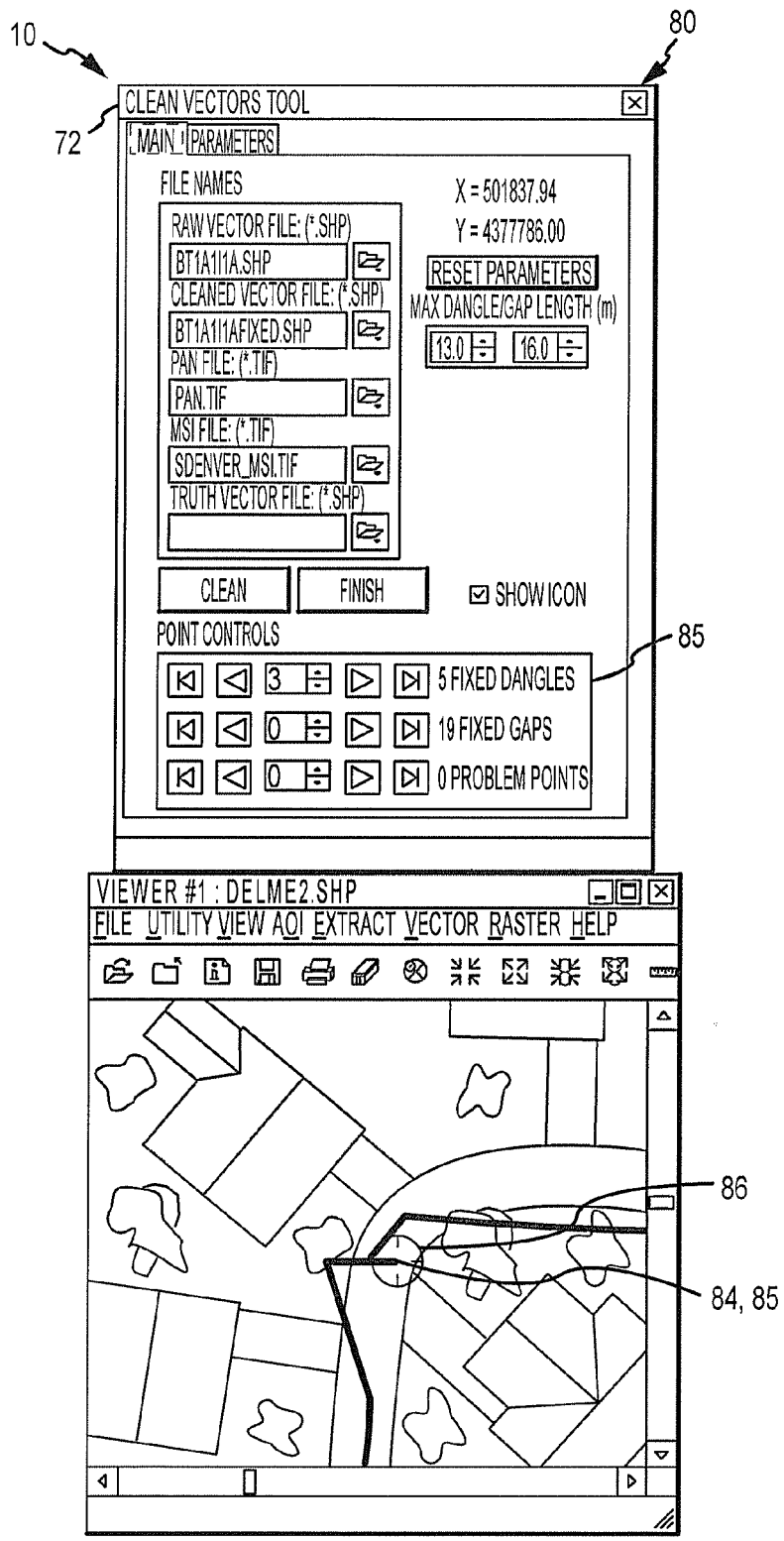
FIG. 25 shows cleaning vectors.

In one embodiment of the method 10, the user may simultaneously put the cleaned vector set on top of the original vector set and make the line width wider for the original vector set as shown in FIG. 25. This is for the sake of comparison of the two vector sets. If the user wants to edit the cleaned vector set, the user may enter the editing mode and make the desired modifications while viewing the results.

FIGS. 26-27 illustrate other instances in which the vector cleaning algorithm 72 may automatically clean 80 varieties of gaps 82 and dangles 84. FIG. 26A illustrates parallel gap 82. Shown at very high magnification are two nearly parallel lines separated by 0.2 m. Rather than identifying this situation as two gaps, the vector cleaning algorithm 72 recognized it as parallel gap 82 and fixed it appropriately with fix 85 as shown in FIG. 26B.

Figures 27A, 27B:
FIG. 27, with subparts 27A and 27B, shows automatically fixing a gap.

FIG. 27A shows what could be gap 82 or dangle 84 depending on whether the two paths 30 actually intersect. In this case, since the paths 30 do not intersect, it is parallel gap 82. FIG. 26B shows the appropriate fix 85 as made by the clean vectors algorithm 72.

The information regarding anchor points 32, 34, vector sets, path 30, material type 56 and geometry 46 may be stored in the output vector file 24. Once the output vector file 24 has been populated and saved, it may be used at any time thereafter to automatically create a map using methods known in the art (e.g., with commercially available GIS software).

Figures 28A, 28B:
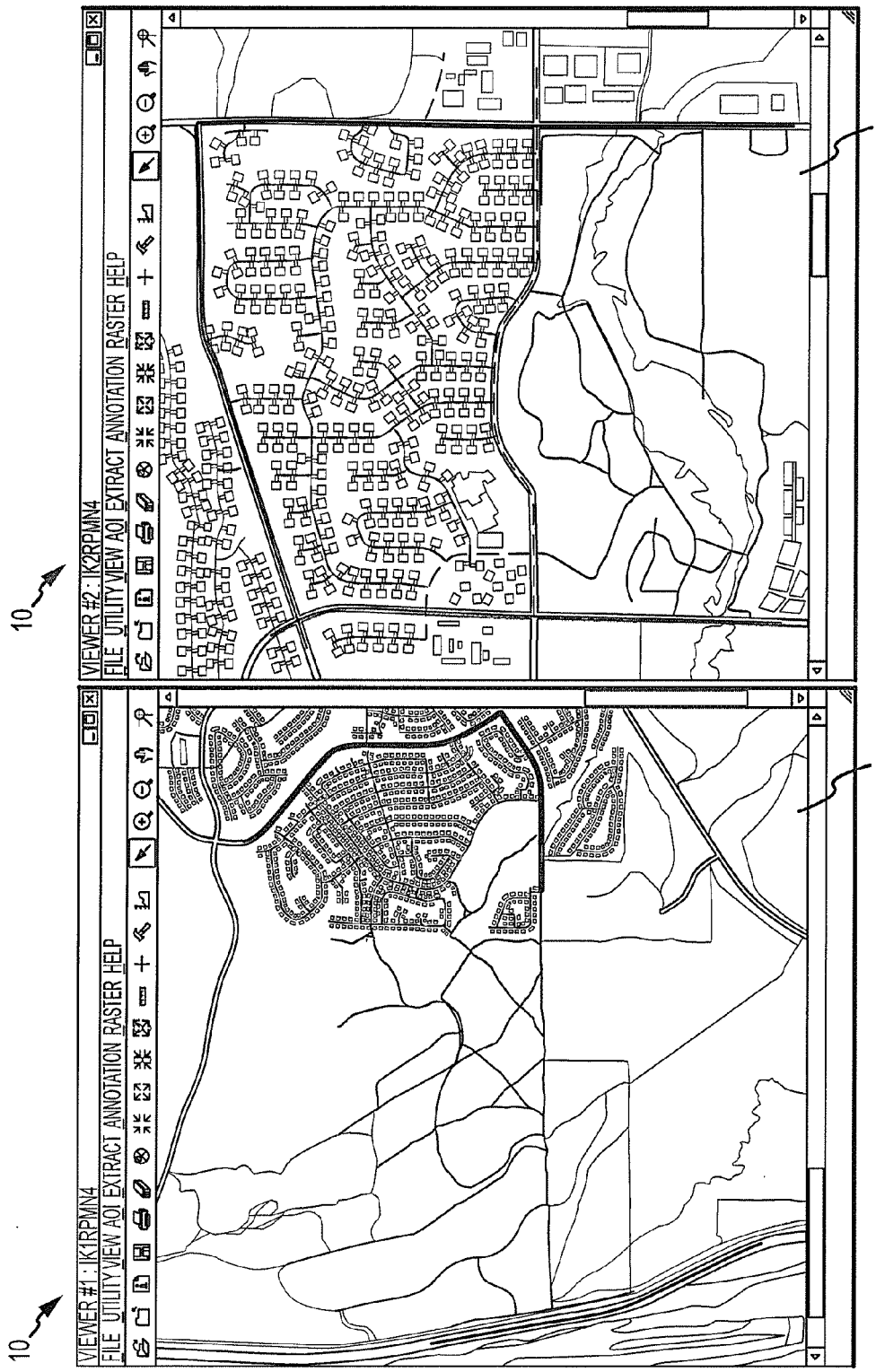
FIG. 28, with subparts 28A and 28B, shows multispectral imagery from the IKONOS® satellite.

Various aspects of the method 10 of the present invention were tested for speed and accuracy. Three analysts extracted roads from two IKONOS® images both manually (e.g., without image-based logic) and according to method 10 of the present invention (e.g., using image-based logic). FIG. 28 shows the IKONOS-1 and IKONOS-2 multispectral image 14 scenes with truth vectors. The IKONOS-1 multispectral image 14 (FIG. 28A) contains 14 km of 2-lane roads, 4 km of highways and 13 km of trails. The IKONOS-2 multispectral image 14 (FIG. 28B) contains 10 km of 2-lane roads, 5 km of highways and 7 km of trails. Not counting highways, both scenes contain about 50% paved roads. Two of the analysts extracted the road vectors manually or according to method 10 in opposite order to minimize the effects of learning the road network. The tests were intended to measure extraction and edit time and material attribution accuracy. As shown in Table 1 below, road 40 extraction according to method 10 of the present invention ("Tracker" in Table 1) was about 26% faster than manual extraction on average.

TABLE 1

| IKONOS-1 | | RMSE (m) | Extract | Edit | Total |
| --- | --- | --- | --- | --- | --- |
| 1 | Manual | 2.08 | 15:00 | 2:00 | 17:00 |
|   | Tracker | 1.86 | 11:28 | 3:00 | 14:28 |
| 2 | Manual | 2.17 | 11:10 | 10:17 | 21:27 |
|   | Tracker | 2.02 | 7:10 | 9:10 | 16:20 |
| 3 | Manual | 1.88 | 9:26 | 0:00 | 9:26 |
|   | Tracker | 1.50 | 9:16 | 0:00 | 9:16 |
| IKONOS-2 | | | | | |
| 1 | Manual | 1.70 | 17:40 | 15:30 | 33:10 |
|   | Tracker | 1.66 | 12:26 | 9:10 | 21:36 |
| 2 | Manual | 1.85 | 10:19 | 3:44 | 14:03 |
|   | Tracker | 1.66 | 6:31 | 8:15 | 14:46 |
| 3 | Manual | 1.35 | 7:26 | 0:00 | 7:26 |
|   | Tracker | 1.44 | 4:42 | 0:00 | 4:42 |
| Average | Manual | | | | 17:05 |
|   | Tracker | | | | 13:31 |

With respect to material type 56 attribution, the analysts in total made 11 errors out of 318 road segments for a total material type 56 attribution accuracy of 96.5%. In addition, when using method 10, about 85% fewer mouse clicks were required.

The vector cleaning algorithm 72 was tested on two datasets. One was a dataset of extracted roads containing 980 vectors totaling 274 km with an associated truth file containing 2520 vectors totaling 524 km. Results of using the vector cleaning algorithm 72 on this data set were: Probability of dangle detection=100%; False alarm (dangle detection)=0%; Probability of gap detection=100%; False alarm (gap detection)=0%. A second dataset comprised 15 subsets over 5 scenes, each with an associated vector layer. The road extractions were not done very carefully. Nonetheless, the results of using the clean vectors algorithm 72 on this data set were: Probability of dangle detection=100%; False alarm (dangle detection)=0%; Probability of gap detection=99%; False alarm (gap detection)=0%.

Figure 29:
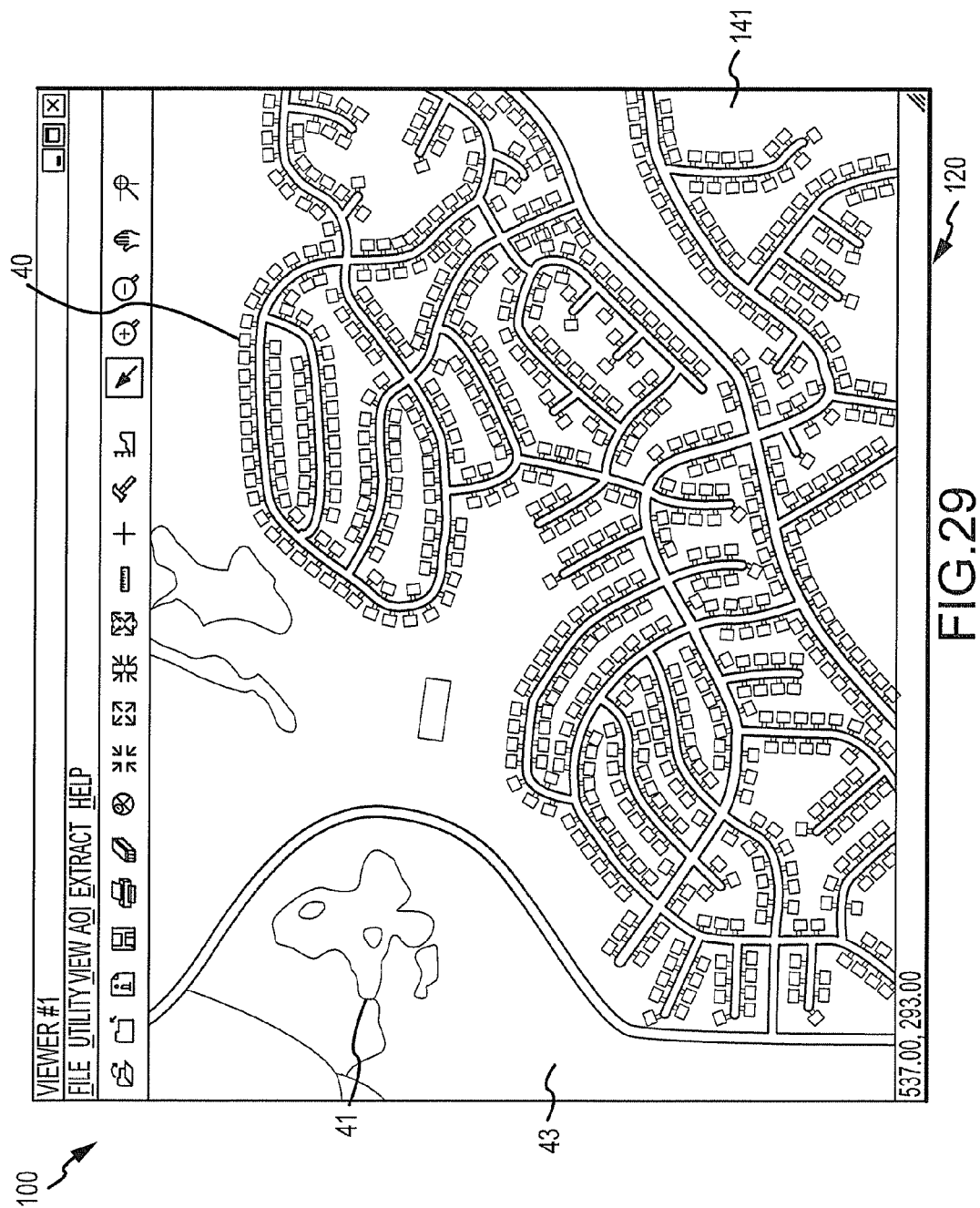
FIG. 29 shows a radar image, as may be selected and displayed in a window of a graphical user interface according to an embodiment of the method of the present invention.

Another embodiment of the present invention comprises a method 100 for extracting at least one linear feature from radar imagery, such as radar image 141. With respect to radar image 141, the strength of the reflected energy registers as the brightness of a pixel, such that the stronger the return signal, the brighter the pixel. The strength of the signal, in turn, may depend on a number of factors including surface roughness and moisture content. Whether a surface may be considered rough or smooth may be a function of its height variations in relation to radar wavelength. In general, the rougher the surface, the brighter the pixel associated with that surface. For instance, relatively smooth surfaces, such as road 40 or still water 41, may reflect almost all of the incidence energy away from radar and appear dark in radar image 141, as shown in FIG. 29. Rough surfaces, such as vegetation (e.g., field 43) and surfaces with a lot of edges and corners (e.g., buildings), scatter incidence energy in many directions and register as brighter areas on radar image 141. Electrical properties of a material also may influence how the material appears in radar image 141; thus, vegetation containing high moisture content may reflect more incidence energy and appear brighter in radar image 141.

Figure 30:
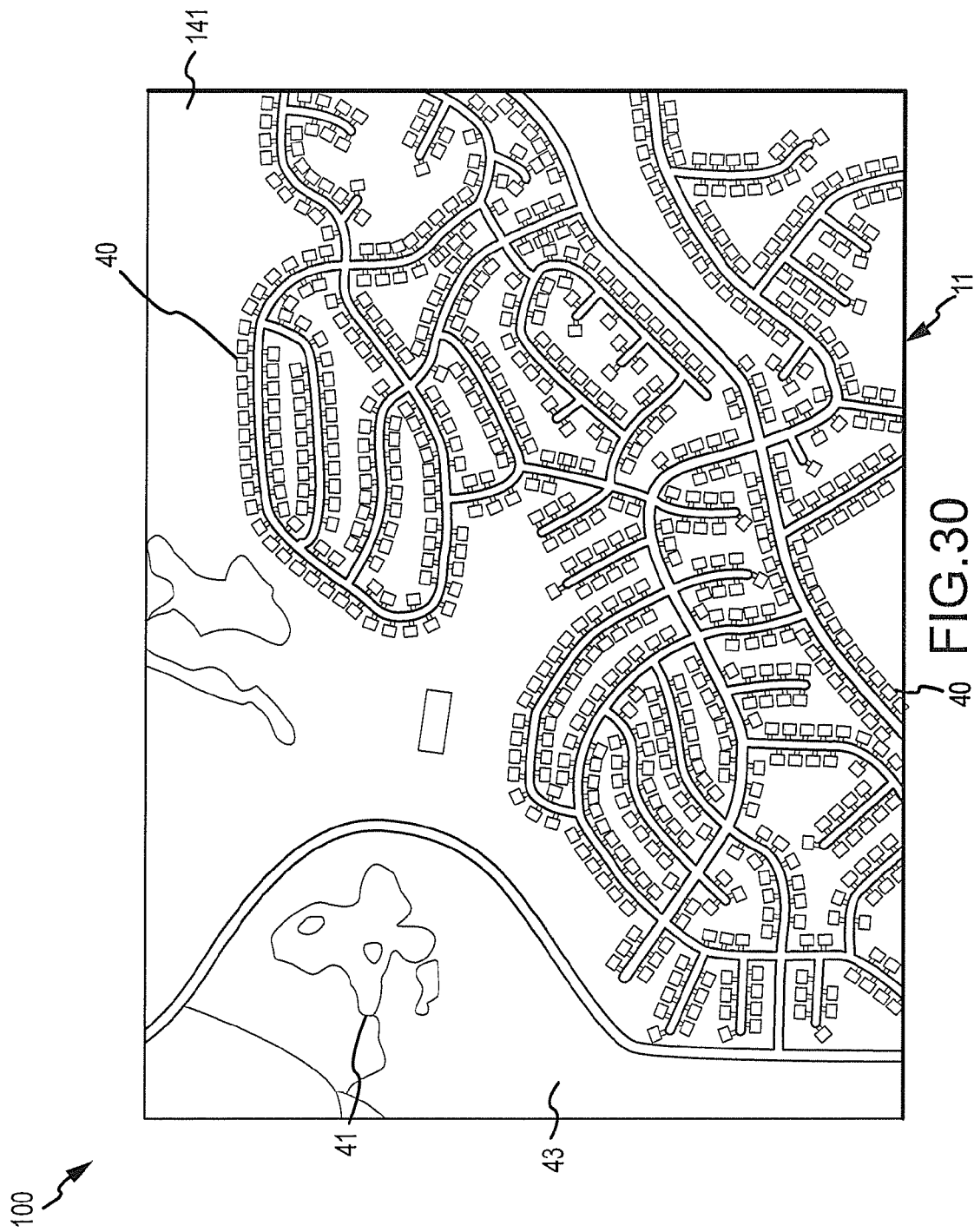
FIG. 30 shows smoothing radar imagery according to an embodiment of the invention using a Gaussian filter.

Method 100 of the invention comprises identifying radar image 141 and smoothing 11 it, preferably using a two-dimensional isotropic Gaussian filter, although other filters as would be known to those of skill in the art may also be used. Gaussian filters are also well known. By way of example, radar image 141 comprises single-band radar image 141. Additional bands may also be used. The smoothing 11 may comprise convolving the radar image 141 with a Gaussian scale sized appropriately for the resolution of radar image 141. Whether one size Gaussian may be preferred over another may be a function of the resolution of radar image 141. If the Gaussian selected is too small, the disparities in pixel brightness may not be normalized and may prevent road 40 from being detected. Where an appropriate size Gaussian scale is selected, the convolution process may produce a weighted average of pixel values, normalizing brightness toward the value of central pixels and removing oscillations from frequency response. By way of example, the appropriate Gaussian scale may match the width 66 of road 40. Applying this Gaussian scale for smoothing 11 radar image 141 resulted in road 40 appearing as a thick line, which, as shown in FIG. 30, appears lighter than the surroundings. Another effect of the Gaussian smoothing filter may be to smooth out noise common to many radar images 141.

An embodiment of method 100 may further comprise selecting 120 radar image 141 using a commercially-available geospatial imaging raster-based software. FIG. 29 shows the selecting 12 of single-band radar image 141 as used in an embodiment herein. By way of example, FIG. 29 has a spatial resolution of about 1.25 meters with an 8-bit dynamic range (which may comprise about 256 levels of brightness). However, radar images 141 with other resolutions and dynamic ranges may be used. The commercially-available software is ERDAS IMAGINE® sold by Leica Geosystems Geospatial Imaging, LLC of Norcross, Ga. The radar image 141 (which was taken of the Golden, Colo. area) was produced using X-band interferometric SAR from the aerial Star-3i sensor owned by Intermap, Denver, Colo.

A preferred embodiment of the method 100 may further comprise generating and utilizing pixel statistics associated with radar image 141. The statistics preferably comprise first order and second order statistics.

Figure 31:
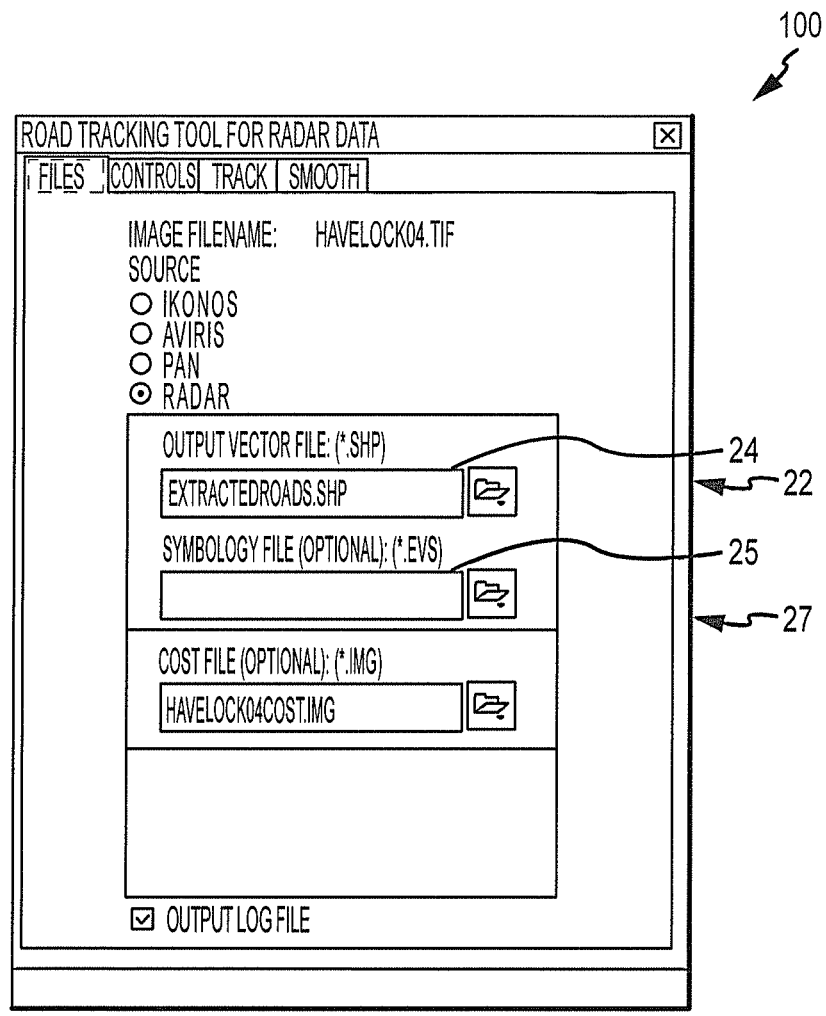
FIG. 31 shows selecting an output vector file and a cost file for the radar image.

The method 100 may further comprise selecting 22 output vector file 24, as shown in FIG. 31. The output vector file 24 may comprise at least one vector set. As used herein, a "vector set" comprises a sequence of points (coordinate pairs (x, y)) defining polygonal path 30 through user-selected 52 anchor points 32, 34. By virtue of its creation, the path 30 may introduce zero to many additional intermediate points 38 between anchor points 32, 34.

Figure 32:
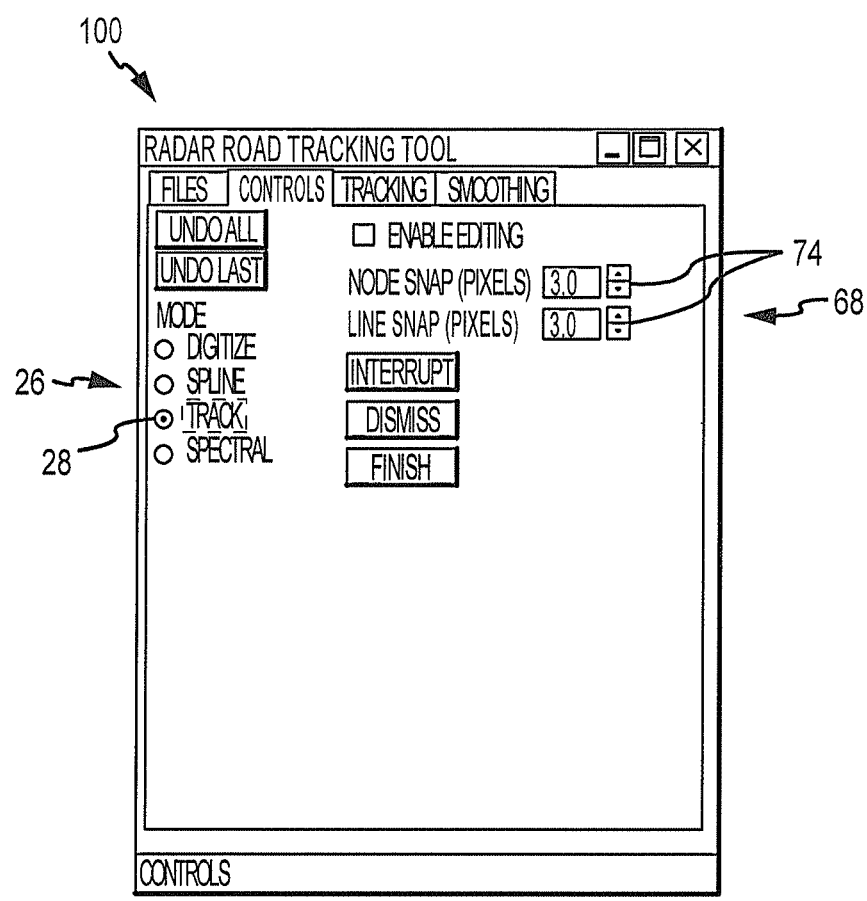
FIG. 32 shows selecting a track mode to be used for the radar image.
Figure 33:
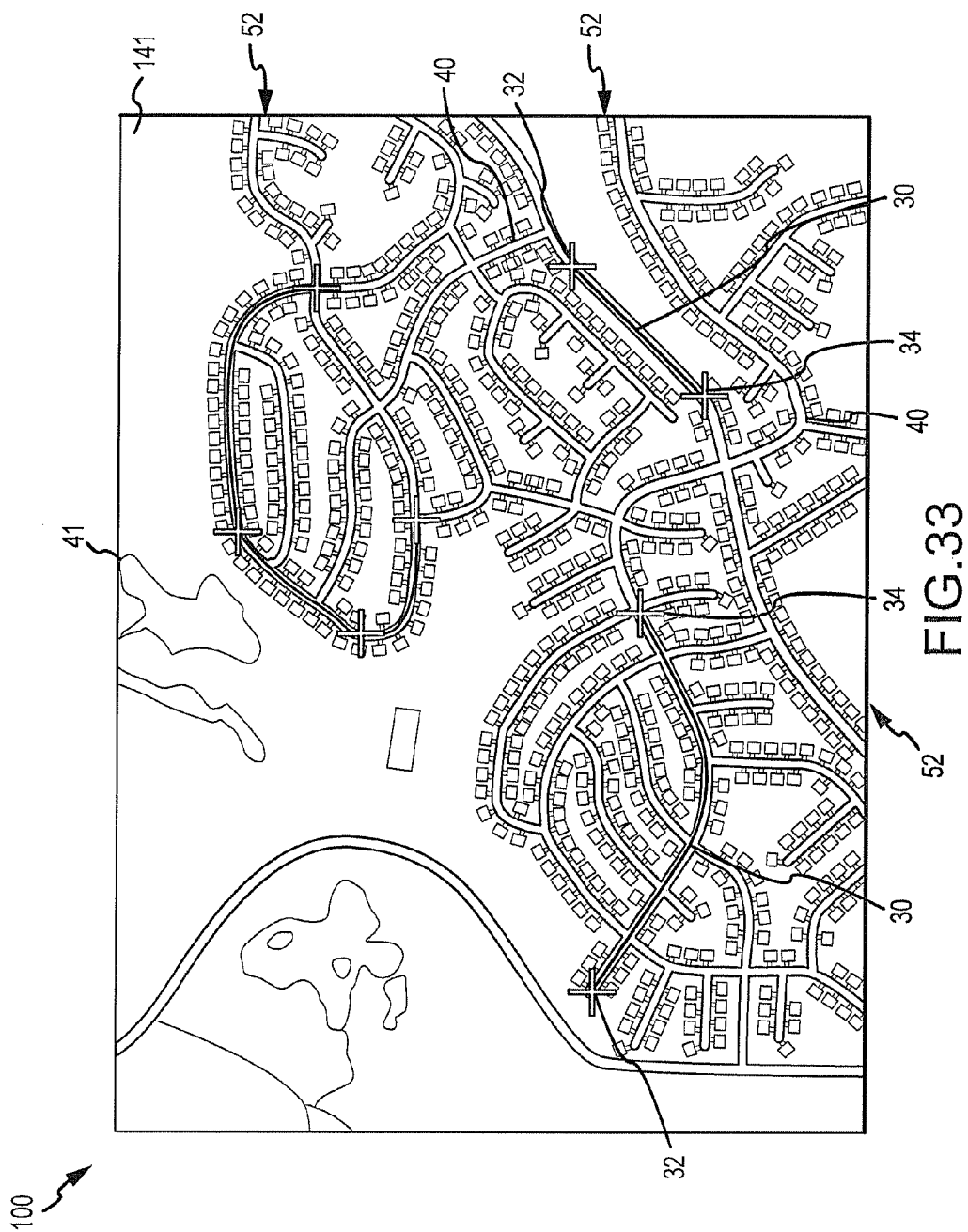
FIG. 33 shows selecting a plurality of anchor points associated with a road in the radar image to create a path between anchor points.
Figure 34:
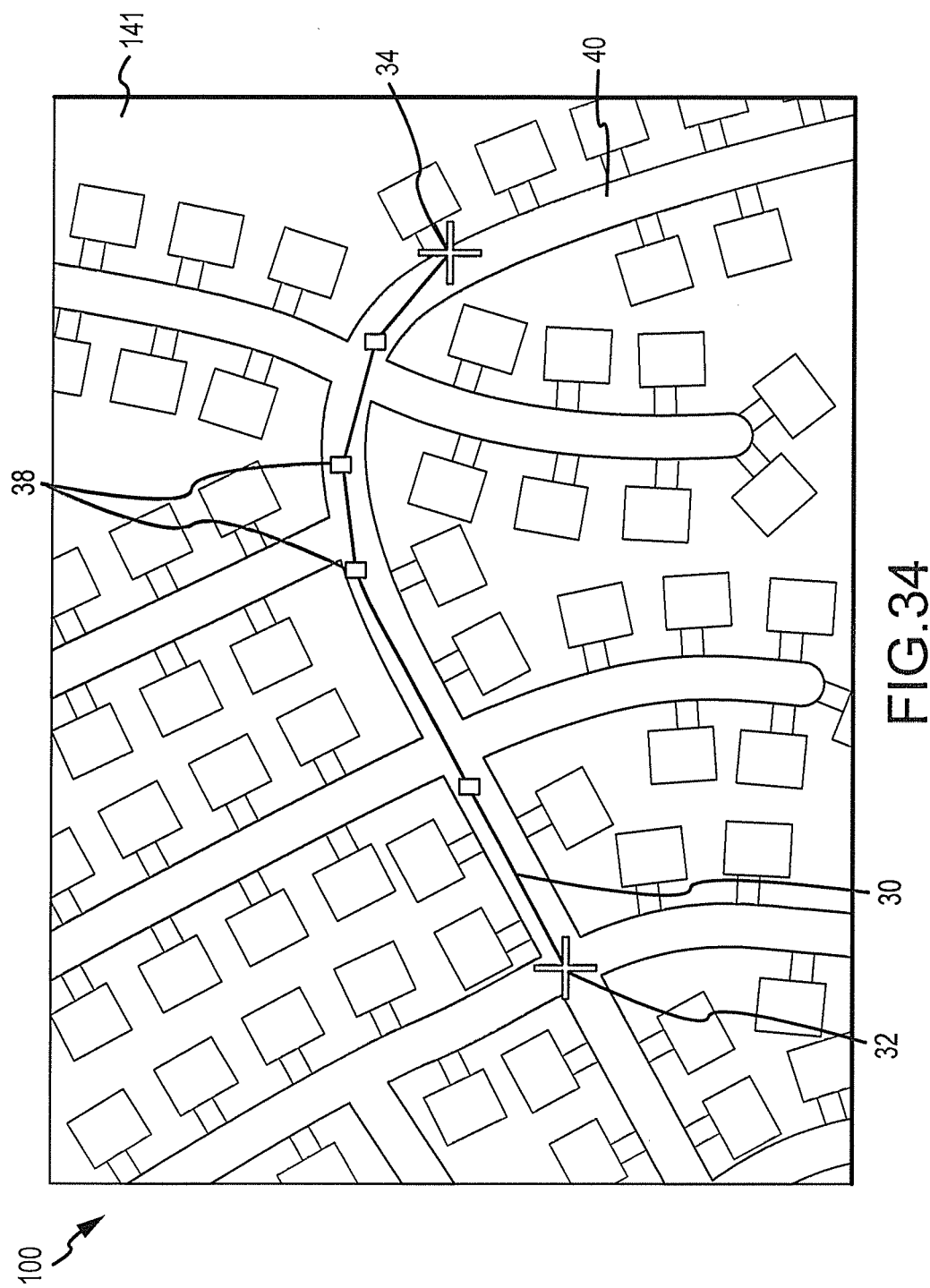
FIG. 34 shows anchor points, intermediate points and a path associated with a road in the radar image.

According to the method 100, after generating statistics and selecting 22 the output vector file 24, the user may select 26 track mode 28, as shown in FIG. 32. The track mode 28 may comprise using image-based logic to automatically generate a near-centerline path 30 (e.g., vector set) for road 40 between first user-selected 52 anchor point 32 and second user-selected anchor point 34 in radar image 141, as shown in FIG. 33. As used herein, "path" 30 may be defined by the vector set. To generate path 30, intermediate points 38 may automatically be added, as shown in FIG. 34.

By way of example, the image-based logic may comprise the least cost path algorithm incorporated in software, such as Djikstra's algorithm or any other least cost algorithm known in the art. Least cost path algorithms are well known in the art for constructing least cost path 30 between two points as a function of "cost." Assigning costs to different variables represents a way to distinguish between desirable paths and undesirable paths. In the case of the present invention, "cost" may distinguish between image features that are highly correlated, somewhat correlated, or not correlated with the presence of the selected linear feature (e.g., road 40), such that high correlation defines low cost. Thus, the least cost path algorithm may assign a cost to moving from one pixel to another (e.g., along path 30). By way of example, there may be a lower cost associated with image features related to the middle of road 40, and a higher cost associated with image features related to areas away from road 40. In an embodiment of method 100, the algorithm may determine the lowest cost path 30 by assigning a cost to each of several factors and then determining a combined total cost, which in turn may dictate path 30 between user-selected 52 anchor points 32, 34. A first cost factor may be path 30 length associated with moving from one pixel to another. A second factor in assigning cost may be spectral distance from the user-selected 52 anchor points 32, 34. Road 40 may show consistent brightness (distinct from the surroundings) between well-selected anchor points 32, 34. Thus, spectral distance from anchor points 32, 34 may be correlated with the presence of road 40.

A third factor in assigning cost may be a Laplacian of Gaussian. As is well known, the Laplacian calculates a second spatial derivative of an image (e.g., radar image 141), preferably after radar image 141 has been smoothed using a Gaussian filter. While the Laplacian may conventionally be used to highlight regions of rapid intensity change in pixel brightness for the purpose of extracting edges, according to the method 100, the Laplacian may be composed with a suitable Gaussian to transform the topography of the original image into a smoothed topography such that the road 40 pixels lie in valleys of low brightness (e.g., areas of low intensity) in relation to their immediate surroundings. It is also preferred that the Laplacian of Gaussian contribute to a cost factor when road 40 in original radar image 141 appears darker than the surrounding area, as is shown in FIG. 1.

A fourth factor in assigning cost may be adjacency to previously extracted road 40. For example, the algorithm adds an increased cost to finding path 30 that may coincide with or closely parallel a portion of previously extracted path 30.

Figure 35:
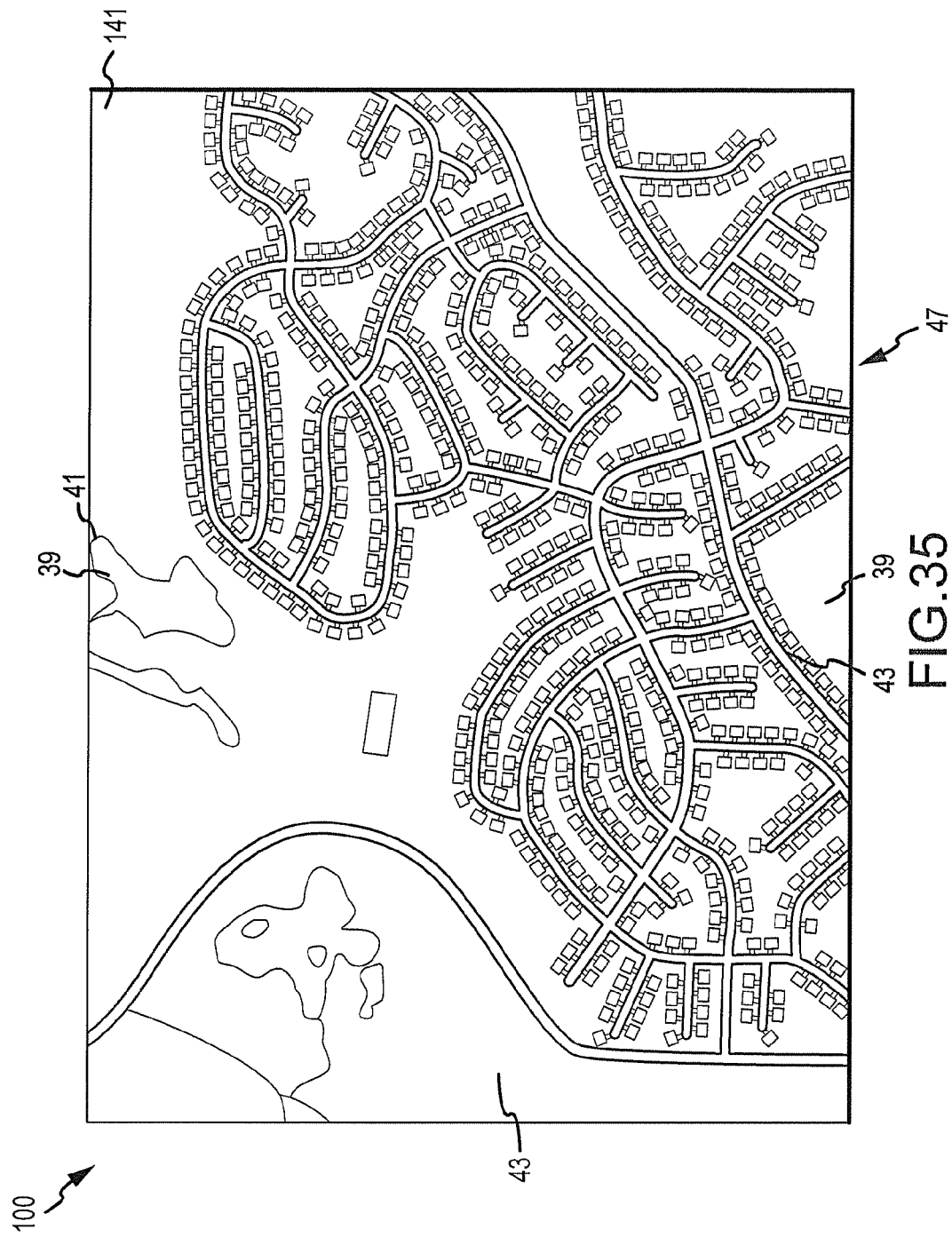
FIG. 35 shows applying an edge mask to radar imagery.

A fifth cost factor may be proximity to edge 39. Associating a cost factor with edges 39 of linear features (e.g., road 40) may keep the path 30 from deviating off the road 40. To manifest the presence of edge 39, there are various well-known edge mask techniques that may be applied 47 to radar image 141, such as a Nevatia-Babu edge mask and others as would be familiar to one of skill in the art. FIG. 7 illustrates applying 47 edge 39 mask to radar image 141. As shown in FIG. 35, edge 39 of road 40 appears white, while road 40 itself appears black. Field 43 shows practically no edges 39 and water 41 shows only slight edge 39 contours. Therefore, assigning a high cost to edge 39 helps to keep path 30 near the center of road 40. Whether applying 47 the edge 39 mask to radar image 141 is preferred may depend on the resolution of the specific radar image 141 to be used. For lower resolution images where the two edges 39 of road 40 may not be distinct, it may not be beneficial to apply 47 the edge 39 mask. However, applying 47 the edge 39 mask was found to be beneficial in the case of the 1.25 meter resolution of radar image 141 as shown in FIG. 29.

In other embodiments, image-based logic may comprise using image data, including spatial relationships and relationships between pixels, to make at least one correlation in data related to the linear feature, possibly to prefer one correlation over another.

Depending on the resolution of radar image 141, according to one embodiment it may be preferable for efficiency of road 40 extraction, but not required, to calculate the cost factors associated with the Laplacian of Gaussian, edge 39 proximities, and other cost factors as a pre-processing 218 step before beginning image-based road 40 extraction on radar image 141. For example, the running time of algorithms of the method 100 scale roughly as the resolution squared, so calculations for a 3-meter resolution radar image 141 may proceed about five times faster than calculations for a 1.25-meter resolution radar image 141. Thus, where using a higher resolution radar image 141, the speed of extracting roads 40 may be substantially increased by calculating several of the cost factors in advance. In addition, the user may specify which cost factors to calculate in this pre-processing 218 step. For example, if it were determined that the edge 39 proximity cost factor should not be used, for example with a lower resolution radar image 141, then the user may indicate that this cost factor is not to be computed as part of the pre-processing 218. By way of example, cost factors associated with the Laplacian of Gaussian and edge 39 proximity were calculated prior to extracting road 40 from radar image 141. The computer program that performed this operation comprises the following variables: input radar image 141; an output cost function that assigns a cost to corresponding pixels; fftSize (Fast Fourier Transform size); scale of Laplacian of Gaussian; Gaussian size in meters of Laplacian of Gaussian; highest value of Laplacian of Gaussian; weight of edges 39 in cost function; and Gaussian size for smoothing 11 edges 39. With the exception of fftSize, the previously-specified variables affect the determination of cost to be used in the least cost path algorithm, and preferably should be changed if any changes are desired in the cost function parameters. For example, if it were desired to eliminate edge 39 proximity as a cost factor, then the weight of edges cost function should be set to zero. By way of example, the fftSize was set to a default of fftSize=2048, which seemed to work well with computers of more than 1 gigabyte of memory. Reducing fftSize to 1024 or even smaller may be beneficial for computers with less memory. If these cost factors are calculated in advance, then cost file 25 should be entered 27 into the user interface after selecting 22 output vector file 24 as shown in FIG. 31.

Another embodiment of method 100 may comprise using the spectral mode for extracting at least one linear feature (e.g., road 40) from radar image 141. Like the track mode 28, the spectral mode comprises using image-based logic to track path 30 between first anchor point 32 and second anchor point 34 selected 52 by the user. It may be beneficial to use the spectral mode where, in radar image 141, the pixels of the road 40 between anchor points 32, 34 are relatively uniform and similar in brightness to (i.e., spectrally similar to) the pixels associated with anchor points 32, 34. The image-based logic of the spectral mode may comprise a least cost path algorithm incorporated in software, such as Djikstra's algorithm or any other least cost algorithm known in the art. In the spectral mode, the cost factors used to determine the least cost path 30 between the user-selected 52 anchor points 32, 34 may comprise spectral similarity to the user-selected 52 anchor points 32, 34; adjacency to previously extracted roads 40; and cost of moving from one pixel to another (e.g., along path 30).

For example, the least cost path algorithm adds an increased cost to finding path 30 that may coincide with or closely parallel a portion of a previously extracted path 30.

Having selected 26 the track mode 28, the user may now visually locate road 40. Referring to FIG. 33, the user may select 52 a plurality of anchor points 32, 34 associated with road 40, anchor points 32, 34 being tied to geographical locations in the raster data associated with radar image 141. To designate anchor points 32, 34, the user may position the cursor on anchor point 32, click on it once, drag the cursor to anchor point 34, and double-click on anchor point 34.

Figure 36:
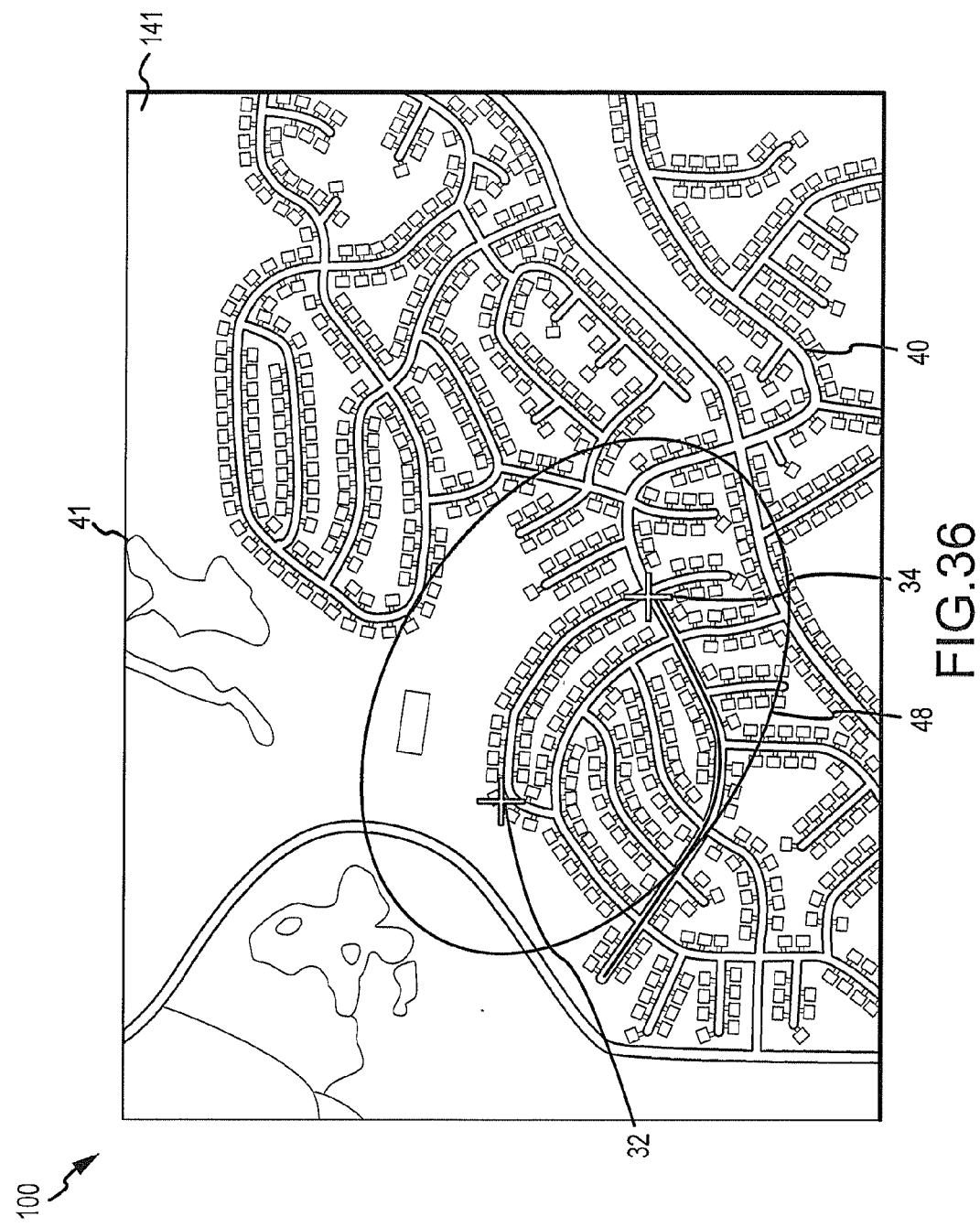
FIG. 36 shows an elliptical search region defined by anchor points.

In a preferred embodiment of the method 100, the anchor points 32, 34 may define the constrained search region about consecutive anchor points 32, 34 to confine path 30 connecting them. For example, ellipse 48 that has the anchor points 32, 34 as its foci, is shown in FIG. 36. In a preferred embodiment, ellipse 48 comprises the search region, such that any intermediate point 38 generated for path 30 connecting anchor points 32, 34 must occur within the area defined by the ellipse 48. In a preferred embodiment, a purpose of the search region is to manage the tradeoff between search space size and computational speed.

According to the method 100, once the user has selected 52 anchor points 32, 34, image-based logic embedded in the software may be employed to automatically create the vector set and connect the anchor points 32, 34 via path 30. Path 30 may include intermediate points 38 automatically generated in such location and in sufficient quantity to accurately reflect the character of road 40. For instance, in the case of a curve in the road 40, where the user selects 52 two anchor points 32, 34 by clicking on them, the software may add intermediate points 38 in between the two anchor points 32, 34 using image-based logic to create additional vectors in the vector set so that the least cost path 30 can be preferably substantially smooth and located substantially along near centerline of the road 40, as shown in FIG. 33. It may be that path 30 contains no such intermediate points 38. In addition, depending on the character of the road 40 to be extracted, the user may select 52 additional anchor points 32*a*, 34*a*, in between anchor points 32, 34, as explained in more detail below.

Figure 37:
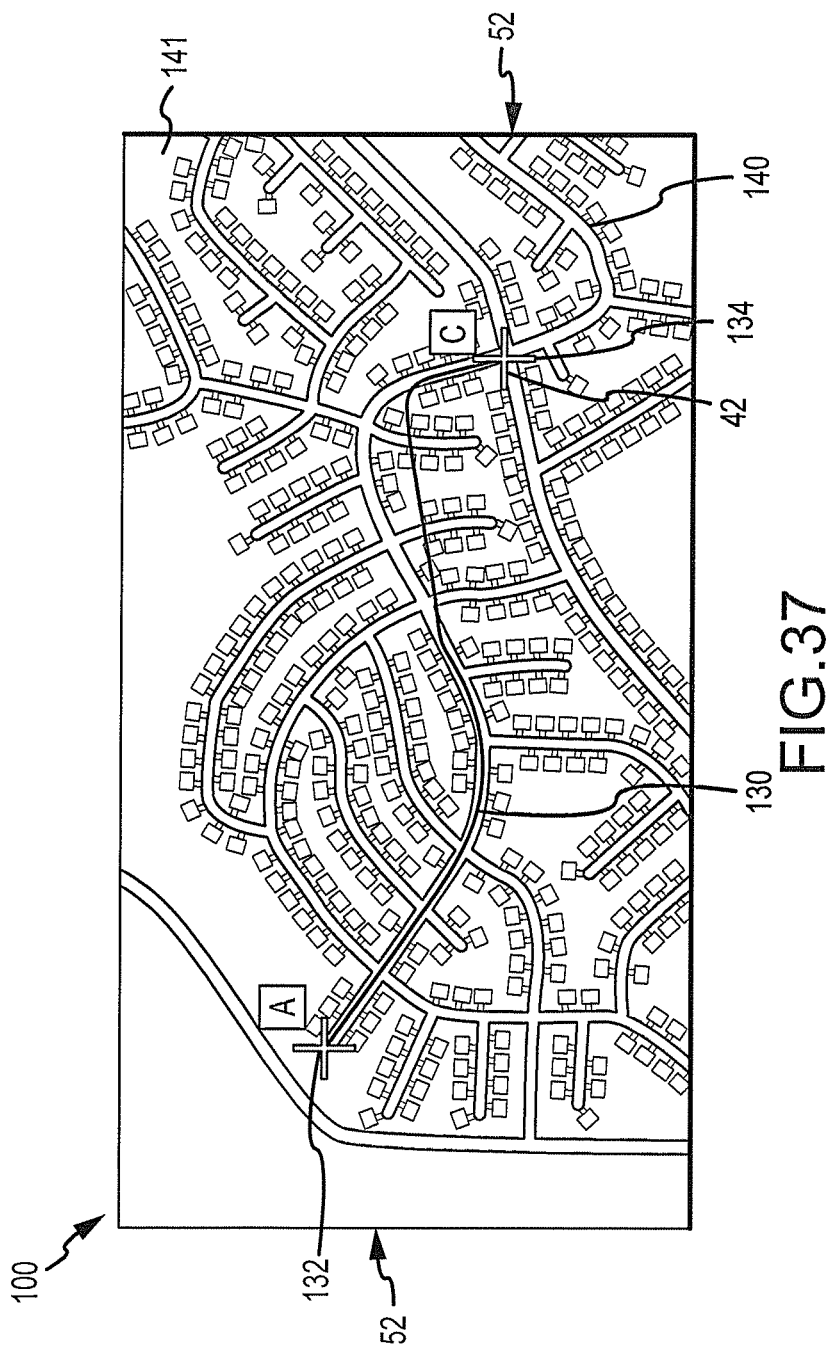
FIG. 37 shows anchor point selection.
Figure 38:
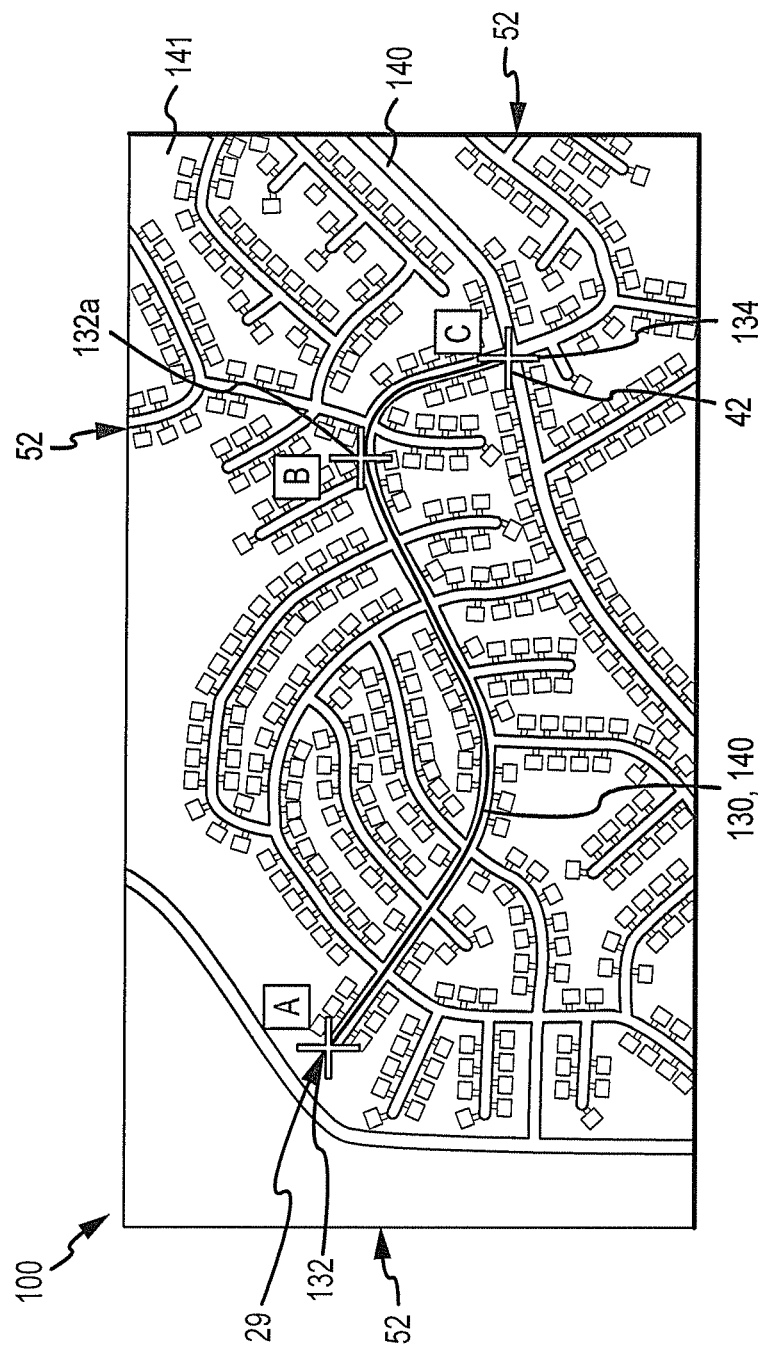
FIG. 38 shows anchor point selection.

For optimal accuracy of road 40 extraction, a preferred embodiment of method 100 comprises using a strategy for locating anchor points 32, 34. Using the radar image 141 representation of road 140, it is preferred that the user select 52 each anchor point 132 (A), 134 (C) by locating them in a road intersection 42 or a road terminal 29 (e.g., cul-de-sac), as shown in FIGS. 37 and 38. In addition, it is preferred that the user click on the road 140 instead of near the road 140 as shown on radar image 141. Further, it may be beneficial for the user to extract primary streets first and then move to secondary streets. Additional anchor points 32*a*, 34*a* should be placed in natural locations, such as bends and junctions. Anchor points 32, 34 should be located no more than a maximum distance apart, depending on the character of the linear feature to be extracted. For instance, in the case of a straight road 40, the maximum distance between anchor points 32, 34 may be greater than in the case of a winding road 40 while still attaining accuracy in road 40 extraction. As shown in FIGS. 37 and 38, if only anchor points 132 ("A" in FIGS. 37 and 38) and 134 ("C" in FIGS. 37 and 38) were specified, then the generated path 130 would not properly extract road 40 between anchor points 132 and 134. However, where additional anchor point 132*a* ("B" in FIG. 28) is selected 52, then the generated path 130 properly extracts road 140.

Figure 39:
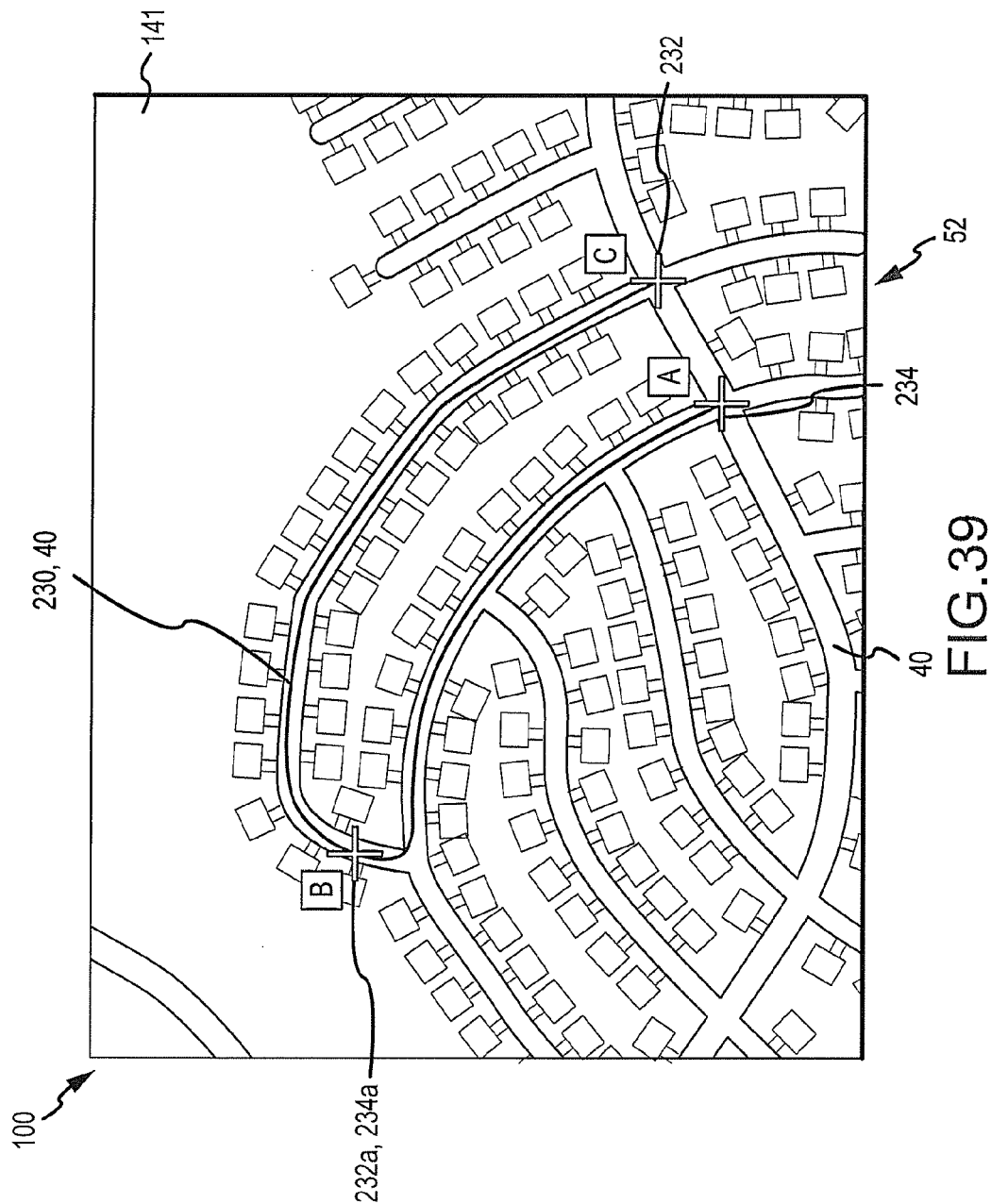
FIG. 39 shows anchor point selection for simple loop.

In the case of a loop in the road 40, the number of user specified points 32, 34, 38 required for accurate extraction of road 40 via path 30 may be a function of the loop shape. For example, as shown in FIG. 39, in the case of a U-shaped loop, selecting two anchor points 232, 234 and additional anchor points 232*a*, 234*a* may allow path 230 to be defined. However, FIG. 40 shows a tight loop with a severe bend. In that case, anchor points 232 ("A" in FIG. 40) and 234 ("E" in FIG. 40), as well as three additional anchor points 232*a*, 234*a* ("B," "C," "D" in FIG. 40) may need to be specified to correctly determine path 230.

In addition, a preferred embodiment of the method 100 may also comprise use of manual modes (e.g., without image-based logic) for extracting roads 40 so that the user has the option of switching between track mode 28 or spectral mode (e.g., both using image-based logic), or the manual modes—spline mode or digitize mode (e.g., neither using image-based logic). It may be beneficial to use the digitize mode to manually extract straight roads 40. It may be beneficial to use the spline mode to manually extract large roads 40 with little curvature (e.g., highways).

Figure 41A:
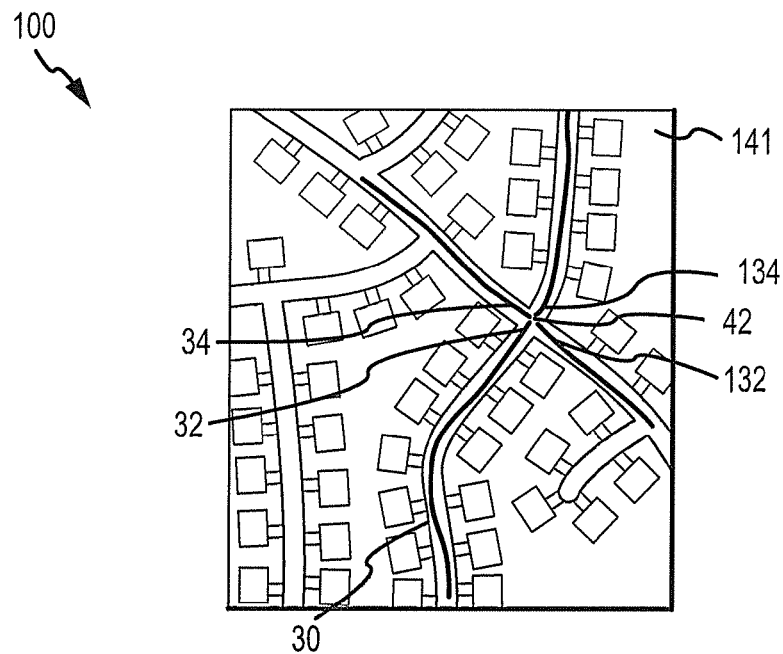
FIG. 41, with subparts 41A and 41B, shows node and line snapping of anchor points.
Figure 41B:
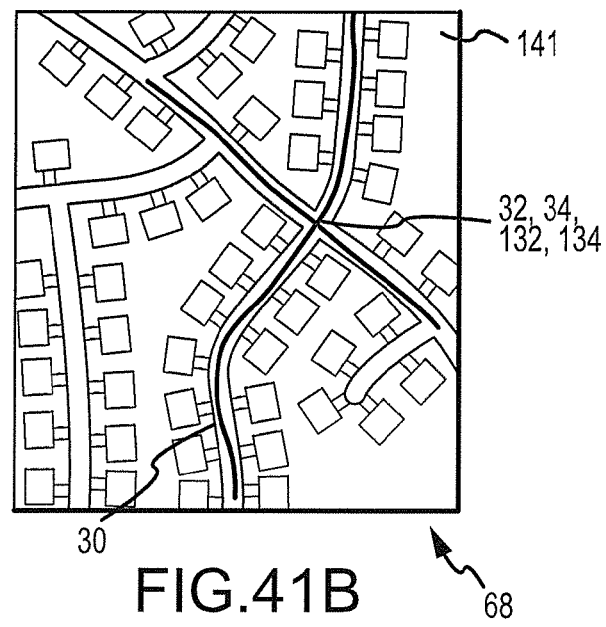

A preferred embodiment of the method 100 comprises topology cleaning using the node and line snapping algorithm, anchor point snapping algorithm 68, to snap new anchor points 132, 134 to nearby path 30 that has already been extracted. The snapping takes place before the path 30 between new anchor points 132, 134 is generated. When the user selects 52 new anchor points 132, 134, the anchor point snapping algorithm 68 may determine whether the anchor points 132, 134 are within snap distance 74 of existing anchor point 32, 34 or path 30. The snap distance 74 may be a predetermined distance, preferably three pixels, as shown in FIG. 41, within which corrections to the road topology may be made. The anchor point snapping algorithm 68 may be disabled. If the new anchor points 132, 134 are within the snap distance 74 of existing anchor point 32, 34 or path 30, the anchor point snapping algorithm 68 moves or "snaps" the new anchor points 132, 134 to coincide with the existing anchor point 32, 34 or path 30 as shown in FIG. 41. FIG. 41A illustrates the result with respect to intersection 42 if the user fails to click precisely in the same place for each anchor point 32, 132. FIG. 41B illustrates the result when the anchor point snapping algorithm 68 is employed so that the anchor points 32, 132 are properly joined.

Figure 42:
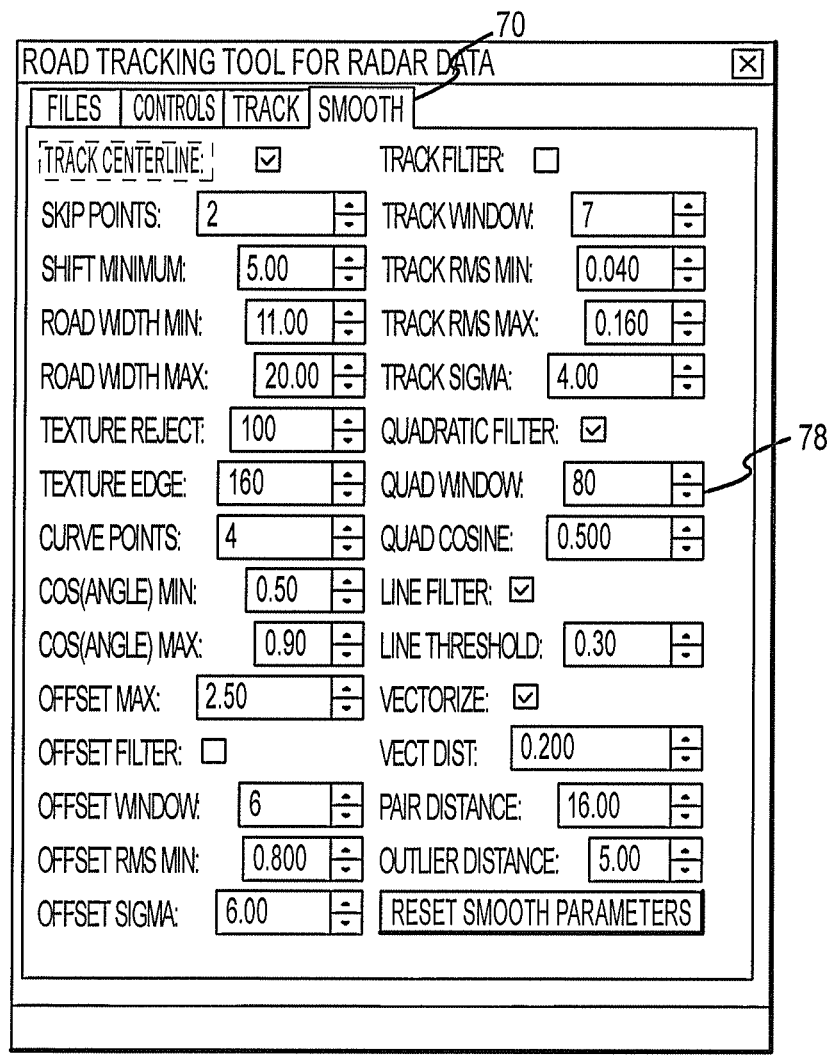
FIG. 42 shows smoothing parameters.

Using 76 smoothing algorithm 70 "smoothes" the least cost path 30 between consecutive anchor points 32, 34, revising least cost path 30 to give it a smooth appearance, rather than what might have been a jagged appearance had smoothing not been used 76. The various smoothing parameters are shown in FIG. 42. The user may choose to adjust the quad window parameter 78. Increasing the quad window parameter 78 will cause extra smoothing to be applied to the path 30.

The information regarding anchor points 32, 34, intermediate points 38, vector set and path 30 may be stored in the output vector file 24 comprising a vector layer.

The user may review path 30 for other topological errors (e.g., deviations from the linear feature of interest in radar image 141 (e.g., road 40)) and correct them manually to change the vector sets. Such review and correction may take place at any time, either immediately after the extraction or, after the extraction results (e.g., vector set, anchor points 32, 34, path 30) have been stored in the output vector file 24. The saved output vector file 24 may be later loaded into software and the corrections made at that time.

Once the output vector file 24 has been populated and saved, a map may be created from it automatically at any later time using known methods in the art (e.g., including tools in commercially available GIS software).

Various aspects of the method 100 of the present invention were tested for speed and accuracy. The method 100 was tested using Star-3i data associated with radar image 141, such as shown in FIG. 29, as well as GeoSAR data associated with radar image 314 shown in FIG. 43. GeoSAR radar image 314 is 16-bit single-band (X) data from an aerial sensor with a spatial resolution of about 3 meters and little noise that was provided by the National Geospatial Intelligence Agency. The standard deviation of the data is around 15,000, so the data makes full use of the 16-bit dynamic range (comprising around 65,536 levels of brightness). Other radar image resolutions and dynamic ranges were also tested with good results.

Figure 43:
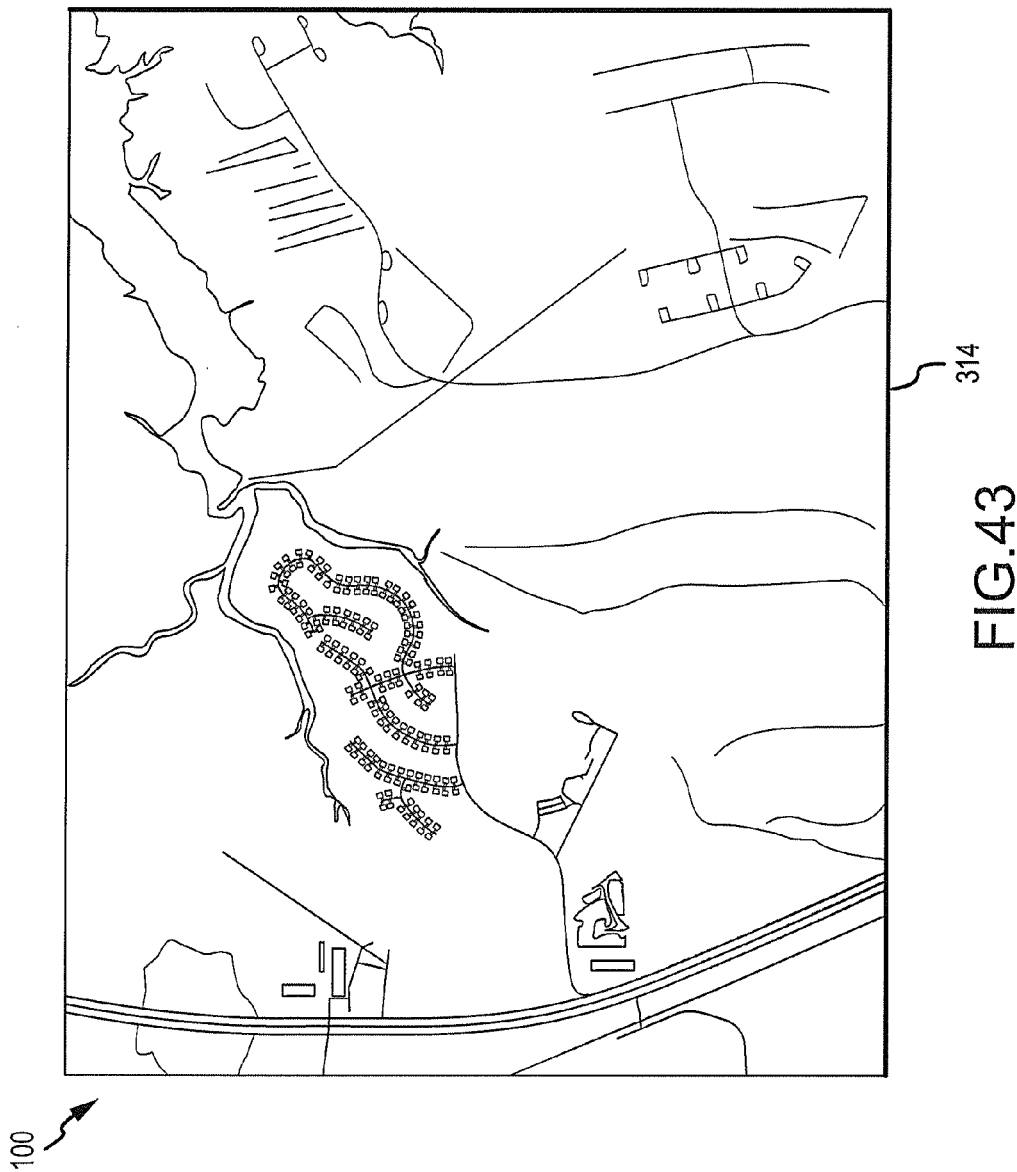
FIG. 43 shows a 3-meter resolution radar image.

For initial testing, two analysts (only one of whom had previously worked with radar imagery) extracted roads 40 from six radar images 141, 314 both manually and according to an embodiment of method 10 (e.g., semi-automatically). Two of the test radar images 141, 314 are shown in FIGS. 29 and 43. The analysts extracted the road 40 vectors manually or according to method 100 in opposite order to minimize the effects of learning the road 40 network. The tests were intended to measure accuracy, as well as extraction and edit time. As shown in Table 2 below, road 40 extraction according to method 100 ("Tracker" in Table 2) varied in time, sometimes taking longer than manual extraction. However, method 100 worked well in areas with many curved roads 40 which are laborious to extract manually. Method 100 also worked better on two lane roads 40 than it did on four-lane roads 40.

TABLE 2

(Time in Minutes)

| Image | Manual IA 1 | Tracker IA 1 | Manual IA 2 | Tracker IA 2 | Edit IA 2 | Total Manual | Total Tracker |
|---|---|---|---|---|---|---|---|
| GeoSAR 1 | 30 | 24 | 30 | 27 | 19 | 60 | 70 |
| GeoSAR 2 | 15 | 7 | 10 | 10 | 7 | 25 | 24 |
| GeoSAR 3 | 12 | 8 | 10 | 4 | 6 | 22 | 18 |
| Star-3i 1 | 60 | 72 | 107 | 56 | 75 | 167 | 203 |
| Star-3i 2 | 63 | 59 | 85 | 55 | 15 | 148 | 129 |
| Star-3i 3 | 30 | 32 | 37 | 23 | 35 | 67 | 90 |

Subsequent testing was performed by a research scientist with experience in radar imagery and prior art road extraction methods. Radar images 141 used were from the Star-3i sensor. Three of the radar images 141 were about 1.25-meter resolution; one of the radar images 141 had a resolution of about 2.5 meters. The scientist tracked each radar image 141 twice, once manually and once using a combination of automatic and manual tracking modes according to method 100. To reduce bias caused by scene familiarity, the scientist extracted roads 40 from other scenes between two mappings of a single scene. Table 3 below shows the results. The method 100 of the present invention reduced tracking time on average, especially in the case of curved roads 40.

TABLE 3

| Image | Resolution | Size | Manual Time (Min.) | Tracker Time (Min.) |
|---|---|---|---|---|
| A | 1.25 m | 10931 × 9594 | 74 | 48 |
| B | 1.25 m | 4742 × 3491 | 88 | 73 |
| C | 1.25 m | 10964 × 9530 | 34 | 44 |
| D | 2.5 m | 2300 × 4300 | 118 | 85 |

Figure 44:
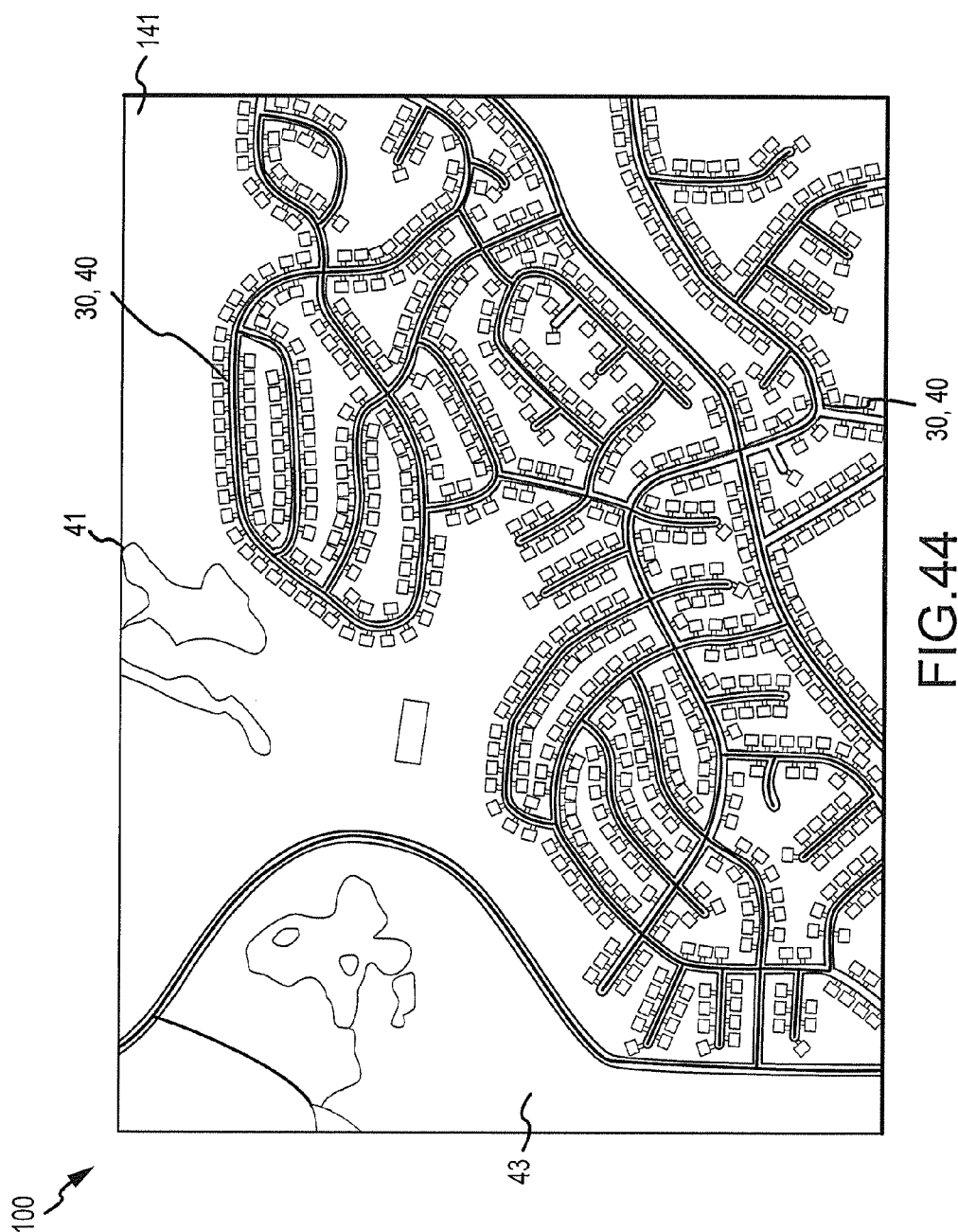
FIG. 44 shows paths extracted to follow roads in a radar image.

A sample extraction showing paths 30 for roads 40 is shown in FIG. 44. As can be seen, path 30 tracks road 40 with reasonable accuracy.

Method 200 of the present invention may be used to extract linear features, such as road 40, from any remotely sensed image, such as multispectral image 14, radar image 141, panchromatic image 20 or hyperspectral image 15 through a user interface. The user interface is a graphical user interface (GUI), that may be constructed from primitives supplied by commercially-available GIS software package, such as ERDAS IMAGINE® sold by Leica Geosystems Geospatial Imaging, LLC of Norcross, Ga.

Figure 45:
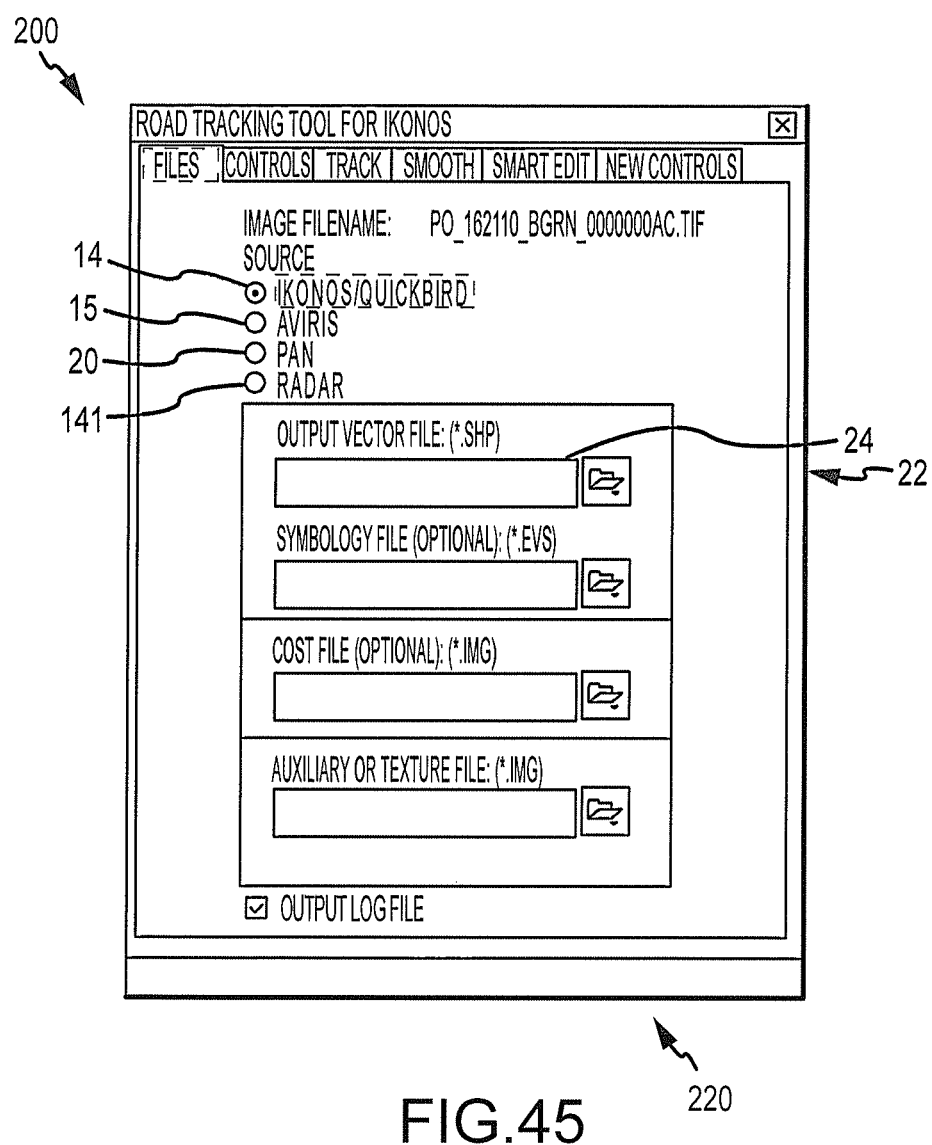
FIG. 45 shows selecting image type.

Via the interface, the user may select 220 an input image of image type from among multispectral image 14, radar image 141, panchromatic image 20 or hyperspectral image 15, which may have been pre-processed 218 (e.g., atmospherically corrected multispectral image 14 or hyperspectral image 15, or a smoothed version of radar image 141). Via the user interface, the selected 220 input image may be further pre-processed 218 to generate auxiliary raster images (e.g., texture file 18 from input panchromatic image 20, cost file 25 from input radar image 141) that may also be subsequently employed in practicing method 200 to enhance the accuracy or speed of subsequent road 40 extraction. Depending on the type of image selected 220, preprocessing 18 may be preferred but not required. FIG. 45 shows, for example, that selection 220 of input multispectral image 14 has occurred.

Figure 46:
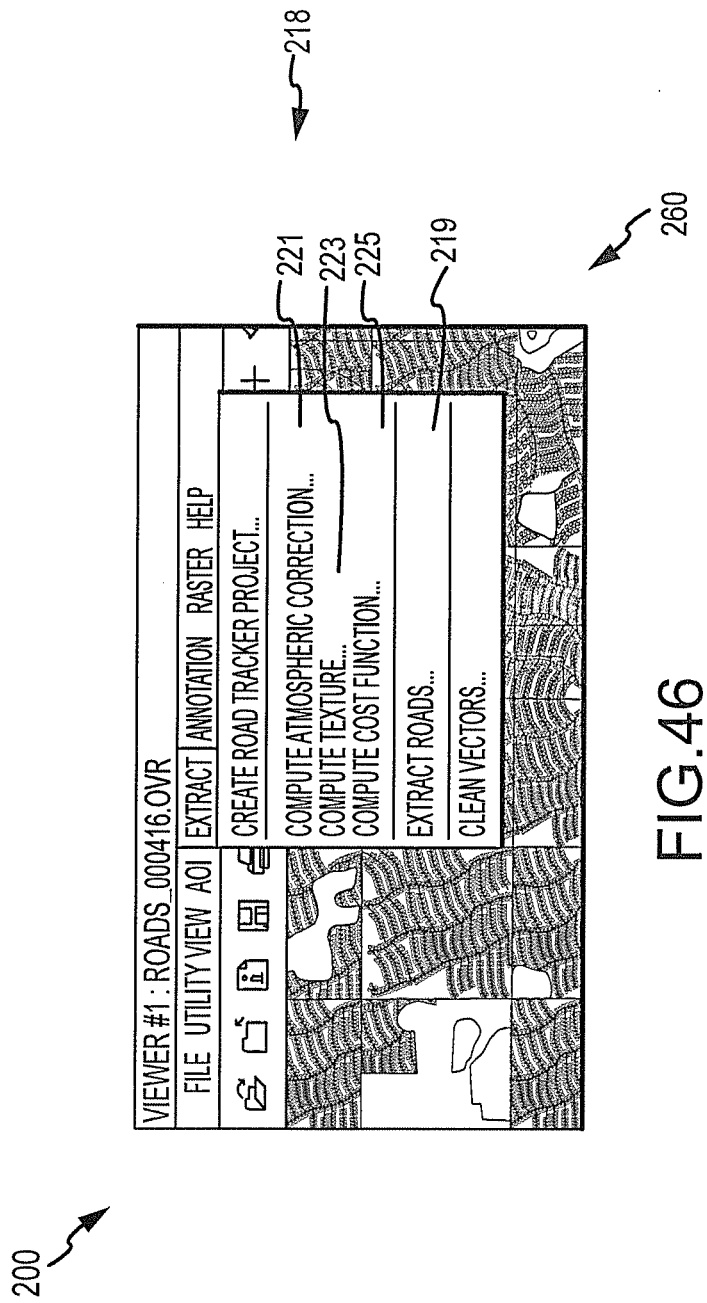
FIG. 46 shows selecting the extract roads feature.

As suggested by the drop-down menu in FIG. 46, the user may now perform, for example, the pre-processing 218 operation of "Compute 221 atmospheric correction" against the input multispectral image 14. Again, in relation to the drop-down menu in FIG. 46, if the selected input image had been panchromatic image 20, then user may have performed the pre-processing 218 operation of "Compute 223 texture", and if the selected input image had been radar image 141, then the user may have performed the pre-processing 218 operation of "Compute 225 cost function."

The images from which roads may be satisfactorily extracted by the present invention comprise characteristics described below. For example, multispectral image 14 may be produced by the IKONOS® satellite owned by GeoEye, Dulles, Va., or by the QuickBird satellite owned by DigitalGlobe®, Longmont, Colo. The multispectral image 14 produced by the IKONOS® satellite has a resolution of about 3.28 meters; the multispectral image 14 produced by the QuickBird satellite has a resolution of about 2.4 meters. Panchromatic image 20 may be from the IKONOS® satellite or the QuickBird satellite. Multispectral image 14 may be used alone or in conjunction with corresponding panchromatic image 20. In the case of the IKONOS® satellite, panchromatic image 20 has a resolution of about 0.82 meters. In the case of the QuickBird satellite, panchromatic image 20 has a resolution of about 0.60 meters. Radar image 141 has a spatial resolution of about 1.25 meters with an 8-bit dynamic range (which may comprise about 256 levels of brightness) and may be produced using X-band interferometric SAR from the aerial Star-3i sensor owned by Intermap, Denver, Colo. Hyperspectral image 15 is produced by NASA's AVIRIS (Airborne Visible InfraRed Imaging Spectrometer) in 224 contiguous spectral bands with wavelengths from 400 to 2500 nm. Other remotely-sensed images not specifically described herein may also be used.

Once pre-processing 218 operations on the selected input image have been performed and the input image is displayed in the GUI, the user may select 260 the "Extract Roads" feature 219, as shown in FIG. 46.

The method 200 may further comprise selecting 22 output vector file 24. See FIG. 45. As set forth above, output vector file 24 may comprise the vector set, material type 56 and geometry 46. When the output vector file is selected 22, it may be empty or may contain information related to previously extracted roads 40.

Depending on the image type of the selected 220 input image, a preferred embodiment of method 200 may comprise inputting 16 an additional auxiliary file, cost file 25 or texture file 18, or multiple auxiliary files. The term "auxiliary file" may encompass any supplemental raster file provided as input for the method 200 of road 40 extraction. Thus, texture file 18 and cost file 25 may be considered auxiliary files. The texture file 18 may be generated 223, or computed, as described above with respect to panchromatic image 20. Inputting 16 texture file 18 (generated from panchromatic image 20 that corresponds to multispectral image 14) is shown in FIG. 2. In the case of panchromatic image 20, the auxiliary file may also be texture file 18 generated 223 during preprocessing 218 step. In the case of radar image 141 or hyperspectral image 15, the auxiliary file may comprise cost file 25 computed 225 as a pre-processing step. Cost file 25 may comprise a radar imagery cost file, hyperspectral imagery cost file or any other cost file that may be associated with application of at least one least cost algorithm to the path 30 representing a linear feature. With respect to radar image 141, entering 27 cost file 25 after selecting 22 output vector file 24 is shown in FIG. 31.

Figure 47:
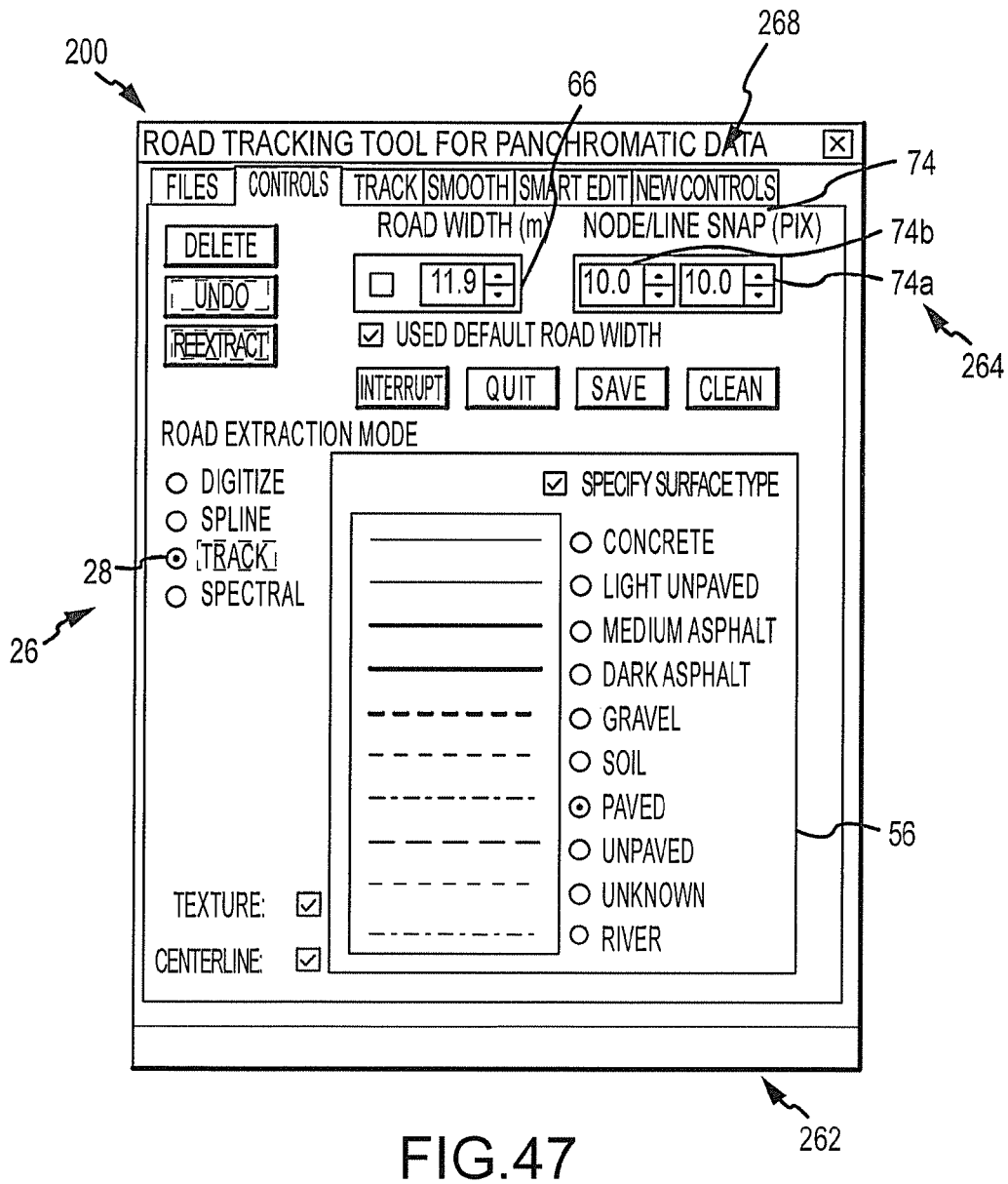
FIG. 47 shows establishing a snap distance and selecting the mode.

The method 200 may further comprise selecting an extraction mode, such as track mode 28 or spectral mode. Other modes, such as known modes for manual road extraction, may also be selected as part of method 200. Manual modes, such as spline mode and digitize mode, are explained above. Thus, method 200 may comprise selecting 26 track mode 28 as shown in FIG. 47. Track mode 28 comprises using image-based logic to automatically calculate the path 30 associated with user-selected 52 anchor points 32, 34, to create a near centerline for road 40. Use of track mode 28 in this manner with respect to multispectral image 14 and radar image 141 is explained above and is shown in FIGS. 6 and 33-34.

By way of example, track mode 28 image-based logic may comprise a least cost path algorithm incorporated in software, such as Djikstra's algorithm or any other least cost path algorithm known in the art, as explained above. The least cost path algorithm of method 200 may construct the least cost path 30 between user-selected 52 anchor points 32, 34. The cost factors used in the least cost path algorithm of the present invention have been previously described in some detail. Because many different image types may be the subject of method 200, the cost factors used in the method 200 may vary depending on the type of image selected. The path length factor and the adjacency to previously extracted roads factor may be used for all remotely-sensed images. The spectral road-likeness factor (computed from Tasseled Cap greenness) may be used for multispectral image 14. The spectral road likeness cost factor may be used for hyperspectral image 15. The textural road likeness factor (specified by the input 16 texture file 18) may be used for panchromatic image 20. Cost file 25 (comprising Laplacian of Gaussian and edge 39 proximity cost factors) may be used for radar image 141.

The spectral mode has been previously described. As explained above, the spectral mode may be well suited for extracting road 40 from panchromatic image 20 when that road 40 exhibits poor image texture (i.e., exhibits high texture within panchromatic image 20 or its texture file 18) as may occur with dirt roads, streets with overhanging vegetation, building shadows, vehicles on the road, and the like. Spectral mode may be well-suited to extracting road 40 from multispectral image 14 in conjunction with panchromatic image 20 when road 40 exhibits high texture in panchromatic image 20 or its texture file 18. Spectral mode may be used for extracting road 40 from remotely-sensed imagery of the type discussed herein where it is desired that all points along path 30 (associated with road 40) be spectrally similar to the user-selected 52 end anchor point 32, 34 of path 30.

The method 200 may further comprise activating 262 automatic vector revision functions embedded in software. These functions may comprise automatic topology cleaning (including automatic line and node snapping and automatic orthogonal crossroads), automatic corner point installation and automatic smoothing (which may include deep smoothing, as described below), all of which will be explained in more detail below. As previously explained above, topology cleaning removes gap 82, dangle, 84, as well as realizing the intended coincidence of path 30 terminals 29. The automatic vector revision functions of the present invention comprise functions based on geometric relationships between and within paths 30, 230. Activating 262 these automatic vector revision functions may occur at any point in the method 200. It may be preferred, although not required, for the user to activate 262 them early in the method 200 before actually beginning to select 52 anchor points 32, 34 in the remotely-sensed image. If the automatic vector revision functions are activated 262 before selecting 52 endpoints 32, 34, automatic point snapping, automatic topology cleaning, automatic corner point installation and automatic smoothing may occur in real time, on the fly, to revise the newly extracted path 230 (corresponding to the extraction of road 40), as well as previously extracted paths 30, 30a in the vicinity of path 30. In another embodiment, all of the automatic vector revision functions may be activated 262 by default, requiring the user to deactivate any of the functions that are not desired at a particular time for subsequent extraction.

Figures 48A, 48B:
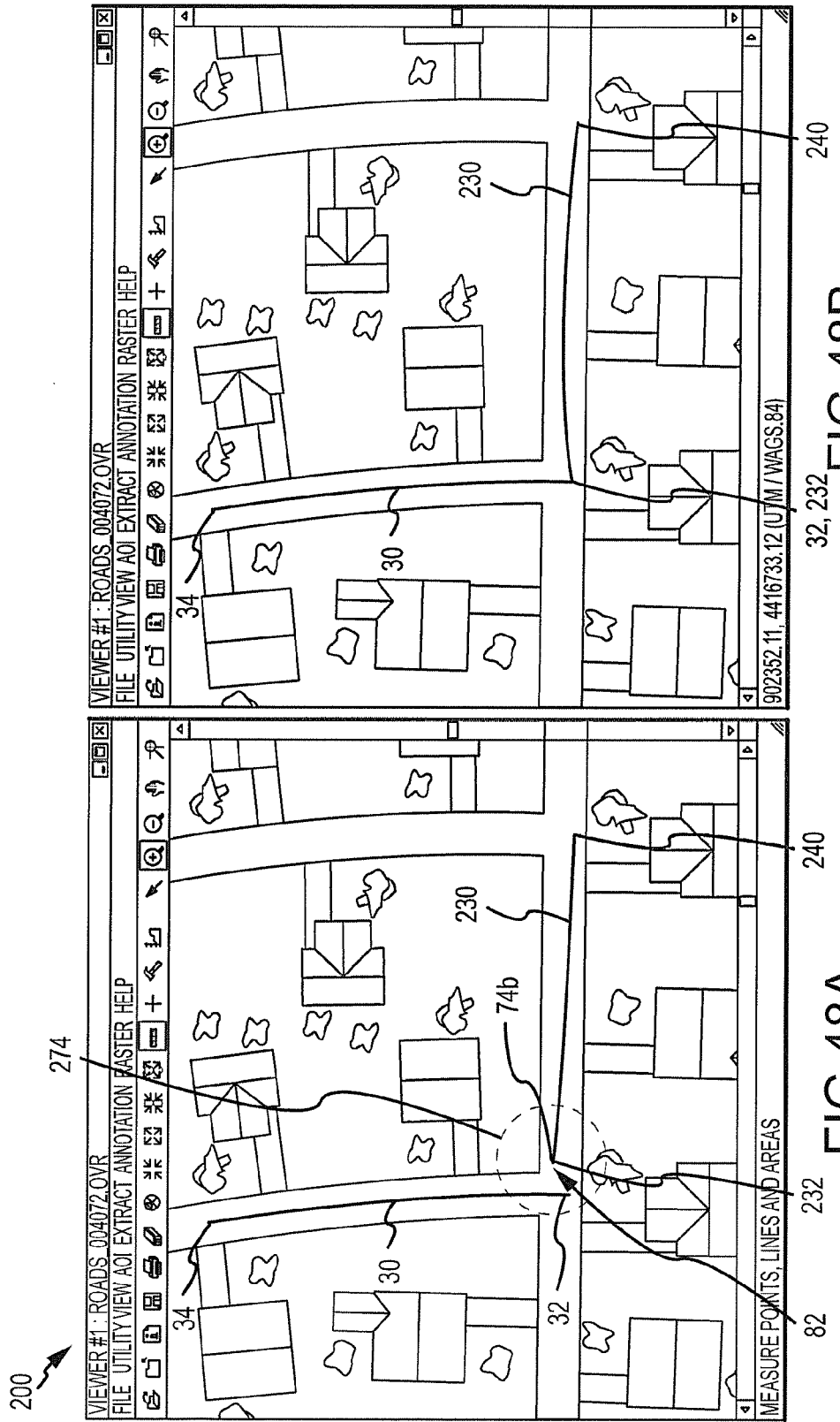
FIG. 48 shows anchor point snapping within a snap region.
Figures 49A, 49B:
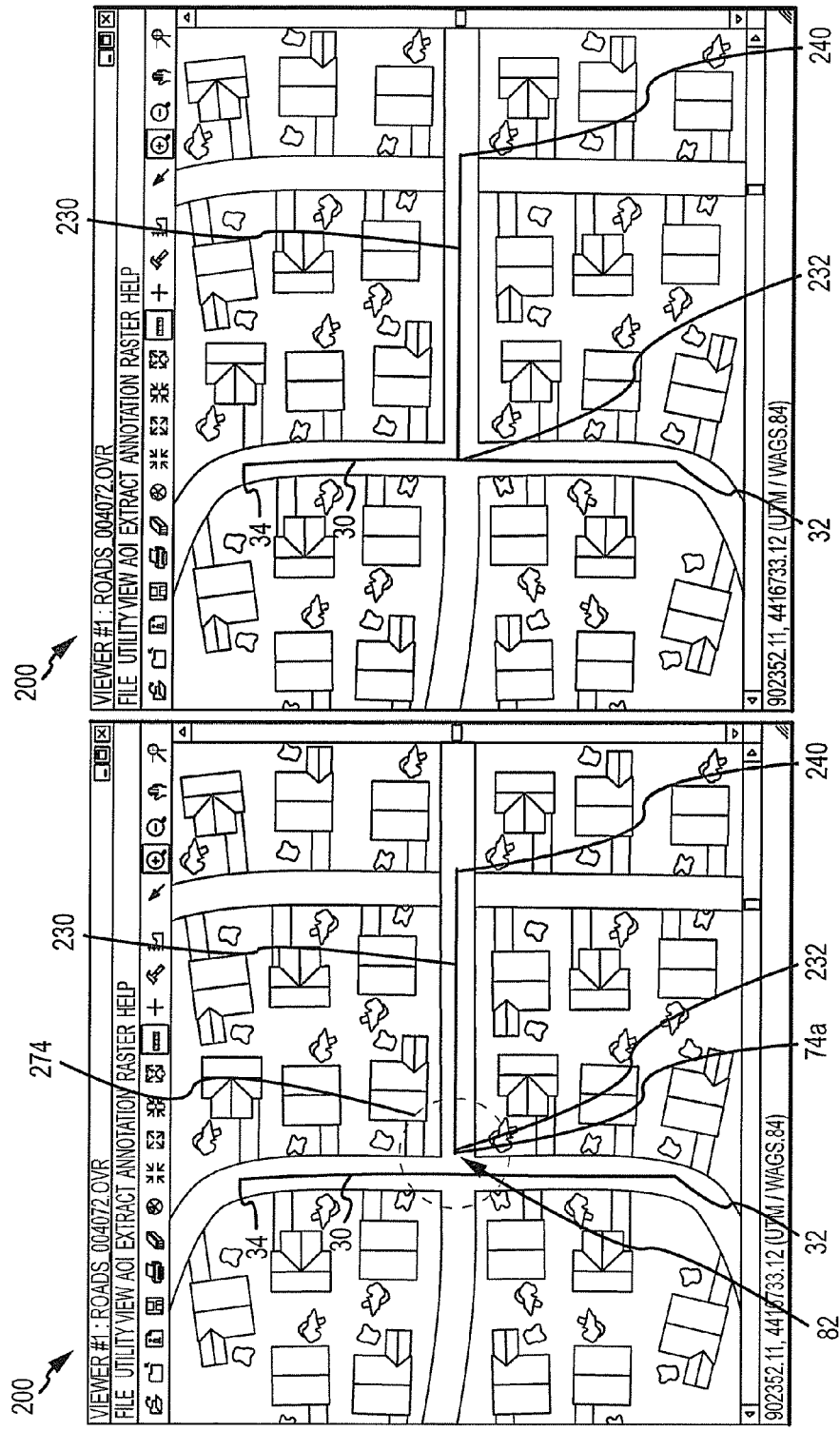
FIG. 49 shows another embodiment of anchor point snapping within the snap region.

Activating 262 the automatic vector revision functions may comprise establishing 264 the snap distance 74 as shown in FIG. 47. Snap distance 74 may comprise line snap distance 74a and node snap distance 74b. As shown in FIG. 48, node snap distance 74b may be a predetermined distance from the end anchor point 32 of an existing path 30, such that if the user specifies new end anchor point 232 for new path 230 that is about to be extracted, and that new end anchor point 232 is within node snap distance 74b of end anchor point 32 of existing path 30, then the new anchor point 232 will be automatically snapped to the end anchor point 32 of the existing path 30 by point snapping algorithm 268 prior to extraction of new path 230. As shown in FIG. 49, line snap distance 74a may be a predetermined distance from newly extracted path 230, such that existing path 30 which terminates within the line snap distance 74a of newly extracted path 230 is automatically revised (e.g., corrected) by the automatic topology cleaning function to terminate on the newly extracted path 230. Additionally, line snap distance 74a may be a predetermined distance from existing path 30, such that if the user specifies new end anchor point 232 for new path 230 that is about to be extracted, and that new end anchor point 232 is within line snap distance 74a of the existing path 30, then the new anchor point 232 will be automatically snapped to the existing path 30 by point snapping algorithm 268 prior to extraction of new path 230. See FIG. 49. In the case of method 200, snap distance 74 (which the user interface may designate in units of image pixels) corresponding to 10 meters, as shown in FIG. 47, may be preferred, as yielding desirable behavior associated with the road 40 extraction. The user interface may designate snap distance 74 in units other than image pixels, such as units of meters. While it may be preferred that the line snap distance 74a and the node snap distance 74b be set at the same distance, this is not required. Point snapping algorithm 268 may determine whether anchor points 32, 34 and/or intermediate point 38 are within the snap distance 74 of existing anchor point 32, 34 or of path 30.

Activating automatic topology cleaning as one of the automatic vector revision functions may automatically resolve gap 82, dangle 84, as well as snapping anchor point 32, 232 and path 30 to meet in intersection 42, for example. As shown in FIG. 48, if new anchor point 232 is less than node snap distance 74b of existing anchor point 32, point snapping algorithm 268 snaps the new anchor point 232 to existing anchor point 32. FIG. 48(a) shows the results of an extraction (based on mouse clicks at the displayed anchor points 32, 232) if automatic node snapping were deactivated. FIG. 48(b) shows the results of the extraction based on the same mouse clicks shown in FIG. 48(a) when automatic node snapping is activated—gap 82 is resolved. Had gap 82 been dangle 84 instead, that would have been resolved as well. FIG. 48(a) also shows snap region 274 displayed as a dotted-line disc, the center of which is anchor point 232 (in the same location as centerpoint 275, in this example) and the radius of which is node snap distance 74b. If two anchor points 32, 232 are within snap distance 74 of one another, that does not necessarily mean that one point lies within disc-shaped snap region 274 about the other where the radius of snap region 274 is node snap distance 74b; rather, it could mean that one anchor point 32 lies within snap region 274 of another shape (e.g., regular polygon) about the other point, where snap region 274 and its dimensions are determined by node snap distance 74b. In another embodiment, the path 30 associated with existing anchor point 32 may also be automatically revised, or adjusted, with the addition of new path 230 in FIG. 48.

Similarly, as shown in FIG. 49, if new anchor point 232 is less than line snap distance 74*a* of existing path 30, then point snapping algorithm 268 snaps new anchor point 232 to meet existing path 30. FIG. 49(*a*) shows the results of an extraction (based on mouse clicks at the displayed anchor point 232) if automatic line snapping were deactivated. FIG. 49(*b*) shows the results of the extraction based on the same mouse-clicks as shown in FIG. 48(*a*) when automatic line snapping is activated—gap 82 is resolved. Had gap 82 been dangle 84 instead, that would have been resolved as well. In FIG. 48(*a*), centerpoint 275 of snap region 274, whose radius is shown as node snap radius 74*b*, is coincident with anchor point 232; in FIG. 49(*b*) centerpoint 275 of snap region 274, whose radius is line snap radius 74*a*, is coincident with anchor point 232. However, this coincidence of locations is not required; snap region 274 may be centered about other locations as would naturally occur to one of ordinary skill in the art after becoming familiar with the teachings of the present invention.

Figure 50:
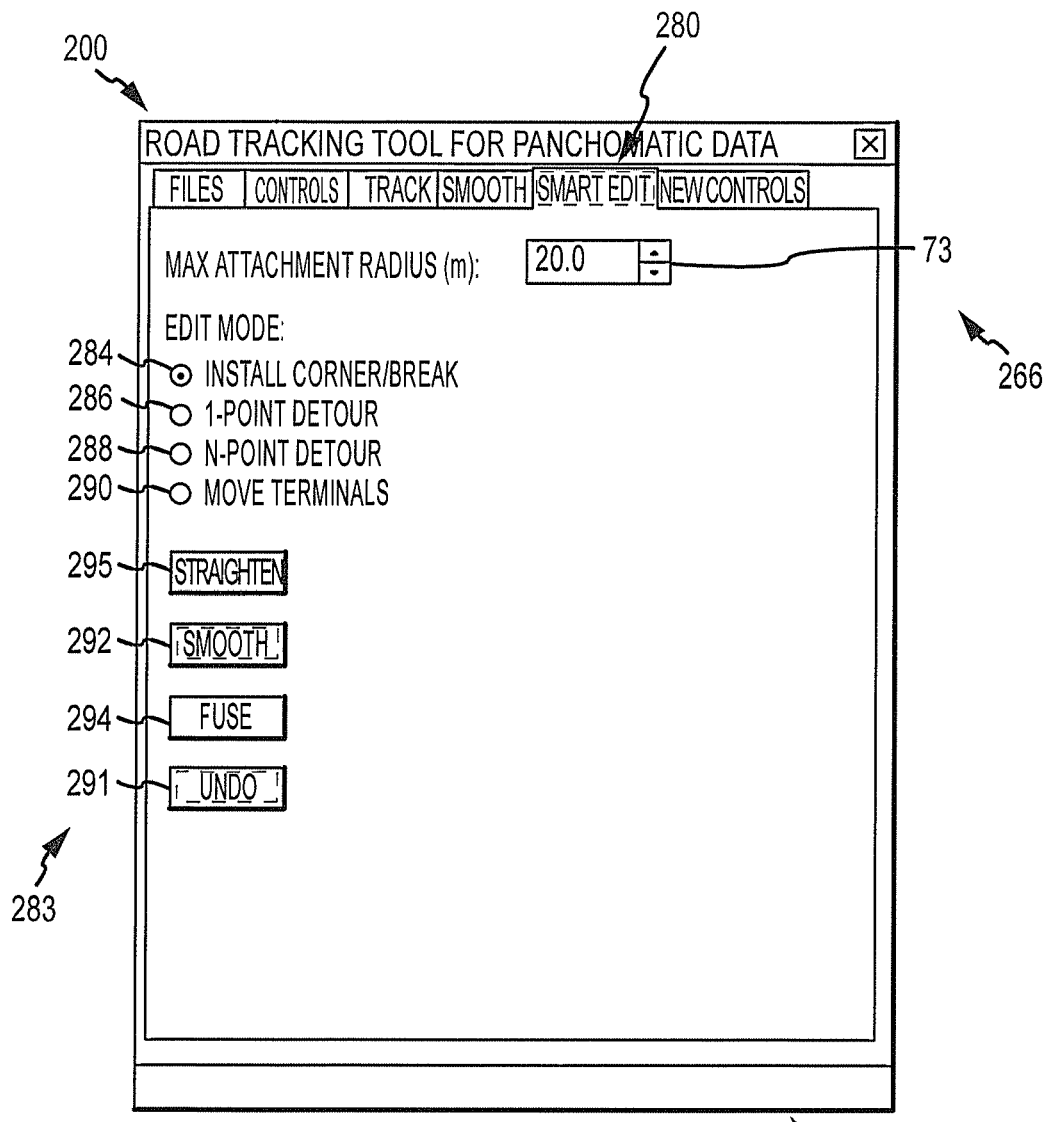
FIG. 50 shows establishing a maximum attachment radius and selecting a smart editing tool.
Figure 51:
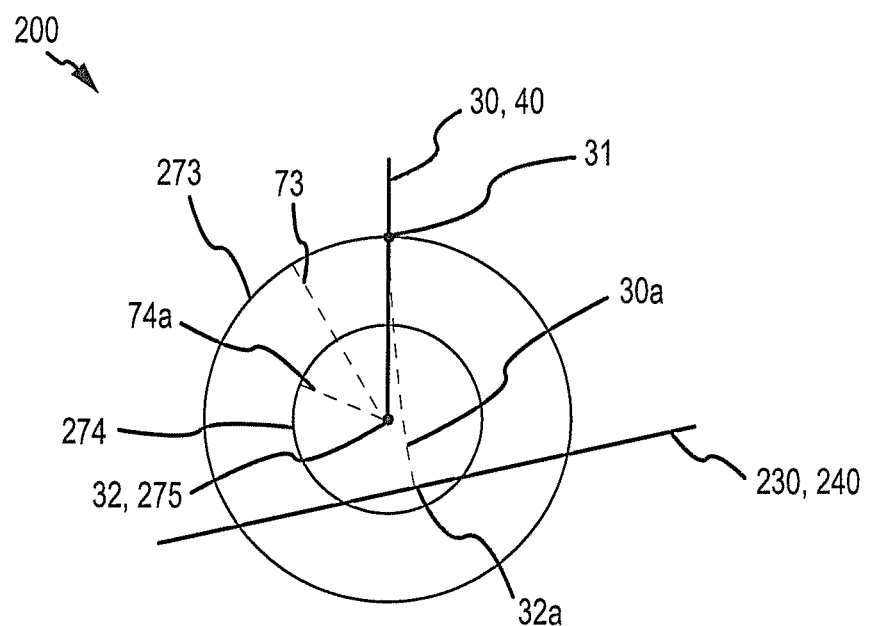
FIG. 51 shows revising the path using a region of influence and the snap region.

Activating automatic topology cleaning, one of the automatic vector revision functions, may also comprise establishing 266 maximum attachment radius 73 as shown in FIG. 50. The maximum attachment radius 73 comprises a distance (which may be designated in meters or another unit) that may define a region of influence 273 centered about centerpoint 275, which may coincide with the end anchor point 32 of existing path 30, as shown in FIG. 51. In a preferred embodiment, the region of influence 273 is a disc centered about centerpoint 275, whose radius is maximum attachment radius 73, as shown in FIG. 51. The region of influence 273 may be further described as the area within which a modification, or correction, to path 30 may be confined. FIG. 51 shows the addition of new path 230 close to existing path 30 defined in part by anchor point 32. Since anchor point 32 is within the line snap distance 74*a* of new path 230, automatic topology cleaning will cause the path 30 to be automatically rerouted to meet new path 230 at relocated anchor point 32*a*. If it is desired that the automatic rerouting of path 30 meet path 230 at roughly a 90° angle, the path 30 would be revised as path 30*a* in the manner shown in FIG. 51. Measures of distance other than meters may be used for the maximum attachment radius 73. Again, in the embodiment illustrated in FIG. 51, centerpoint 275 of the region of influence 273 may coincide with anchor point 32. However, this coincidence of locations is not required and may not occur in a different embodiment.

In FIGS. 48-49 and 51 both the snap region 274 and the region of influence 273 are visually indicated as dotted-line circles for illustrative purposes. In one embodiment of method 200, both the snap region 274 and region of influence 273 are mathematical constructs that may not explicitly appear to the user on a graphical display screen. Rather, the user may become familiar with the general confines of the snap region 274 and the region of influence 273 after experience gained through use of the method 200. In that embodiment, the snap distance 74 and the maximum attachment radius 73 may be modified by entering different distances in the GUI text fields shown in FIGS. 47 and 50.

Figure 52:
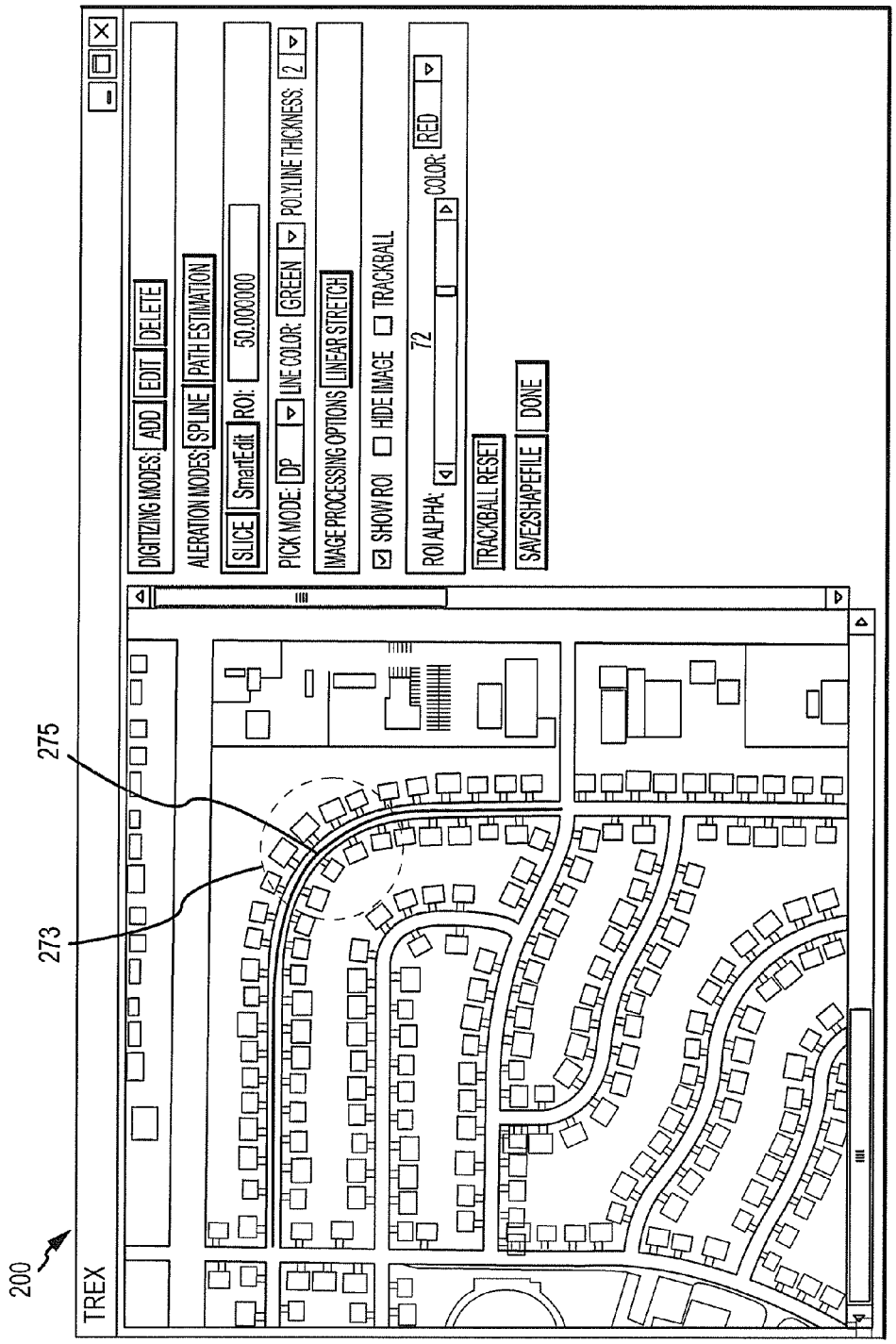
FIG. 52 shows a graphical representation of the region of influence.

In another embodiment of the method 200, the snap region 274 and/or region of influence 273 may be displayed graphically on the display screen. For example, FIG. 52 shows a graphical representation of region of influence 273 as a translucent colored disc, although other graphical representations, such as a hollow circle, are possible. In one embodiment, the region of influence 273 and/or snap region 274 may be graphically displayed as region(s) centered at a cursor location that is specified manually through a motion-sensitive device comprising switches and means to move the cursor on the display screen, such as a mouse, track ball, or touch pad.

In another embodiment, the respective associated maximum attachment radius 73 and/or the snap distance 74 may also be changed through the motion-sensitive device comprising switches and means to adjust the value of a numerical parameter, such as a mouse wheel, trackball, or touch pad, without having to manually enter maximum attachment radius 73 and/or the snap distance 74 in GUI text fields as shown in FIGS. 50 and 47. Another embodiment may include the ability to maintain continuous, real-time, updated graphical display of the region of influence 273 or snap region 274 in response to the user moving the region of influence's 273 centerpoint 275 continuously in real-time (e.g., by moving the cursor) over the display screen. Another embodiment may include the ability to maintain continuous, real-time, updated graphical display of an expanding or shrinking region of influence 273 (or snap region 274) whose size may be changing in response to the user continuously adjusting the maximum attachment radius 73 (or, the snap distance 74) via the motion-sensitive device (e.g., mouse wheel, track ball, touch pad). In yet another embodiment, the user may employ any features described in this paragraph when using the smart editing tools 281 described in more detail below.

Figure 53:
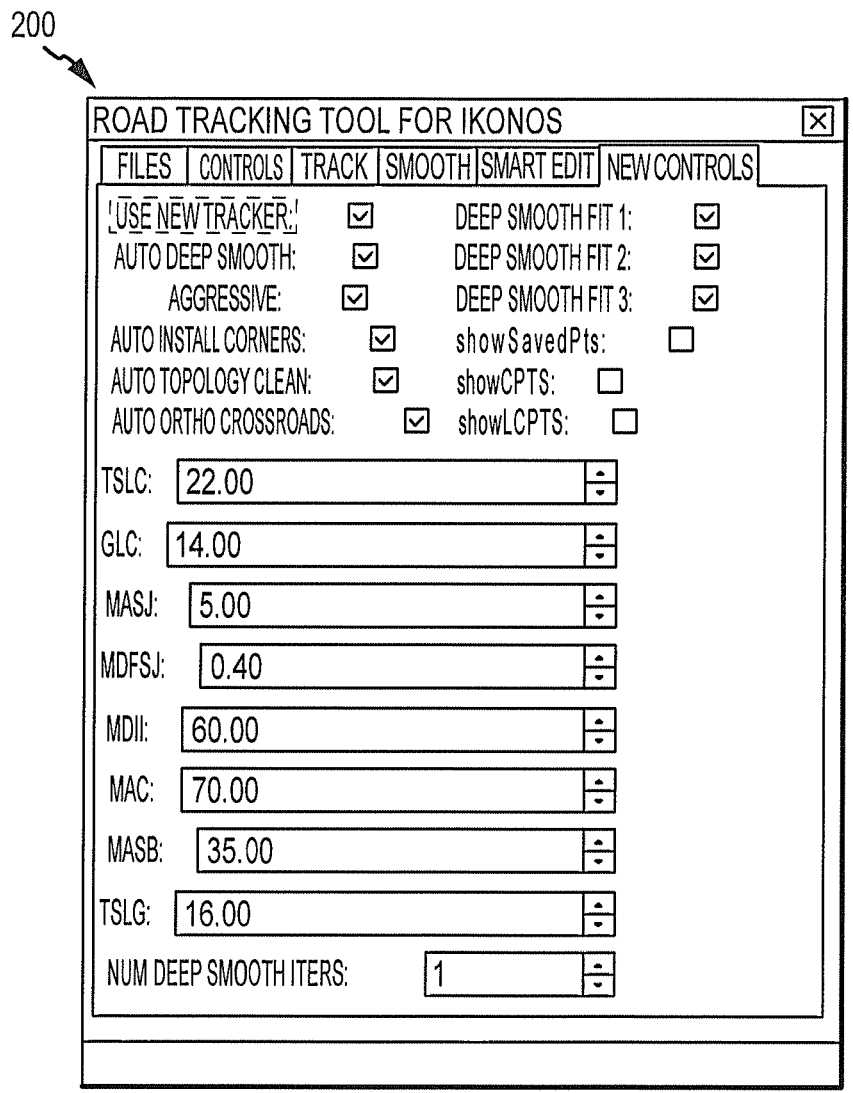
FIG. 53 shows an embodiment of enabling vector revision functions.

Activating 262 the automatic vector revision functions may further comprise selecting one or more functions, such as automatic topology cleaning (including automatic line and node snapping and automatic orthogonal cross-roads), automatic corner installation, and various smoothing functions, as shown on FIG. 53. In another embodiment, all automatic vector revision functions may be selected (e.g., activated 262) as a default, requiring the user in that case to deselect (i.e., deactivate) functionality that may not be desired for subsequent road 40 extraction. The user may activate 262 or deactivate some or all of the various automatic vector revision functions at any time.

Proceeding with the description of method 200, once the user has selected 26 track mode 28 (or any other extraction mode described herein), the user visually locates road 40 in the remotely-sensed image under consideration, for example, multispectral image 14. As described above and shown in FIG. 8, the user may select 52 anchor points 32, 34, associated with road 40, anchor points 32, 34 being tied to geographical location(s) in the raster data associated with multispectral image 14. In one embodiment, when track mode 28 (or any other extraction mode) is selected 26, the cursor shown in multispectral image 14 assumes a state (e.g., turns into a crosshair) indicating that the user may select 52 anchor points 32, 34. The user may then position the crosshair on the road 40 and single click with the mouse to establish anchor point 32. With each successive single click, additional anchor point 34 is established, with the software automatically connecting anchor points 32, 34 by a negative (e.g., reverse video) "rubber band" line. The user may choose multiple anchor points 32, 34 by single clicking at various locations on road 40. When the user desires to end the selecting 52, the user may double click on the last selected anchor point 34. The user may select 52 anchor points 32, 34 using the motion-sensitive device or any device that would be obvious to one of ordinary skill in the art.

In the same manner as described above with respect to methods 10, 100, anchor points 32, 34 may define ellipse 48 with the anchor points 32, 34 as its foci. See FIGS. 9, 36. Ellipse 48 comprises the search region such that intermediate point 38 generated for path 30 connecting anchor points 32, 34, as well as path 30, occur within the area defined by the ellipse 48.

According to method 200, once the user has selected 52 at least anchor points 32, 34, image-based logic embedded in software may be employed to automatically create path 30 connecting anchor points 32, 34, and display path 30 on the display screen. Path 30 may include intermediate points 38 automatically generated in such locations and in sufficient quantity to accurately reflect the character of road 40. Once the image-based logic has automatically created path 30, as another step in method 200, the image-based logic may also automatically attribute 54 material type 56 of road 40 to corresponding path 30, as explained above with reference to methods 10, 100. Material type 56 may be indicated by marking the path 30 associated with road 40 in a color keyed to the particular material type 56 attributed 54. The step of automatically attributing 54 material type 56 to the road 40 may be performed while using the track mode 28 or spectral mode, or other extraction mode.

Once the image-based logic embedded in the software has automatically created path 30, as another step in method 200, the image-based logic may also automatically attribute 45 geometry 46 associated with road 40 to the corresponding path 30, as explained above with reference to methods 10, 100. The software may automatically associate material type 56 and geometry 46 with the vector sets associated with path 30; material type 56 and geometry 46 may be stored as attributes of path 30 in output vector file 24.

Once path 30 has been automatically created, according to the method 200, the user may visually locate new road 240 in multispectral image 14, for example. As described above and shown in FIG. 51 the user may select 52 new anchor points 232, 234, associated with new road 240. Image-based logic embedded in software may be employed to automatically connect anchor points 232, 234 via new path 230 displayed to the display screen. Again, path 230 may include intermediate points 38 (not shown) automatically generated in such locations and in sufficient quantity to accurately reflect the character of road 240. Once new path 230 has been automatically created, as previously described, the image-based logic may also automatically attribute 54, 45 material type 56 and geometry 46 of the road 240 to path 230.

In a preferred embodiment, while new path 230 may have been calculated mathematically, it may not be "drawn" on the display screen until after the automatic vector revision functions have automatically evaluated the geometric relationships between path 30 and new path 230, and revised path 30 and/or new path 230 in accordance with application of one or more of the automatic vector revision functions.

In one embodiment, once the software has automatically revised the affected path 30 according to the automatic vector revision functions, as explained below, the length 66 of any path 30 affected by the insertion of new path 230 may be automatically reattributed 245 to the revised existing path 30. In other embodiments of the method 200, material type 56 or road width 66 may also be reattributed 245 to revised path 30. Thus, the method 200 may comprise automatically reattributing 245 the material type 56 and geometry 46 associated with road 40 to revised path 30.

After existing path 30 (affected by the insertion of new path 230) has been revised and had its geometry reattributed 245, the visual representation of new revised path 30 may appear along with that of new path 230 on the display screen. Once new path 230 appears on the display screen, the cursor returns to the state (e.g., cross-hairs) indicating that the user may resume selecting 52 new anchor points 232, 234.

The discussion of method 200 now turns to the manner in which the automatic vector revision functions operate and may be used. From the user's perspective, when activated 262 the software causes these automatic vector revision functions to be applied automatically, seamlessly, on-the-fly and in real time. What is displayed to the display screen may be the final result of the software having applied the activated automatic vector revision function to paths 30, 230 without displaying intermediate results to the screen.

Method 200 may further comprise using the automatic topology cleaning function to automatically clean the topology of paths 30, 230 based on the geometric relationship between paths 30, 230. Automatically cleaning the topology of the paths 30, 230 may comprise using 267 an automatic point snapping tool, or point snapping algorithm 268 embedded in software, to automatically fix topological errors, such as gap 82 and dangle 84.

As explained above, FIGS. 48-49 illustrate using 267 point snapping algorithm 268 to automatically resolve topological errors (e.g., gap 82).

Figure 54C:
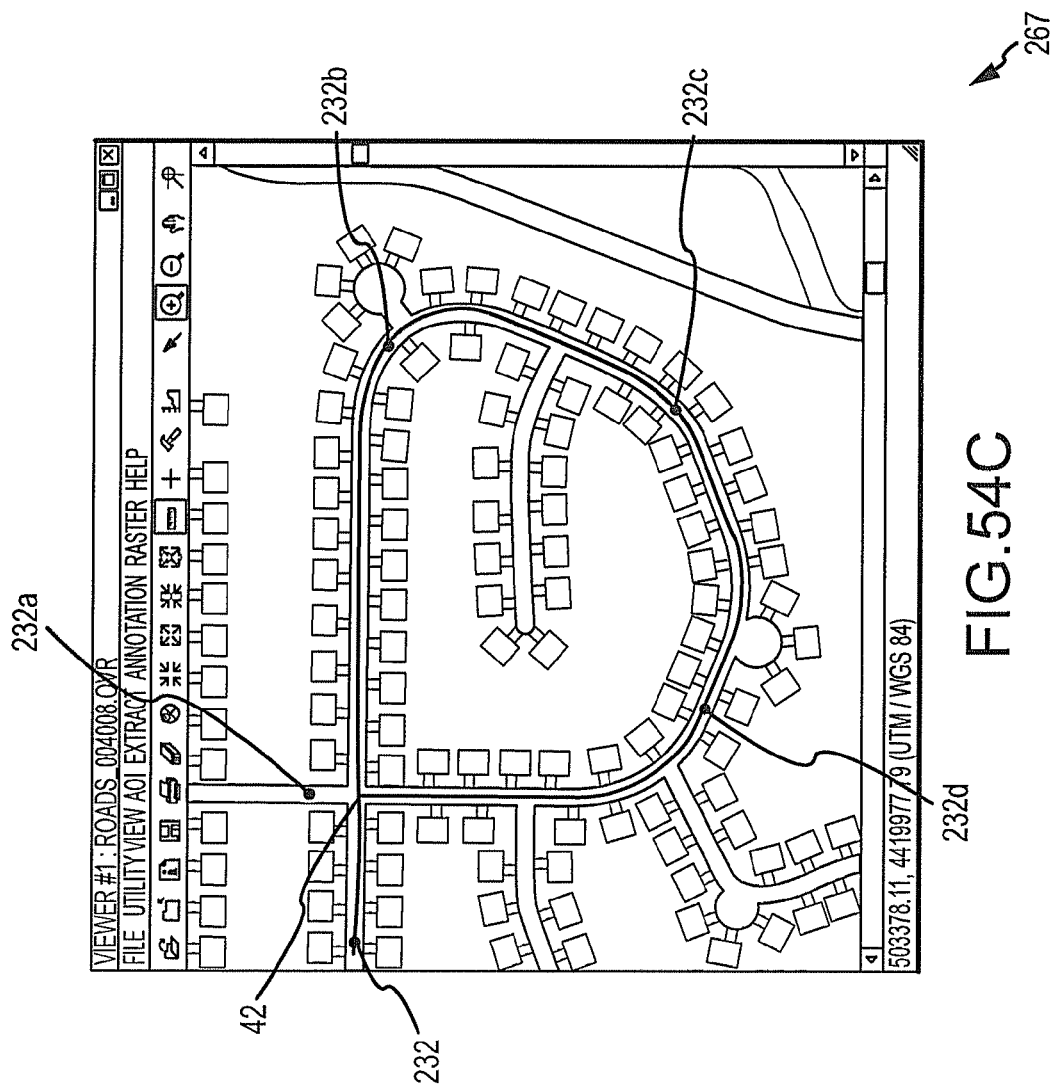
FIG. 54 shows embodiments of establishing orthogonal crossroads.

FIG. 54 illustrates functionality associated with using 267 point snapping algorithm 268 and automatic topology cleaning. FIG. 54(a) shows the results of a multi-point extraction (indicated in this case by a sequence of three user-selected anchor points 232, 232a, 234 (e.g., mouse-clicks left to right)) when this functionality is not activated. Dangle 84 is left on existing path 30, and anchor point 232a (associated with the middle mouse click) is not coincident to path 30. Thus, three paths 30, 230, 230a meet in the vicinity of the intersection 42 but are not coincident there. FIG. 54(b) shows the results of the same multi-point extraction using the same user-selected 52 anchor points 232, 232a, 234 (e.g., mouse clicks), but now with point snapping algorithm 268 and automatic topology cleaning activated. In one embodiment of the invention, the following sequence of processing steps occur: (1) path 230 is automatically constructed through the three anchor points 232, 232a, 234 corresponding to the mouse clicks; (2) if path 30 exhibits gap 82 or dangle 84 in relation to path 230 (e.g., anchor point 32 is within line snap distance 74a of path 230) then anchor point 32 of path 30 is automatically relocated to anchor point 232a on path 230 and path 30 is automatically rerouted to the new anchor point 232a; (3) if anchor point 232a (corresponding to the middle mouse-click on path 230) is within node snap distance 74b of intersection 42 then anchor point 232a (corresponding to the middle mouse-click on path 230) is snapped to coincide with point 232b at intersection 42. The result is that the intersection 42 is resolved cleanly - - - all paths 30, 230, 230b that terminate in the vicinity of the intersection 42 terminate at a common anchor point 232b. FIG. 54(c) shows additional capability associated with activation of point snapping algorithm 268 and automatic topology cleaning. Here a multi-point extraction is shown, consisting in this case of five user-selected 52 anchor points (e.g., mouse-clicks). The last mouse click in the sequence (e.g., anchor point 232a) is automatically detected to be within line snap distance 74a of an initially extracted path 230 passing through all the anchor points 232, 232b, 232c, 232d. In this case, anchor point 232a (associated with the last mouse-click) is snapped to the self-intersection 42 point of path 230. Other embodiments may exhibit other automatic behaviors that are similar to those described in this paragraph as would naturally occur to one familiar in the art.

Automatically cleaning the topology of existing paths 30, 30a, 30b in relation to new path 230 may comprise revising paths 30, 30a, 30b so that they not only terminate on new path 230, but also meet new path 230 to form 90-degree "T" intersections 42, for example, as shown in FIG. 55. Therefore, using the automatic orthogonal crossroads function may comprise using 277 orthogonal crossroads algorithm 276, described below. Using 277 orthogonal crossroads algorithm 276, together with automatic topology cleaning, establishes revised paths 30, 30a, 30b as paths 30, 30a, 30b that terminate on path 230 while maintaining locally orthogonal relationships with new path 230. See also FIG. 51 (also showing establishing orthogonal crossroads).

In method 200, the orthogonal crossroads algorithm 276 may automatically proceed through the following basic steps. See FIG. 51. (1) Find the point where the boundary of the region of influence 273 centered about anchor point 32 of path 30 cuts the interior of path 30 (here, point 31); (2) find point 32a (to become the new location of anchor point 32) on the new path 230 that is closest to point 31; (3) replace the portion of path 30 that goes from point 31 to anchor point 32 with a cubic spline from point 31 to relocated anchor point 32a where the spline preserves the tangent direction of path 30 at point 31, and assumes a tangent direction orthogonal to path 230 at anchor point 32a. Using 277 orthogonal crossroads algorithm 276 results in revising path 30 so that it terminates orthogonally on new path 230.

Figures 56A, 56B:
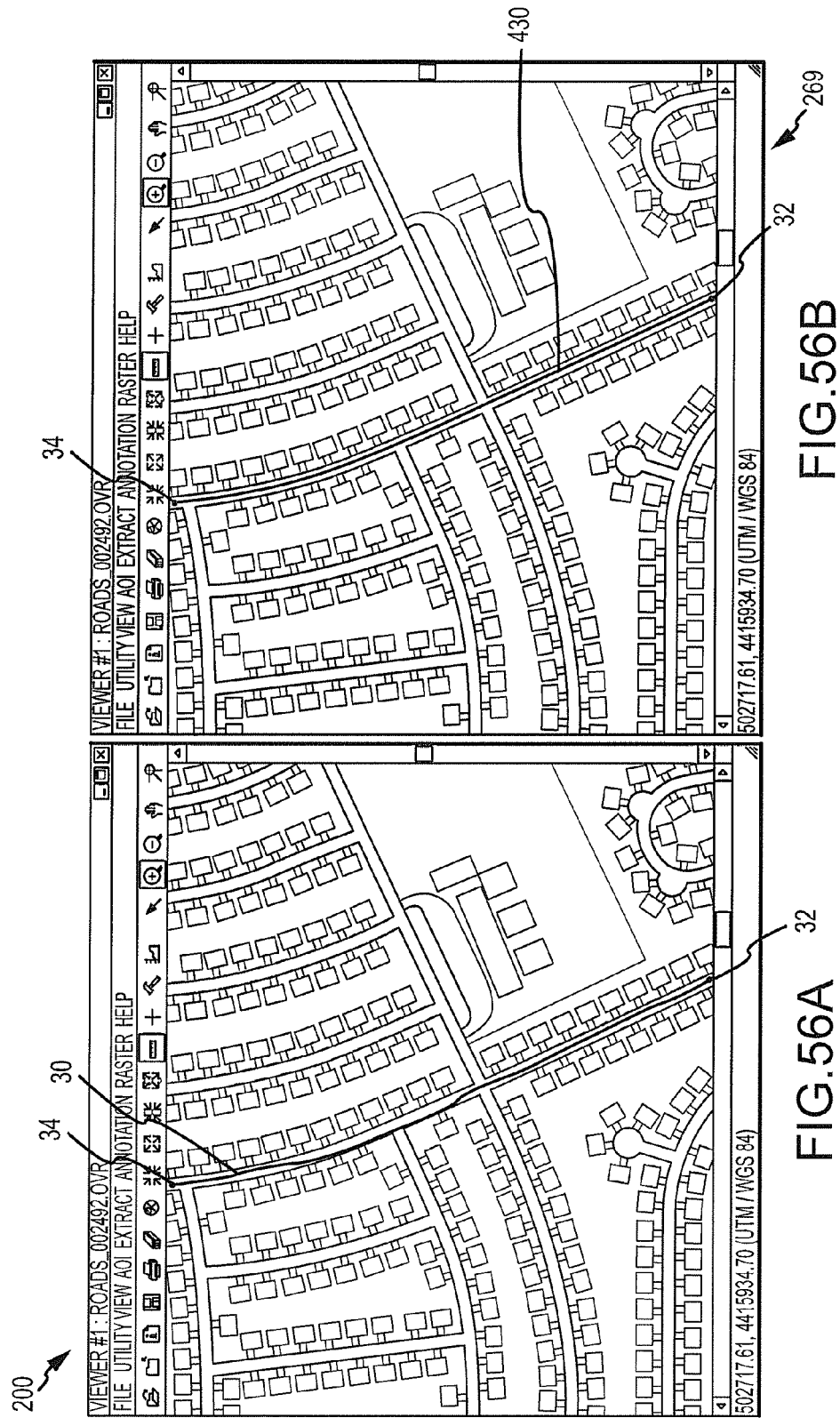
FIG. 56 shows automatically smoothing the path.

The automatic vector revision functions of method 200 may comprise an automatic deep smoothing function, or tool, that may automatically apply at least one extra layer of smoothing to newly extracted path 30 (before display to the display screen) in addition to smoothing supplied as part of method 100. An objective of the automatic deep smoothing tool is to substantially smooth out certain undesirable artifacts in path 30 that may have been introduced in earlier phases of the extraction process, such as (1) small-wavelength wiggles in the path 30 that may not reflect a "true" (visual) centerline of road 40, and (2) small-amplitude wiggles in near-linear portions of path 30. For example, without automatic deep smoothing being activated prior to extraction, the path 30 displayed to the screen between anchor points 32, 34 may exhibit small-wavelength wiggles, or small-amplitude wiggles in near-linear portions, as shown in FIGS. 56(a) and (c). However, with automatic deep smoothing activated prior to extraction, path 430 displayed to the screen between anchor points 32, 34 is shown in FIGS. 56(b) and (d) and appears considerably smoother than that shown in FIGS. 56(a) and (c). Method 200 may comprise automatically deep smoothing path 30 based on the geometric relationships within an earlier realization of path 30 during extraction. Automatically deep smoothing path 30 may comprise using 269 deep smoothing algorithm 270, which may be automatically applied, for example, to the least cost path 30, after the path 30 has been automatically quadratically-smoothed via quad window parameter 78 in accordance with smoothing algorithm 70, resulting in quadratically-smoothed path 30. Deep smoothing algorithm 270 may then proceed through the following steps automatically: (1) Compute a curvature profile for the quadratically-smoothed path, using a sliding nunchuka-like template comprising two fixed length "handles" with a flexible fixed-length "chain" in between. The fixed-length "handles" may represent the least squares line fit to the quadratically-smoothed path, while the flexible fixed-length "chain" may represent a fixed-length arc of the quadratically-smoothed path between the "handles." (2) Compute critical points (e.g., local curvature inflections, maxima, minima) of the curvature profile. (3) Remove sub-paths of the quadratically-smoothed path that lie between nearby inflection points (while preserving the inflection points themselves), except do not remove sub-paths that correspond to true bends in road 40. Deep smoothing algorithm 270 automatically determines true road bends as follows: If P represents the quadratically-smoothed path and S represents one sub-path of quadratically-smoothed path P between two nearby inflection points of P, the perform least squares line fit to each of the two components of P-S. If the two line fits subtend a sufficiently small angle between them, sub-path S is deemed a true road bend, in which case, S is not removed from the quadratically-smoothed path P. (4) Use cubic spline(s) (with appropriately defined tangents) to interpolate through removed portions of quadratically-smoothed path, resulting in a first revised path, Q. The inserted splines remove small wavelength wiggles in the quadratically-smoothed path, P, by taking a more direct route through the inflection points of quadratically-smoothed path P. (5) Compute the curvature profile for the first revised path, Q. Decompose the first revised path Q into a plurality of sub-paths and classify each sub-path by curvature (high, medium or low). Fit each segment with an active contour, or "snake," whose bend parameter is specially tuned to that sub-path's curvature class. Concatenate the snakes resulting in a second revised path, R. (6) Perform long least squares line fits to maximal sub-paths of second revised path R, as would be familiar to one of ordinary skill in the art, thereby removing small-amplitude wiggles from near-linear portions of the second revised path R, resulting in a third revised path, W. (7) Fit the third revised path W with the snake of low bend parameter (high flexibility), thus achieving an additional degree of smoothing and resulting in deep smoothed path 430.

FIG. 56 shows the result of the automatic deep smoothing function, using 269 deep smoothing algorithm 270. FIGS. 56(a) and (c) show how the path 30 actually appears after using 267 smoothing algorithm 70, but prior to using 269 deep smoothing algorithm 270. FIGS. 56(b) and (d) show how the deep smoothing algorithm 270 revises path 30, resulting in deep smoothed path 430. In one embodiment of method 200, if automatic deep smoothing is activated 262 by the user prior to extraction of path 30, the user never sees the visual representation of path 30 prior to deep smoothing. Rather, in that case, the user only sees the end result—deep smoothed path 430.

The automatic vector revision functions of method 200 may comprise an automatic corner installation 278 function. The automatic corner installation 278 function may revise path 30 by automatically introducing corner points 61 in path 30. In one embodiment, the number and location of corner points 61 depends on the geometric relationships between or within paths 30, 230. When activated, using 279 the automatic corner installation 278 function may result in the automatic installation of corner point 61 in new path 230 that is displayed on the display screen (see FIGS. 57, 58 and 59). In one embodiment, such as is shown in FIG. 59, the automatic corner installation 278 function may partition new path 230 at corner point(s) 61, resulting in a plurality of tandem paths 230a, 230b along path 230. The geometry 46 and material type 56 are attributed 45, 54 automatically to paths 230a, 230b. The automatic corner installation 278 function may comprise point snapping functions, as explained herein.

FIG. 57(a) shows the visual representation of a multi-point extraction (in this case, three user-selected 52 anchor points 32, 32a, 34) when automatic corner installation 278 is previously deactivated by the user. Of interest in this example is the user's mouse-click placement of anchor point 32a near what should be a corner in the resulting path 30 at intersection 42. FIG. 57(b) shows the visual representation resulting from the same set of user mouse clicks when using 279 automatic corner installation 278 function, previously activated 262 by the user. Corner point 61 is automatically installed in resulting path 230 at intersection 42. In addition, anchor point 32a, because of its proximity to auto-installed corner point 61, was automatically relocated by the automatic corner point installation 278 function to coincide with corner point 61. Additionally, the automatic corner installation 278 function may partition path 230 at auto-installed corner point 61, resulting in two tandem paths 230a, 230b that are each automatically attributed 45, 54 their respective geometries 46 and material type 56. Automatic corner installation 278 would operate in similar fashion in a multi-point extraction that involved multiple corners, instead of one corner as shown in FIG. 57.

Figure 58:
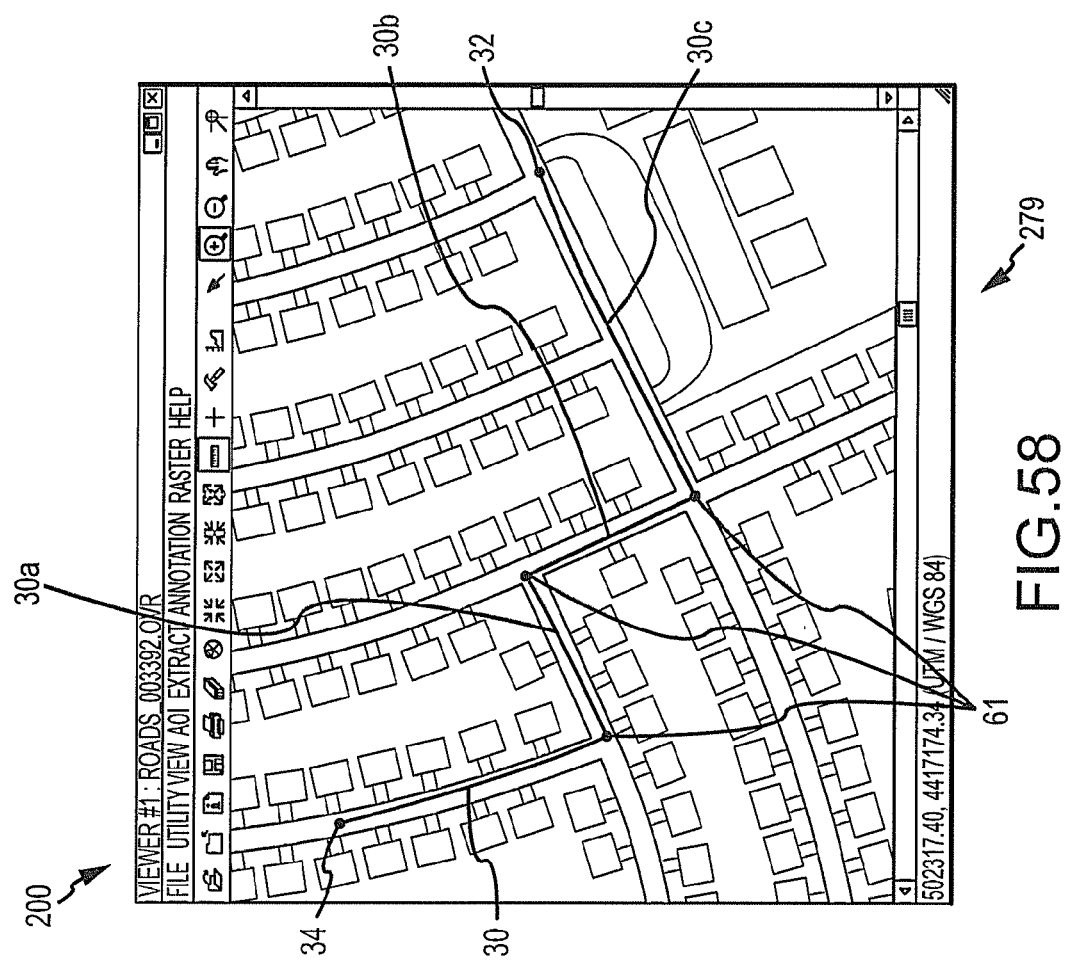
FIG. 58 shows another embodiment of using automatic corner installation.

FIG. 58 illustrates using 279 automatic corner installation 278 to automatically install three corner points 61, based on two user-identified anchor points 32, 34. In addition, automatic corner installation 278 may automatically partition the path 30 at the automatically installed corner points 61, resulting in a plurality of tandem paths 30, 30a, 30b, 30c that are each automatically attributed 45, 54 their respective geometries 46 and material type 56.

FIG. 59 shows that using 279 automatic corner installation 278 may cause each installed corner point 61a on new path 230 to be snapped to nearby existing corner point 61 or existing terminal 29, should such corner point 61 be in the vicinity as measured with respect to node snap distance 74b. FIG. 59 illustrates this snapping for one newly installed corner point 61a and one existing corner point 61.

The method 200 may further comprise using 281 semi-automated, vector-based, real-time smart editing tools 280 embedded in software, in conjunction with interactive user review, to revise paths 30, 230. As such, the smart editing tools 280 revise, or "correct," paths 30, 230 and their associated anchor points 32, 34 by exploiting geometric relationships between and/or within paths 30, 230. Therefore, implementation of the smart editing tools 280 may include aspects of the various algorithms set forth above, separately or in combination. Because the smart editing tools 280 are vector-based, they may be applied to any path 30, 230 (e.g., vector set) associated with a graphical image or raster image, where path 30, 230 may or may not be associated with road 40, 240. In an embodiment of the method 200 acting on such raster imagery, the definition of "linear feature" may be expanded to include any feature captured in raster imagery such that the pixels of the feature lie within a neighborhood distance of a polygonal line, where the neighborhood distance is small by comparison to the total length of the polygonal line. Unlike existing low-level vector based GIS editing tools of the prior art, the smart editing tools 280 of the present invention do not require the user to relocate individual vectors one at a time. Thus, using 281 smart editing tools 280 may comprise applying one or two mouse-clicks to accomplish the same editing function that would have required many individual edit operations under prior art GIS methods.

In method 200, the behavior of the smart editing tools 280 may be influenced by the snap distance 74 (comprising line snap distance 74a and node snap distance 74b) and the maximum attachment radius 73. Therefore, using 281 smart editing tools 280 may comprise establishing 264, 266 snap distance 74 and maximum attachment radius 73.

The smart editing tools 280 of the present invention may also be used in conjunction with the automatic vector revision tools described above, provided the user has activated 262 the automatic vector revision tools.

In an embodiment, when at least one path 30 already exists, the user may identify 285 an error 287 in paths 30, 230, associated with extracted road 40, 240. Error 287 may comprise missed corner point 61, missed near centerline, misplaced junction (e.g., anchor point 32, 34) incident to a plurality of paths 30, 230, undesirable small-wavelength wiggles or small-amplitude wiggles in path 30, 230, and inaccurate relationships between paths 30, 230 associated with tandem roads 40, 240. In another embodiment, the user may use the graphically displayed region of influence 273 and associated motion-sensitive device (e.g., mouse, mouse wheel, track ball) (explained above) to assist with editing paths 30, 230. In yet another embodiment, the user may use the motion-sensitive device (e.g., mouse) to drag the center of the region of influence 273 (causing the whole region of influence 273 to follow continuously) to a desired location, or use the motion-sensitive device (e.g., mouse wheel) to continuously vary the maximum attachment radius 73 or dimensions of the region of influence 273 (as explained above), to highlight a region within which a given editorial modification to at least one path 30 may be confined.

Having identified 285 the error 287, the user may select 283 the smart editing tool 280 appropriate to correct the error 287. Thus, using 281 smart editing tools 280 may comprise selecting 283 at least one smart editing tool 280, as shown in FIG. 50. Smart editing tools 280 of the present invention may comprise a corner/break installation 284 tool, a 1-point detour 286 tool, an N-point detour 288 tool, a move terminals 290 tool, a smooth 292 tool, a fuse 294 tool and a straighten 295 tool. In one embodiment of the method 200 only one smart editing tool 280 may be selected 283 at a time. However, in other embodiments combinations of specific smart editing tools 280 or even all the smart editing tools 280 may be selected 283. In still other embodiments, the individual smart editing tools 280 may comprise various functional options, enabling the user to select 283 a desired subset from among the functional options for at least one of the smart editing tools 280.

In an embodiment where (1) the automatic corner installation 278 function was not selected or was deactivated, or (2) the automatic corner installation 278 function was activated but nevertheless failed to install corner point 61, as desired, then, as shown in FIG. 60(a), the automatically-extracted path 30 skirts intersection 42 and fails to install corner point 61 at that location. Visually identifying 285 this error 287, the user may select 283 corner/break installation 284 tool as the desired smart editing tool 280 to effect an edit operation. The user may then click in the intersection 42 to place anchor point 232 there. The corner/break installation 284 tool automatically reroutes the path 30 through anchor point 232, modifying path 30 within the region of influence 273 centered about anchor point 232 to generate new path 230, as shown in FIG. 60(b). In one embodiment, the corner/break installation 284 tool may also automatically partition new path 230 at anchor point 232, thereby dividing new path 230 into tandem paths 230, 230a, 230b, which are automatically and separately attributed 45, 54. The paths 230, 230a, 230b may be automatically attributed 45, 54 the same material type 56 and width 66 as original path 30. In another example, shown in FIG. 61, if the user-selected 52 anchor point 232 lies within node snap distance 74b of road terminal 29 or existing corner, then the installed corner point 61 may be snapped to the existing road terminal 29 or existing corner.

Where the automatically generated path 30 may be deemed by the user to be unacceptably far from the true centerline of the road 40, the user may select 283 the 1-point detour 286 tool as the desired smart editing tool 280 to effect the edit operation. FIGS. 62 and 63 illustrate operation of the 1-point detour 286 tool. As shown in FIG. 62, the user may mouse-click in the general vicinity of path 30, preferably on the centerline of road 40, to place anchor point 232 at that location. The 1-point detour 286 tool automatically reroutes the path 30 through anchor point 232, modifying path 30 within the confines of the region of influence 273 centered about the new anchor point 232. In a preferred embodiment, the region of influence 273 is a disc whose radius is the maximum attachment radius 73. The 1-point detour 286 tool then generates smooth new path 230, as shown in FIG. 62. New path 230 preserves the original locations of the end anchor points 32, 34 of the path 30. New path 230 now smoothly approximates the centerline of road 40. The length 64 of path 230 may be automatically reattributed 245. In another embodiment, the width 66 of path 230 may also be reattributed 245. In a preferred embodiment, where the path 30 is very curvy, the maximum attachment radius 73 may be beneficially established 266 as 15 m prior to the 1-point detour smart edit operation; where the path 30 is not very curvy, the maximum attachment radius 73 may be beneficially established 266 as 30 m prior to the 1-point detour smart edit operation. As shown in FIG. 63, if the user locates anchor point 232 in the vicinity of two tandem paths 30, 30a such that the region of influence 273 centered about anchor point 232 overlaps both paths 30, 30a, then the 1-point detour 286 tool automatically reroutes the two paths 30, 30a as if they were fused together as one, to create new path 230. New path 230 may then be automatically partitioned at a point along its trajectory that has a natural relationship to the original point where tandem paths 30, 30a met each other. This results in two revised tandem paths 30, 30a that may be reattributed 245 automatically and separately.

Figures 64C, 64D:
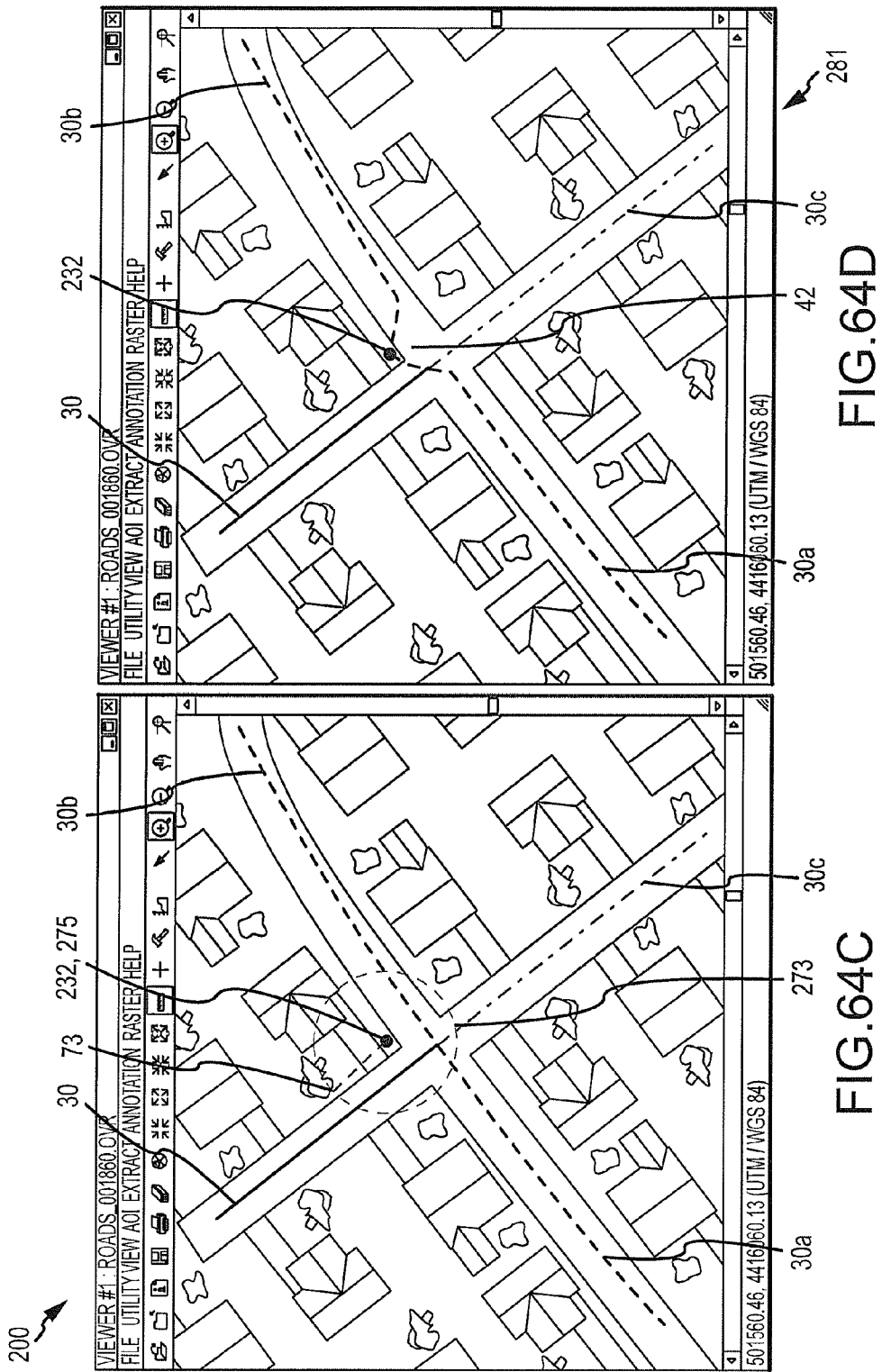
FIG. 64 shows yet another embodiment of using 1-point detour tool.

If at intersection 42 (e.g., a "T" intersection or "+" intersection, such as shown in FIG. 64) two or more paths 30, 30a are incident to one another, and the user places an anchor point 232 such that the region of influence 273 centered at the anchor point 232 overlaps two or more of these paths 30, 30a, 30b, then there could be potential confusion as to which path 30, 30a is to be primarily affected by the 1-point detour 286 tool. This may result in 1-point detour 286 not being applied to the desired path, or at least not in the desired way. In an embodiment, the issue may be resolved as follows. First, the user selects the desired path 30a or desired pair of tandem paths 30a, 30b to be primarily affected, the selected paths 30a, 30b being involved in the intersection 42. The user then applies the 1-point detour 286 tool, which automatically knows to apply itself to the selected paths 30a, 30b.

Further, if paths 30, 30a meet in tandem, then even if paths 30, 30a are not selected by the user, the combined path 30, 30a may be edited seamlessly via one or more applications of 1-point detour 286 tool, under the assumption that other paths 230 are not in the vicinity to cause confusion as to which path 30, 30a, 230 the 1-point detour 286 tool is to be applied. In another embodiment, if paths 30, 30b are not selected by the user and meet smoothly in tandem (not creating a sharp angle between them) at intersection 42 that involves other paths 230, the combined path 30, 30a may still be edited seamlessly through the intersection 42 via consecutive use of the 1-point detour 286 tool, as long as the region of influence 273 associated with the first 1-point detour 286 tool in the sequence overlaps path 30 and no other path 30a, thereby establishing path 30 as the first path in the sequence to be edited by 1-point detour 286 tool. The embodiment may be easily performed because, as successive mouse-clicks associated with successive applications of 1-point detour 286 tool transition from the vicinity of path 30 to the vicinity of path 30a, the software automatically remembers that path 30 was the previous path 30 to which 1-point detour 286 function was applied, and the software automatically recognizes that path 30a is the unique path at intersection 42 that is smoothly tandem to path 30.

Figures 67A, 67B:
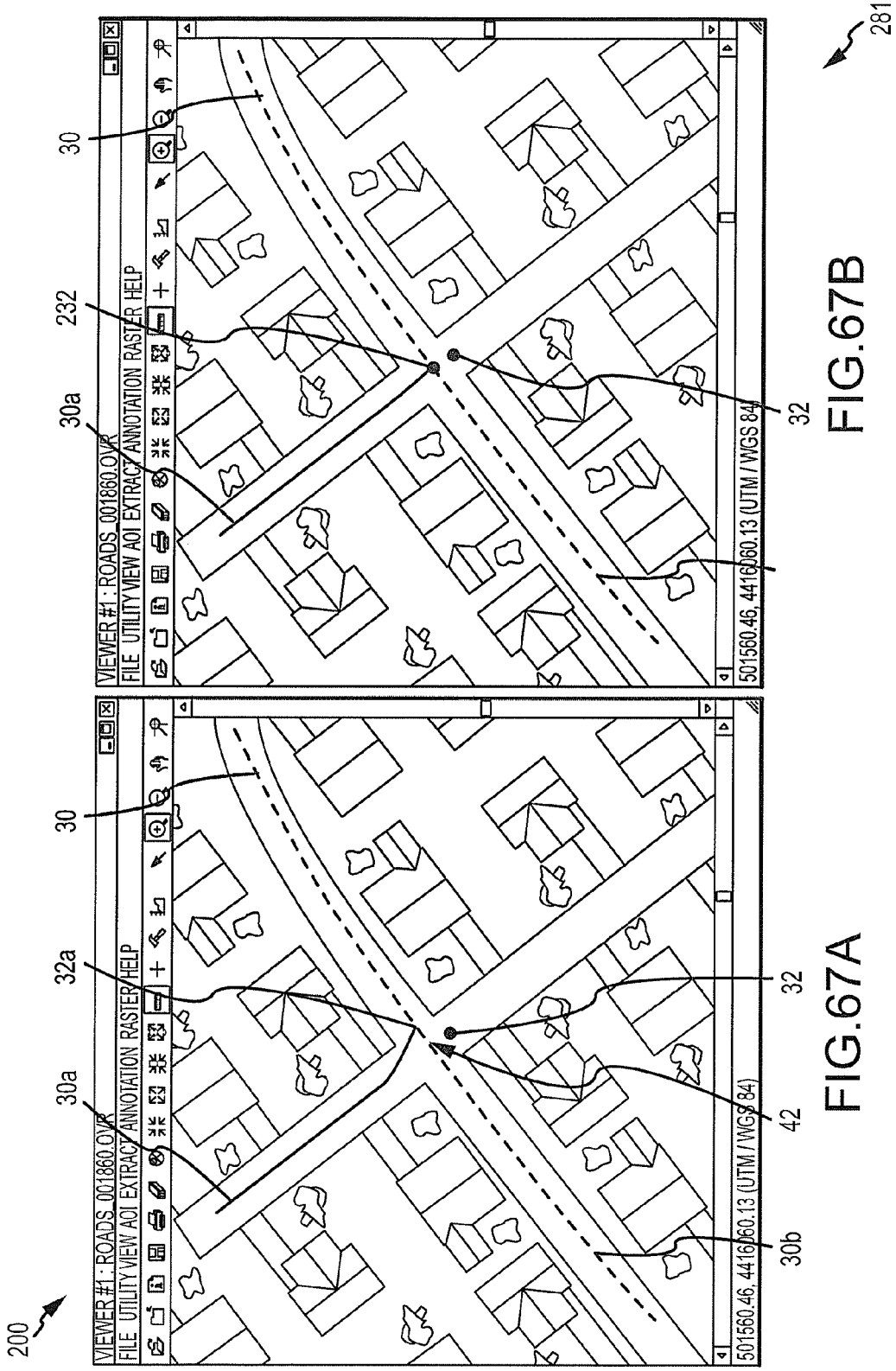
FIG. 67 shows another embodiment of using the move terminals tool.

In a case where the user deems path 30 to be unacceptably far from the true centerline of the road 40, the user may select 283 the N-point detour 288 tool as the desired tool to effect the editing operation. The user may place at least two anchor points (in FIG. 65, shown as three anchor points 232, 232a and 234) by clicking on desired locations. The anchor points 232, 232a, 234 should be placed on road 40 (to obtain desired path 230), such that the regions of influence 273, 273a centered about first and last anchor points 232, 234 both overlap path 30. The N-point detour 288 tool automatically reroutes path 30 through the anchor points 232, 232a and 234 to generate new path 230, as shown in FIG. 65. The rerouting of path 30 does not modify path 30 outside the regions of influence 273, 273a centered about the first and last anchor points 232, 234, except for the portion of path 30 that spans the two regions of influence 273, 273a. New path 230 preserves the original locations of end anchor points 32, 34 of the path 30. The length 64 of path 230 is automatically reattributed 245. In another embodiment, the width of path 230 may also be reattributed 245. If the user selects two anchor points 232, 234 for application of N-point detour 288 operation, then the portion of new path 230 that spans the two anchor points 232, 234 may simply be a straight line, and the path 230 may not be smooth at those two anchor points 232, 234 (in other words, an angle in path 230 may appear at one or both anchor points 232, 234). In another embodiment, the N-point detour 288 tool may be applied to two tandem paths 30, 30a, where the first user-selected 52 anchor point 32 in the N-point detour 288 operation is in the vicinity of path 30 and the last user-selected 52 anchor point 32a in the N-point detour 288 operation is in the vicinity of path 30a. In that case, the tandem configuration of path 30 and 30a is treated by the N-point detour 288 operation as a single path, resulting in a rerouted new path 230 that is then automatically partitioned at a point along its trajectory that has a natural relationship to the tandem point where path 30 and path 30a had met. This results in two revised tandem paths 30, 30a that may be reattributed 245 automatically and separately.

Where the user concludes that the terminating anchor point (s) 32, 32a, 34, 34a of at least one path 30 need to be moved to a single collective new anchor point location 232, the user may use 281 the move terminals 290 tool as the desired smart editing tool 280 to effect the edit operation. As shown in FIG. 66, the user may perform a mouse-click to specify new anchor point 232 at a desired location (e.g., center of intersection 42), such that the region of influence 273 centered at the new anchor point 232 contains at least one terminating anchor point 32, 32a, 34, 34a of existing paths 30, 30a, 30b, 30c. The move terminals 290 tool automatically reroutes paths 30, 30a, 30b, 30c that terminate within the region of influence 273 centered about the new anchor point 232, smoothly rerouting them so that the resulting new paths 230, 230a, 230b, 230c terminate at the new anchor point 232. The lengths 66 of new paths 230, 230a, 230b, 230c are reattributed 245. FIG. 67 illustrates application of the move terminals 290 tool to a T or +intersection 42 where the valence of the intersection 42 (3 for T, 4 for +) is one greater than the number of existing paths terminating in the intersection 42 (e.g., path 30 involved in the intersection 42 passes though the intersection 42, while paths 30a, 30b more or less terminate there). In these cases, if the user places a mouse-click such that the region of influence 273 centered at the mouse-click contains at least one terminating anchor point 32 for at least one existing path 30a, and additionally the mouse-click is within line snap distance 74a of path 30, then the mouse-click location is snapped to path 30, yielding the location of new anchor point 232 on path 30 to which the other paths 30a, 30b involved in the intersection 42 are rerouted. New anchor point 232 becomes the new terminating anchor point for the rerouted paths 30a, 30b. As before, paths 30a, 30b are rerouted within the confines of the region of influence 273 centered at the user mouse-click, and their geometry 46 may be reattributed 245. If the mouse-click is not within line snap distance 74a of path 30, 30a as has occurred in FIG. 68, then the new anchor point 232 is placed at the mouse-click location itself, and path 30b (not including path 30, 30a) involved in the intersection 42 is rerouted to terminate at the new anchor point 232. In another embodiment of method 200, the user may also select a subset of possible paths 30, 30a, 30b for application of the move terminals 290 operation, to restrict the paths that would be rerouted as a result. If multiple paths 30, 30a, 30b met at common anchor point 32, and the user wanted to move the terminal anchor point 32a of only one of the involved paths 30, 30a, 30b so that it terminated at a desired mouse-click location, then the user may first select the desired path 30a, and then when the move terminals 290 tool is applied, the software would automatically know to apply it only to path 30a.

Figures 69A, 69B:
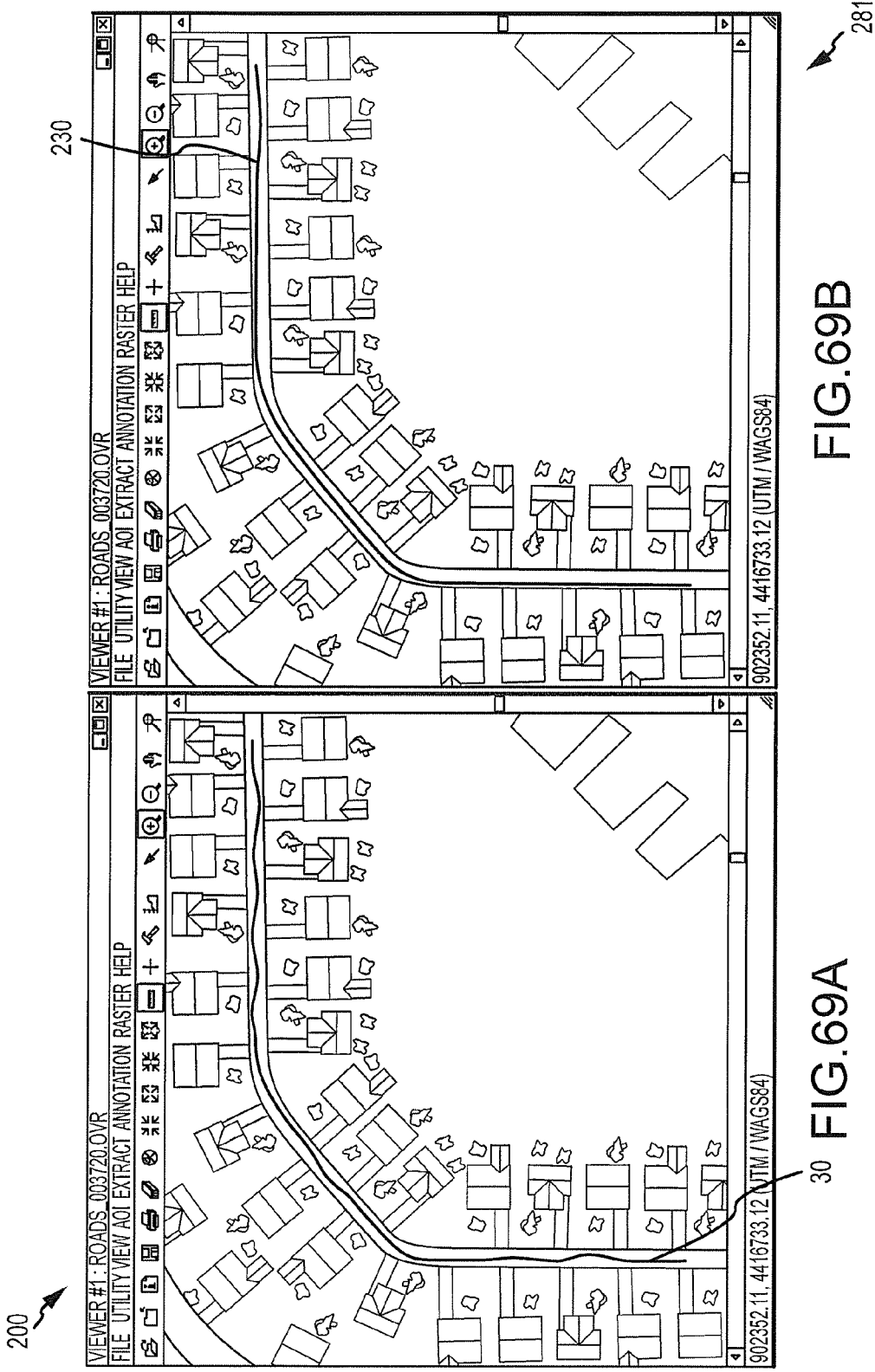
FIG. 69 shows using a smoothing tool.
Figures 70A, 70B:
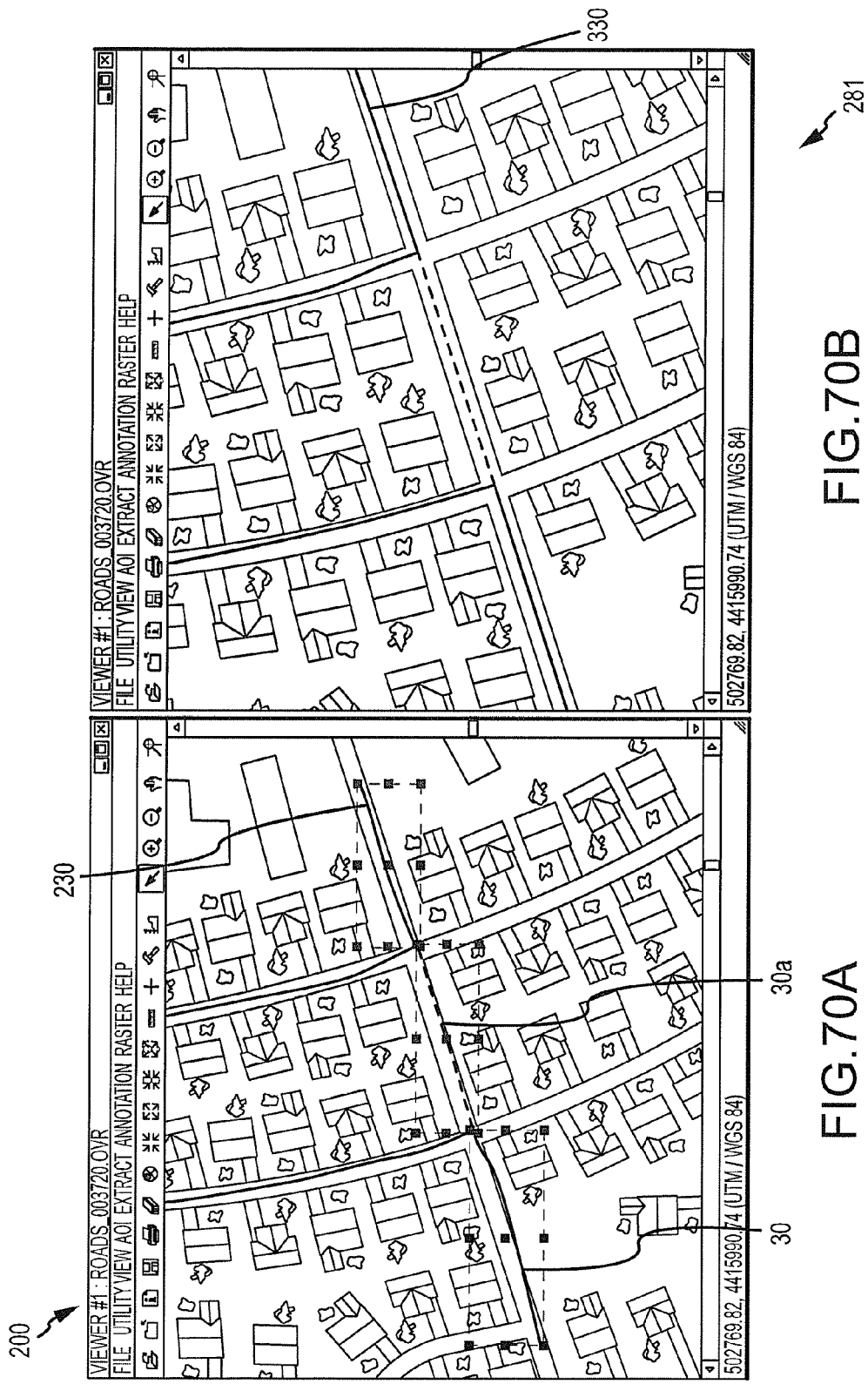
FIG. 70 shows yet another embodiment of using the smoothing tool.

Using 269 automatic deep smoothing algorithm 270 to smooth path 30 automatically on-the-fly while road 40 is being extracted has been described above. However, in similar fashion, the deep smoothing algorithm 270, or aspects thereof, may also be used 281 as the smooth 292 smart editing tool 280. If, for example, the user (1) through manual or semi-automatic editing creates undesired small-wavelength or small amplitude wiggles in path 30 or (2) identifies path 30 as containing undesired small-wavelength wiggles or small amplitude wiggles, the user may select path 30 and then select 283 the smooth 292 smart editing tool 280. This may invoke the vector-based deep smoothing algorithm 270 or relevant aspects thereof, to automatically smooth path 30, generating new path 230, as illustrated in FIG. 69. In another embodiment, illustrated in FIG. 70, the user may select 283 the smooth 292 smart editing tool 280 to smooth a plurality of tandem paths 30, 30a, 230. In that embodiment, the user may first select the desired paths 30, 30a, 230 in any order and then select 283 the smooth 292 smart editing tool 280. The smooth 292 smart editing tool 280 may automatically (1) explicitly or notionally concatenate paths 30, 30a, into super path 330, (2) smooth super path 330, for example, using deep smoothing algorithm 270 on superpath 330 in the manner previously described, and (3) explicitly or notionally repartition super path 330 into a sequence of tandem paths whose number is the same as the number of originally selected paths 30, 30a, 230. The lengths 66 of the resulting tandem paths comprising super path 330 are reattributed 245. In another embodiment, their widths 64 may also be reattributed 245.

In yet another embodiment of method 200, the user may wish to fuse multiple paths 30, 30a, 30b, 230, 230a, 230b into concatenated super path 330. The user may select 283 the fuse 294 smart editing tool 280 to effect the edit operation As shown in FIG. 71, the user may select desired tandem paths 30, 30a, 30b, 230, 230a, 230b in any order. Then the user may select 283 the fuse 294 tool. Paths 30, 30a, 30b, 230, 230a, 230b are automatically concatenated into super path 330, while unnecessary anchor points 32a, 32b, 232a, and 232b are removed. Material type 56 and geometry 46 are attributed 54, 45 anew. In one embodiment, the width 66 attributed 45 to super path 330 may be a length weighted average of the road widths 66 of paths 30, 30a, 30b, 230, 230a, 230b. The material type 56 attributed 54 may be the material type 56 of the longest of paths 30, 30a, 30b, 230, 230a, 230b, or may be based on a length-weighted voting scheme among paths 30, 30a, 30b, 230, 230a, 230b, or may be based on such other natural scheme as would occur to one of ordinary skill in the art. The length 64 attributed 45 to superpath 330 may be the sum of the lengths 64 of paths 30, 30a, 30b, 230, 230a, 230b.

In yet another embodiment of method 200, the user may wish to straighten extracted path 30 by using 281 the straighten 295 tool to effect the edit operation. See FIG. 50. In one embodiment, if road 40 is roughly straight, but extracted path 30 contains wiggles, applying the straighten tool will erase existing path 30 and redraw path 30 as a straight line between endpoints 32, 34.

User identification 285 of error 287, user selection 283 of the smart editing tool 280 as appropriate for the error 287, and application of that selected tool may take place at any time, either immediately after the extraction, after additional extractions or, after the extraction results have been stored in the output vector file 24 as described herein. The saved output vector file 24 may be later loaded and the corrections made at that time. After the error 287 has been addressed using 281 at least one of the smart editing tools 280, the visual changes that appear on the display screen resulting from the last application of the selected smart editing tool 280 may be fully undone 291 (e.g., with a single press of an "undo" 291 pushbutton on the user interface) if the user concludes that the error 287 was not adequately corrected. If the automatic topology cleaning has been activated during the smart editing operation, the visual changes appearing on the display screen may also be fully undone 291 at the same time as the last application of the selected smart editing tool 280 as explained above.

The information regarding path 30, such as path 30 geometry (e.g., the positions of the vectors and vector set(s) comprising the path 30), length 66, width 64 and material type 56 of the path 30 may be stored in the output vector file 24.

Once the output vector file 24 has been populated and saved, at least one map may be created from it automatically at any later time using known methods in the art (e.g., including tools in commercially available GIS software).

Method 200 may also comprise preprocessing 218 remotely-sensed imagery. Preprocessing 218 may vary as a function of image type, as described herein. To begin preprocessing 218 as shown in FIG. 45, the user may select the preprocessing 218 algorithm associated with the remotely-sensed image being used. Preprocessing 218 may comprise computing 221 atmospheric correction to multispectral image 14 or hyperspectral image 15, generating 223 texture file 18 for panchromatic image 20, or computing 225 cost file 25 for radar image 141. In another embodiment, preprocessing 218 may comprise computing at least one graphical image file or raster image file based on the image input file(s) such that the computed graphical or raster image files may be subsequently employed to assist in road 40 extraction. In another embodiment, the user may choose to have the software run the preprocessing 218 automatically in the background during the course of extracting path 30.

Preferably, with respect to multispectral image 14, preprocessing 218 may comprise computing 221 atmospheric correction, including normalization of solar effects, in accordance with methods that would be familiar to one of ordinary skill in the art. Further, computing 221 atmospheric correction of multispectral image 14 may comprise generating a solar elevation level and a mask layer. The solar elevation angle may be used to normalize brightness across pixels. The mask layer contains classification information that may be used to mask input multispectral image 14 during histogram 250 generation 251. It may be preferable to generate 251 histogram 250 of non-water pixels, since road extraction 40 may be concerned primarily with non-water pixels. Thus, computing 221 atmospheric correction may comprise removing water pixels, because the atmospheric levels from some spectral bands may be lower over water pixels than non-water pixels. In the method 200, the following classification for the mask layer may be used, as may any other classification as would be familiar to one of ordinary skill in the art after becoming familiar with the invention described herein (the numbers merely represent a class indexing):

0=good pixel
1=water pixel
2=raw bright pixel
3=water and brightness temperature record (BTR) (inconsistent)
4=expanded region near a bright pixel
5=invalid pixel (input values are zero)

Preprocessing 218 may further comprise generating 223 the texture file 18 associated with panchromatic image 20, as was described above. Preferably, panchromatic image 20 is in TIFF format. Generating 223 texture file 18 may comprise using default parameters, which are:
TEXTURE_TYPE=VARIANCE
NUM_ANGLES=16
SMOOTH=3
MINIMUM=5
DOEDGES=FALSE
In another embodiment, the NUM_ANGLES may be set at a value higher than 16, which may better indicate the texture of panchromatic image 20, but at the expense of processing time.

Preprocessing 218 of radar image 141 may comprise two steps—smoothing 11 and computing 225 cost file 25. Smoothing 11 radar image 141 has been explained above. Smoothing 11 radar image 141 may further comprise despeckling radar image 141. As explained above, radar image 141 may be filtered to reduce noise and artifacts. Next, reduced-resolution radar image 141 may be automatically produced by setting X and Y scale factors to achieve degraded pixel size of about 1-2 m. A Lee-Sigma speckle suppression filter may be applied to radar image 141. It may be preferred that the Coefficient of Variation is 0.2 and the Coefficient of Variation Multiplier is 2.0.

Preprocessing 218 may further comprise computing 225 cost file 25 for radar image 141. Computing 225 cost file 25 has been explained in great detail above.

Preprocessing 218 of hyperspectral image 15 may comprise computing 225 cost file 25 for hyperspectral image 15, which in turn may comprise generating 251 histogram 250, smoothing histogram 250, computing 221 atmospheric correction, scene-independent band-dependent data normalization, and generation of principal-components feature data.

Figure 72:
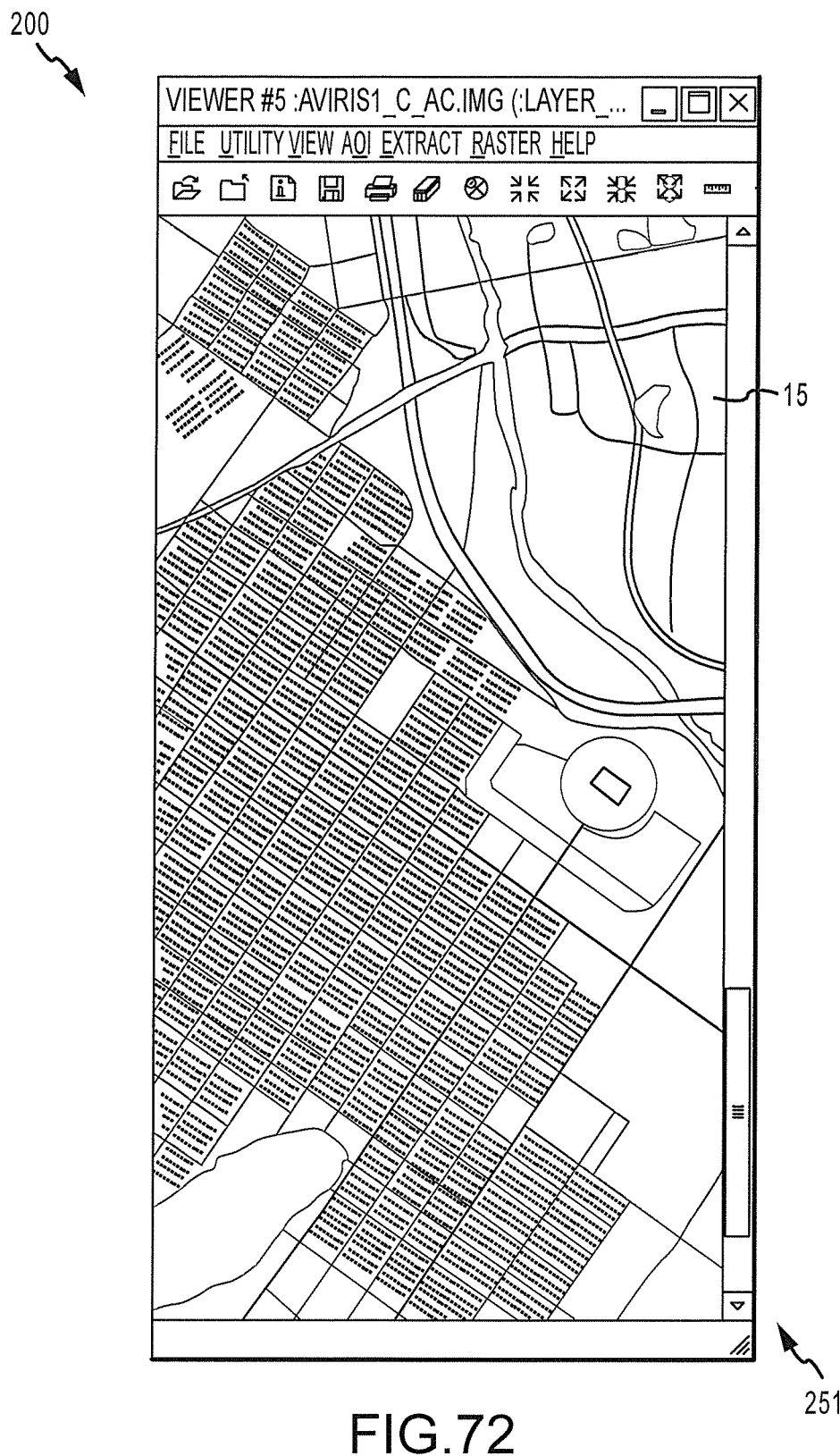
FIG. 72 shows generating a histogram for hyperspectral imagery.

As in the case of multispectral image 14, generating 251 histogram 250 may comprising removing water pixels. Removing water pixels may comprise identifying water pixels by setting as a threshold the band having a value of 124. FIG. 72 illustrates the mask (detecting water pixels) obtained by using the band having a value of 100 (which is below the threshold value of 124). Other than the band and threshold values, generating mask layer for hyperspectral image 15 may follow the same method as that used to generate 251 histogram 250 for multispectral image 14.

Figure 73A:
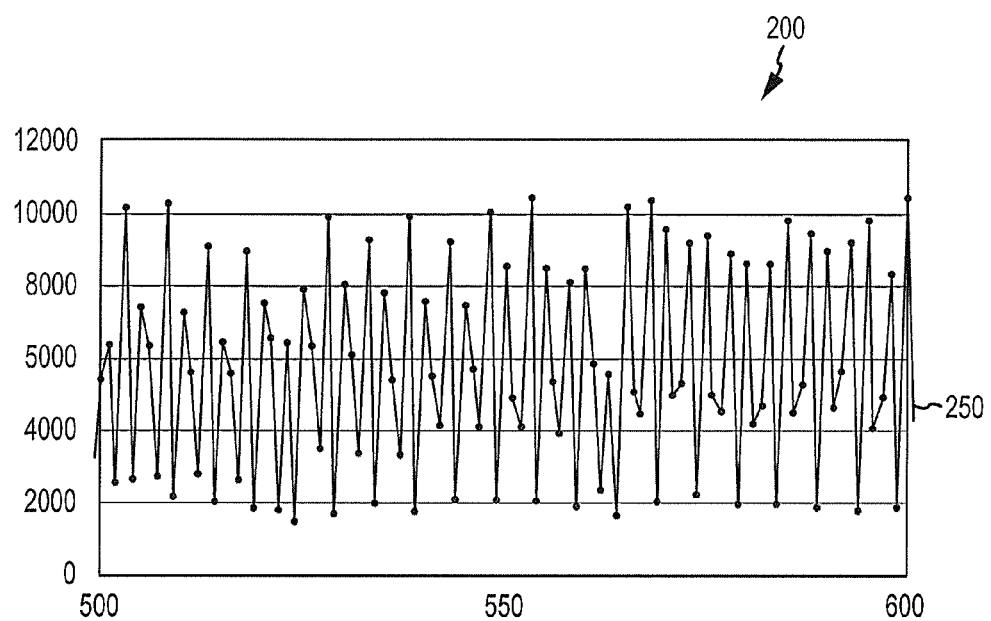
FIG. 73 shows the need for histogram smoothing of hyperspectral imagery.
Figure 73B:
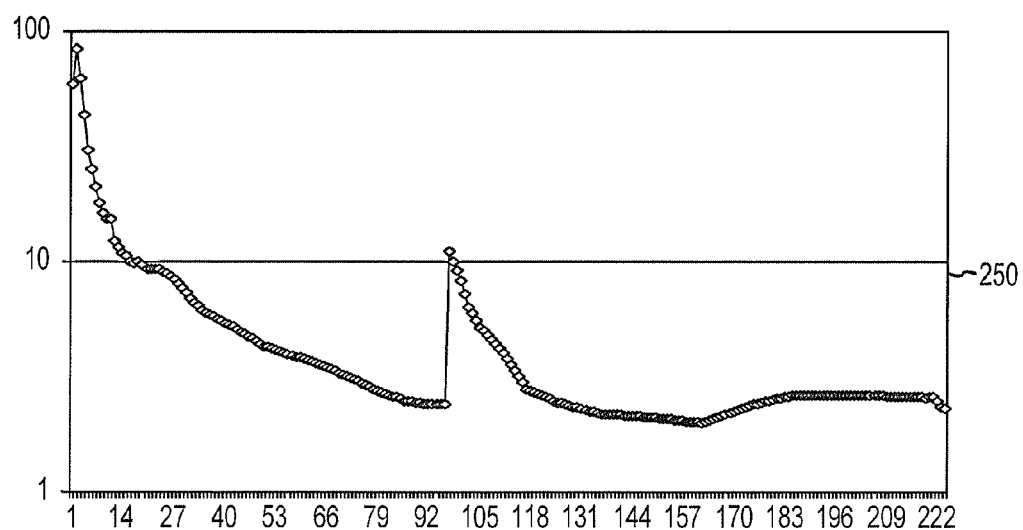

Computing 225 cost file 25 for hyperspectral image 15 may further comprise smoothing histogram 250. FIG. 73 illustrates the need for smoothing in the case of hyperspectral image 15 produced by AVIRIS, which may have been subjected to decommutation, interpolation and radiometric scaling for calibration. FIG. 73(a) shows a section of the band with the value of 124, illustrating periodic behavior with a cycle of about 2.5 counts. FIG. 73(b) shows histogram 250 period versus wavelength index, using a logarithmic scale, with a break at about 97 wavelength index.

In the case of hyperspectral image 15, computing 225 cost file 25 may comprise computing 221 atmospheric correction. Atmospheric correction levels may be estimated by analyzing the base of the smoothed histogram 250. The atmospheric correction level may be estimated as the smallest data value such that at least five histogram 250 bins in a row are above 10. This may eliminate spurious artifacts. (e.g., data dropouts, sensor undershoots, etc.). Then, the atmospheric correction level may be removed from the raw data value, $r_i$, to get the corrected value, $c_i$, such that $c_i = r_i - a_i$.

In a preferred embodiment of the method 200, a fixed band-dependent data normalization is performed once the atmospheric correction has been computed 221. For convenience the output data type may be maintained as unsigned 16 bit. Statistics are generated over a number of datasets. Using a single data set as an example, after computing
$A_i$=average atmospheric correct for band i
$M_i$=data max for band i
$D_i$=data median for band i,
compute band dependent constant gain factor, G, where $$G = 32767 * \text{Min}\{(D_i - A_i)/(M_i - A_i)\} \text{ over } i.$$

Then, apply band-dependent constant factor, G, to get the new value $S_i$, where $$s_i = G * c_i / (M_i - A_i), i = 1, \ldots n.$$

Figure 74:
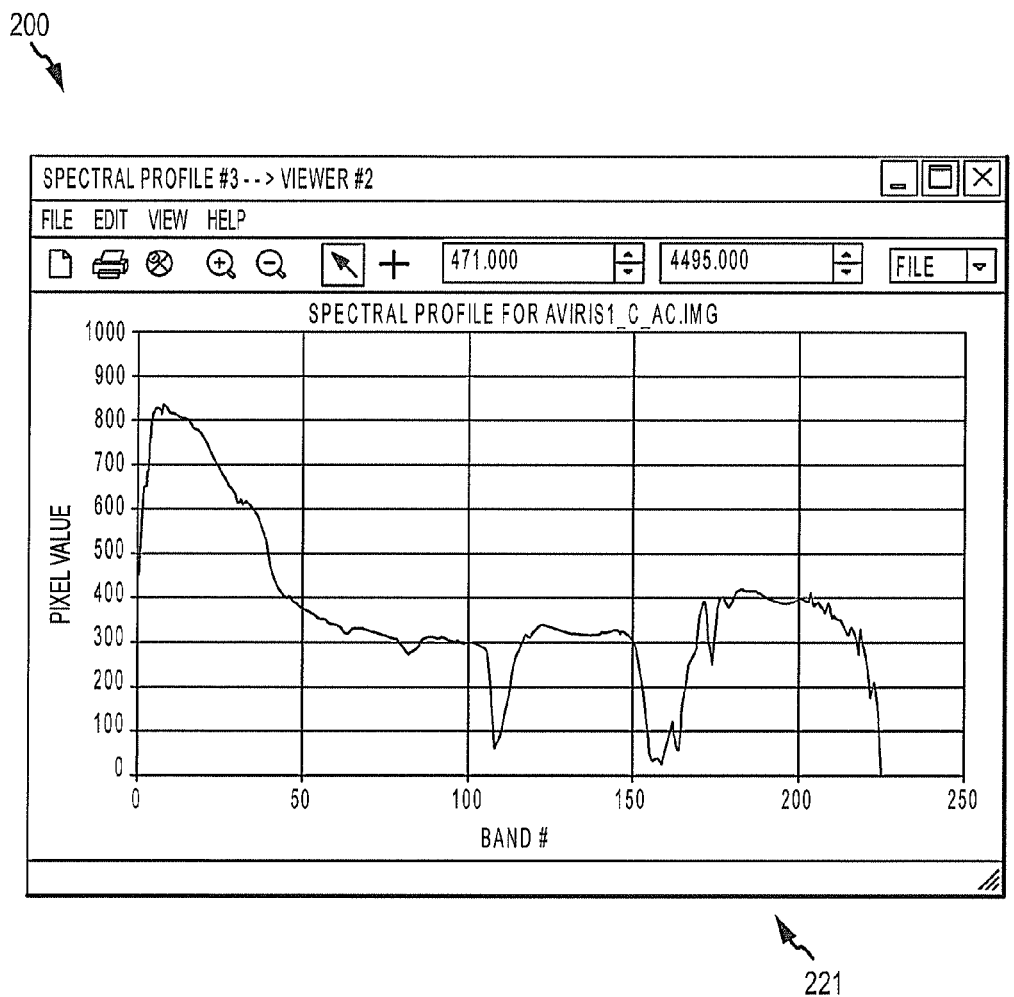
FIG. 74 shows results of normalization of hyperspectral imagery.

This normalization method may be used to maintain comparable data levels over the spectrum of hyperspectral image 15. FIG. 74 shows a spectral trace of raw hyperspectral image 15 at one pixel with high albedo after normalization in the manner described herein.

Figure 75:
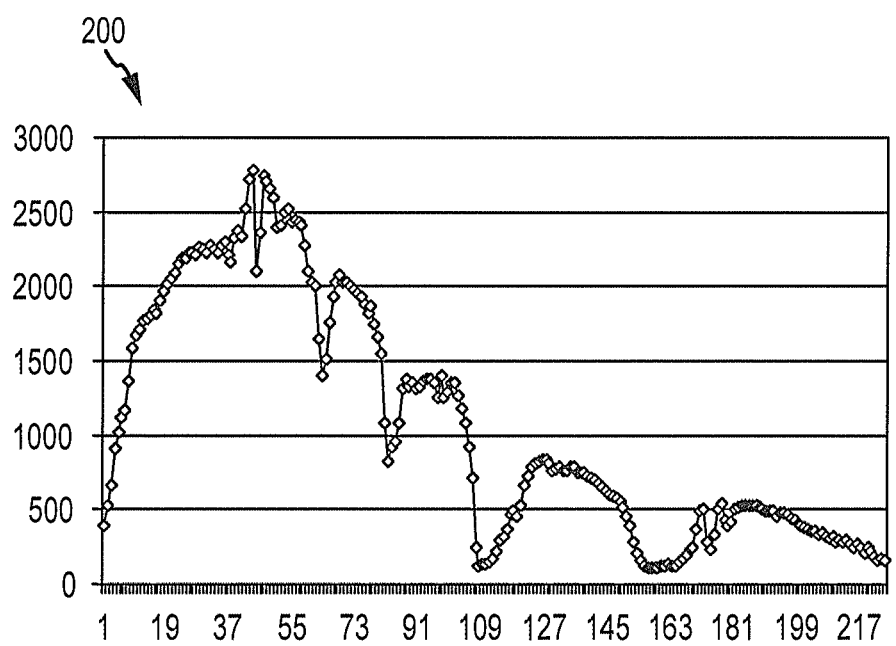
FIG. 75 shows normalization of quantity $D_i$-$A_i$, with bin smoothing applied.
Figures 76A, 76B:
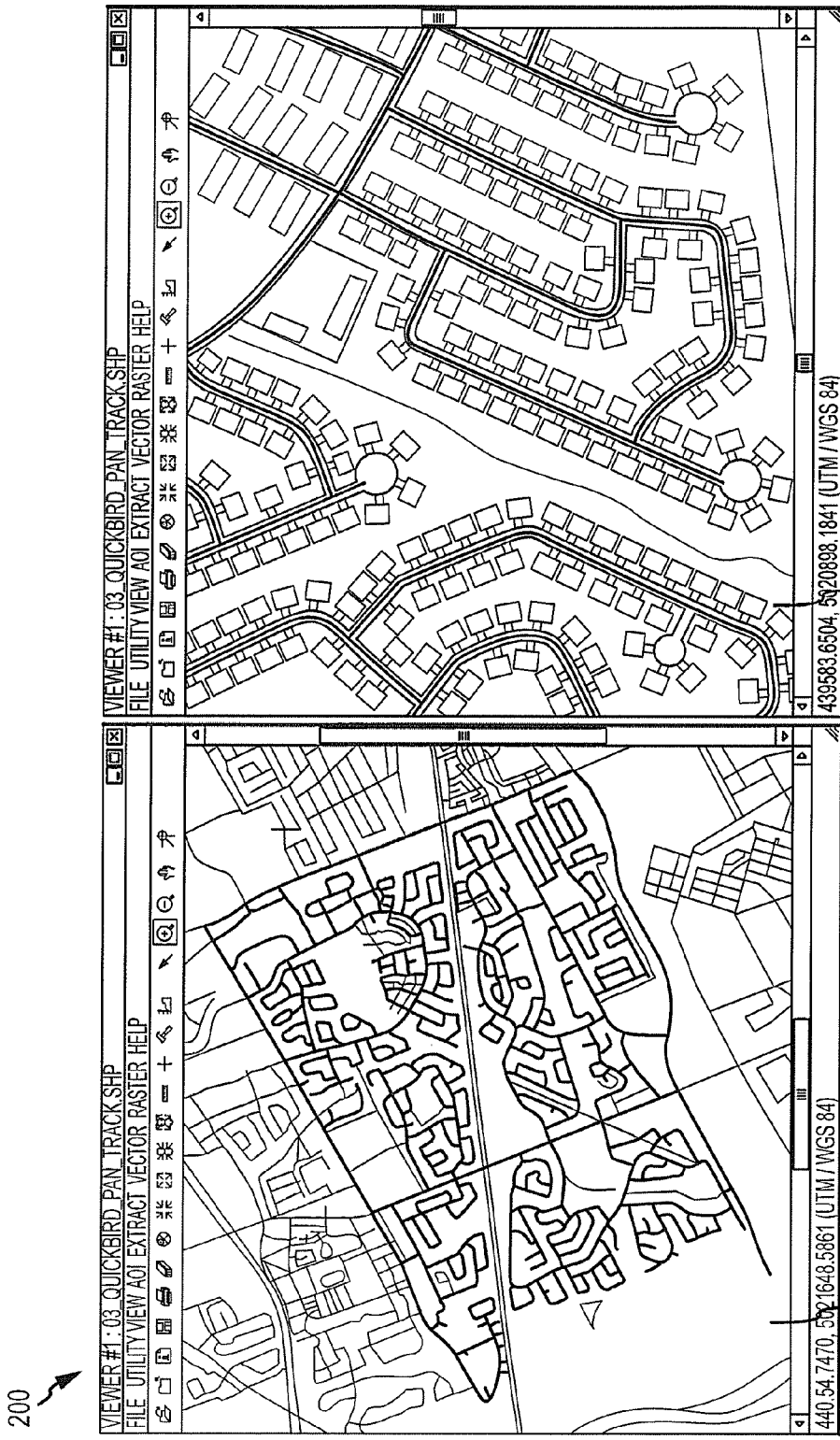
FIG. 76 shows QuickBird Pan image with (a) semi-automatic extraction according to a method of the invention and (b) manual extraction.
Figures 78A, 78B:
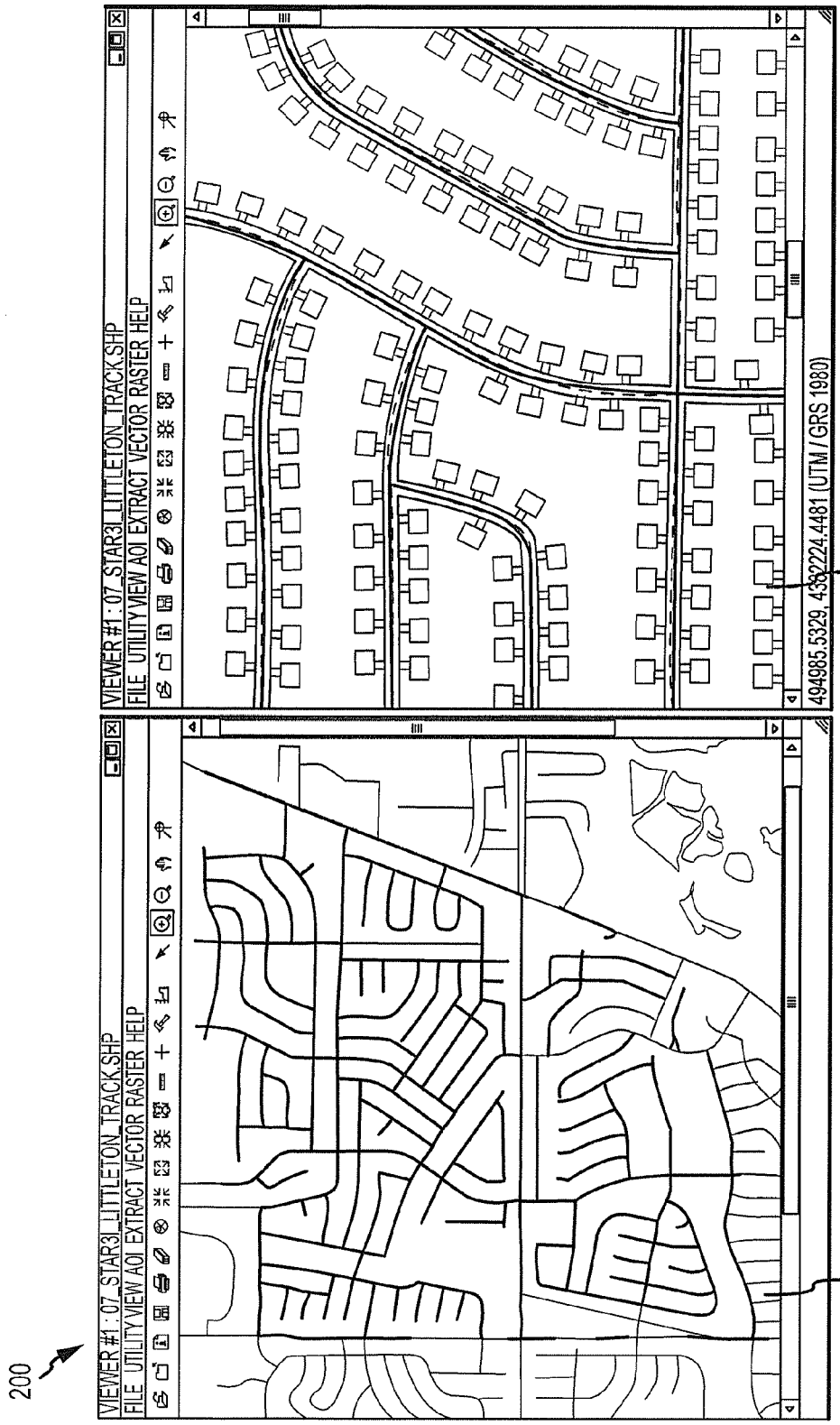
FIG. 78 shows Star3i radar image with (a) semi-automatic extraction according to a method of the invention and (b) manual extraction.
Figures 79A, 79B:
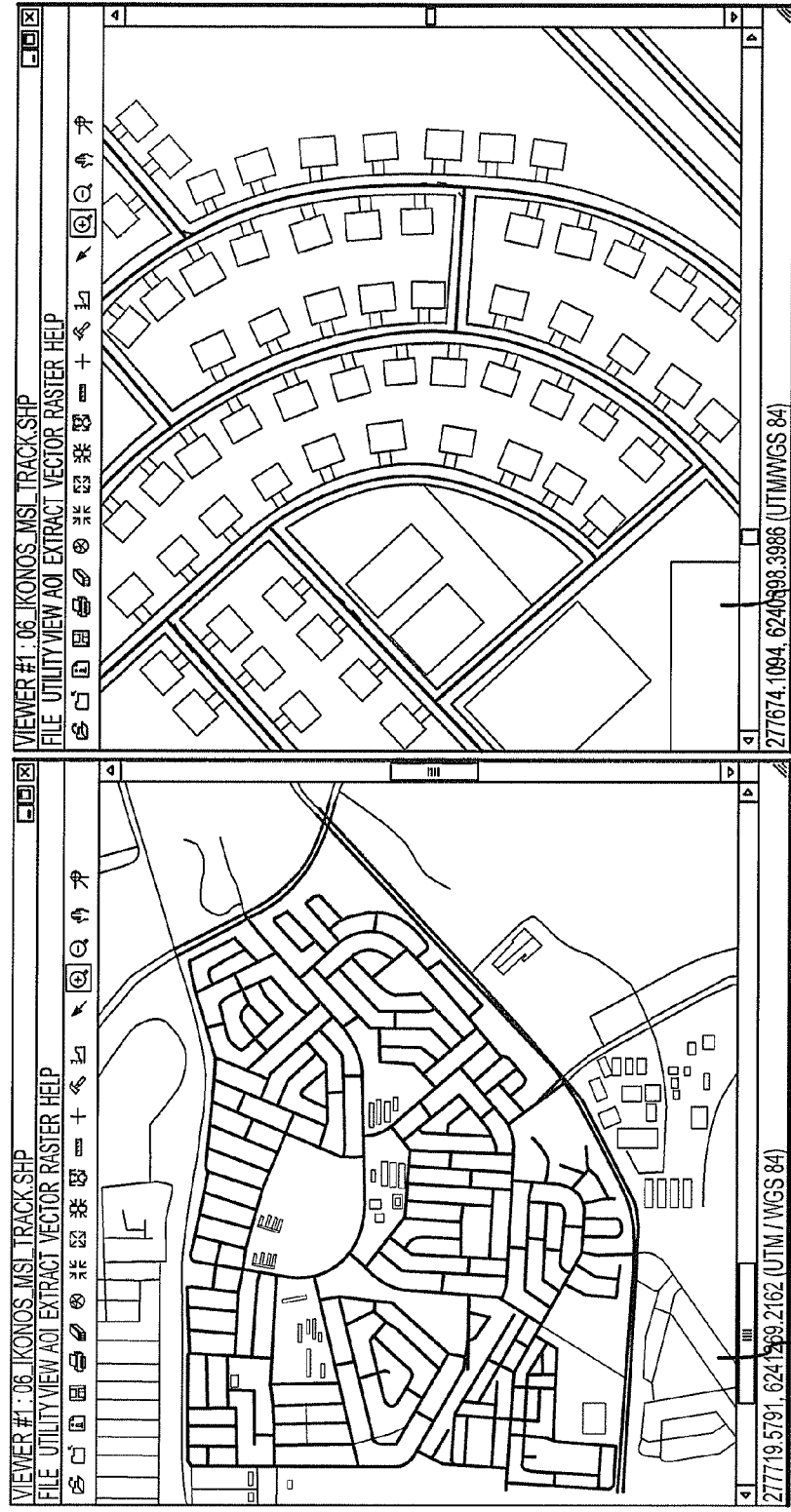
FIG. 79 shows IKONOS® multispectral image with (a) semi-automatic extraction according to a method of the invention and (b) manual extraction.
Figures 80A, 80B:
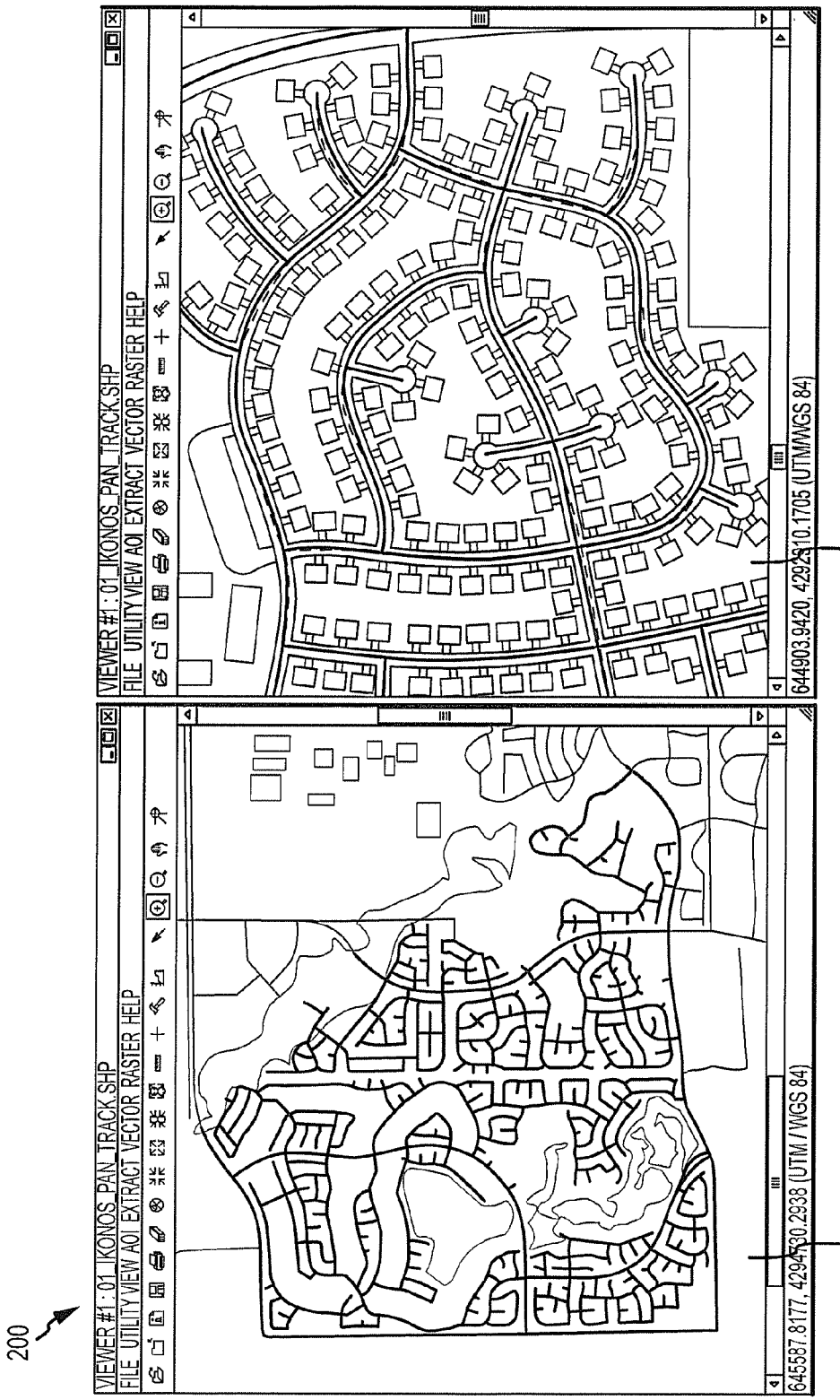
FIG. 80 shows IKONOS® multispectral image with (a) semi-automatic extraction according to the method and (b) manual extraction.
Figures 81A, 81B:
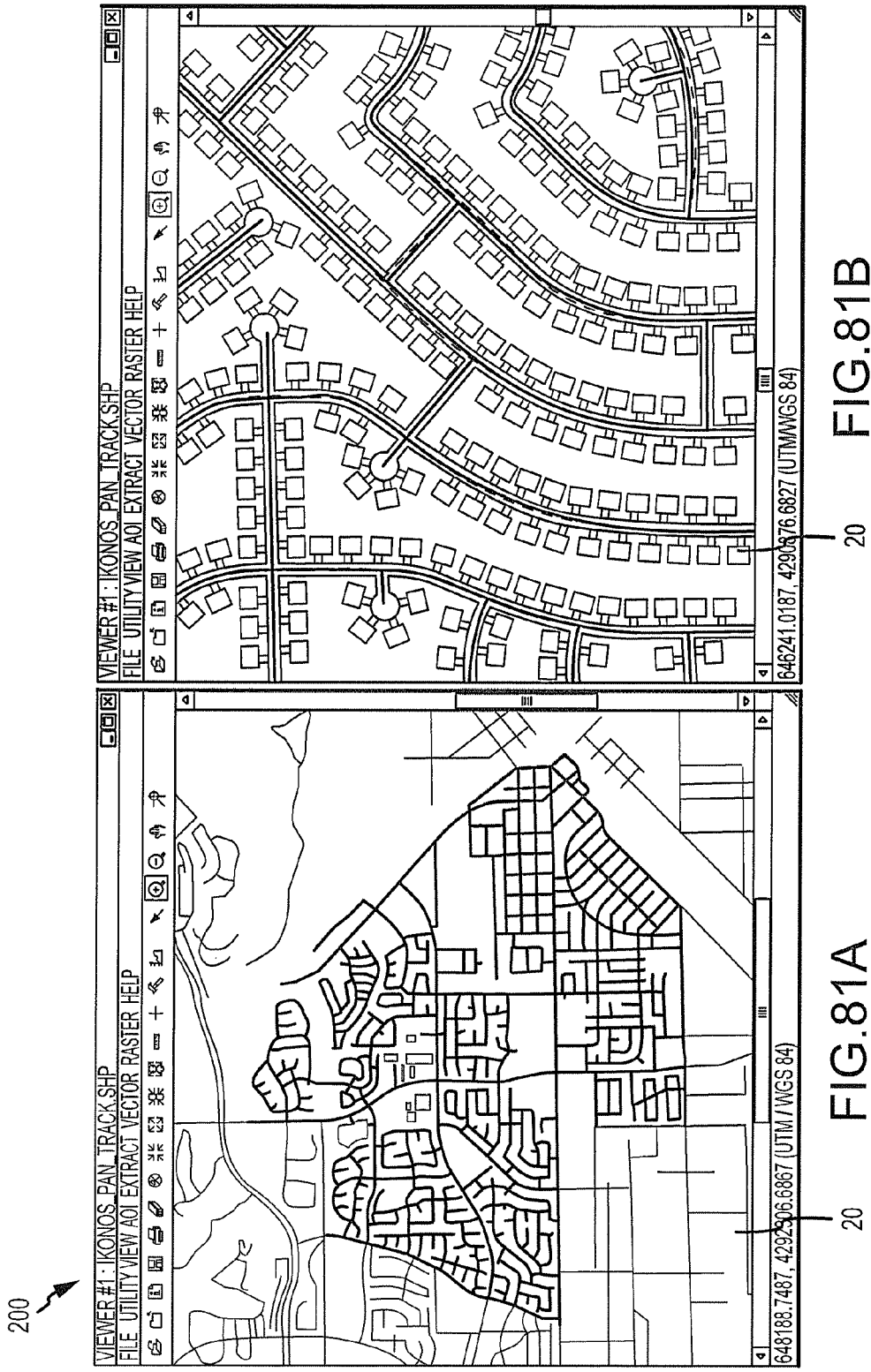
FIG. 81 shows IKONOS® multispectral image with (a) semi-automatic extraction according to the method and (b) manual extraction.
Figure 82A:
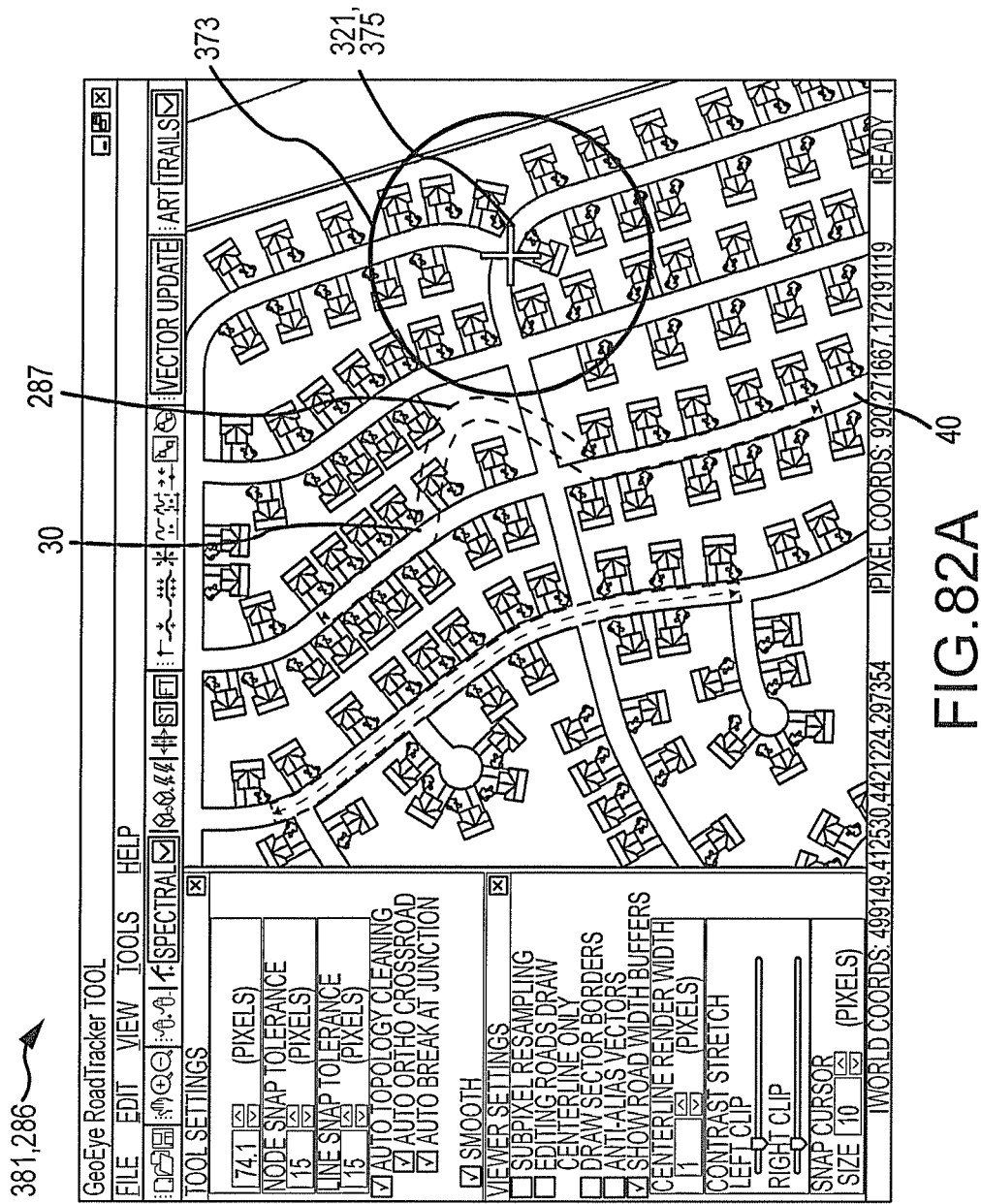
FIG. 82 shows using an embodiment of the 1-point detour tool.
Figure 82B:
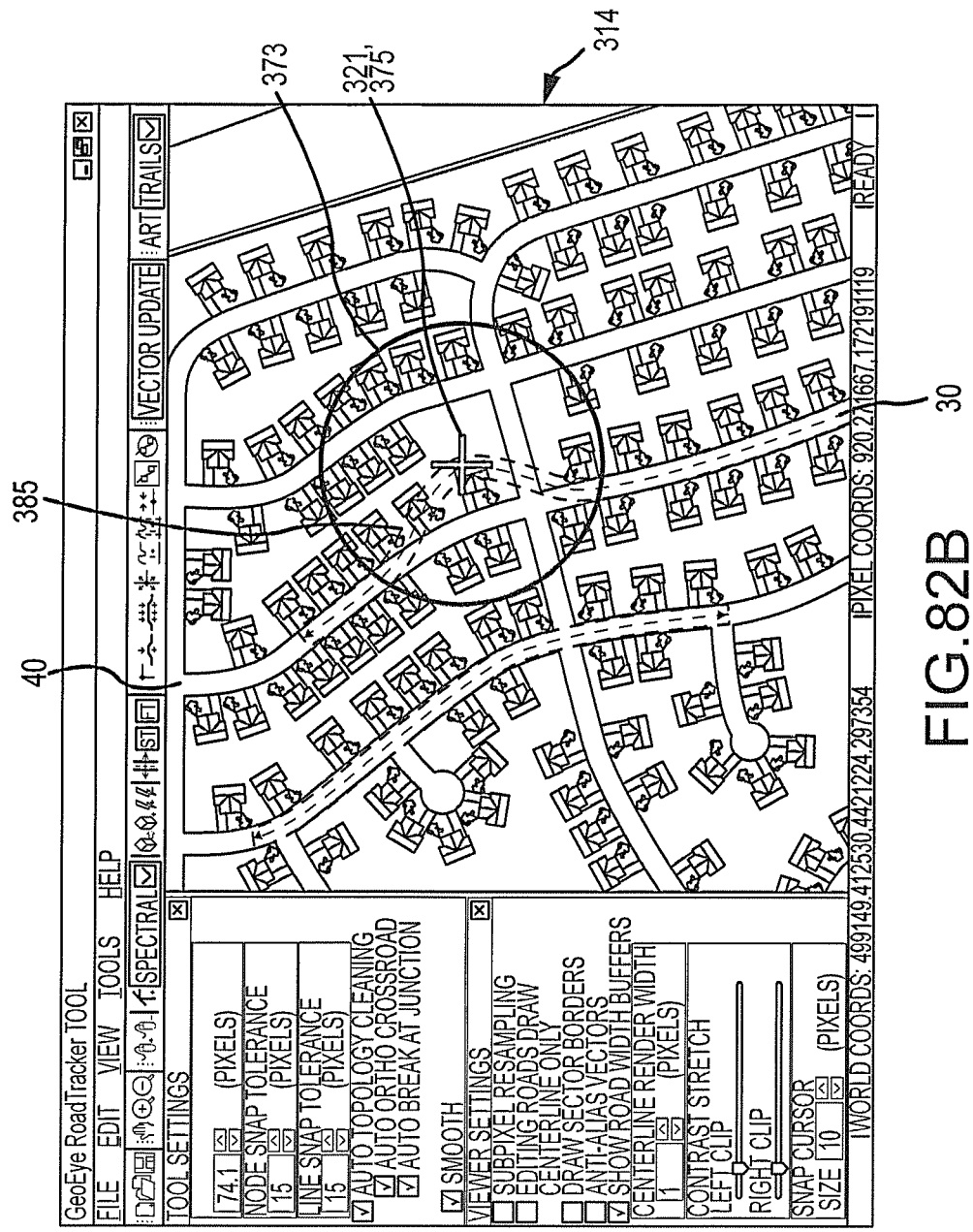
Figure 82C:
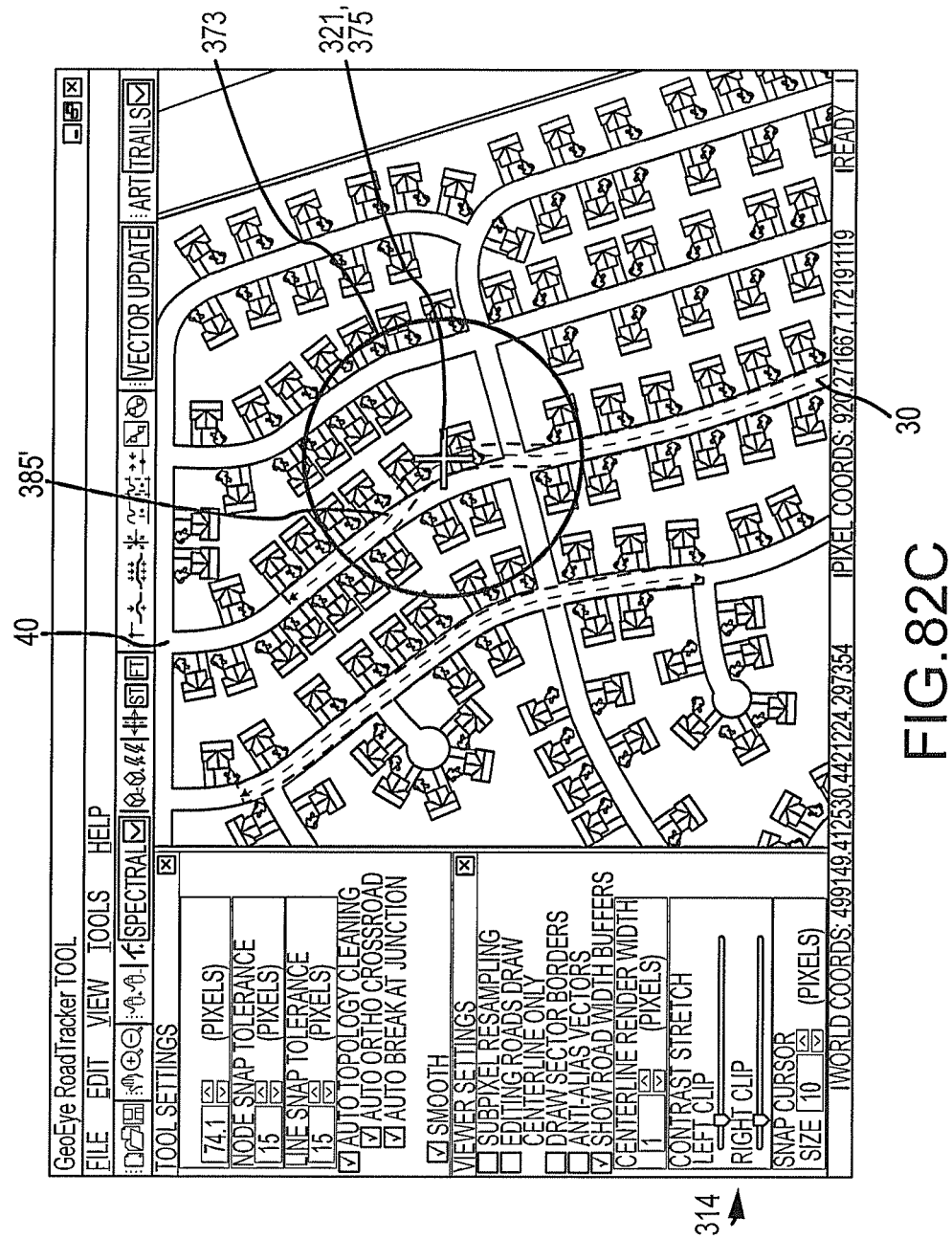
Figure 82D:
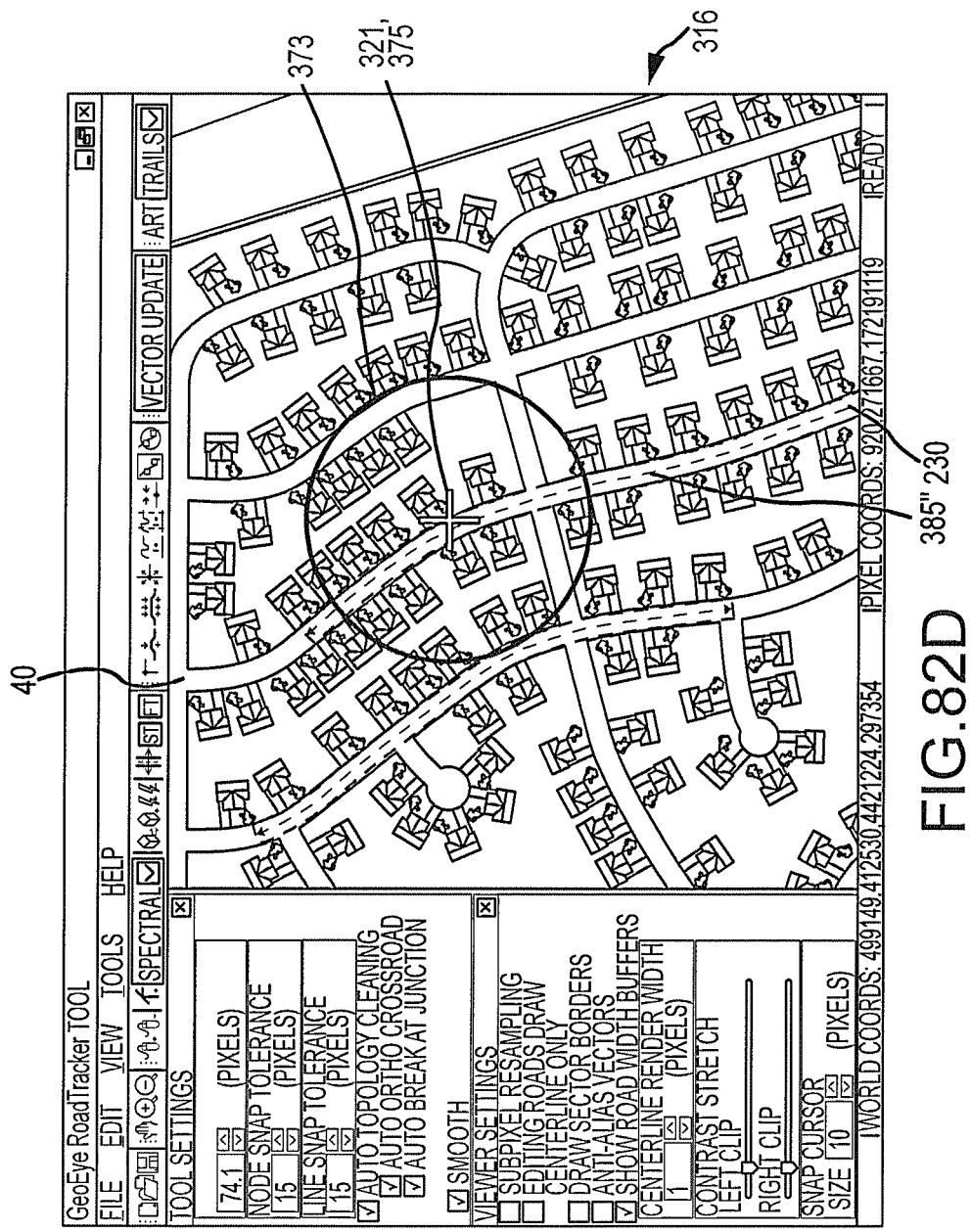
Figure 83A:
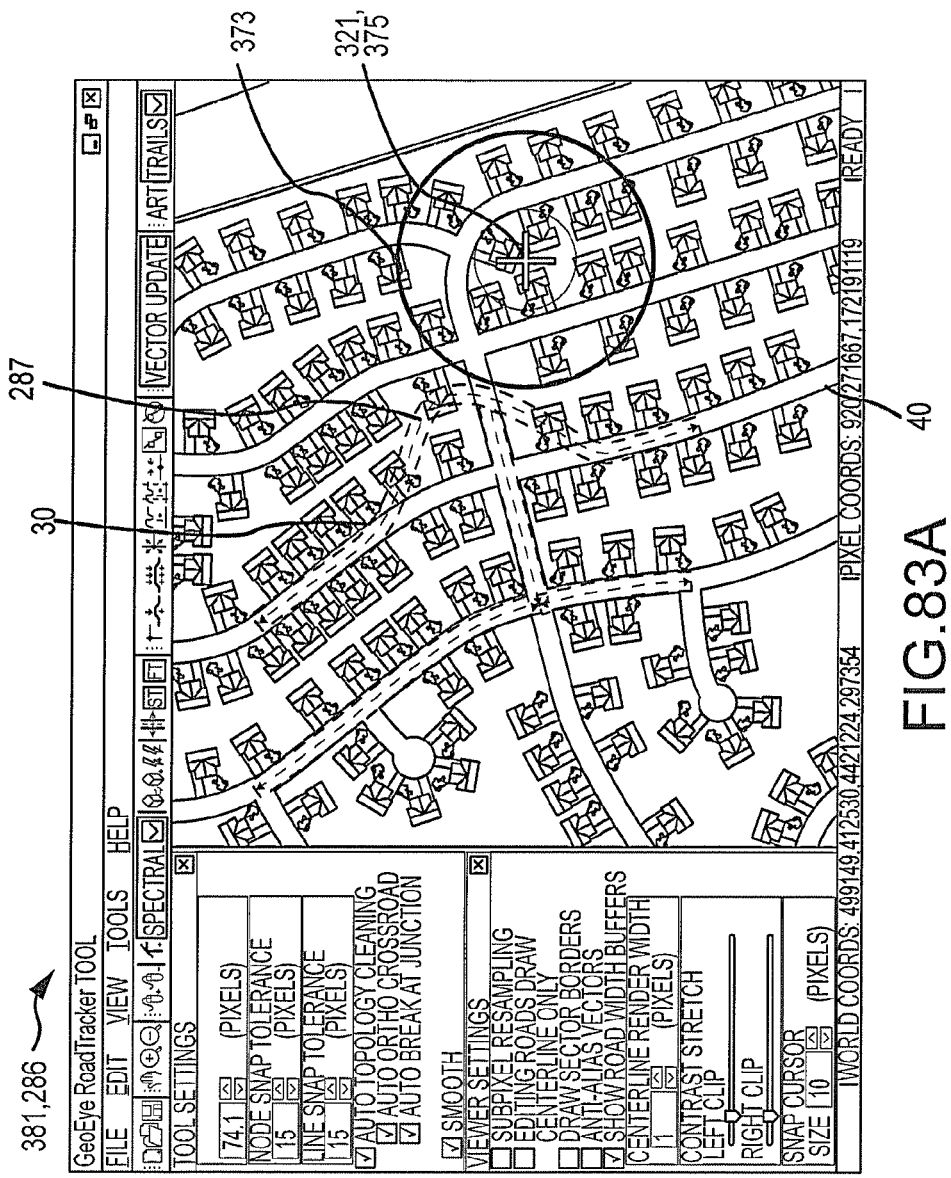
FIG. 83 shows using another embodiment of the 1-point detour tool.
Figure 83B:
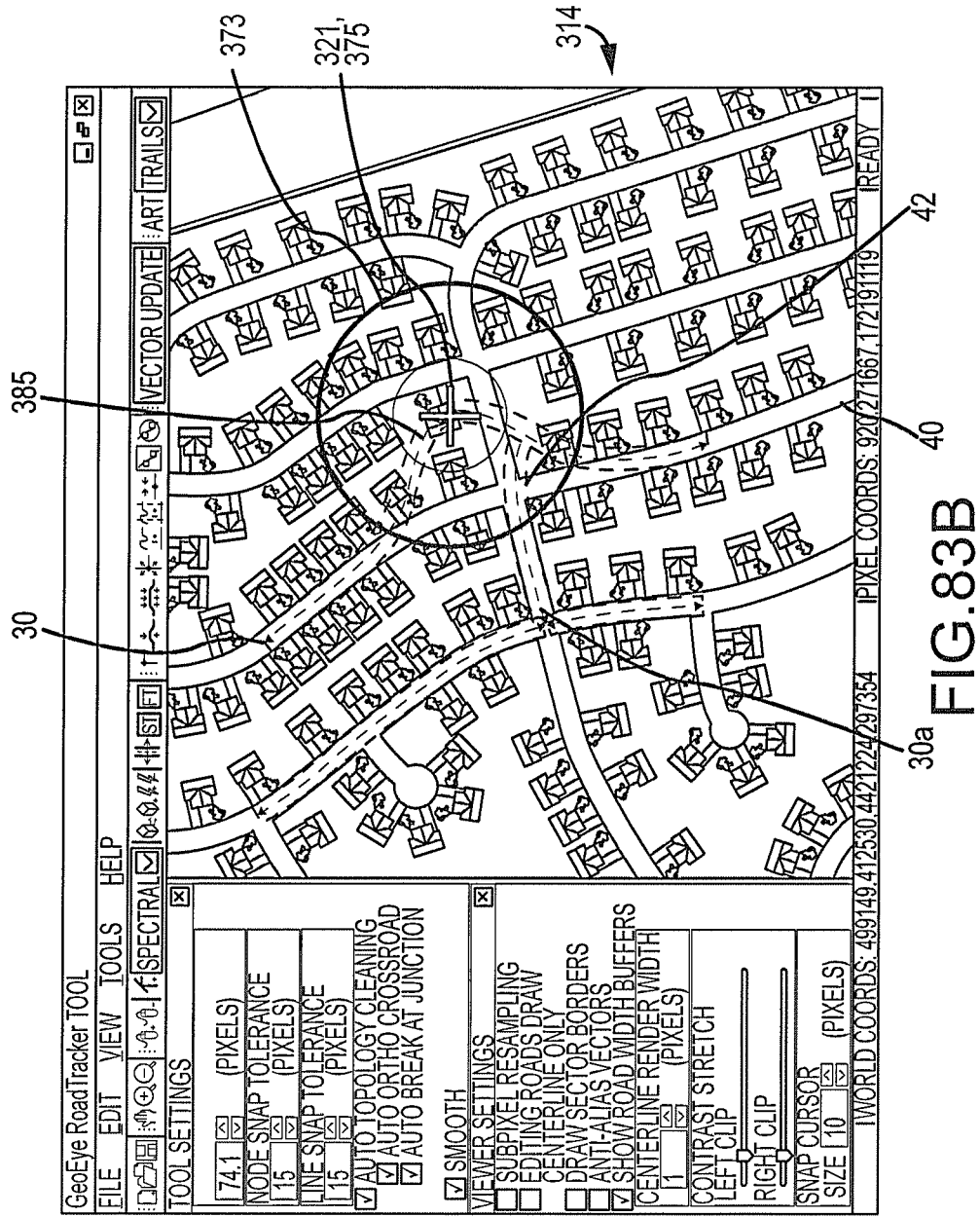
Figure 83C:
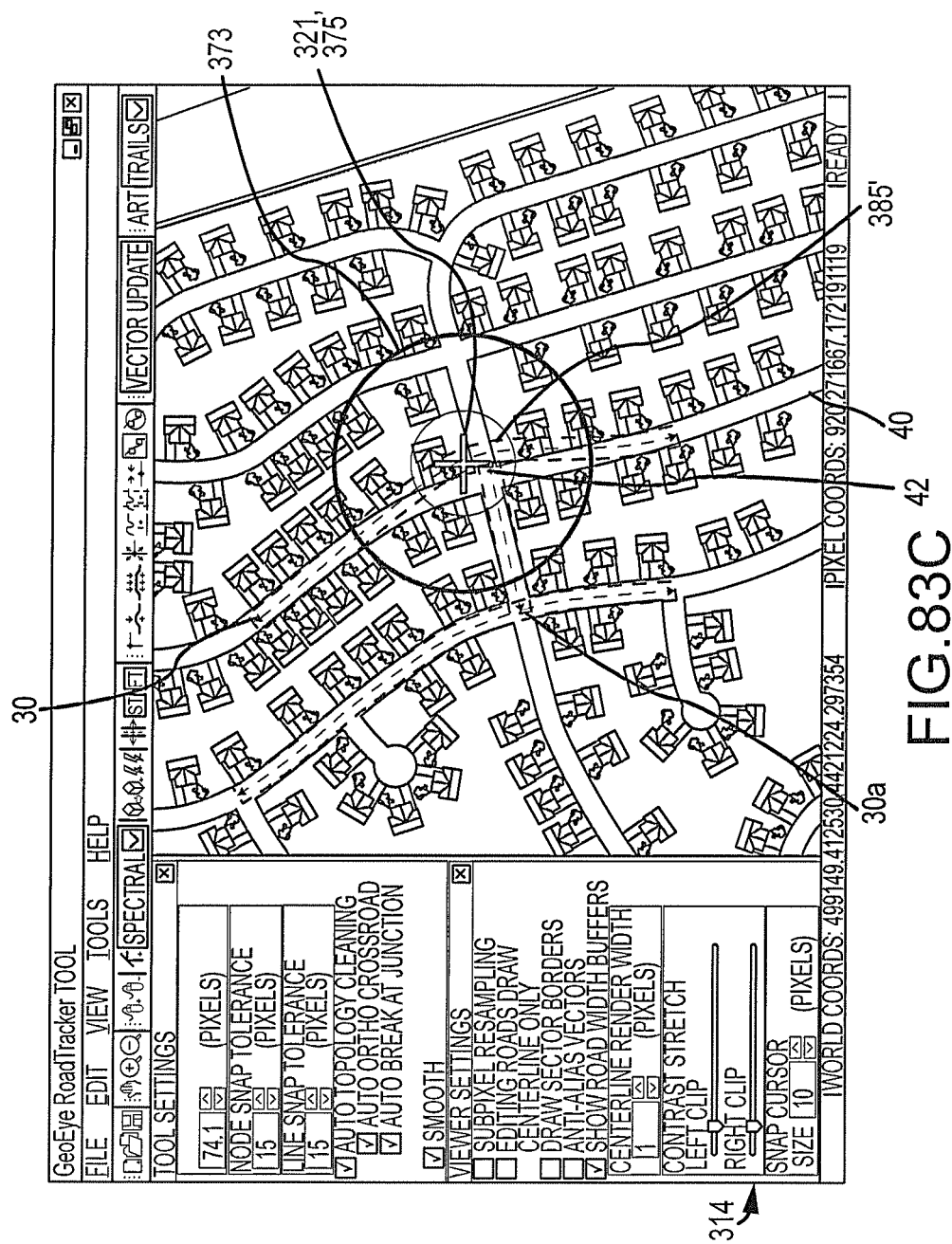
Figure 83D:
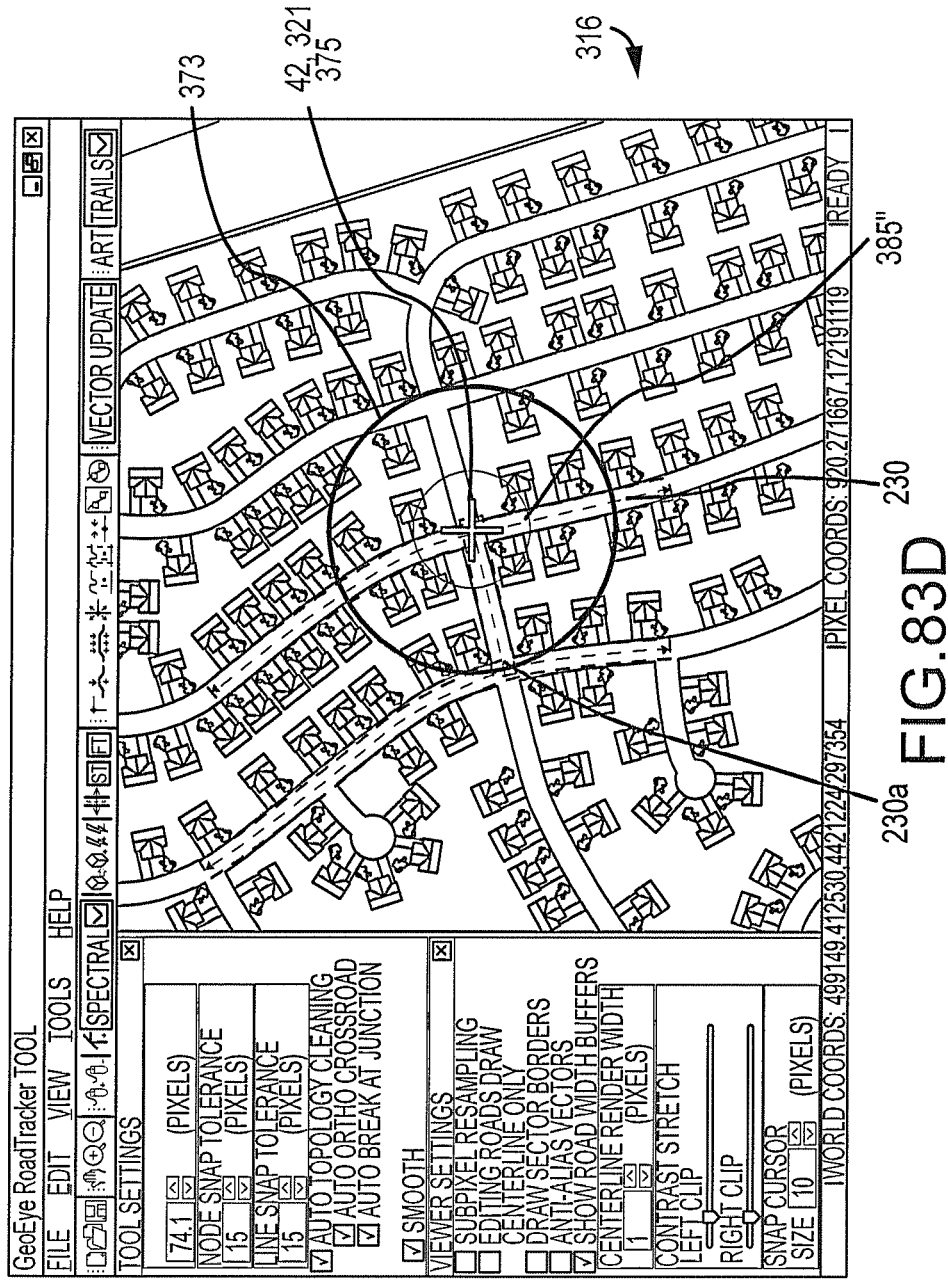

FIG. 75 shows normalizing quantity: $D_i - A_i$, with bin smoothing applied.

Various aspects of the method 200 of the present invention were tested for speed and accuracy on multispectral image 14, panchromatic image 20 and radar image 141. FIGS. 76-81 show the images tested, where for each image in the test, extraction was performed in two different ways (a) semi-automated extraction via method 200 (using automatic vector revision functions and semi-automated smart editing tools 280 discussed earlier) versus (b) manual extraction as explained in more detail below.

For the images shown in FIGS. 76-81, the analyst was instructed to extract all roads 40 in a designated area of interest (AOI) enclosing typical suburban landscape that included curved and straight roads, overhanging trees, and cars on the streets. For each AOI for each image, the analyst kept track of how long it took to extract the roads 40 manually versus semi-automatically according to method 200 (shown as "Tracker" in Tables 4 and 5). Manual extraction refers to just the use of the digitize and spline modes (without use of automatic vector revision functions) together with just the vector editing tools available in the ERDAS Imagine commercially-available GIS software. Semi-automatic extraction of method 200 comprised digitize, spline, track 28, and spectral modes, plus the automatic vector revision functions and semi-automatic smart editing tools 280 of method 200. The accuracy standard for near centerline road 40 extraction was left to the discretion of the analyst who was instructed to keep panchromatic image 20 path(s)) to within roughly two meters pixels of the and multispectral image 14 paths to within one meter of the true road 40 centerline using available editing tools, as necessary. The primary goal of the testing was to quantify for each image type the total extraction time that was achieved by using semi-automatic extraction in accordance with method 200 as compared to that for manual extraction. The semi-automatic extraction according to method 200 was always performed first to give a slight bias in favor of manual extraction time, thereby providing a conservative comparison of the two methods. Such bias results from increased familiarity of the image to the analyst. Before any testing began, the analyst practiced using the automatic vector revision functions and the smart editing tools 280 of method 200 to become familiar with the operation of the method 200.

Table 4 demonstrates that, by using method 200, extraction time can be reduced by a factor of about 1.7 for all types of unclassified remotely-sensed image data, as compared to manual extraction time. Table 5 demonstrates that, by using method 200, extraction time can be reduced by a factor of about 1.7 for classified panchromatic image 20 data, and 1.3 for classified radar image 141 data, as compared to manual extraction time. In addition to speeding extraction time, analysts reported that use of method 200 also reduced stress and fatigue. Unlike the reporting in Tables 1 and 2 above, the reporting of extraction time in Tables 4 and 5 is no longer divided into initial extraction time and editing time because method 200 makes it easier for the user to interweave initial road 40 extraction with path 30 editing, rather than performing path editing after all the roads 40 have been initially extracted.

Testing of panchromatic data included original panchromatic image 20, as well as its auxiliary derived texture file 18. Testing of multispectral data included multispectral image 14, as well as the texture file 18 of the associated panchromatic image 20. Testing of radar included radar image 141 and the associated auxiliary file comprising radar cost file 25. Table 4 shows results for unclassified imagery.

TABLE 4

| FIG. | Image/Sensor | Manual Time (Min.) | Tracker Time (Min.) |
|---|---|---|---|
| 76 | IKONOS Pan | 320 | 120 |
| 77 | QuickBird Pan | 330 | 270 |
| 78 | Star3i Radar | 105 | 60 |
| 79 | IKONOS MSI | 270 | 165 |
| 88 | IKONOS Pan | 225 | 120 |
| 81 | QuickBird Pan | 150 | 90 |

Tests were conducted in the same manner on classified panchromatic image 20 and classified radar image 141 data provided by NGA. Results are shown in Table 5.

TABLE 5

| Image | Manual Time (Min.) | Tracker Time (Min.) |
|---|---|---|
| Pan 1 | 158 | 77 |
| Pan 2 | 60 | 45 |
| Radar | 111 | 192 |
| Radar | 231 | 22 |

In yet another embodiment of the present invention, method 300 comprises semi-automated vector-based editing tools and methods embedded in software for correcting errors in vector sets associated with previously extracted linear features of remotely-sensed imagery, regardless of the manner in which those linear features were previously extracted. A number of these editing tools embody in a single edit operation what would normally require multiple edit operations in prior art methods. As in method 200, method 300 may be performed with respect to multispectral image 14, hyperspectral image 15, panchromatic image 20 and radar image 141. Method 300 can be used to review and revise vector sets (e.g. path 30) associated with linear features previously extracted from remotely-sensed imagery using any known method, whether manual, automatic or semi-automatic. Unlike prior art methods, method 300 and its associated GUI with real-time, smooth-motion animation graphics affords the user the ability to continuously preview proposed edits to vector sets, including automatic topology cleaning, in real-time and on-the-fly, before the user accepts the edits. Prior art methods, by comparison, experience at least one of the following two weaknesses: (a) multiple edit operations are required to achieve the same effect as a single edit operation in method 300; (b) no preview capability is provided for edit operations, so that if the user decides an already-applied edit is unacceptable, the user must either "undo" the edit, or apply additional edit operations as "touch-up" to remedy the deficiencies of the first edit operation. Method 300 of the present invention may be used to efficiently increase the cartographic accuracy of previously extracted vector sets which may have been developed in accord with a lower standard of cartographic accuracy. In addition, as remotely-sensed landscapes evolve in time under natural and human influences, method 300 of the present invention may be used to efficiently update previous extractions where, in newer imagery, road 40, for example, has been rerouted, extended, or retracted.

Method 300 will now be described according to the embodiments disclosed herein. Paths 30 may be rendered in the graphical display as thin lines, or as ribbons, each ribbon having width 66 corresponding to the actual width of the linear feature (e.g., road 40). However, the present invention should not be viewed as being limited in this regard; paths 30 may be graphically displayed in a variety of colors, line styles and degrees of transparency as would become apparent to one of ordinary skill in the art after becoming familiar with the teachings of the present invention. In addition, method 300 is described herein as comprising a GUI including smooth animation graphic. The invention should not be viewed as being limited in this respect either, as other types of animation graphics are possible.

Method 300 comprises using 381 smart editing tools 280 aided by continuous-preview, real-time animation graphics; attributing 345 width 366 to path 30; using 302 excise functions 304; selecting 312 a plurality of vector sets on which to perform a uniform action; and extending 306 existing paths 30.

In one embodiment, method 300 comprises using 381 smart editing tools 280. As explained above, using 381 smart editing tools 280 comprises establishing 266 the maximum attachment radius 73, as shown in FIG. 50. Maximum attachment radius 73 comprises the distance (designated in meters or any other unit) that may define the region of influence 373 centered about centerpoint 375, which may be indicated by mouse click or merely the cursor location 321 associated with the motion-sensitive device. As shown in FIGS. 82-85, region of influence 373 is graphically displayed as a circle centered about centerpoint 375 (which may be coincident with cursor location 321) and whose radius is the maximum attachment radius 73. Region of influence 373 may be displayed in any other manner as would be obvious to one of ordinary skill in the art after becoming familiar with the teachings of this invention. In connection with method 300, the region of influence 373 may be described as the instantaneous area within which modification(s) or correction(s) are made to vector sets that overlap it.

Smart editing tools 280 of the present invention comprise corner/break installation 284 tool, 1-point detour 286 tool, N-point detour tool 288 tool, and move terminals 290 tool. These smart editing tools 280 have been described above. Because the smart editing tools 280 are vector-based, they may be applied to any path 30, 230 (e.g., vector set) associated with a graphic image or a raster image (e.g., remotely-sensed imagery), where path 30, 230 may or may not be associated with road 40, 240. As described above in connection with method 200, the definition of "linear feature" may include any feature captured in raster imagery such that the pixels of the feature lie within a neighborhood distance of a polygonal line, where the neighborhood distance is small by comparison to the total length of the polygonal line. Linear features in remotely-sensed imagery may include the centerlines of roads 40, trails, rivers 44, mountain ridges and ravines, as well as boundaries of lakes, rivers 44, snow pack, fields 43, buildings, other man-made structures, etc.

Also as explained above, operation of the smart editing tools 280 depends on establishing the region of influence 373 that is displayed graphically on the display screen in a portion of the remotely-sensed image that the user has selected. Generally, as used in connection with any of the smart editing tools 280, method 300 comprises selecting 283 one of the smart editing tools 280 by pressing an associated icon, for example. While the user could be the entity that first identifies 285 error 287 in path 30, that is not necessary in method 300. In method 300, error 287 may be automatically identified 285 using automatic image-based logic. Either way, proposed fixes 385 or corrections for error 287 in path 30 will be automatically and continuously suggested in real time based on the movement of the user's cursor (e.g., centerpoint 375) and region of influence 373, as will be explained in more detail below. All the proposed fixes 385 are displayed graphically (in a manner that visually distinguishes the proposed fixes 385 from path 30) for the user to preview 314 prior to committing 316 to one of them as the desired edit for error 287.

Once the smart editing tool 280 has been selected 283, the user uses the motion-sensitive device (e.g. mouse) to drag the centerpoint 375 (e.g., cursor) of region of influence 373 (causing the whole region of influence 373 to follow continuously) to a desired location. The user may also use the motion-sensitive device (e.g., mouse wheel, track ball, slider, touch pad) to vary the maximum attachment radius 73 or dimensions of the region of influence 373 to delimit an area within which modifications may be made to path 30. As the user drags the cursor and thereby moves the region of influence 373 (and centerpoint 375), certain or all paths 30 that overlap the region of influence 373 undergo modification within the region of influence 373 (in accord with the particular editing tool selected) automatically, continuously, and in real-time. Although method 300 is described in embodiments in which the mouse is used, the present invention should not be viewed as being limited in that respect. Moreover, method 300 is described in embodiments in which the cursor and centerpoint 375 are in the same location within the region of influence 373; however, the present invention should not be viewed as being limited in that respect either.

In addition, method 300 may also comprise activating 262 automatic vector revision functions prior to selecting 283 any of the smart editing tools 280. In that case, automatic vector revision functions, including automatic topology cleaning, will be performed on all vector sets that overlap the region of influence 373 as it is moved around the remotely-sensed image as viewed in the graphical display. Automatic vector revision functions of the present invention have been described above.

As the user moves the region of influence 373 around the remotely-sensed image in the graphical display, the user can visually preview 314 the fixes 385 that are proposed to the vector sets that overlap the instantaneous region of influence 373. Once the user is satisfied with the preview visualization of proposed fix 385, the user commits 316 to the proposed fix 385, for example, by single mouse-click against it. Proposed fixes 385 to path 30 may be graphically displayed in any manner that distinguishes them from the original state of path 30. For example, proposed fixes 85 may be displayed in a color or line style different from that of path 30, although other methods can be used. When the user commits 316 to the proposed fix 385 of path 30 as a final correction, the color and line style of new path 230 returns to that of original path 30. New path 230 is saved off to storage that persists the latest geometry and attribution of the vector sets symbolically— these could be a shape table, output vector file 24, or geodatabase, among others. In another embodiment, the color and line style of new path 230 could be changed back to that of original path 30 during the storage step.

In the embodiments described herein, the proposed fixes 385 are not saved off to storage that persists the latest geometry 46 and attribution 45 of the vector sets symbolically until the user commits 316. However, in another embodiment, the proposed fixes 385 could be saved off to such storage during the preview 314 and prior to commit 316. In such cases, the commit 316 operation does nothing other than end the preview 314 session.

Method 300 will now be described when using the 1-point detour tool 286. Embodiments of the 1-point detour 286 tool have been discussed in detail above. If the user has selected 283 the 1-point detour 286 tool as the desired smart editing tool 280, then in response to the user's current cursor location 321 and the associated region of influence 373 about that location, method 300 will automatically select path 30 and apply the 1-point detour 286 tool to it, so as to correct path 30 where it deviates unacceptably far from the true centerline of the road 40.

FIG. 82 illustrates the operation of 1-point detour 286 tool as part of method 300. As shown in FIG. 82(A), the user begins to drag the cursor (in this case, coincident with centerpoint 375) and the associated region of influence 373 in the direction of path 30 containing error 287. The cursor location 321 (e.g., centerpoint) 375 is now in the vicinity of error 287. As used herein, "in the vicinity" means at, on or near. When the cursor location 321 is moved closer to road 40 as shown in FIG. 82(B), proposed fix 385 (which has automatically re-routed path 30 through the cursor location 321, as well as centerpoint 375, within the region of influence 373) is suggested and displayed on the graphical display (as a semi-transparent ribbon of different color from that of path 30), allowing the user to preview 314 proposed fix 385. Having rejected proposed fix 385, the user moves the cursor location 321 (e.g., centerpoint 375) still closer to road 40 as shown in FIG. 82(C) and now proposed fix 385' is suggested, allowing the user to preview 314 that proposed fix 385'. Having rejected proposed fix 385', the user places the cursor (and, therefore, centerpoint 375) at cursor location 321 on road 40 as shown in FIG. 82(D), and proposed fix 385" is suggested. In each of FIG. 82 (B, C, D), the 1-point detour 286 tool has automatically rerouted path 30 through the current cursor location 321, as well as centerpoint 375, within the confines of the current region of influence 373. No intermediate placement of anchor points 332, 334 or additional anchor points 332a, 334a is required. The 1-point detour 286 tool automatically generates the smooth new path 230. New path 230 preserves the original locations of the end anchor points 32, 34 of the path 30 and now smoothly approximates the centerline of road 40. The length 64 of path 230 may be automatically reattributed 245. In another embodiment, the width 66 of path 230 may also be reattributed 245. In a preferred embodiment, where the path 30 is very curvy, the maximum attachment radius 73 may be beneficially established 266 as 15 m prior to the 1-point 286 detour smart edit operation; where the path 30 is not very curvy, the maximum attachment radius 73 may be beneficially established 266 as 30 m prior to the 1-point detour 286 smart edit operation.

Once the user has previewed 314 proposed fix 385" as path 230 and is satisfied with the look of the modifications, the user may commit 316 to the proposed fix 385", which in the present embodiment is achieved with one mouse-click. The proposed fix 385" realized as path 230 is thus saved off to storage that persists the latest geometry 46 and attribution 45 of the vector sets symbolically which, in the present embodiment, is a shape table. As the proposed fix 385" realized as path 230 has been committed 316, its color and line style revert back to that of path 30.

The 1-point detour 286 tool of the present invention may also be used in conjunction with the automatic topology cleaning, as shown in FIG. 83. In this embodiment, aided by automatic topology cleaning, the 1-point detour 286 tool handles the T junction (e.g., intersection 42) involving two paths 30, 30*a* where path 30 plays the role of the crossbar of the T and path 30*a* plays the role of the vertical bar of the T. In what follows, the user directly edits path 30 with 1-point detour 286 tool, while path 30*a* is affected indirectly by the edit and updated automatically in real-time in accord with automatic topology cleaning so as to maintain the T-like incidence of the two paths 30, 30*a*. As shown in FIG. 83(A), the user begins to drag the cursor (in this case, coincident with centerpoint 375) and the associated region of influence 373 in the direction of path 30 containing error 287. The cursor (e.g., centerpoint 375) is now in the vicinity of error 287. When the cursor, as well as centerpoint 375, are moved closer to road 40 as shown in FIG. 83(B), proposed fix 385 (which reroutes path 30 through the current cursor location and centerpoint 375 and within the region of influence 373) is suggested and displayed on the graphical display (as a semi-transparent ribbon of different color from that of path 30). In this case, proposed fix 385 includes both path 30 and path 30*a* since the region of influence 373 overlaps both of these paths 30, 30*a*. While path 30 contains error 287, the repair of path 30*a* is induced because of its incidence to path 30 and is handled automatically via automatic topology cleaning. Having rejected proposed fix 385, the user moves the cursor, as well as centerpoint 375, still closer to road 40 in the vicinity of intersection 42 as shown in FIG. 83(C) and now proposed fix 385' is suggested, allowing the user to preview that proposed fix 385'. Having rejected proposed fix 385', the user moves the cursor, as well as centerpoint 375, to a location directly on road 40 in the vicinity of intersection 42 as shown in FIG. 83(D) and now proposed fix 385" is suggested, allowing the user to preview that proposed fix 385". The 1-point detour tool 286 in conjunction with automatic topology cleaning has now automatically rerouted the two paths 30, 30*a* so that they exhibit the correct geometry in relation to intersection 42. According to an embodiment of method 300, the 1-point detour 286 tool may accomplish the rerouting of paths 30, 30*a*, to paths 230, 230*a* without the user having to specify anchor points 232, 234, or additional anchor points 232*a*, 234*a*. Revised paths 230, 230*a* may be reattributed 245 automatically and separately.

Once the user has previewed 314 proposed fix 385" as path 230, 230*a* and is satisfied with the look of the modifications, the user may commit 316 to the proposed fix 385", which in the present embodiment is achieved with one mouse-click. The proposed fix 385" as path 230 is made permanent and saved off to storage that persists the latest geometry 46 and attribution 45 of the vector sets symbolically, which in the present embodiment is a shape table. Once the proposed fix 385" as path 230 has been committed 316, its color and line style revert back to that of path 30.

In yet another embodiment of method 300, 1-point detour 286 tool may be used to repair two tandem paths 30, 30*a*. Given two tandem paths 30, 30*a* (e.g., end-to-end), 1-point detour tool 286 handles the two paths 30, 30*a* in seamless fashion as if they constituted single super path 330. Then, the 1-point detour 286 tool automatically breaks the super path 330 into two new paths 30*b*, 30*c* that are incident end-to-end. The incidence location of the two new paths 30*b*, 30*c* has a natural relationship to the incidence location of the original two paths 30, 30*a*. (The 1-point detour 286 tool's handling of tandem paths 30, 30*a* was discussed above in connection with FIG. 63 to illustrate an embodiment of method 200.)

Method 300 may also comprise using 381 the N-point detour 288 tool as the desired smart editing tool 280. If the user has selected 283 the N-point detour 288 tool as the desired smart editing tool 280, then in response to the user's current cursor location 321 and the associated region of influence 373 about that cursor location 321, method 300 will automatically select path 30 and apply the N-point detour 288 tool to it, so as to correct path 30 where it deviates unacceptably far from the true centerline of the road 40.

Figure 84A:
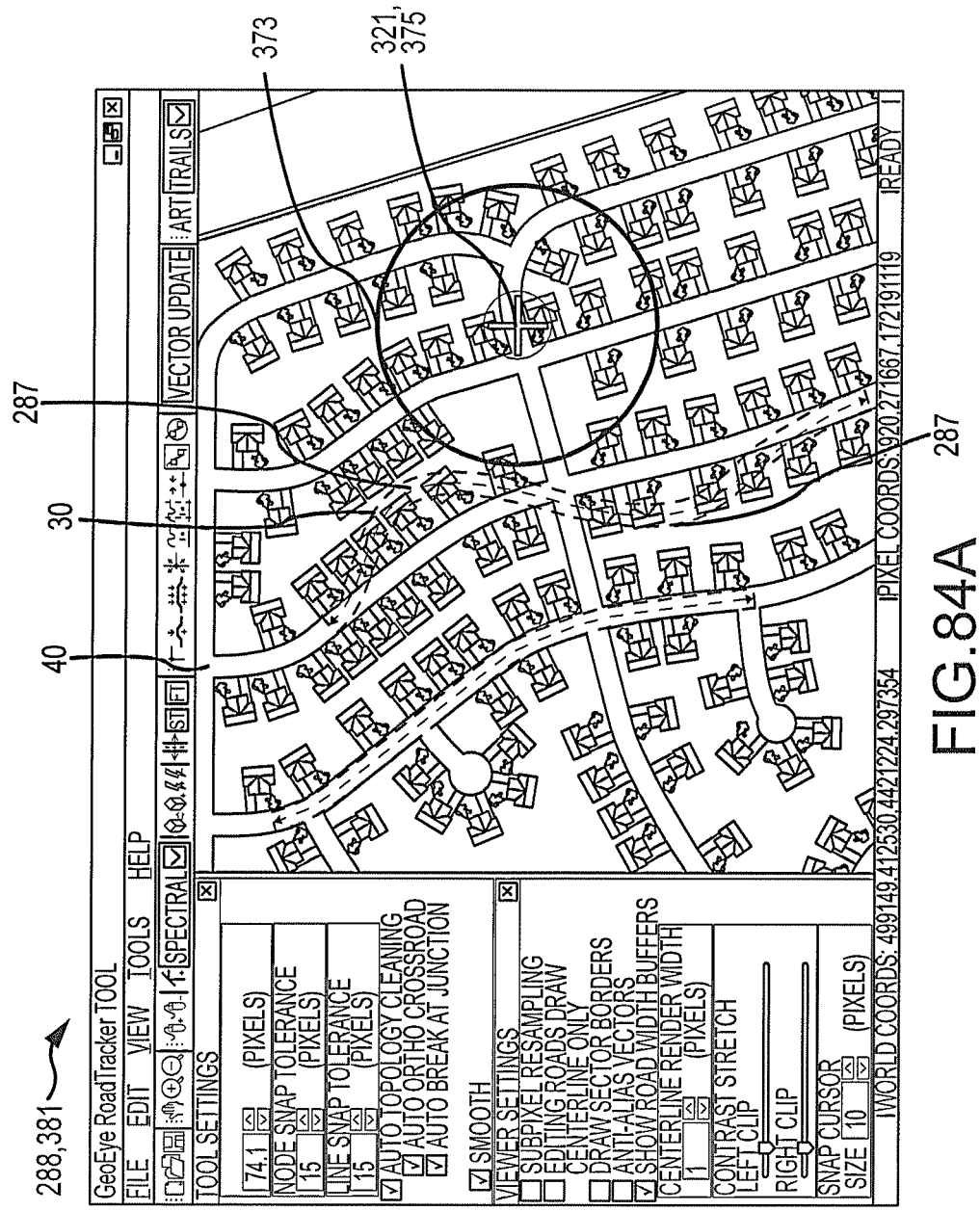
FIG. 84 shows using an embodiment of the N-point detour tool.
Figure 84B:
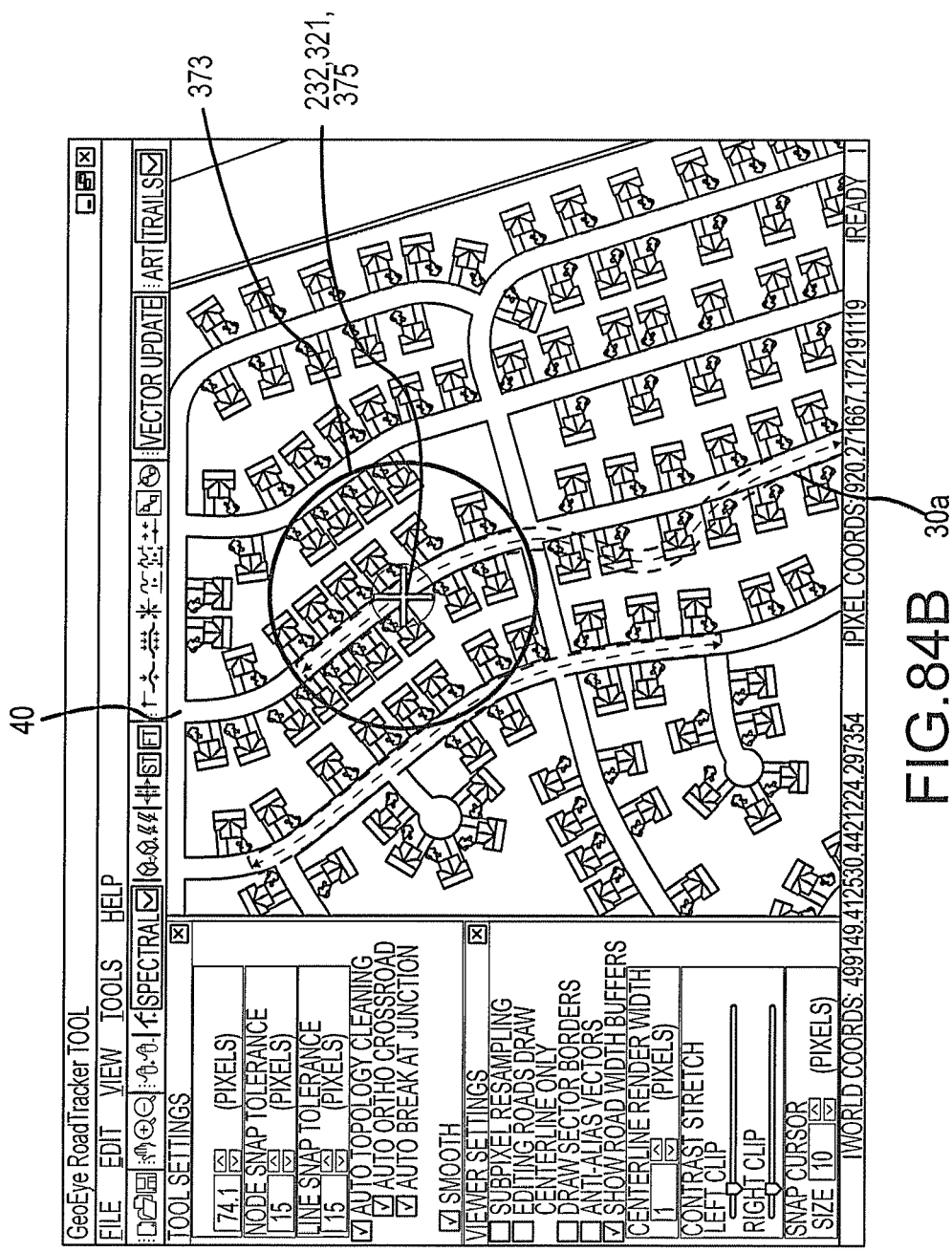
Figure 84C:
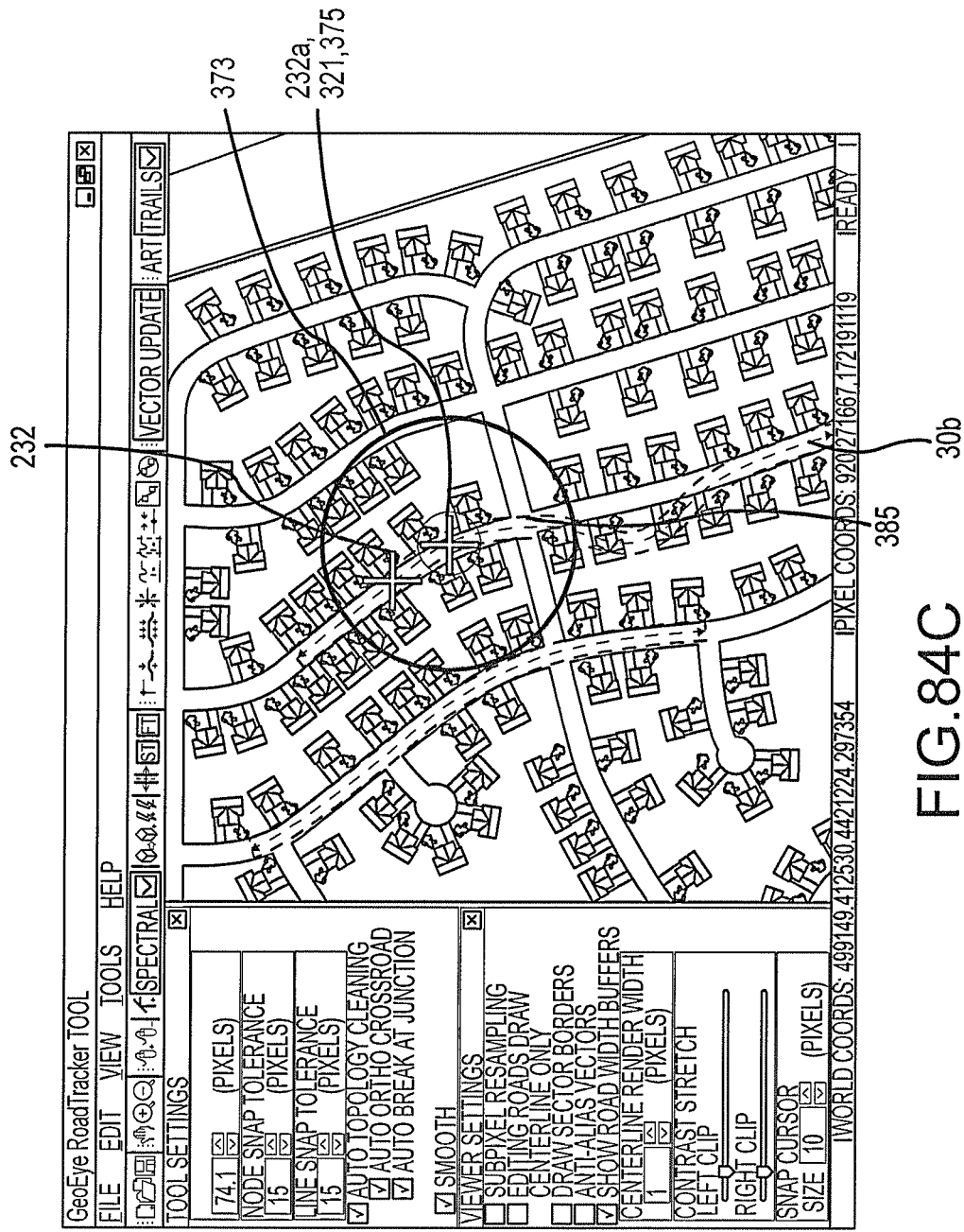
Figure 84D:
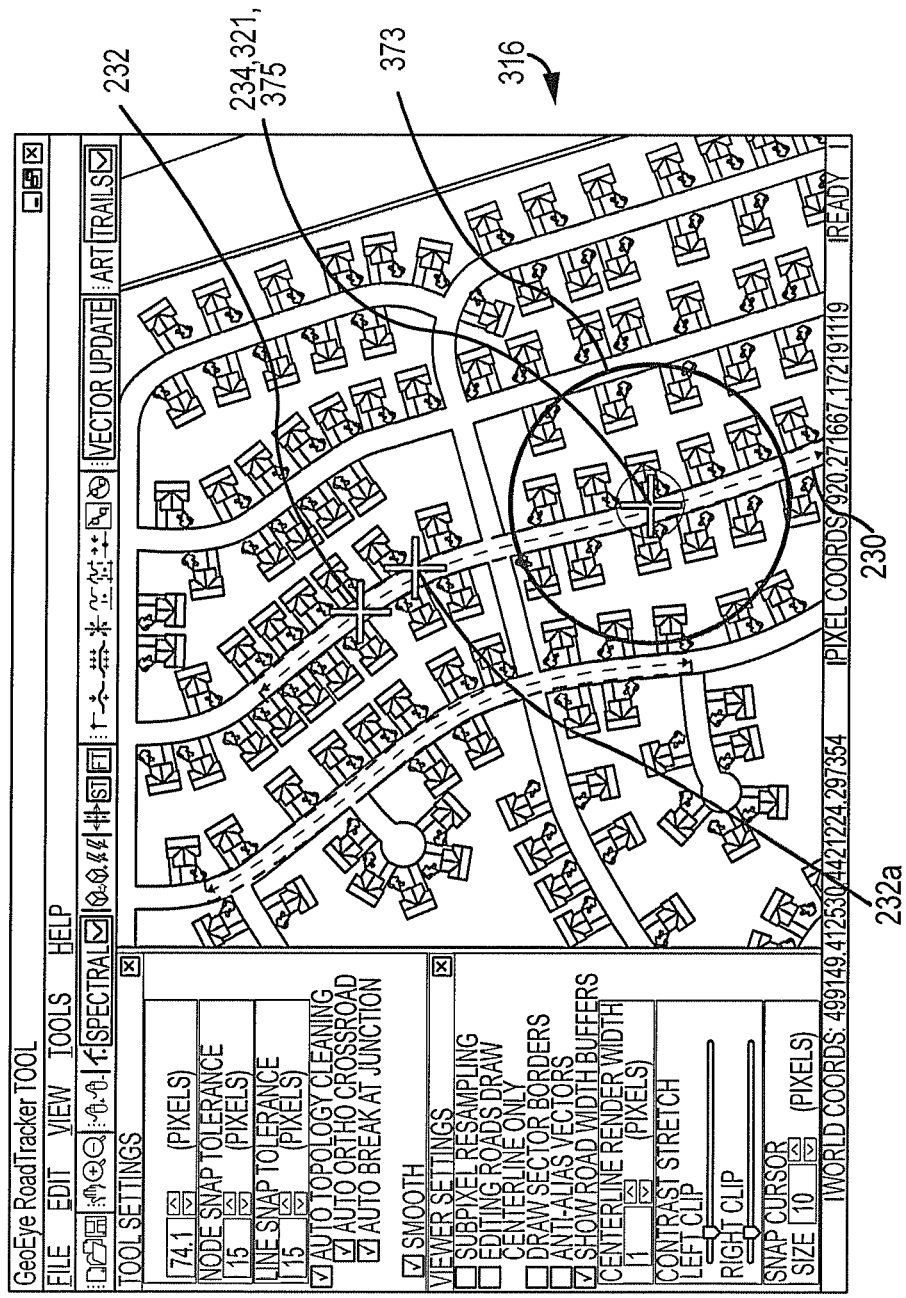

As shown in FIG. 84(A), once the N-point detour 288 tool has been selected 283, the user begins to drag the cursor (coincident with centerpoint 375) and the associated region of influence 373 in the direction of path 30 containing error 287. The cursor location 321 (e.g., centerpoint 375) is now in the vicinity of error 287. When the user moves the cursor location 321, as well as centerpoint 375, to the location shown in FIG. 84(B), the N-point detour 288 tool automatically reroutes path 30 through this cursor location 321 (and centerpoint 375) within the region of influence 373 as shown. The user now clicks with the mouse at this cursor location 321 to establish anchor point 232 on the rerouted path 30*a*. The rerouted path 30*a* is visually displayed as a semi-transparent ribbon of color or line style different from that of original path 30 shown in FIG. 84(A). Next, the user moves the cursor location 321, as well as centerpoint 375, and the associated region of influence 373 to the location shown in FIG. 84(C). The N-point detour 288 tool takes rerouted path 30*a* of FIG. 84(B) that goes through anchor point 232, and automatically reroutes it through the new cursor location 321 (e.g., centerpoint 375) in FIG. 84(C) within the region of influence 373. The user now clicks at this cursor location 321 to establish anchor point 232*a* on the latest rerouted path 30*b*. The latest rerouted path 30*b* now passes through both anchor points 232, 232*a*. Next, the user moves the cursor location 321, as well as centerpoint 375, and the associated region of influence 373 to the location shown in FIG. 84(D) inducing the reroute of path 30*b* shown there. The user now double clicks at this cursor location 321 to establish anchor point 234 on this latest rerouted path 230 and to designate anchor point 234 as the final anchor point 234 in the sequence. The latest rerouted path 230 now passes through all three anchor points 232, 232*a*, and 234. Upon the double click, the new path 230 is saved off to storage that persists the latest geometry 46 and attribution 45 of the vector sets symbolically which, in the present embodiment, is a shape table. As the path 230 has been committed 316, its color and line style revert back to that of path 30.

The rerouting of path 30 does not modify path 30 outside the areas which variously overlap the region of influence 373 centered about the anchor points 232, 232*a*, 234. New path 230 preserves the original locations of end anchor points 32, 34 of the path 30. The length 64 of path 230 is automatically reattributed 245. In another embodiment, the width 66 of path 230 may also be automatically reattributed 245.

If the user selects just two anchor points 232, 234 during application of N-point detour 288 operation, then the portion of new path 230 that spans the two anchor points 232, 234 may simply be a straight line, and the path 230 may not be smooth at those two anchor points 232, 234 (in other words, an angle in path 230 may appear at one or both anchor points 232, 234). In another embodiment, the N-point detour 288 tool may be applied to two tandem paths 30, 30a, where the first user-selected 52 anchor point 32 in the N-point detour 288 operation is in the vicinity of path 30 and the last user-selected 52 anchor point 32a in the N-point detour 288 operation is in the vicinity of path 30a. In that case, the tandem configuration of path 30 and 30a is treated by the N-point detour 288 operation as a single path, resulting in a rerouted new path 230 that is then automatically partitioned at a point along its trajectory that has a natural relationship to the tandem point where path 30 and path 30a had met. This results in two revised tandem paths 30, 30a that may be reattributed 245 automatically and separately.

In another embodiment, method 300 may comprise using 381 the move terminals 290 tool as the desired smart editing tool 280 to move the terminating anchor points 32, 32a, 34, 34a of paths 30, 30a, 30b, 30c to the single new collective anchor point 232. The user may select 283 the move terminals 290 tool after identifying 285 error 287. If the user has selected 283 the move terminals 290 tool as the desired smart editing tool 280, then in response to the user's current cursor location 321 and the associated region of influence 373 about that location, method 300 will automatically select path 30 and apply the move terminals 290 tool so as to correct path 30 where it deviates unacceptably far from intersection 42.

Figure 85A:
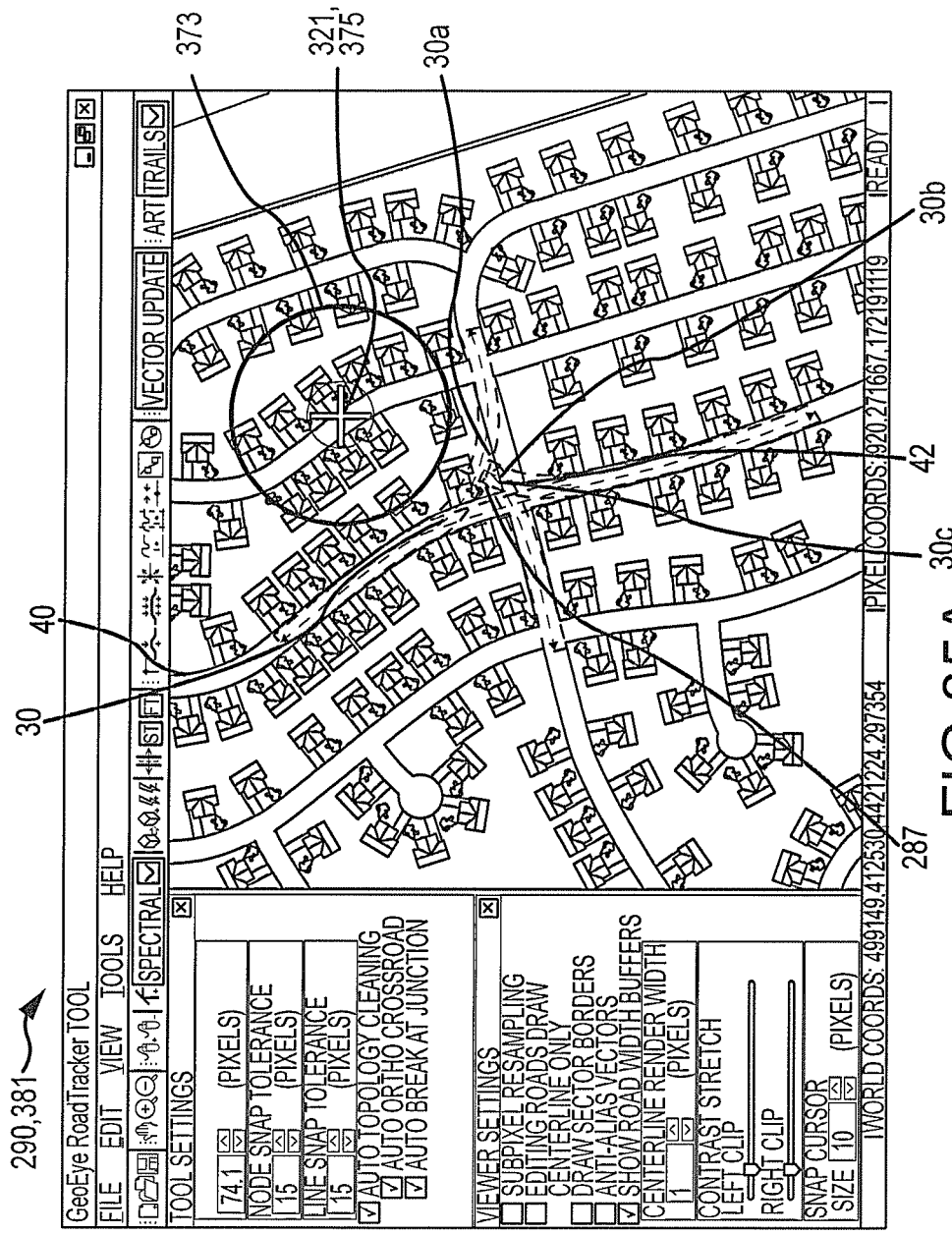
FIG. 85 shows using an embodiment of the move terminals tool.
Figure 85B:
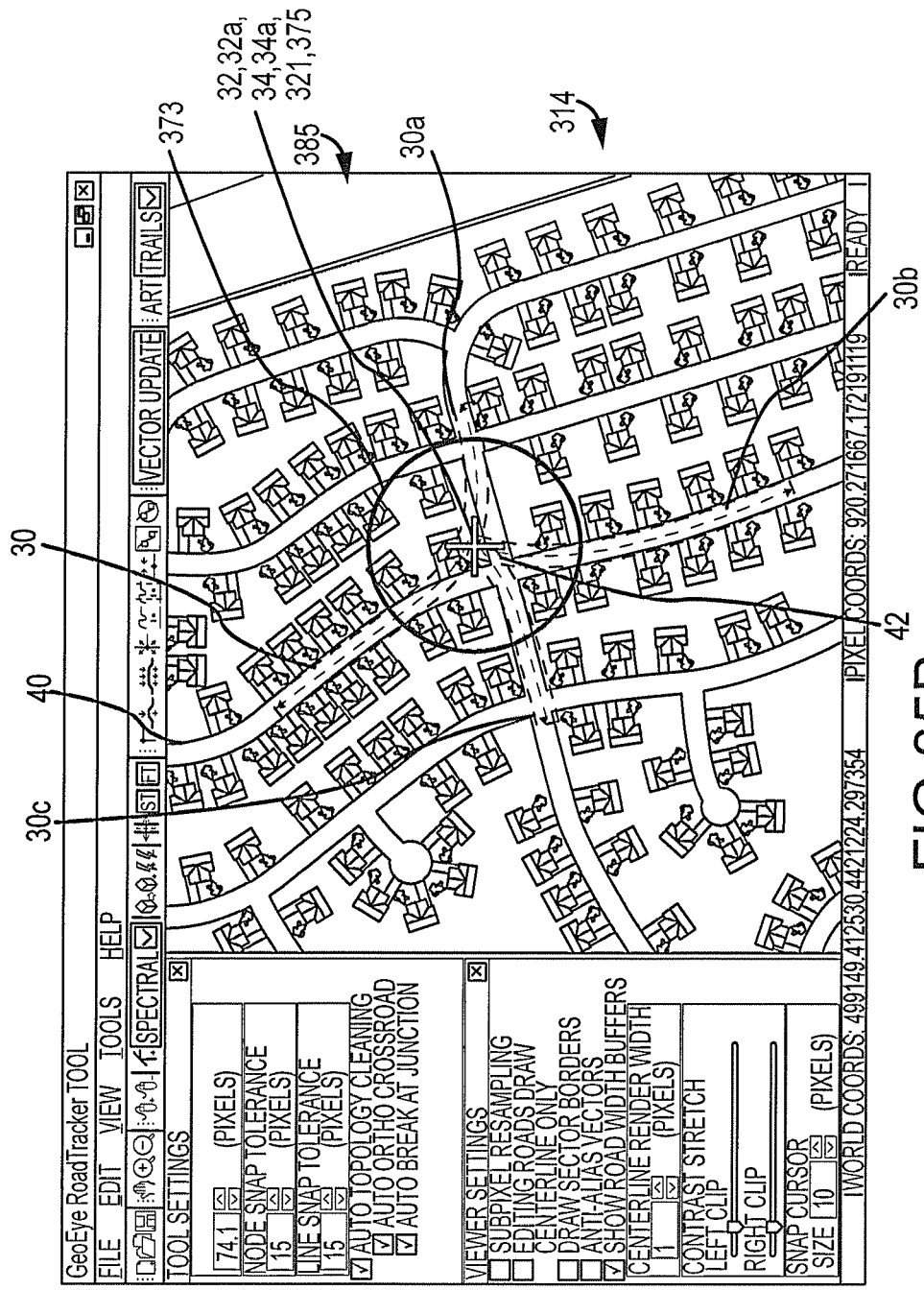
Figure 85C:
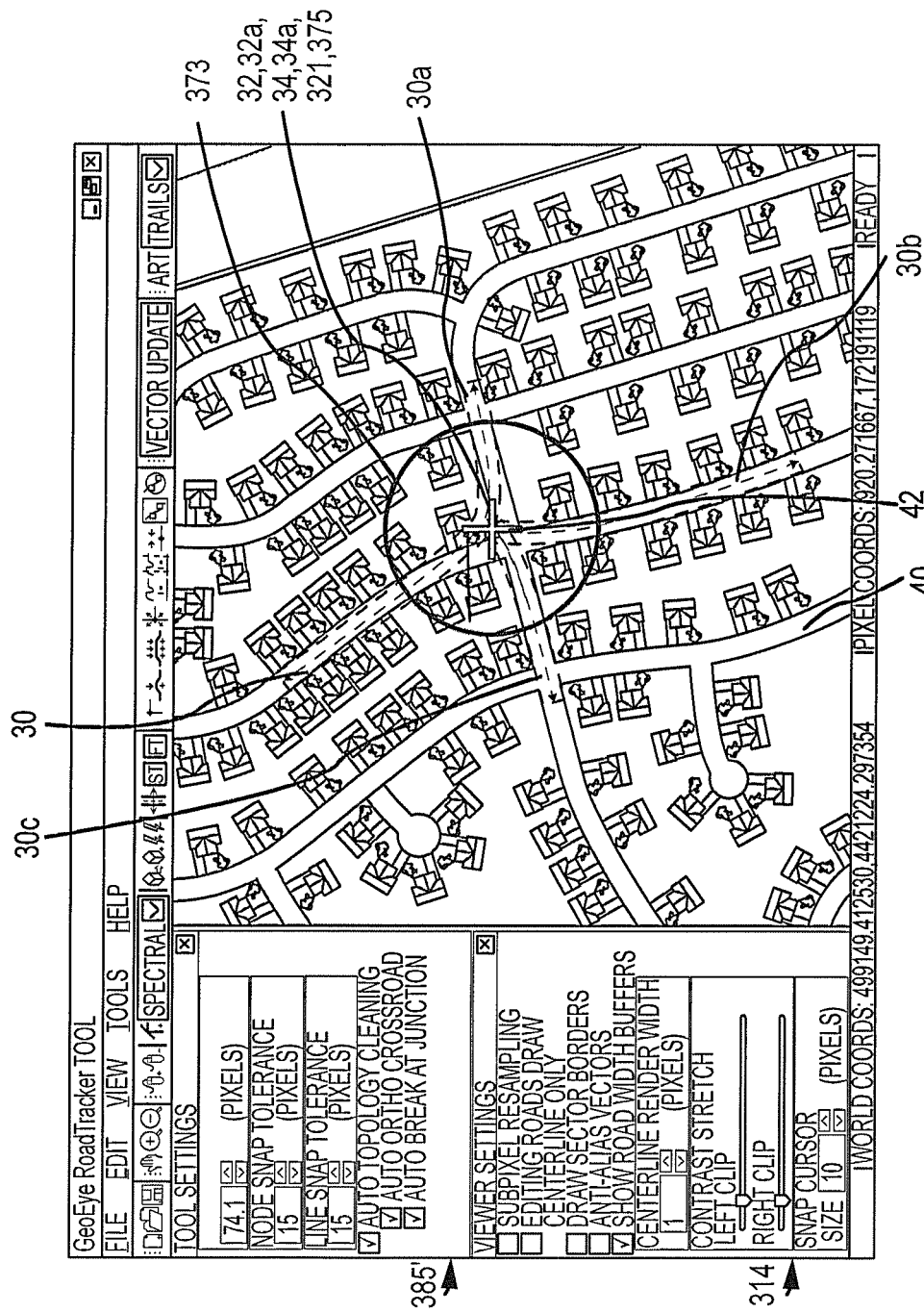
Figure 85D:
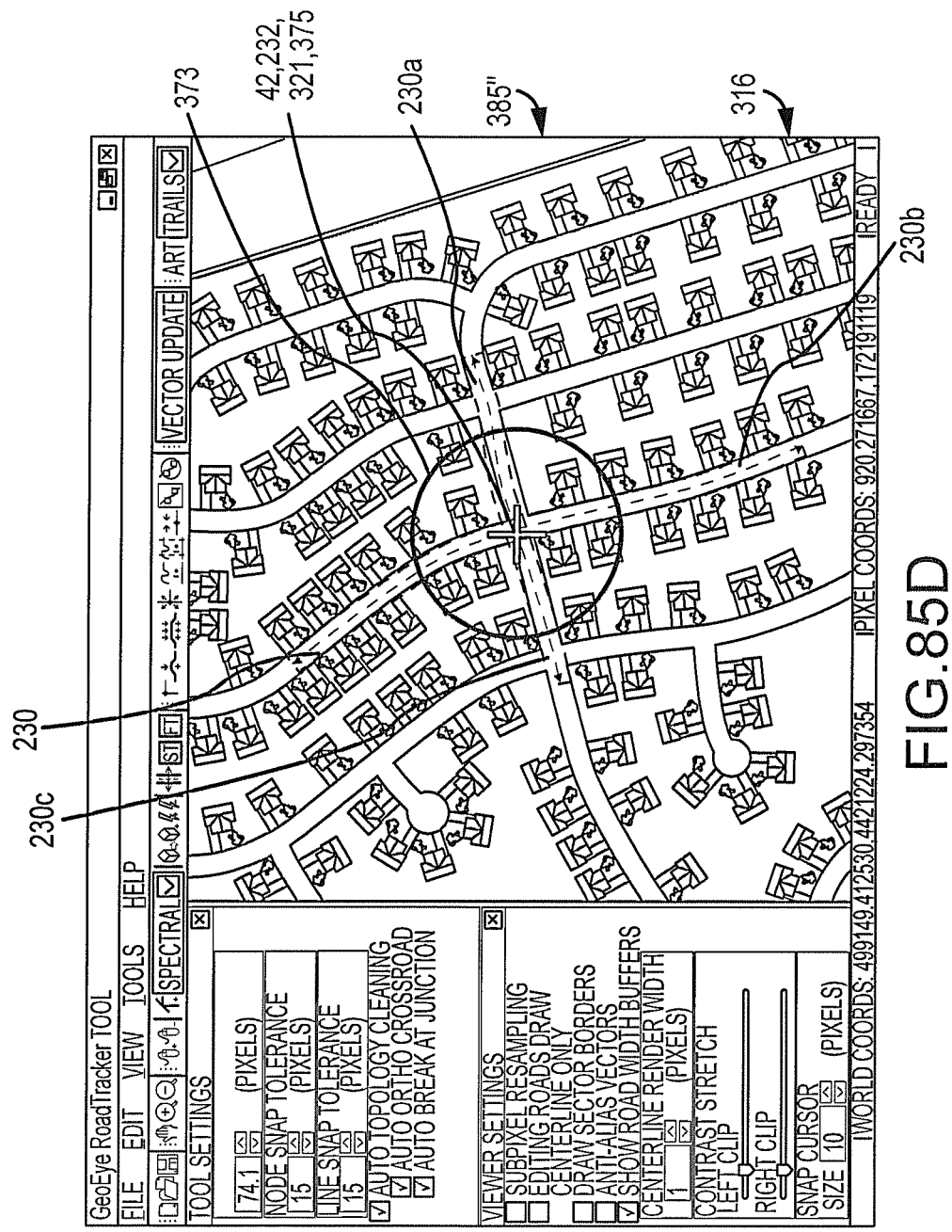

As shown in FIG. 85(A), once the move terminals 290 tool has been selected 283, the user begins to drag the cursor (coincident with centerpoint 375) and its associated region of influence 373 in the direction of path 30 containing error 287 where paths 30, 30a, 30b, and 30c do not meet properly at intersection 42. The cursor location 321 (e.g., centerpoint 375) is now in the vicinity of error 287. When the user moves the cursor location 321 (e.g., centerpoint 375) to the location shown in FIG. 85(B), the region of influence 373 contains at least one terminating anchor point 32, 32a, 34, 34a of existing paths 30, 30a, 30b, 30c. The move terminals tool 290 automatically proposes to relocate these terminating anchor points 32, 32a, 34, 34a to a common terminal at the cursor location 321 (e.g., centerpoint 375), and reroutes the paths 30, 30a, 30b, 30c accordingly within the region of influence 373, resulting in proposed fix 385. Having rejected proposed fix 385, the user moves cursor location 321 (as well as centerpoint 375) and the region of influence 373 closer to intersection 42, as shown in FIG. 85(C). The move terminals 290 tool automatically proposes the common terminal at the cursor location 321 (e.g., centerpoint 375) and reroutes the paths 30, 30a, 30b, 30c accordingly within the region of influence 373, resulting in proposed fix 385'. Having rejected proposed fix 385', the user moves cursor location 321 (e.g., centerpoint 375) to coincide with intersection 42, as shown in FIG. 85(D). Again, the move terminals 290 tool automatically proposes the common terminal at the cursor location 321 (e.g., centerpoint 375) and reroutes the paths 30, 30a, 30b, 30c accordingly within the region of influence 373, resulting in proposed fix 385". Assuming the user is satisfied with the preview 314 of proposed fix 385", the user clicks at the current cursor location 321 (e.g., centerpoint 375) to establish anchor point 232 as the common terminal for paths 230, 230a, 230b, 230c. The proposed fix 385" is committed 316 and saved off to storage that persists the latest geometry 46 and attribution 45 of the vector sets symbolically which, in the present embodiment, is a shape table. Once the proposed fix 385" is committed 316, the color and line style of paths 230, 230a, 230b, 230c revert back to those of paths 30, 30a, 30b, 30c.

In another embodiment of method 300, the move terminals 290 tool may also be applied to a T or +intersection 42 where the valence of the intersection 42 (3 for T, 4 for +) is one greater than the number of paths terminating at the intersection 42 (e.g., path 30 involved in the intersection 42 passes though the intersection 42, while paths 30a, 30b more or less terminate there), in similar manner to that explained above to propose the common terminal for paths 30a, 30b on path 30 at intersection 42. See FIG. 67. This can be done by setting the line snap distance 74a sufficiently large and then moving the cursor location 321 (e.g., centerpoint 375 (which takes along the region of influence 373)) in the vicinity of intersection 42. The move terminals 290 tool will automatically propose fix 385, comprising the common terminal (snapped to path 30 as allowed by the line snap distance 74a) for paths 30a, 30b. Assuming the user is satisfied with the preview 314 of proposed fix 385, the user clicks at the cursor location 321 (e.g., centerpoint 375) to establish anchor point 232 as the common terminal on path 30 for paths 30a, 30b. As before, paths 30a, 30b are rerouted within the region of influence 273, 373. In the embodiment described, the region of influence 373 is centered about the current cursor location 321 (e.g., centerpoint 375). In another embodiment the region of influence 373 may be centered about the point 31 on path 30 that is close or closest to the current cursor location 321.

While steps for using 381 the smart editing tools 280 as part of method 300 has been variously described, it is important to remember that the various operations and algorithms enable real-time, automatic, on-the-fly updates to the vector sets (e.g., paths 30) in the graphical display. To the user, the proposed fixes 385 adjust smoothly and continuously in the graphical display in response to the current cursor location 321 and associated region of influence 373. Thus, advantageously, in response to movement of the cursor, paths 30 appear to be continuously redrawn without the need to add additional anchor points 232a, 234a, and without the need for mouse-clicks, except to commit to the proposed fix 385" after previewing 314 other proposed fixes 385, 385'. Prior art methods, by comparison, experience at least one of the following two weaknesses: (a) multiple edit operations are required to achieve the same effect as a single edit operation in method 300; (b) no preview capability is provided against edit operations, so that if the user decides an already-applied edit is unacceptable, he must either "undo" the edit, or apply additional edit operations as "touch-up" to remedy the deficiencies of the first edit operation. Thus, method 300 minimizes user effort and tedium in relation to the activity of editing extracted vector sets (e.g. path 30) toward the goal of making cartographically-accurate maps.

Method 300 may further comprise editing path 30 by attributing 345 or reattributing the feature width ("width", for short) 366 to path 30. In prior art methods, when no acceptable image-independent default width is available for path 30, and when no automatic image-based logic is available to accurately assess the width of path 30, the user typically computes the width of the linear feature represented by path 30 via manual measuring tools, for example, a tool that allows the user to stretch a graphical rubber band across the short axis of the linear feature and return the length of the rubber band in appropriate units. However, using the present invention, attributing 345 width 366 is easier and in some cases more accurate than explicit manual measurement, particularly when there is local variability in the width of the feature along its centerline, so that an average or representative width is truly what is desired. The present invention allows the user to adjust the proposed width 366', 366" of path 30 (taken as the centerline of the linear feature) continuously via the motion-sensitive device (e.g., mouse wheel, slider bar) and to preview 314 the results of that action in real time in the graphical display. For each proposed width 366', 366" for path 30, the user can see how well that width 366', 366" agrees with the actual width 366 of the corresponding linear feature in the image.

Figure 86A:
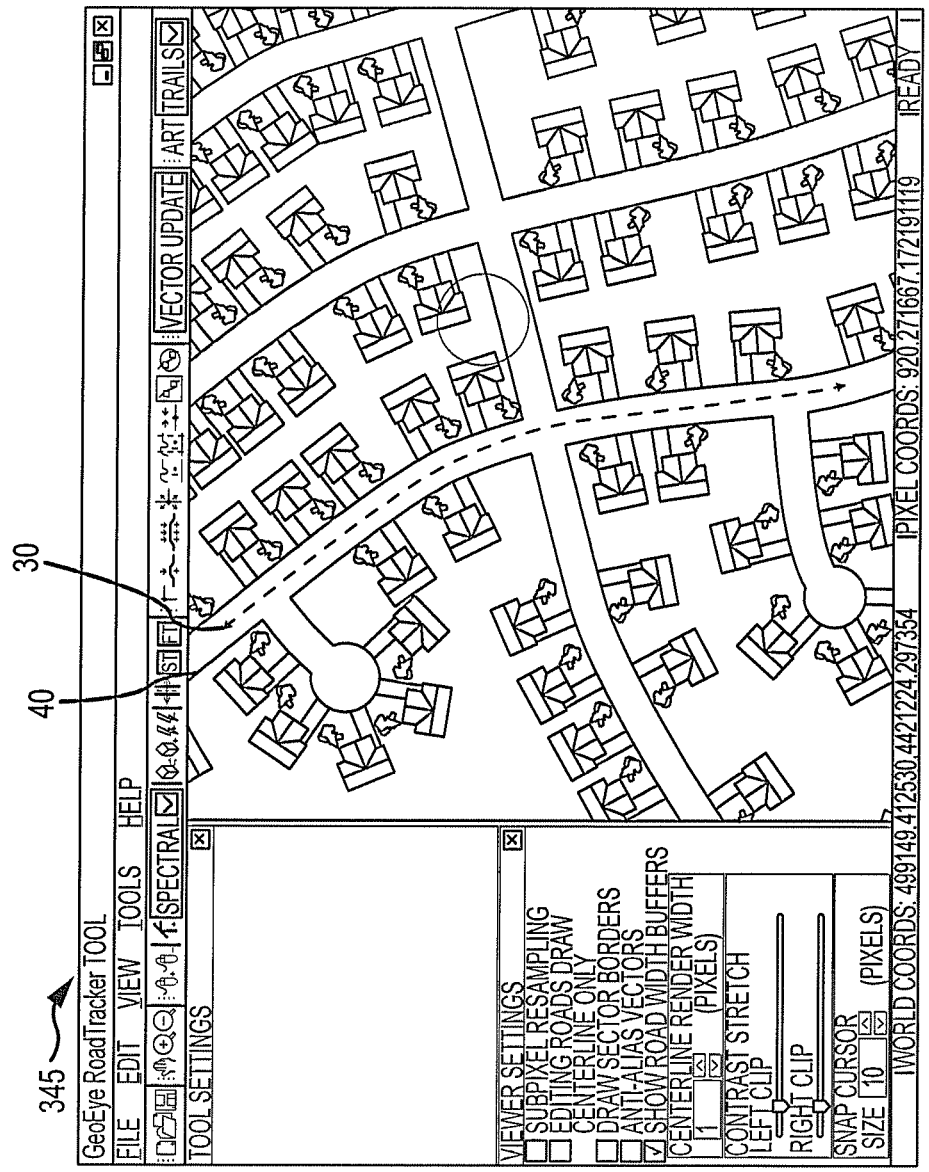
FIG. 86 shows an embodiment of attributing the width to the path.
Figure 86B:
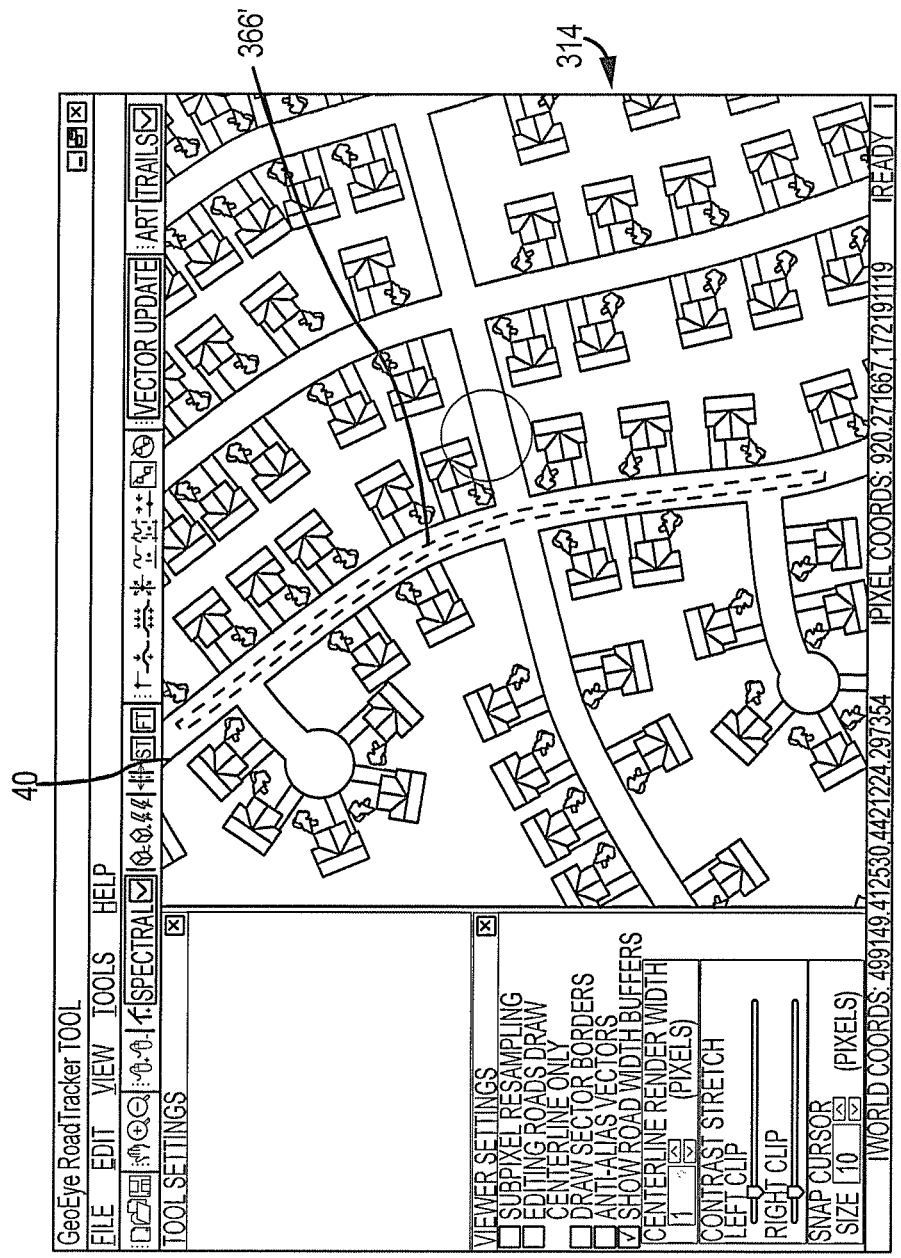
Figure 86C:
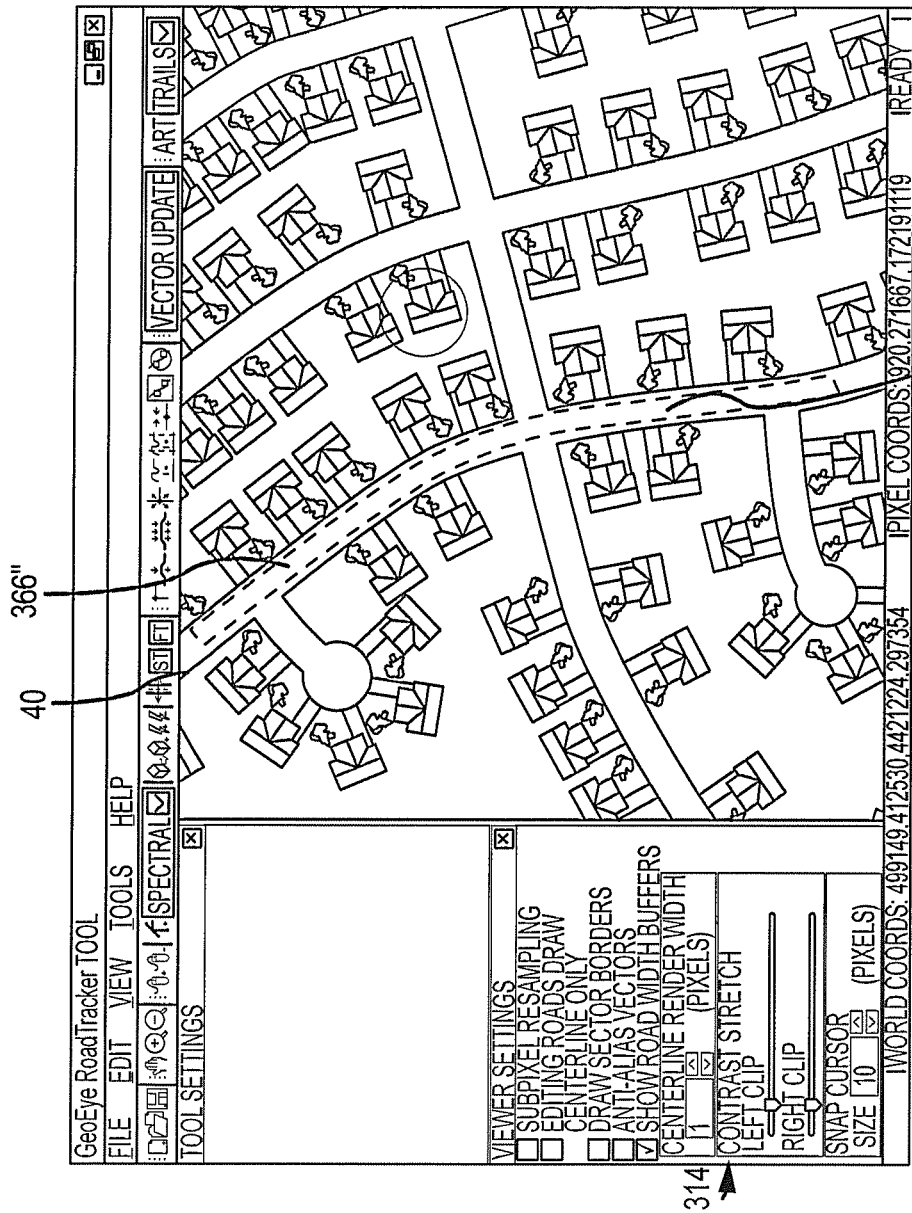
Figure 86D:
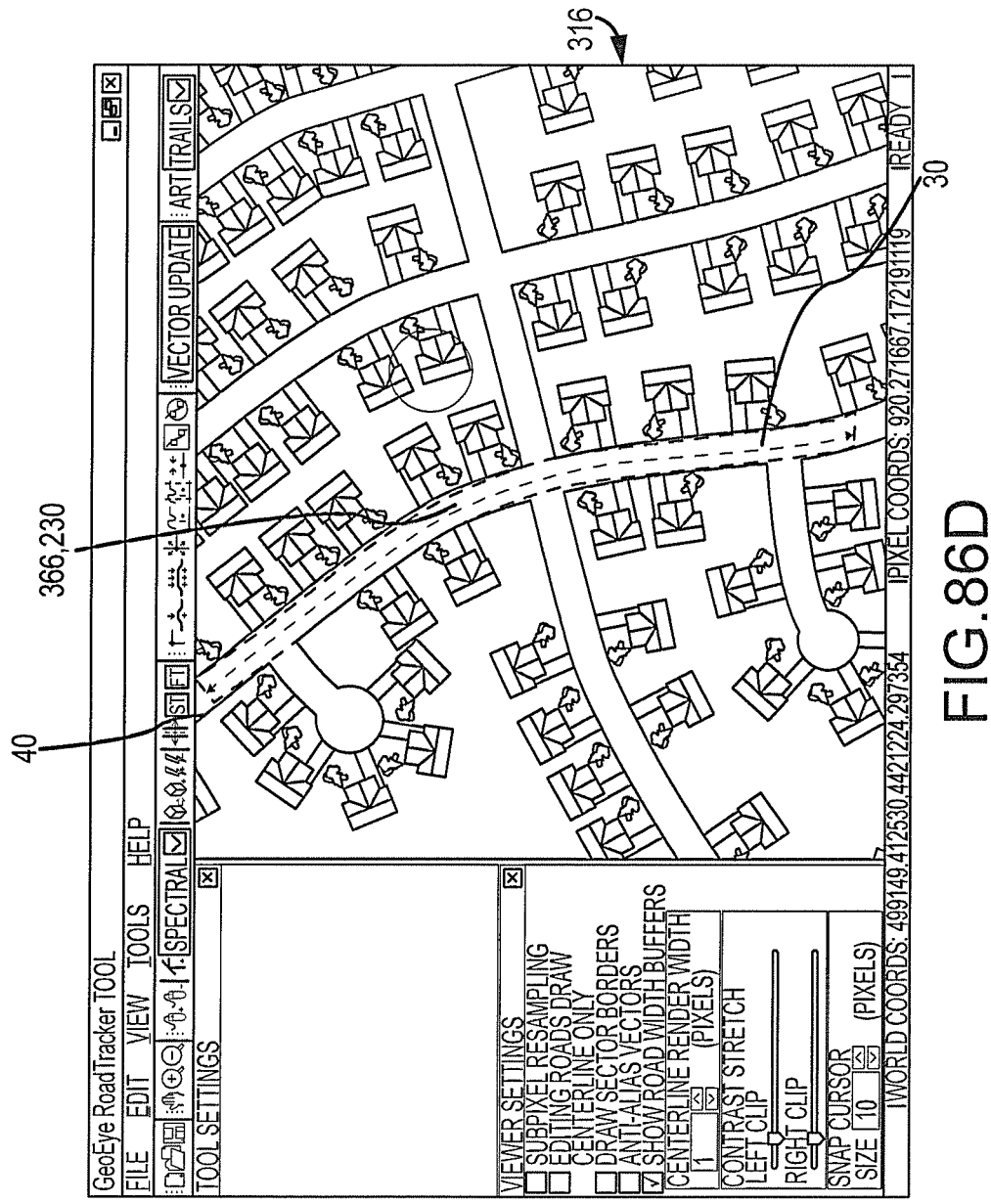

In FIG. 86(A), path 30 is depicted by a narrow centerline of road 40. Once the tool is activated, attributing 345 width 366 may begin by rendering path 30 as a semi-transparent or opaque ribbon of uniform width 66, such as a default or currently-assigned width, on the remotely-sensed image in the graphical display, as shown in FIG. 86(B). The ribbon may be displayed with the centerline designated, but this is not required. The ribbon width is tied to and may be continuously varied by operation of the motion-sensitive device (e.g., mouse wheel, slider bar). As shown in FIGS. 86(C) and (D), width 366', 366" is continuously varied, automatically, on-the-fly and in real time until the user is satisfied that the final width 366 fills all or nearly all of the space occupied by road 40. Again, the user has the ability to visually preview 314 proposed widths 366', 366" before committing 316. Committing 316 to final width 366 for path 230 means saving off the final width 366 for path 230 to the storage that persists the latest geometry 46 and attribution 45 of the vector sets symbolically which, in the present embodiment, is a shape table. This is assuming that saving off to such storage was not occurring during the previews 314. Otherwise the commit 316 step simply means terminating the current width-preview session.

In another embodiment of method 300, path 30 may be smoothed in a manner similar to that which was just described for attributing 345 width 366. Methods for smoothing path 30 have previously been described. According to method 300, path 30 may be globally smoothed 318 by using the motion-sensitive device (e.g., mouse wheel, slider bar) to vary the level of global smoothing 318 applied to the path 30. The result is displayed visually in the graphical display. Once the continuous global smoothing 318 tool has been activated, the user can preview 314 the effects of different levels of global smoothing 318 on the path 30 shown in the graphical display.

Figure 87A:
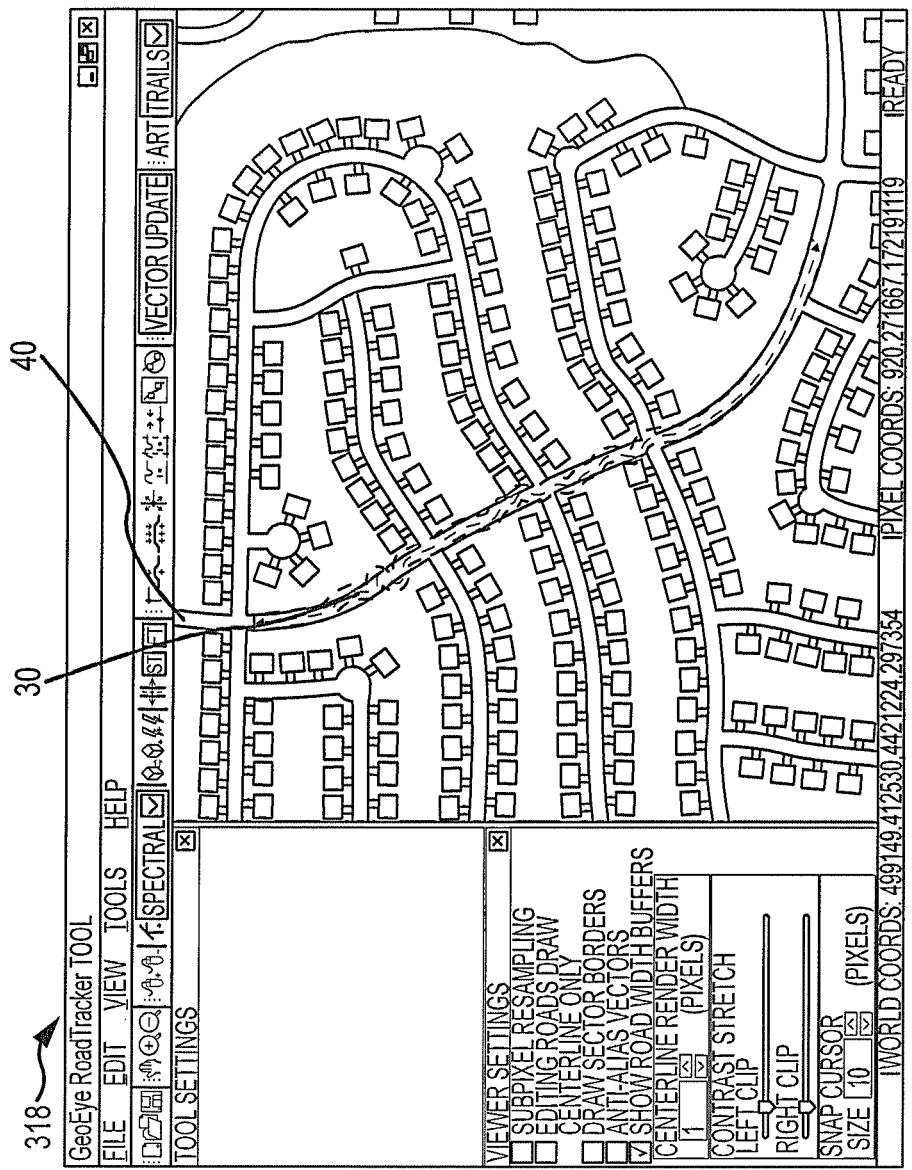
FIG. 87 shows using global smoothing.
Figure 87B:
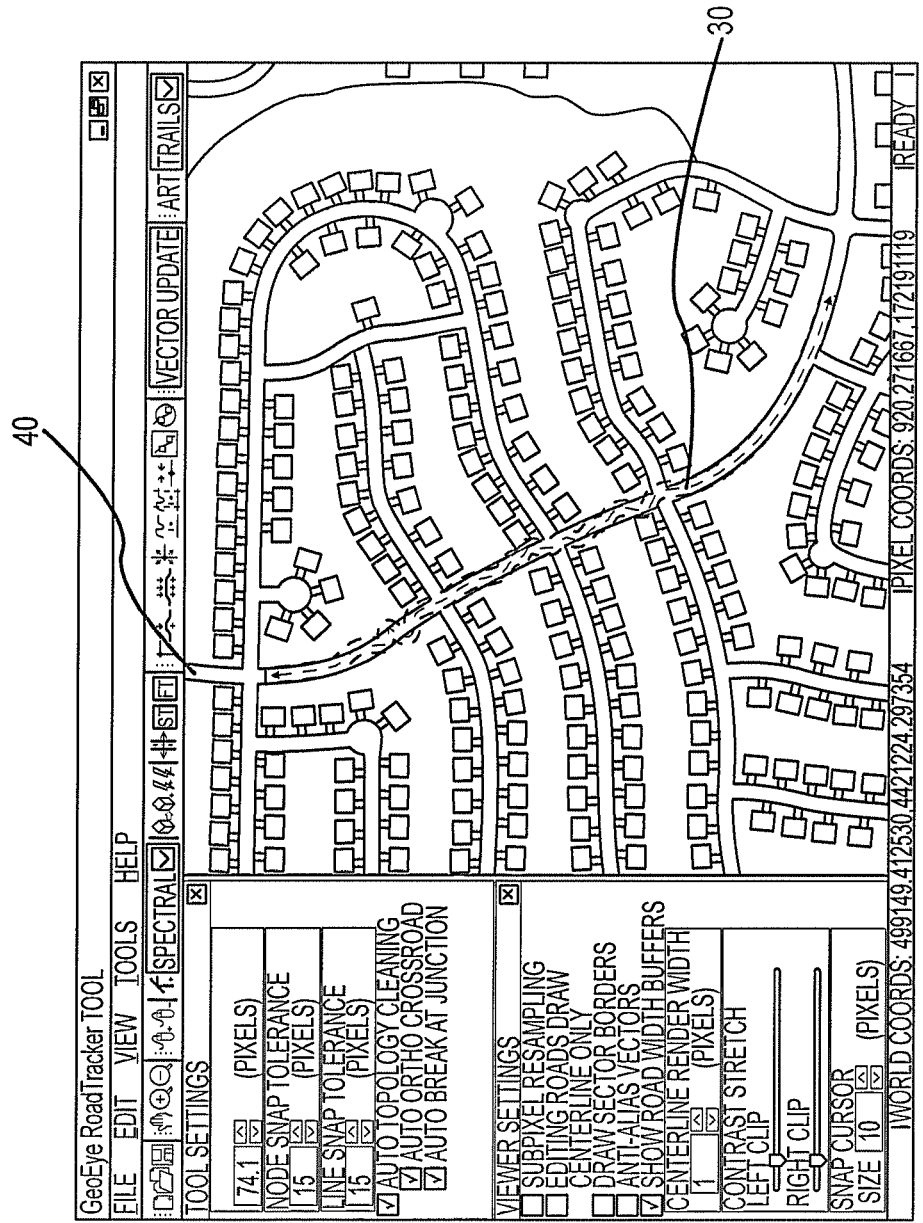
Figure 87C:
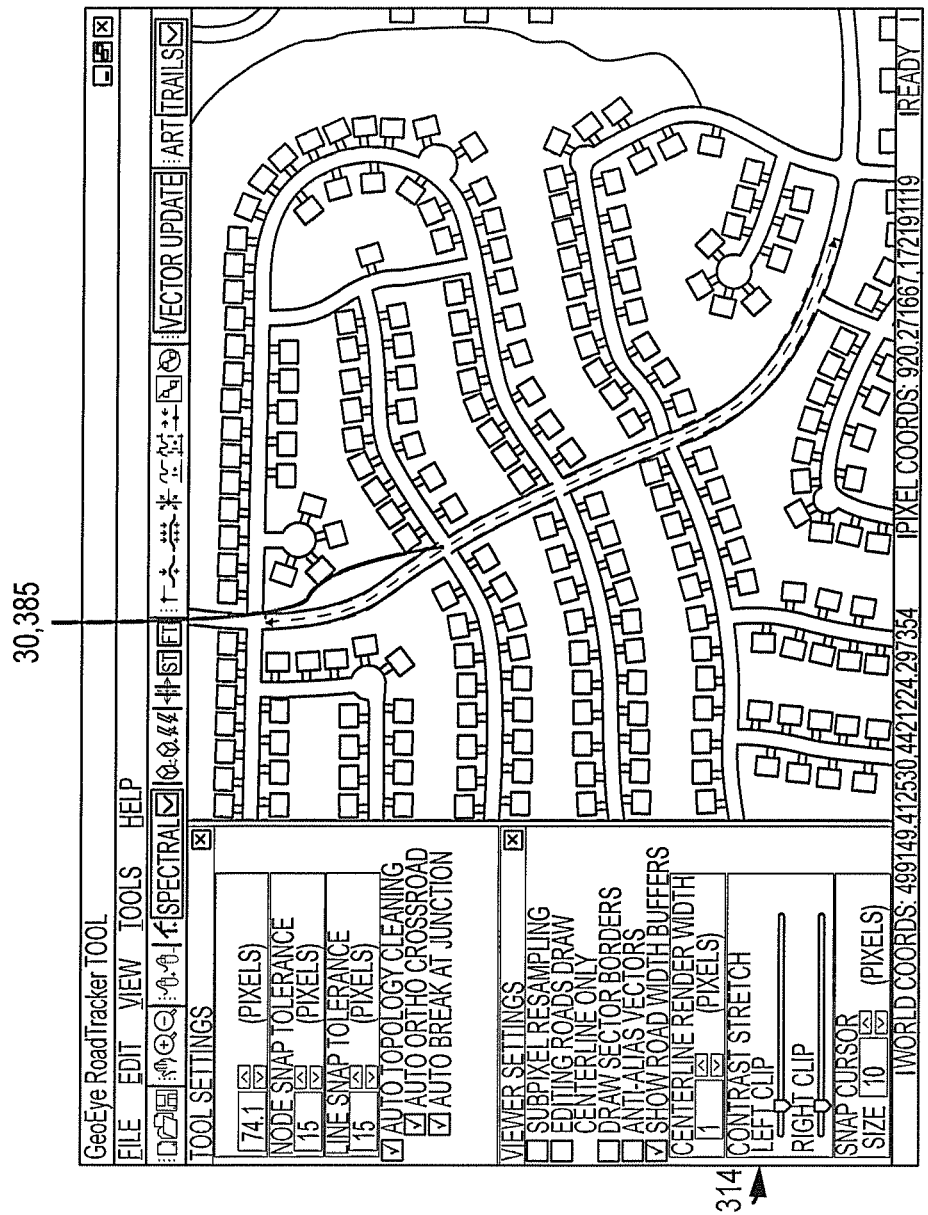
Figure 87D:
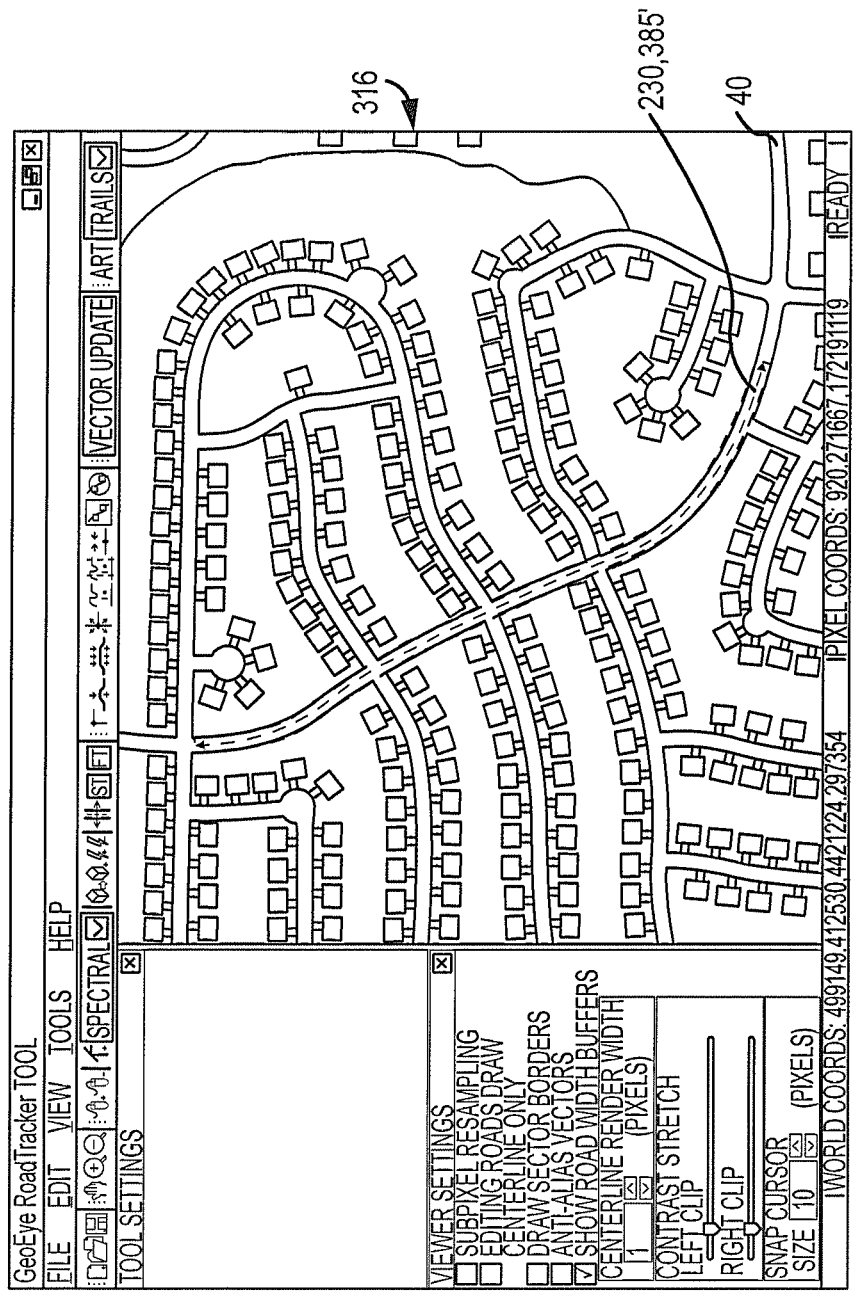

In FIG. 87(A), irregular and uneven path 30 is shown. Once the global smoothing 318 tool is activated and the user designates path 30 for global smoothing 318 (e.g., by clicking on path 30 with the mouse), global smoothing 318 may begin by rendering path 30 as a semi-transparent or opaque ribbon on road 40 in the graphical display. FIG. 87(B). The ribbon may be displayed with the centerline designated, but this is not required. The smoothing level of the ribbon is tied to and may be continuously varied by operation of the motion-sensitive device (e.g., mouse wheel). As shown in FIGS. 87(C) and (D), the path 30 is smoothed automatically, continuously, on-the-fly and in real time as a function of the global smoothing 318 level conveyed through the motion-sensitive device. The previewing 314 would generally continue until the user is satisfied that path 30 is sufficiently smooth. The global smoothing 318 algorithm itself (behind the user interface) may work by varying at least one parameter within the deep smoothing algorithm 270 or by varying at least one parameter within another known prior art global smoothing algorithm. Either way, the parameter is varied via the motion-sensitive device. As in other embodiments of method 300, the user may visually preview 314 proposed fixes 385, 385' before committing 316. Committing 316 to the desired level of smoothing such as shown in path 230 of FIG. 87(D) means saving off the newly-smoothed path 230 to the storage that persists the latest geometry and attribution of the vector sets symbolically which, in the present embodiment, is a shape table. This is assuming that saving off to such storage was not occurring during the previews 314. Otherwise the commit 316 simply means terminating the current global smoothing 318 preview 314 session.

In another embodiment, the automatic vector revision functions may be at work during global smoothing 318. In that case, not only is the path 30 directly affected by global smoothing 318, but other paths 30 may be indirectly affected (due to their incidence with the path 30 that is being globally smoothed 318) and will be updated by the automatic vector revision functions, redrawn and displayed in real time, automatically continuously, and on-the fly.

Figure 88A:
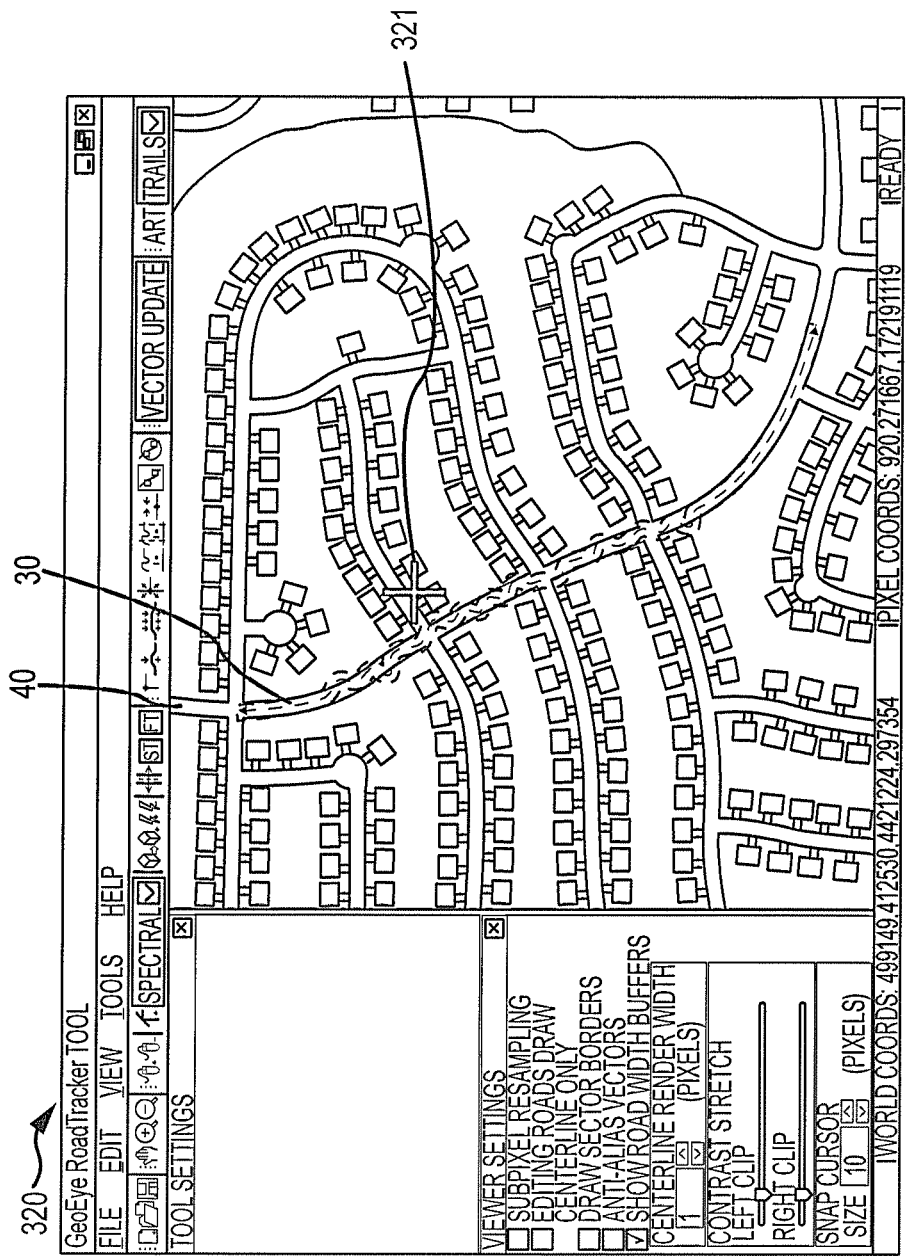
FIG. 88 shows using local smoothing.
Figure 88B:
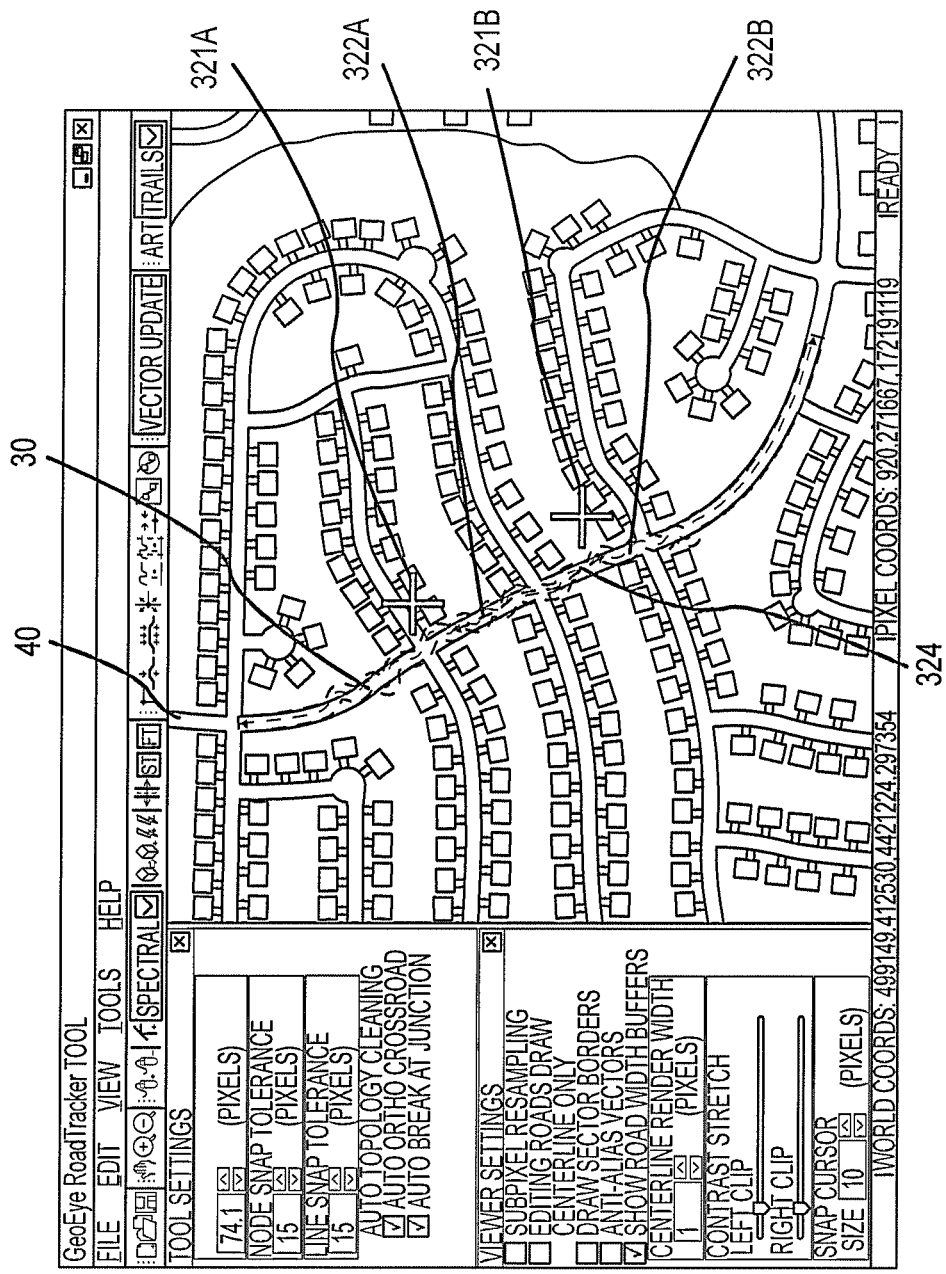
Figure 88C:
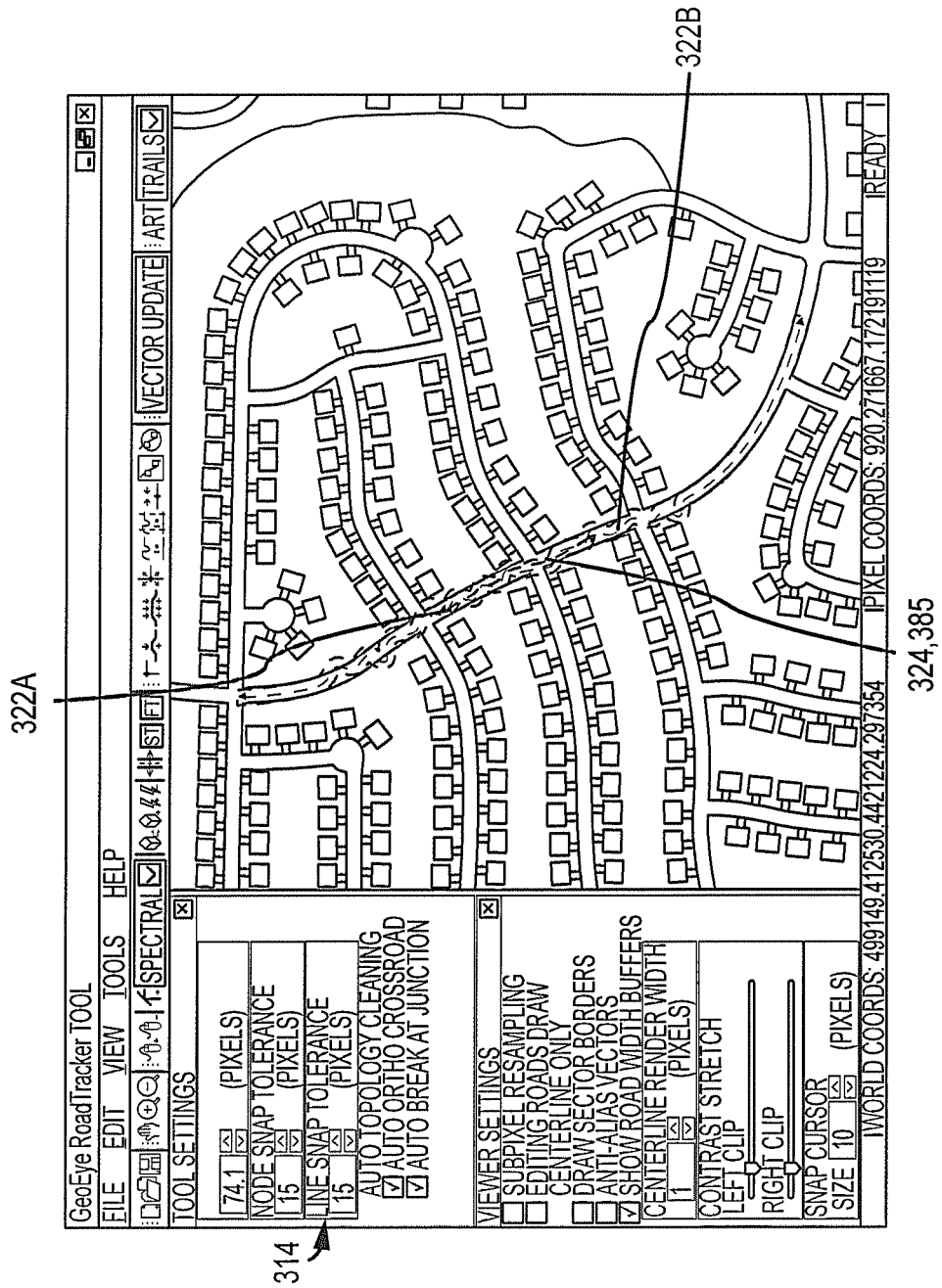
Figure 88D:
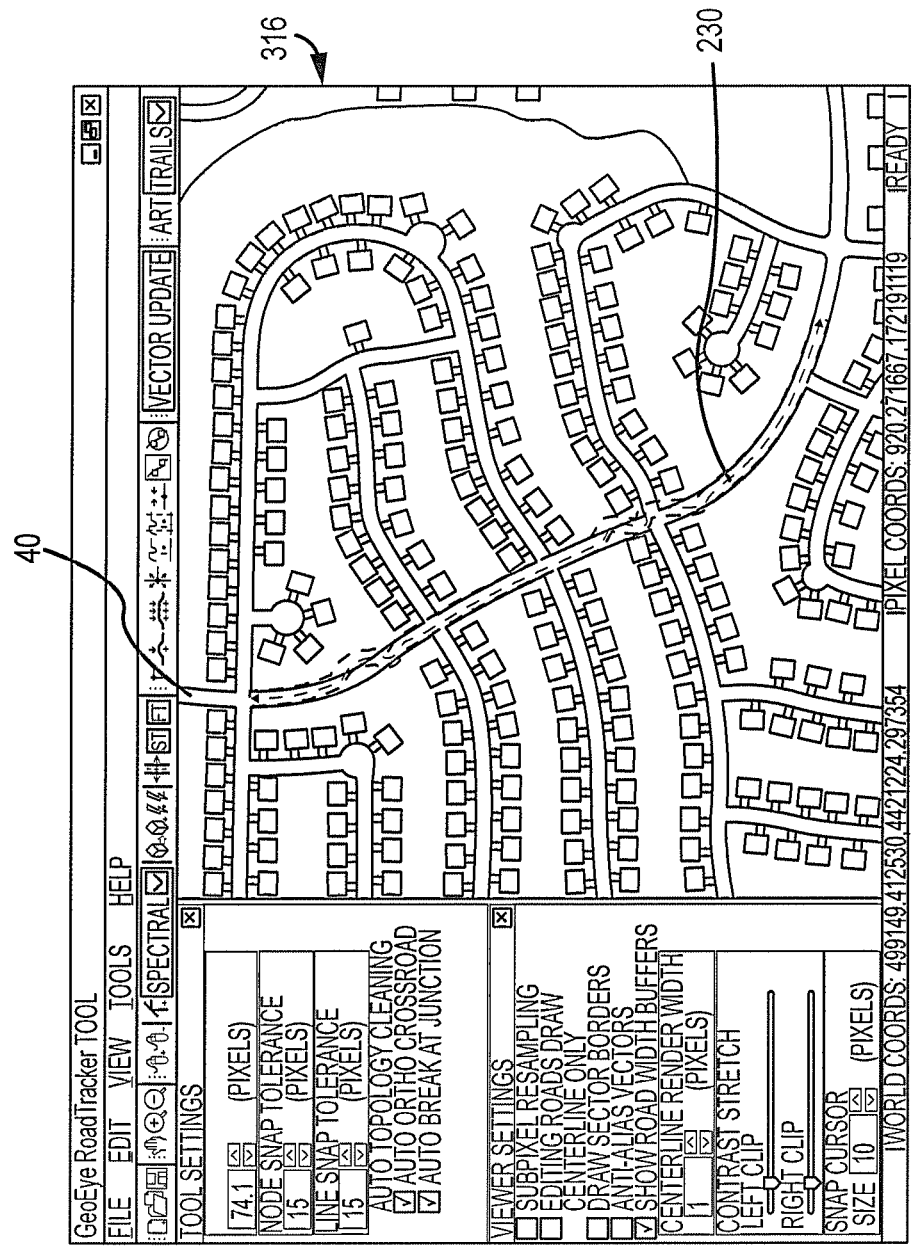

Method 300 may also comprise local smoothing 320 path 30 or portion thereof. FIG. 88(A) illustrates path 30 (path 30 displayed as a semi-transparent ribbon) with a portion that is irregular, uneven and in need of smoothing. However, this portion of path must first be delimited so that the local smoothing 320 operation is performed only on delimited segment 324. The user moves the cursor in the vicinity of one end of the irregular, uneven portion of path 30 to cursor location 321A, then clicks, which automatically places delimiting point 322A on path 30. As shown in FIG. 88(B), the user now moves the cursor location to 321B, then clicks, which automatically places a second delimiting point 322B on path 30 at the other end of the irregular, uneven portion of path 30, thus forming delimited segment 324. Delimited segment 324 may be rendered differently from the rest of path 30 in the graphical display. FIG. 88(B). A graphical rubber band may connect cursor locations 321A, 321B, but this is not required. The smoothing level of delimited segment 324 is tied to and may be continuously varied by operation of the motion-sensitive device (e.g., mouse wheel). As shown in FIGS. 88(C) and (D), the delimited segment 324 is locally smoothed 320 automatically, continuously, on-the-fly and in real time as a function of the local smoothing level conveyed through the motion-sensitive device. The previewing 314 would generally continue until the user is satisfied that the delimited segment 324 is sufficiently smooth. The local smoothing 320 algorithm itself (behind the user interface) may work by varying at least one parameter within the deep smoothing algorithm 270 or by varying at least one parameter within some other known prior art global smoothing algorithm. Either way, the parameter is varied via the motion-sensitive device. As in other embodiments of method 300, the user may visually 314 preview proposed fixes 385 before committing 316. Committing 316 to the desired level of smoothing against delimited segment 324 of FIG. 88(D) means saving off the newly-modified path 230 (that was locally smoothed 320 on delimited segment 324) to the storage that persists the latest geometry 46 and attribution 45 of the vector sets symbolically which, in the present embodiment, is a shape table. This is assuming that saving off to such storage was not occurring during the previews. Otherwise, the commit 316 step simply means terminating the current local smoothing 320 preview 314 session.

In another embodiment, the automatic vector revision functions may be at work during local smoothing 320. In that case, not only is the path 30 directly affected by local smoothing 320 against delimited segment 324, but other paths 30 may be indirectly affected (due to their incidence with path 30 that is being locally smoothed) and will be updated by the automatic vector revision functions, redrawn and displayed in real time, automatically continuously, and in real-time.

Like local smoothing 320, the excise functions 304 of the present invention comprise delimiting a segment in path 30, (e.g. delimited segment 324) but now for the purpose of excising delimited segment 324. Excise functions 304 of method 300 comprise the two-point (2-point) excise tool 326 tool and the polygon excise 328 mode.

Figure 89A:
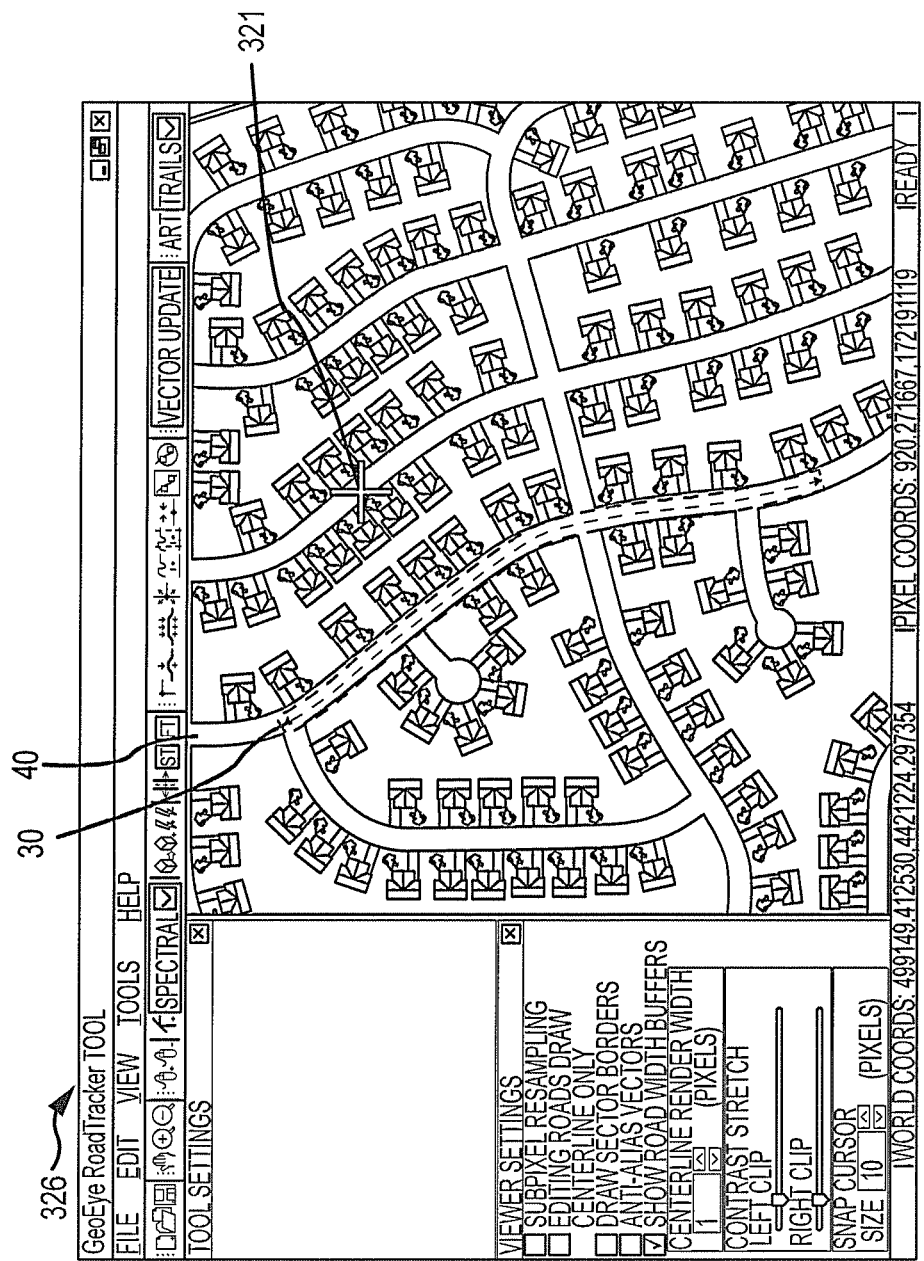
FIG. 89 shows excising a delimiting segment using 2-point excise mode.
Figure 89B:
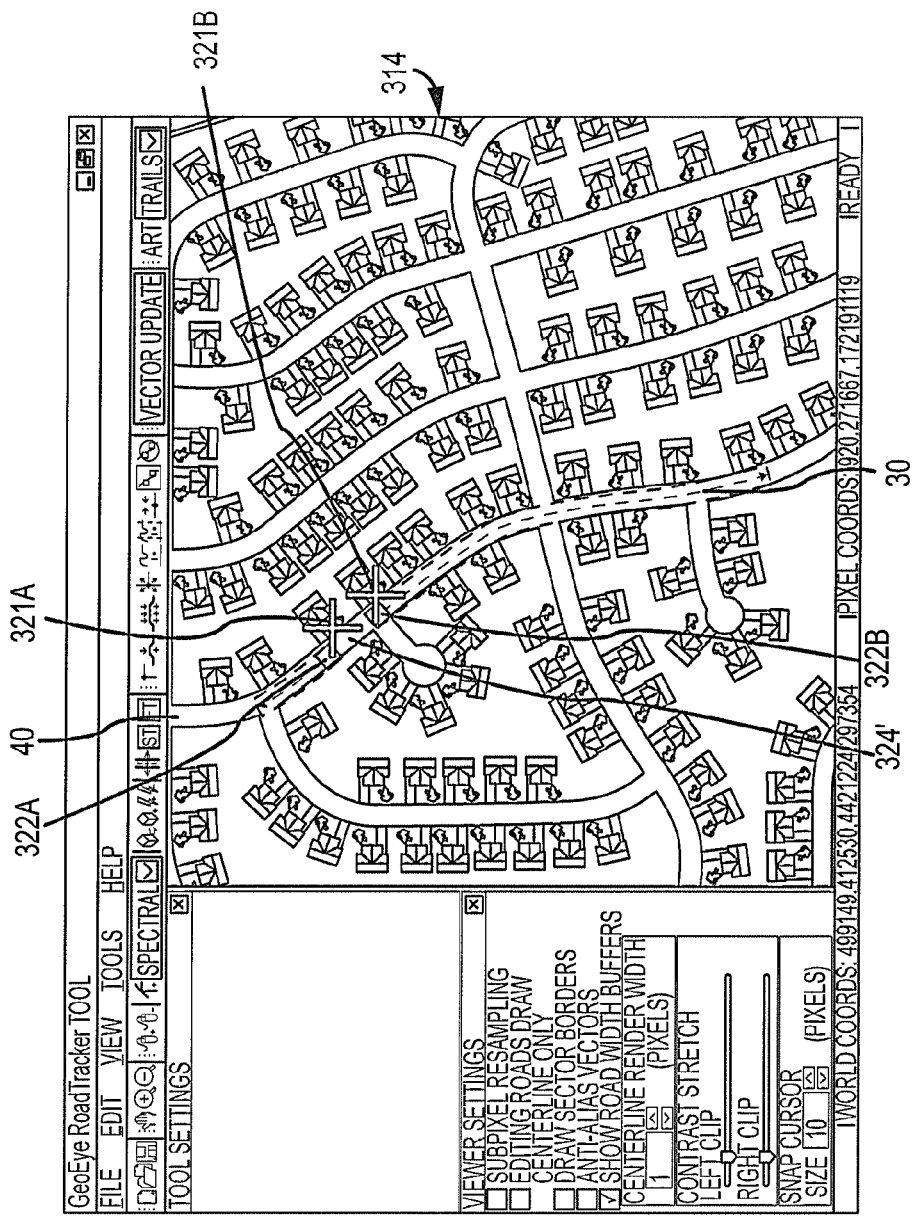
Figure 89C:
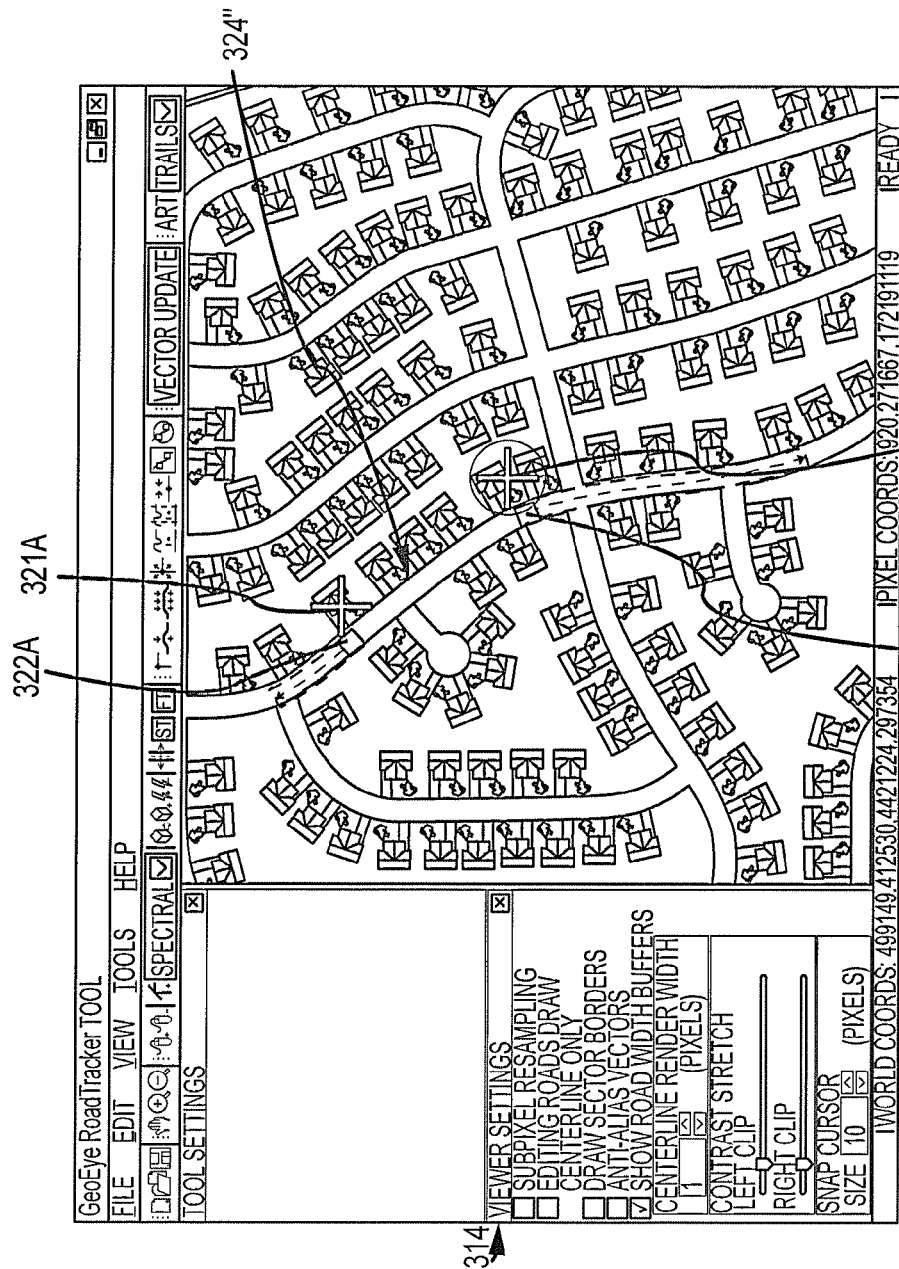

Two-point excise 326 tool will now be described with reference to FIG. 89. In FIG. 89(A), the user has already activated the 2-point excise 326 tool and is moving the cursor from cursor location 321 toward path 30. The user moves the cursor to cursor location 321A within the vicinity of path 30, then clicks, which automatically establishes delimiting point 322A directly on path 30 as shown in FIG. 89(B). The user then begins to move the cursor in a direction away from delimiting point 322A generally following the trajectory of path 30. As the user begins the move, the cursor may be connected to cursor location 321A by a graphical rubber band, although this is not required. The user moves the cursor to cursor location 321B in the vicinity of path 30. Without clicking, proposed delimiting point 322B' is automatically placed directly on path 30 as shown in FIG. 89(B), forming proposed delimited segment 324'. The delimited segment 324' may be rendered invisible or otherwise differently from the remainder of path 30. As shown in FIGS. 89(C) and (D), as the cursor location 321B changes in relation to cursor location 322A, the location of proposed delimiting point 322B", 322B also changes instantaneously and continuously, causing delimited segment 324, 324', 324" to shrink or grow, along path 30 automatically, on-the-fly, continuously, and in real time as a function of cursor location 321B which is linked to delimiting point 322B.

Figure 89D:
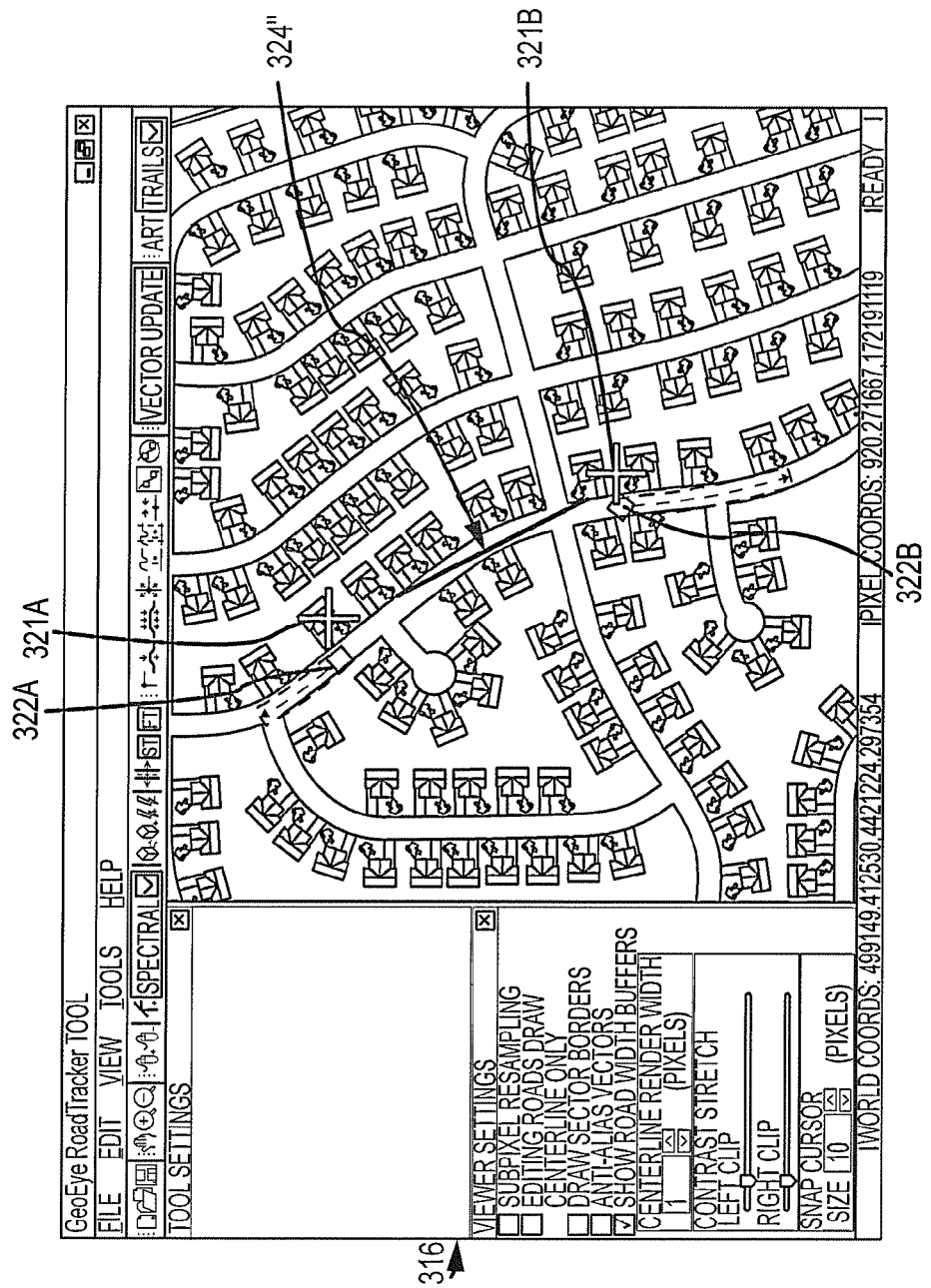

Once again, the excise functions 304 of the present invention, including the 2-point excise 326 tool, provide the user with an opportunity to preview 314 the proposed excisions by rendering delimited segments 324', 324" invisible or otherwise distinct from the portions of paths 30 that are not being excised. The display of the proposed excision is updated automatically, continuously, on-the-fly and in real time as a function of the current cursor location and earlier points established via the cursor. Once the user has previewed 314 the proposed excision as shown in FIG. 89(D), the user commits 316 to that excision by double-clicking, for example. Committing 316 to the excision of delimited segment 324 from path 30 of FIG. 89(D) means saving off the net result of the excision to storage that persists the latest geometry and attribution of the vector sets symbolically which, in the present embodiment, is a shape table. This is assuming that saving off to such storage was not occurring during the previews 314. Otherwise the commit 316 step simply means terminating the current excision preview 314 session.

Figure 90A:
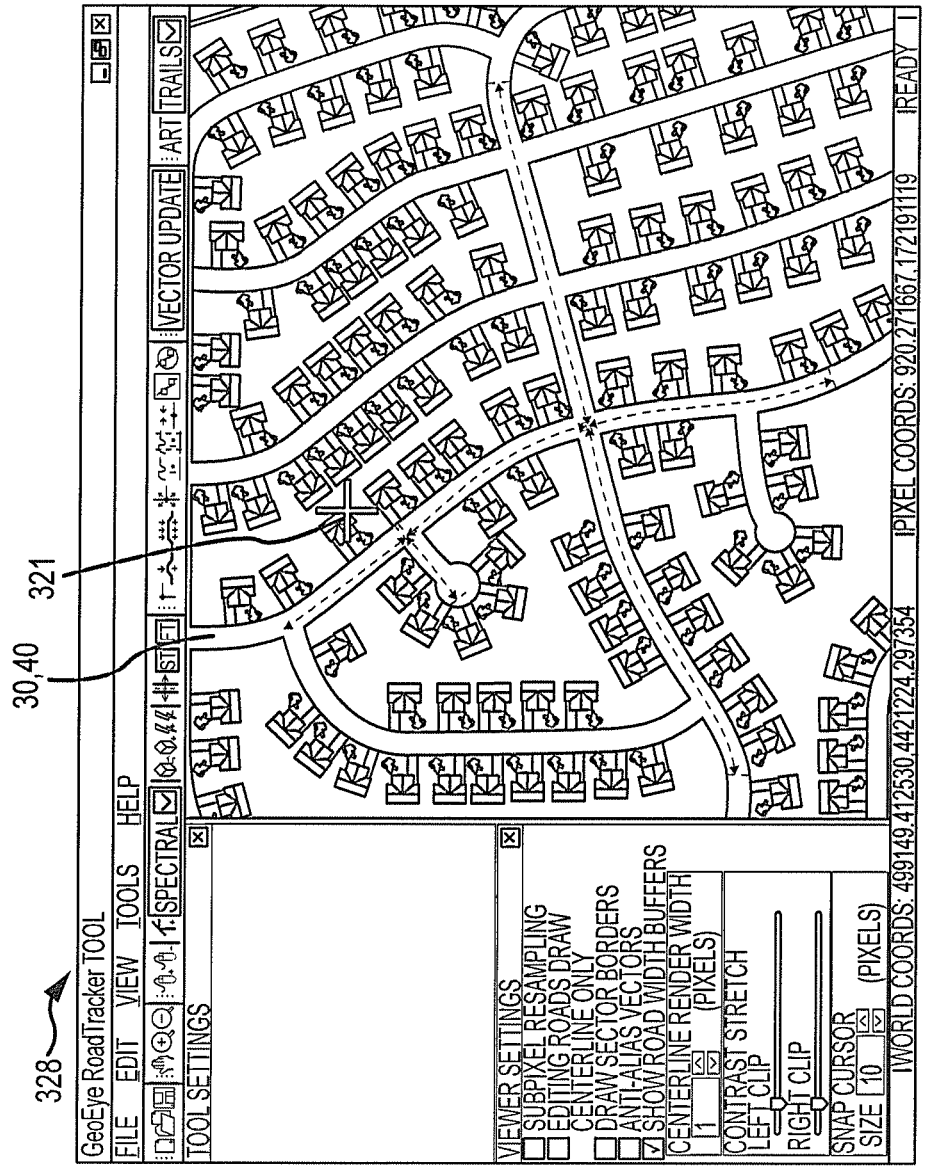
FIG. 90 shows excising vector sets using polygon excise mode.
Figure 90B:
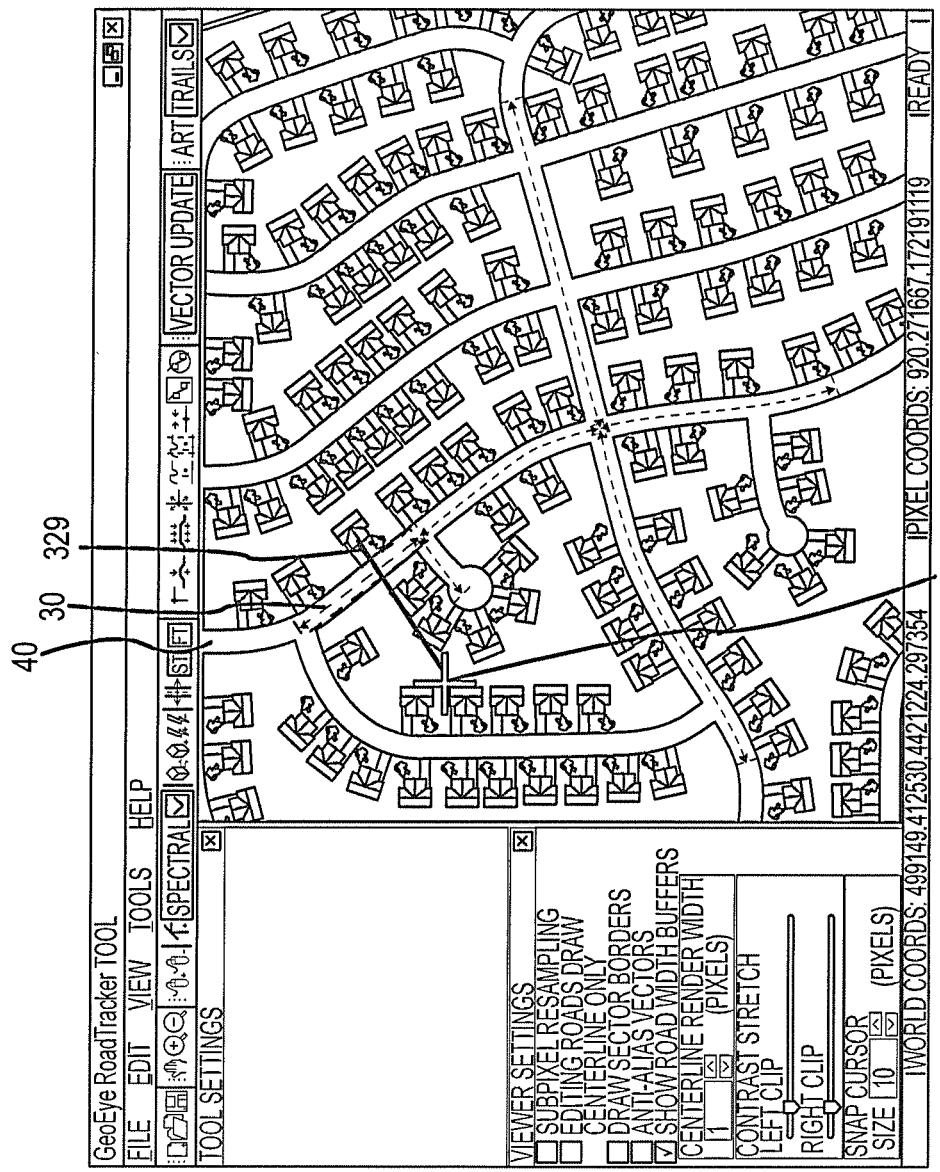
Figure 90C:
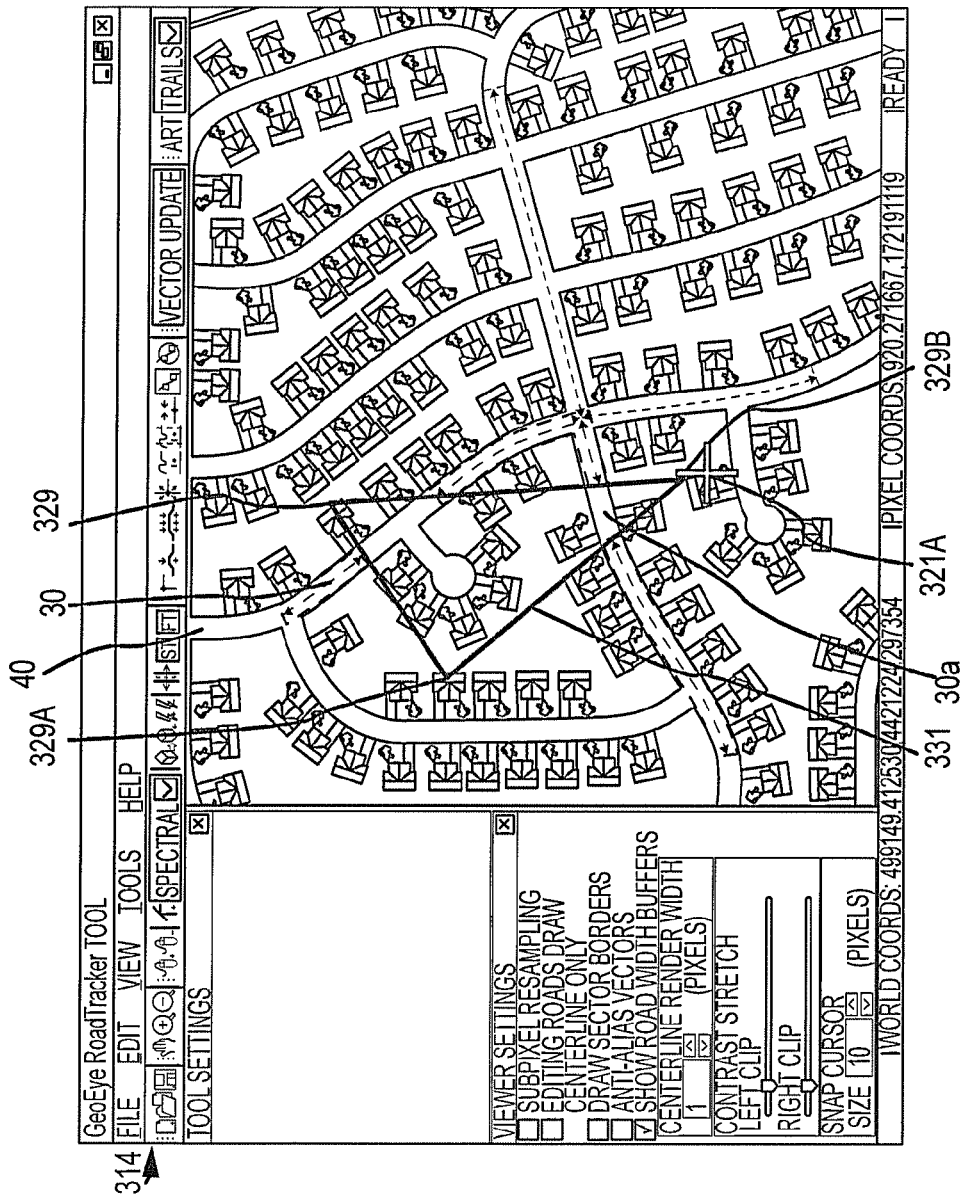

The excise functions 304 of the present invention may also comprise polygon excise 328 mode, for excising portions of one or more paths 30 (e.g., vector sets) simultaneously by enclosing those portions to be excised in a final polygon 333. In reference to FIG. 90, the user has already activated polygon excise 328 mode. In this embodiment, method 300 comprises selecting the polygon excise 328 mode for excising paths 30, or portions thereof, that result from previously extracting linear features in remotely-sensed imagery. As shown in FIG. 90(A), the user places the cursor at cursor location 321, then clicks there, establishing the first vertex 329 of the polygon 331 being formed. As the user drags the cursor to cursor location 321A, a graphical rubber band automatically connects vertex 329 to cursor location 321A, as shown in FIG. 90(B). The user clicks at cursor location 321A to establish the second vertex 329A of the polygon 331 being formed. As the user continues to drag the cursor to cursor location 321B, polygon 331 is automatically and continuously updated in the display, connecting established vertices 329, 329A, with the cursor location 321B via the graphical rubber band. The user clicks at cursor location 321B to establish the third vertex 329B of the polygon 331 being formed. As shown in FIG. 90(C), polygon 331 may be rendered by the closed graphical rubber band boundary through vertices 329, 329A and cursor location 321B. The interior of polygon 331 may be rendered transparent or semi-transparent or in any other manner. Paths 30a, or portions thereof, within polygon 331 may be rendered transparent or differently from the portions of paths 30 that lie outside of polygon 331 as shown in FIG. 90(C), (D). Polygon 331 (or final polygon 333) may be of any shape and can include protrusions and intrusions. Paths 30 that cross the boundary of polygon 331 may also be highlighted in the manner shown in FIG. 90 (B), (C), (D). The shape of polygon 331 changes automatically, continuously, smoothly, on-the-fly and in real-time as a function of the current cursor location 321 and vertices 329, 329A, 329B, 329C established via the cursor. As the shape of polygon 331 changes, so do the visual renditions of those portions of paths 30a that lie within the interior of the polygon 331, as well as the paths 30 themselves that cross the boundary of polygon 331.

Figure 90D:
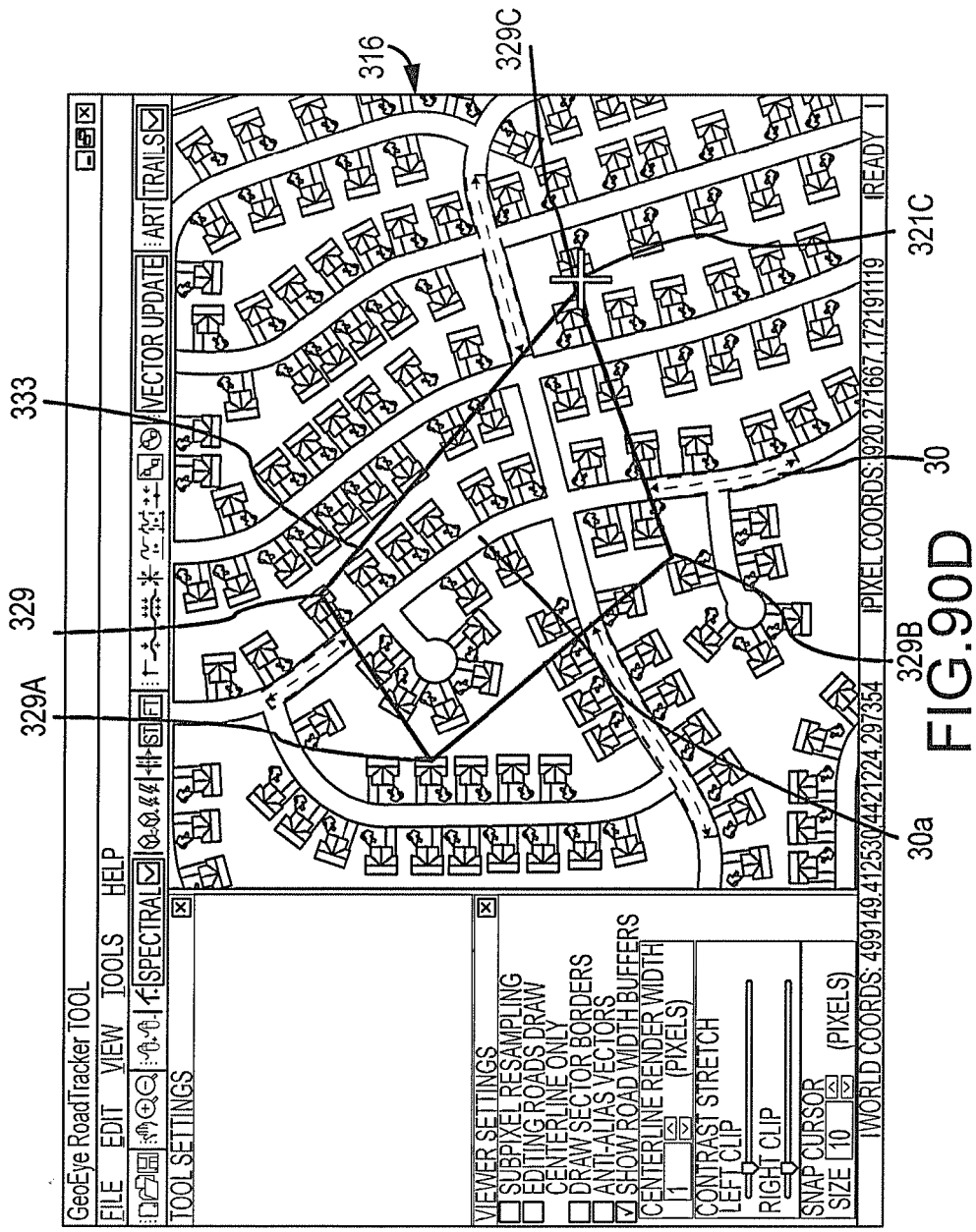

The user may preview 314 polygon 331 and the associated excision against paths 30 that overlap its interior. Once the user commits 316 to the polygon 331 (e.g., by double-clicking at the last cursor location 321C), it becomes final polygon 333, as shown in FIG. 90(D). Committing 316 to the final polygon 333 means saving off the net result of the excision to storage that persists the latest geometry and attribution of the vector sets symbolically which, in the present embodiment, is a shape table. This is assuming that saving off to such storage was not occurring during the previews 314. Otherwise the commit 316 step simply means terminating the current polygon excise 328 preview 314 session.

In another embodiment, instead of excising portions of paths 30a within the interior of final polygon 333, paths 30a may be modified using any other universal action, such as smoothing or straightening.

Similarly, other embodiments of method 300 comprise selecting 312 an ensemble of vector sets (e.g. paths 30) against which to apply the universal action. Methods for selecting 312 the ensemble of vector sets (e.g., selection ensemble 342) on which to apply the universal action comprise paint selection 336 mode, polyline-thru-selection 338 mode and partitioning 340.

Figure 91A:
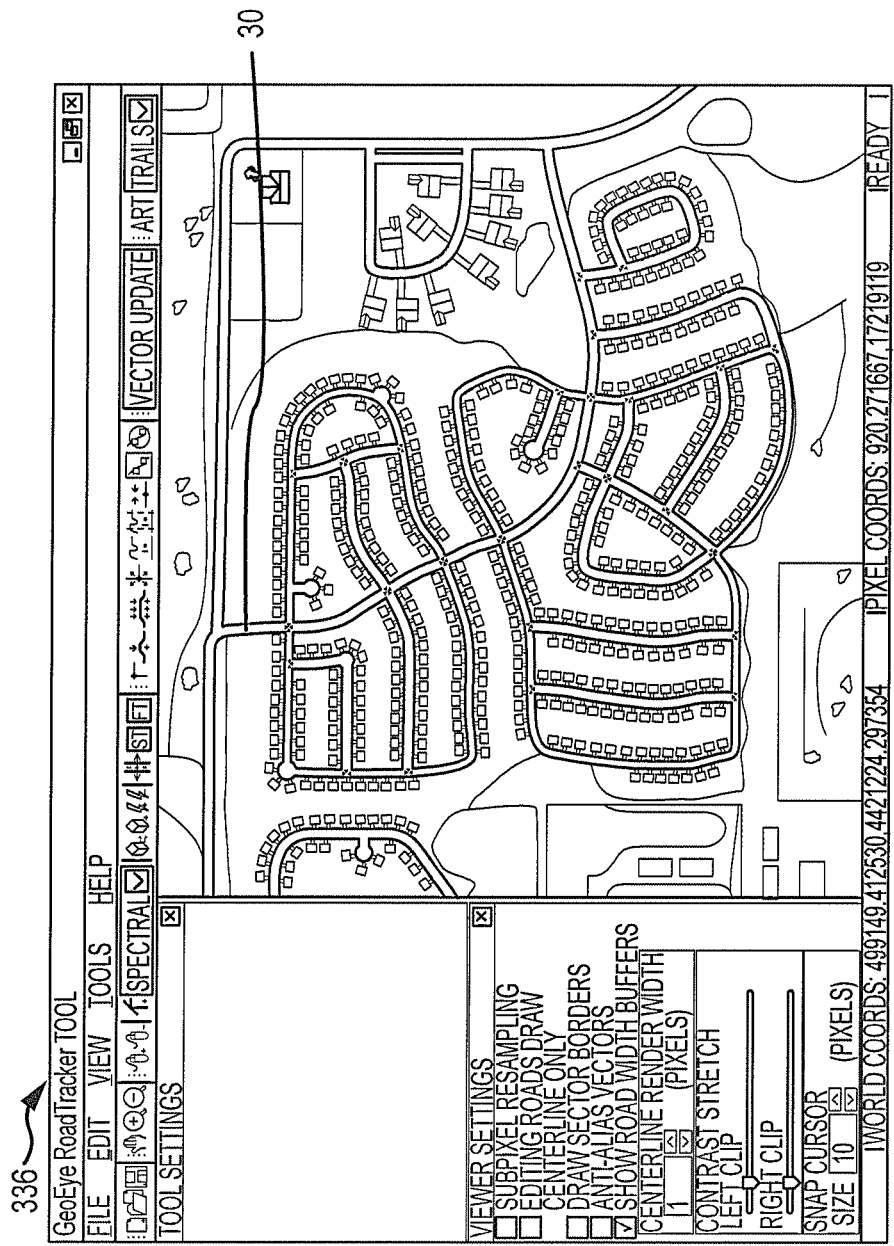
FIG. 91 shows using an embodiment of paint selection mode.
Figure 91B:
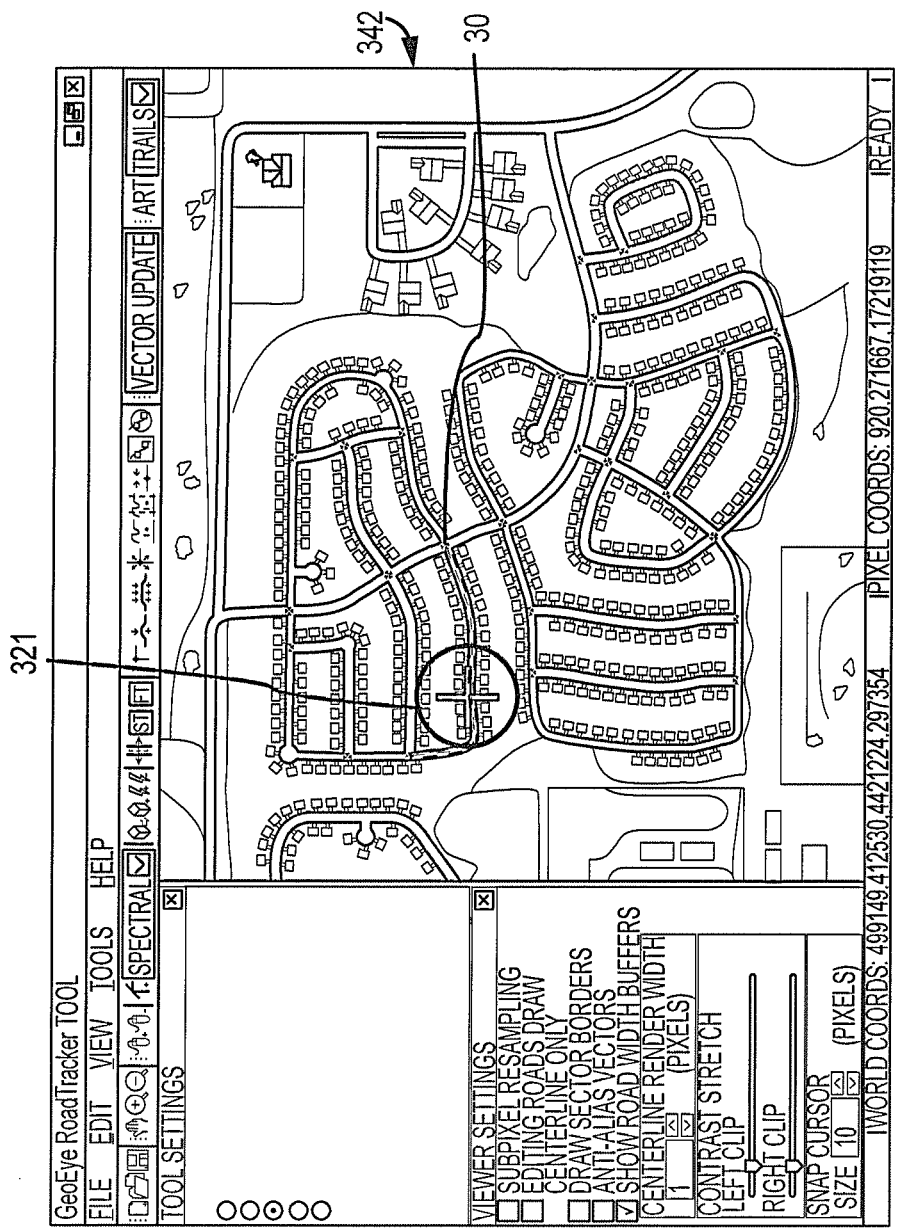
Figure 91C:
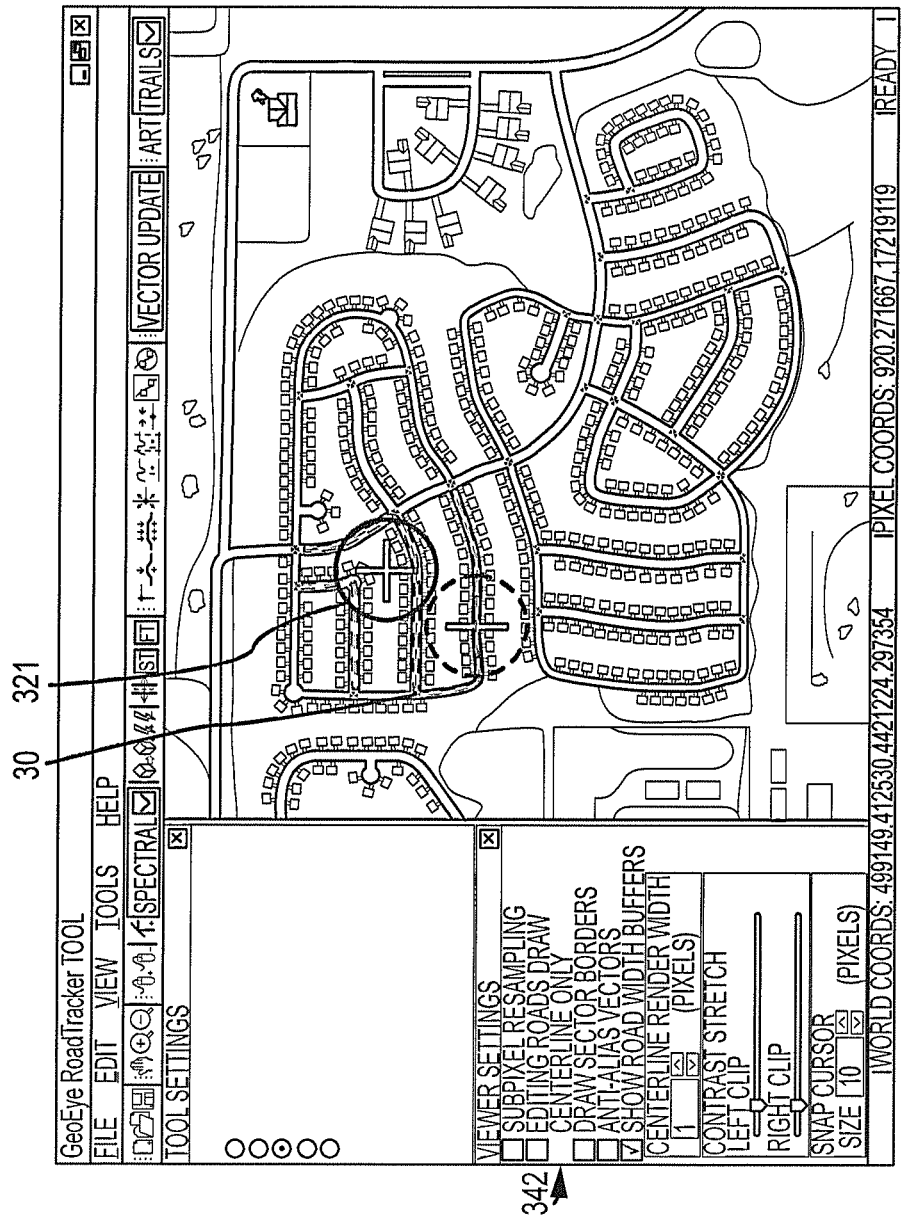
Figure 91D:
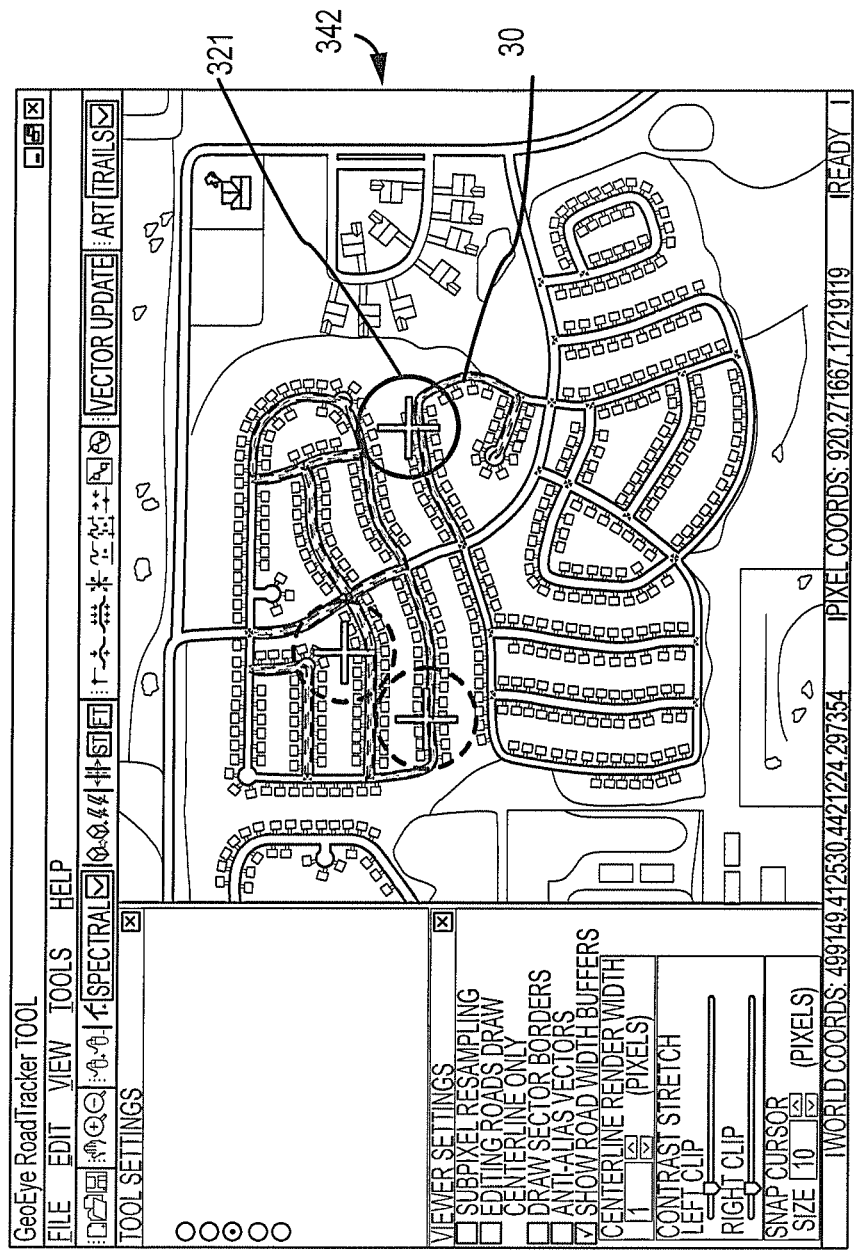

Paint selection 336 mode will now be described with reference to FIG. 91. FIG. 91(A) shows previously extracted vector sets (e.g., paths 30) overlaid on a remotely-sensed image within the graphical display. After the user enters paint selection 336 mode, using the motion-sensitive device, the user drags the cursor to cursor location 321 (shown in FIG. 91 as circle with a "+" at the center) along a desired trajectory. Each path 30 (e.g., vector set) encountered or crossed by the cursor as it moves along the desired trajectory is added to selection ensemble 342. The moment that the cursor location 321 crosses or comes in contact with path 30, a visual change automatically and instantaneously occurs in path 30 indicating that path 30 is now included in selection ensemble 342, as shown in FIG. 91(C), (D).

In another embodiment of paint selection 336 mode, cursor location 321 may be coincident with centerpoint 375 of the region of influence 373. When the user drags the cursor, centerpoint 375 and the region of influence 373 follow. When the region of influence 373 comes in contact with path 30 (e.g., vector set), path 30 is added to the selection ensemble 342.

Once the desired selection ensemble 342 has been formed, the user exits paint selection 336 mode (e.g., by double-clicking with the mouse) while the vector sets in the selection ensemble 342 remained selected. At this point, the user may now apply the universal action across all the vector sets in the selection ensemble 342. The universal action may comprise deletion (e.g., excision), smoothing, straightening, setting a common attribute value (e.g., width 66, material type 56), or any other function that takes a vector set as input argument.

Figure 92A:
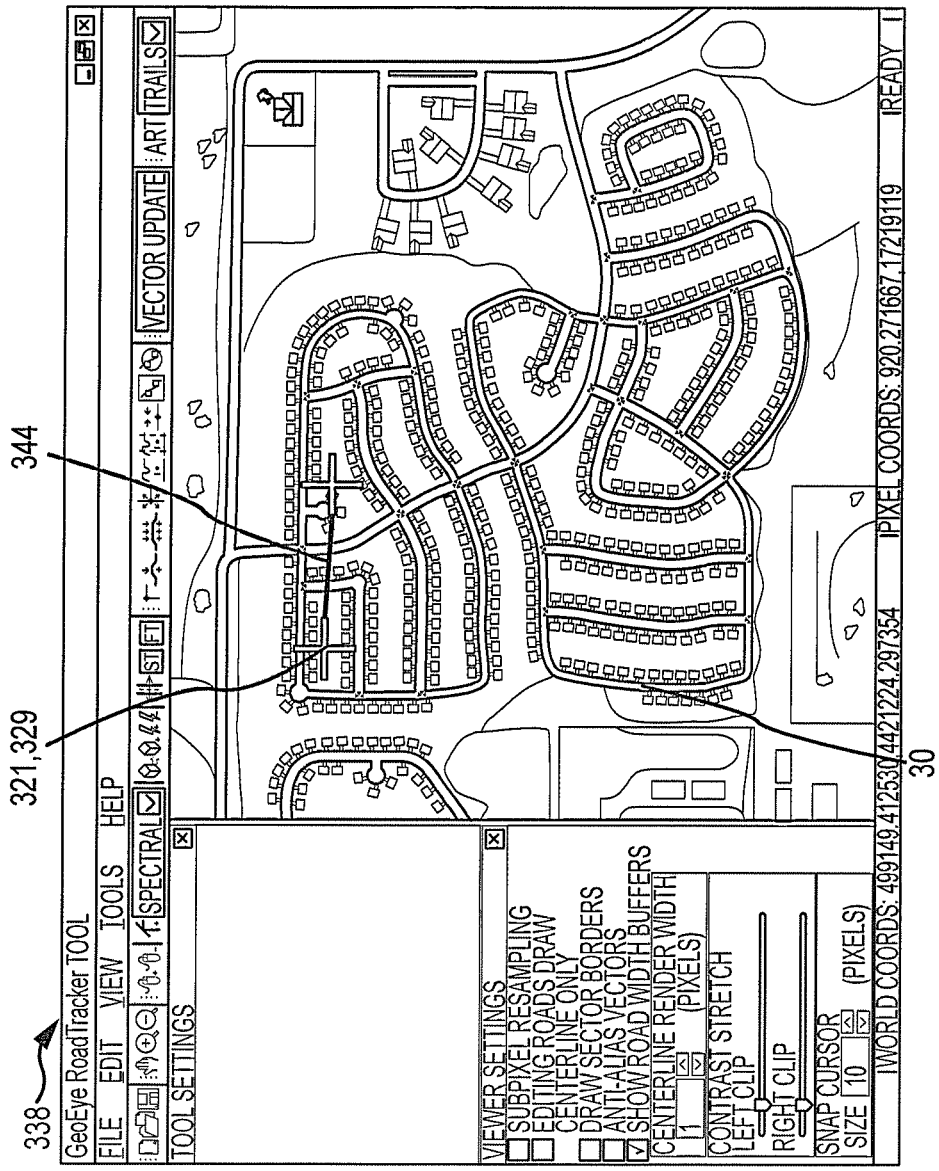
FIG. 92 shows using an embodiment of polyline-thru selection mode.
Figure 92B:
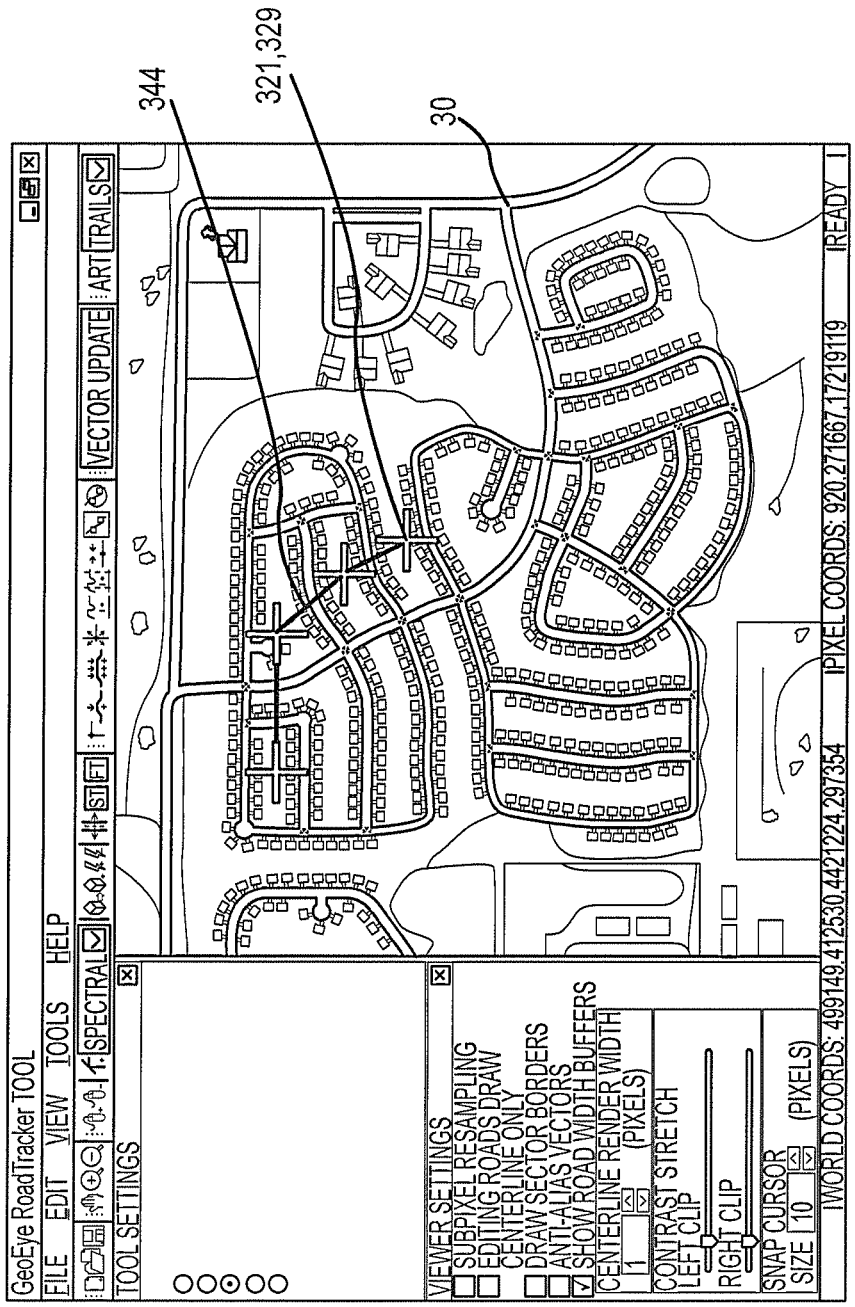
Figure 92C:
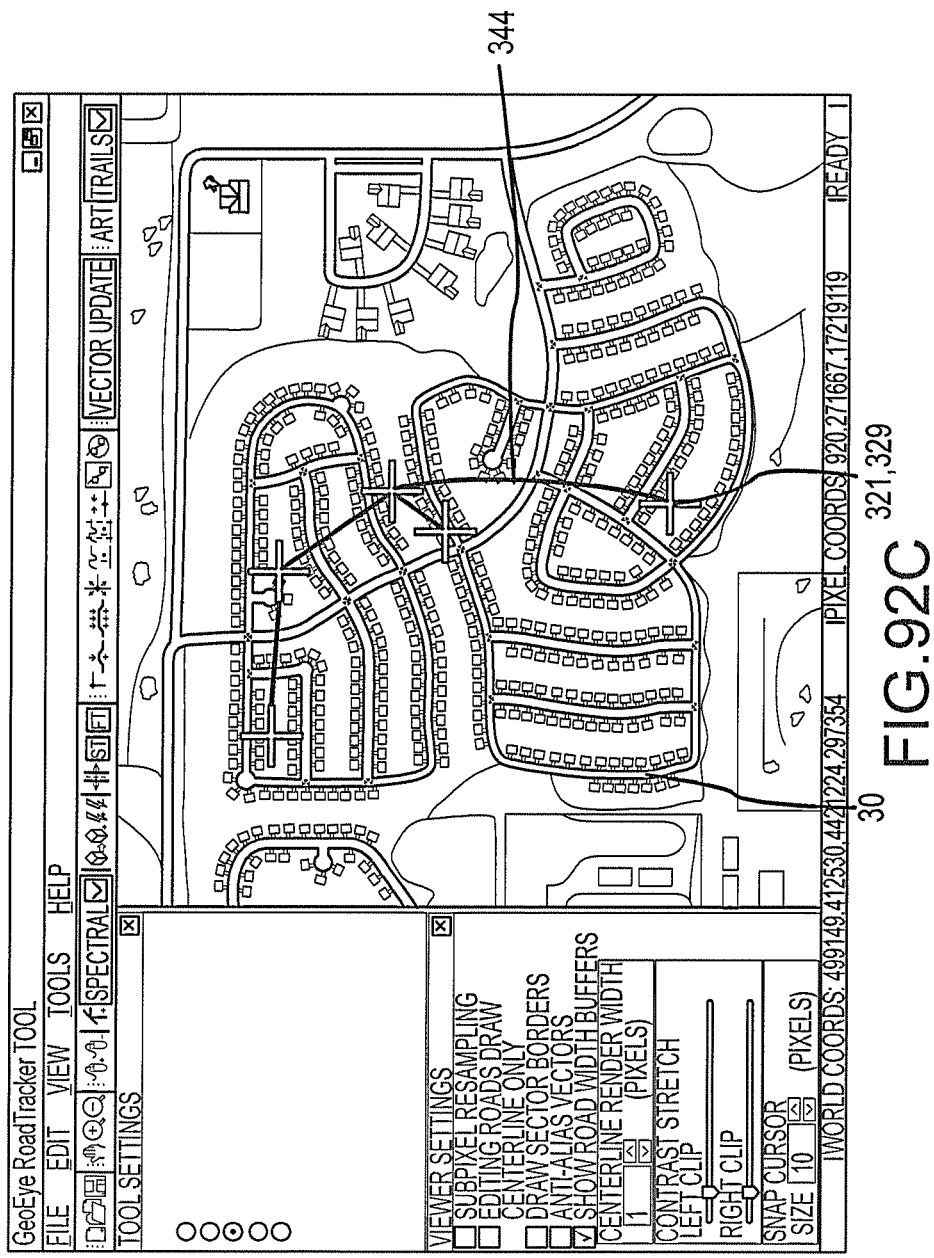
Figure 92D:
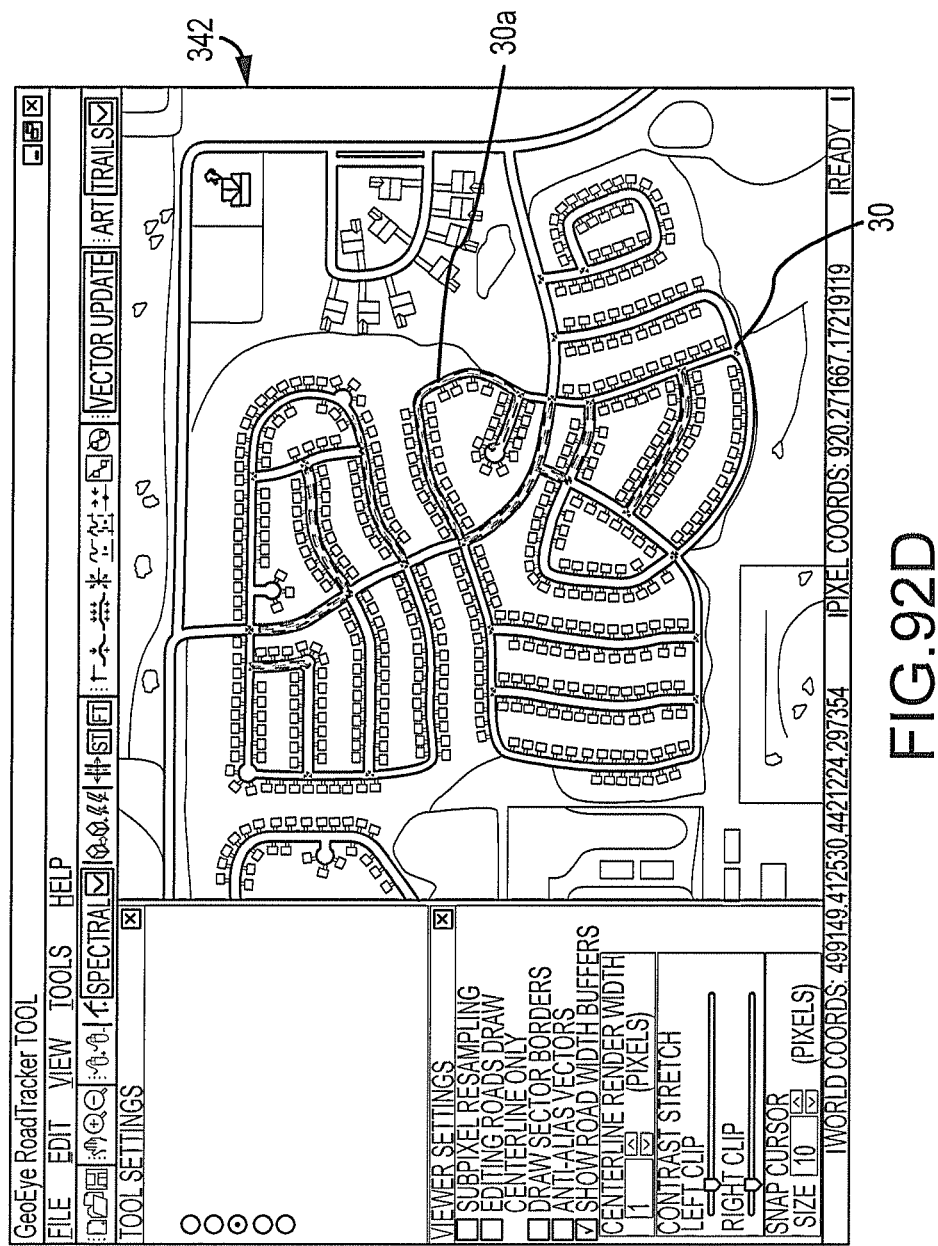

Methods for selecting 312 the ensemble of vector sets (e.g., selection ensemble 342) against which to apply the universal action further comprise polyline-thru-selection 338 mode, which will now be described with reference to FIG. 92. FIG. 92(A) shows previously extracted vector sets (paths 30) overlaid on the remotely-sensed image within the graphical display. After the user enters polyline-thru-selection 338 mode, the user creates graphical polyline 344 in the graphical display, using the cursor associated with a motion-sensitive device to establish the vertices 329 of polyline 344. As the user moves the cursor and clicks, as shown in FIG. 92(A)-(C), vertices 329 of polyline 344 are created coincident with cursor locations 321. The last vertex 329 added to the polyline 344 is designated by the user with a double click at the corresponding cursor location 321. At this time, any path 30 crossed by polyline 344 is automatically placed in selection ensemble 342 and undergoes visual change resulting in path 30a, as shown in FIG. 92(D).

Once the desired selection ensemble 342 has been formed via polyline-thru-selection 338 mode, the user may now apply the universal action across all the vector sets in the selection ensemble 342. The universal action may comprise deletion (e.g., excision), smoothing, straightening, setting a common attribute value (e.g., width 66, material type 56), or any other function that takes a vector set as input argument.

Partitioning 340 the remotely-sensed image into cells 346 in the graphical display will now be described with reference to FIG. 93. Partitioning 340 the remotely-sensed image into cells 346 may be used as part of methods for systematic quality assurance and quality control (QA/QC) of linear feature extraction. During the QA/QC activity, extracted vector sets (e.g., paths 30) fall into two categories: those that are approved and committed 316, and those that are uncommitted and which may required modification prior to approval. Similarly, entire cell 346 can be viewed as uncommitted or committed 316, depending on whether its interior overlaps path 30 that is uncommitted, for example. Partitioning 340 enables the user at any moment in time to concentrate attention on a particular uncommitted focus cell 348 that overlaps at least one uncommitted path 30 and is therefore in need of QA/QC resolution. Partitioning 340 also enables the user to keep track of which cells 346 have already been committed 316 following QA/QC review and which have not.

Figure 93A:
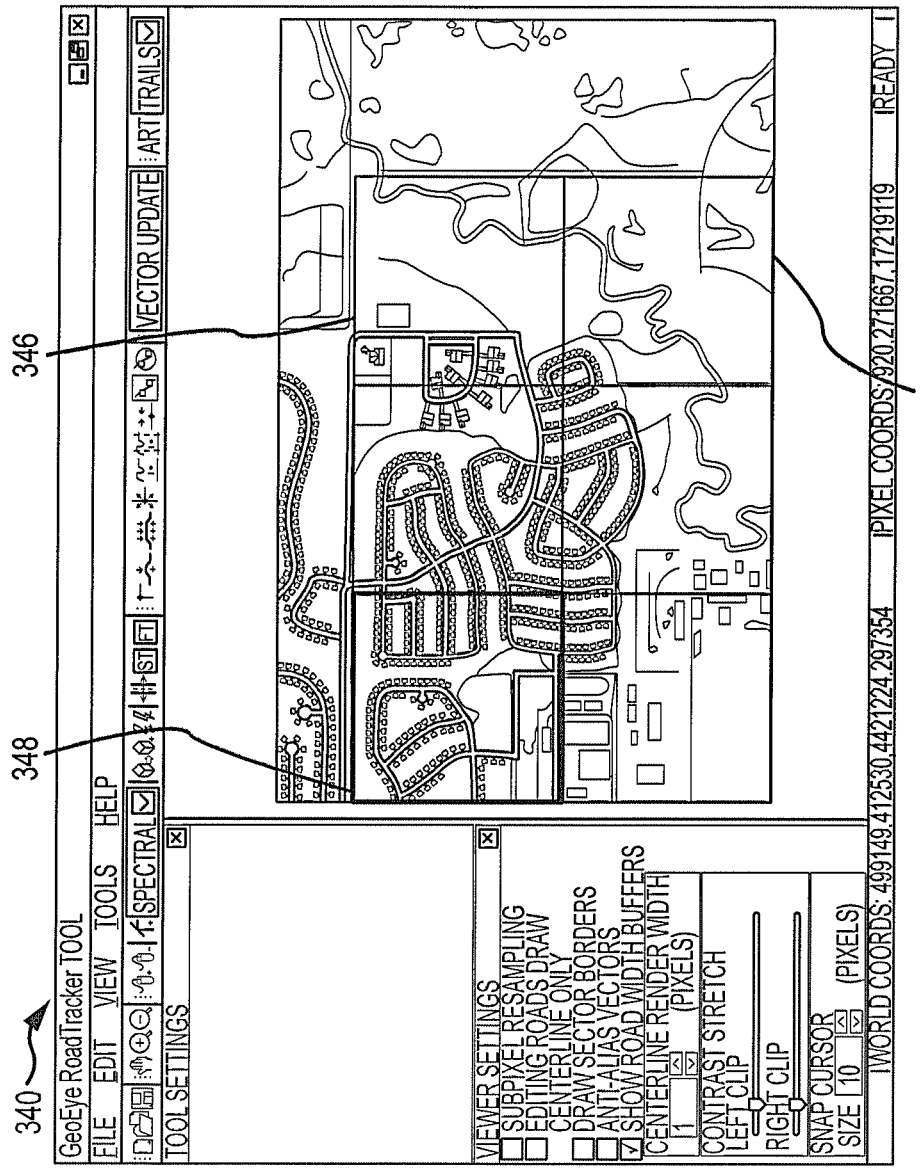
FIG. 93 shows using an embodiment of partitioning.
Figure 93B:
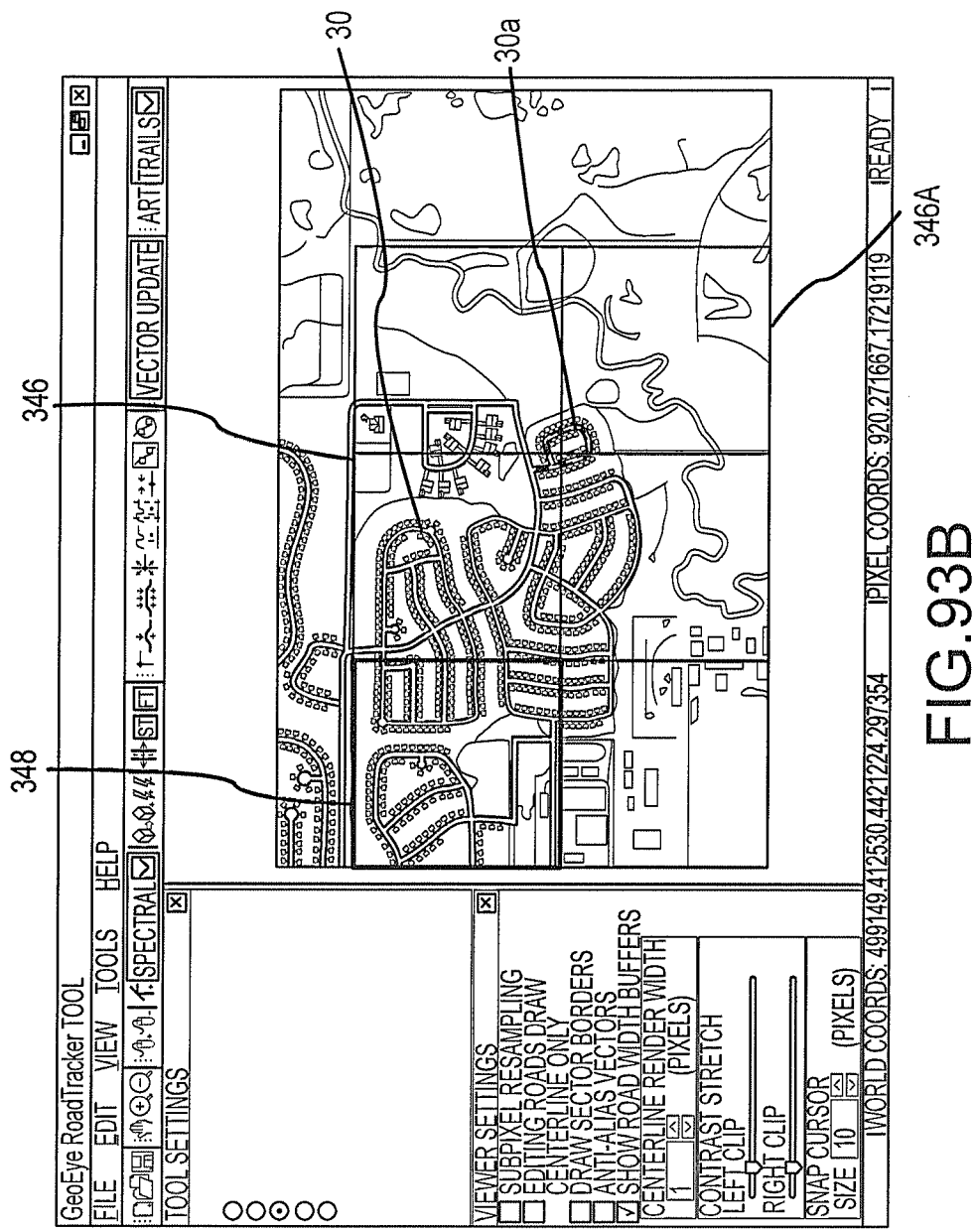
Figure 93C:
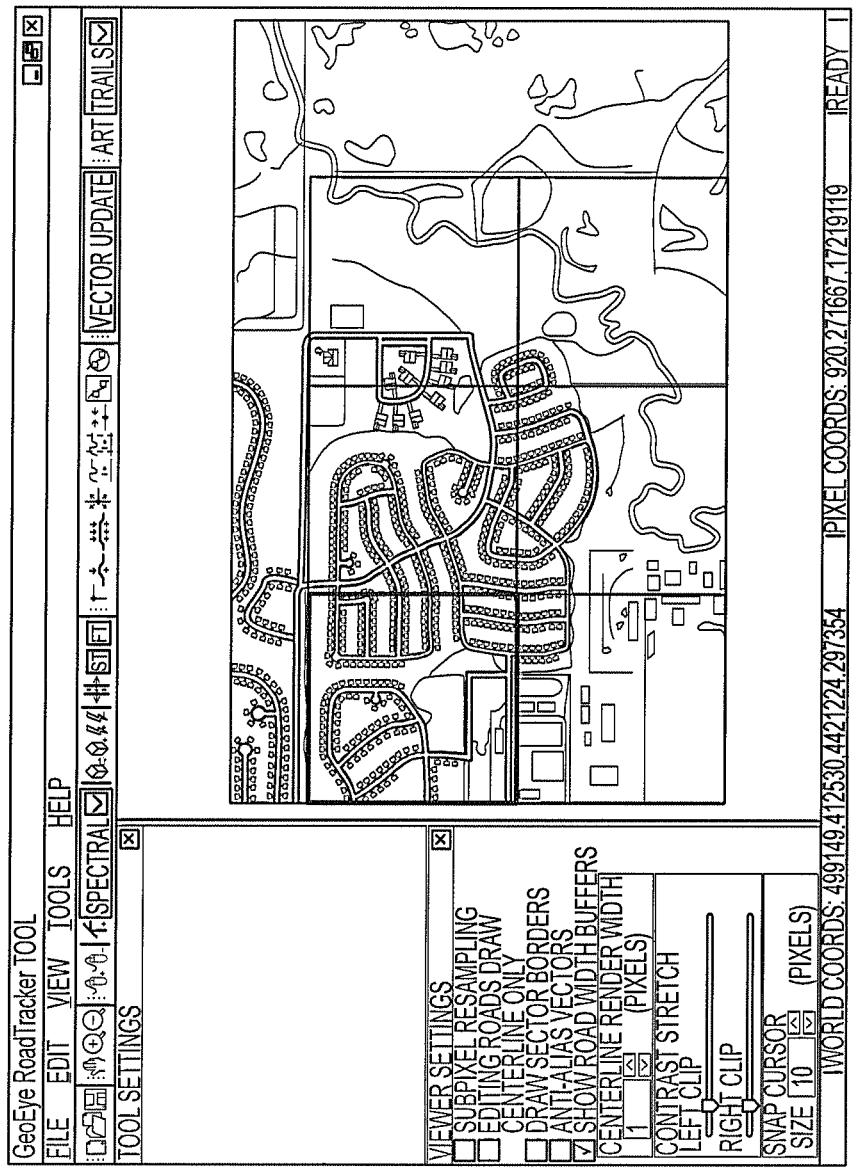

After the user selects the remotely-sensed image, displays it on the graphical display, and has overlaid vector sets (e.g., paths 30) on it, the user partitions 340 the remotely-sensed image into cells 346, 346A, where cells 346, 346A overlap paths 30 (which may or may not be committed 316) and are rendered visible or differently in the graphical display from those that do not overlap paths 30. Additionally, uncommitted focus cell 348 (which overlaps at least one path 30 that is uncommitted) may be rendered differently in the graphical display from other cells 346 (which overlap paths 30 that may or may not be committed). Paths 30 that are uncommitted may be rendered differently in the graphical display than paths 30 that are committed 316. In FIG. 93(A), for example, all paths 30 are in the uncommitted stated as evidenced by the fact that they are not of the color used to designate the committed 316 state. In FIG. 93(B), the user has selected path 30a (highlighted) that overlaps the lower right cell 346A. Where the user wishes to delete path 30 as part of the QA/QC review, for example, FIG. 93(C) shows that path 30a has been deleted and cell 346A has been rendered invisible in the graphical display because it no longer overlaps any paths 30. Although any path 30 in any cell 346 can be edited for QA/QC review at any time, in a preferred embodiment, the user may edit paths 30 within focus cell 348. After some or all of the paths 30 in focus cell 348 have passed QA/QC review, and have been committed 316, the user can instantaneously advance the focus cell 348 to the next cell 346 that overlaps uncommitted paths 30. Establishing focus cell 348 facilitates systematic QA/QC review of uncommitted paths 30. As in the other embodiments of method 300, changes in path 30, including status changes from uncommitted to committed 316, are made automatically, continuously, on-the-fly and in real time. Partitioning 340 comprises previewing 314 the various edit operations described above since this supports the QA/QC process. As previously discussed, changes in path 30 are saved off to storage that persists the latest geometry 46 and attribution 45 of vector sets, which, in the present embodiment, is a shape table.

In addition, partitioning 340 can be used in conjunction with other embodiments of method 300, such as global smoothing 318, straightening, automatic vector revision functions, and excision. The user can confine any of these operations within focus cell 348 after partitioning the remotely-sensed image in the graphical display; however, any cell 346 could also be employed. In addition, the QA/QC process of changing the status of paths 30 from uncommitted to committed 316 may be performed collectively on all vector sets (e.g., paths 30) in selection ensemble 342, as well. In addition, the QA/QC process of changing the status of paths 30 from uncommitted to committed 316 may be performed collectively on all paths 30 that overlap or lie entirely within focus cell 348 or any other cell 346.

For various reasons, it is often necessary to extend a previously-extracted vector set (path 30) representing a linear feature in remotely-sensed imagery so as to create a longer vector set (super path 330) that contains the first. If it is desired that this extension be performed using automatic image-based logic, the extension would logically take place in two parts. The first part involves extracting, in image-based fashion, a new portion of the relevant linear feature that terminates at an endpoint (e.g., anchor point 32) of the existing vector set (e.g., path 30). The second part involves fusing the newly-extracted vector set (e.g., path 30a) and the previously-extracted vector set (e.g., path 30) together into a single vector set (e.g., super path 330). From a user interface perspective, it is desirable that these two distinct operations be invoked together within the context of a single operation. The primary drivers for vector set extension capability are: (a) present-day remotely-sensed raster images are sometimes so huge that it is not practical with a single extraction operation to extract the entirety of a very long linear feature; (b) previously extracted vector sets corresponding to linear features (e.g., paths 30) may terminate on the boundary of a given raster image and might later require extension when an adjacent raster image in a mosaic comes into play; (c) remotely-sensed landscapes are often ever-changing as a result of human and natural forces—thus vector sets (e.g., paths 30) extracted from an older raster image representing roads 40, for example, may need to be extended in a newer raster image covering the same landscape, as the roads 40 themselves may have been extended in the interim between the time the two images were captured. As described below, method 300 enables the user to perform image-based vector set extension under the guise of a single operation that invokes both the extraction step and the fusion step mentioned above.

Extending 306 existing path 30 in image-based fashion will now be described with reference to FIG. 94. As shown in FIG. 94(A), the vector extension 308 mode for extending 306 existing path 30 combines, in a single operation, the activities of first extracting a new linear feature (using the image-based-logic extraction methods described herein) from remotely-sensed imagery where the new linear feature (e.g., road 40) is geometrically tandem to path 30, and second, fusing the new extraction with existing path 30. After the user enters the vector extension 308 mode, the user extracts path 30a using the image-based methods for linear feature extraction previously described herein. As the user places anchor points 32, 32a on road 40 in the vicinity of anchor point 34 on previously extracted path 30, new path 30a will be automatically extracted and automatically fused to path 30 to form super path 330 that follows the trajectory of paths 30, 30a. The geometry 46 of super path 330 is attributed 45 automatically. Super path 330 then effectively replaces path 30 within the storage that persists the latest geometry and attribution of vector sets which, in the present embodiment, is a shape table.

Vector extension 308 mode can also be used to extend two paths 30, 30' in image-based fashion where road 40 has not been extracted between them. The extension essentially bridges the two paths 30, 30' together to form super path 330 that contains them. As shown in FIG. 94(B), after the user enters vector extension 308 mode, the user extracts path 30a using the image-based methods for extraction previously described herein. The user places anchor point 32 on road 40 in the vicinity of anchor point 34 on previously extracted path 30 and places anchor point 32a in the vicinity of anchor point 34a of path 30'. New path 30a will be automatically extracted and automatically fused with paths 30, 30' to form super path 330 that follows the trajectory of paths 30, 30a, 30'. The geometry 46 of super path 330 is attributed 45 automatically. Super path 330 then effectively replaces paths 30 and 30' within the storage that persists the latest geometry 46 and attribution of vector sets which, in the present embodiment, is a shape table.

To help relieve effort and tedium in extracting linear features from remotely-sensed imagery, method 300 embodies snapping 310 the cursor to "raw feature signal" 350, which can be thought of as snapping the cursor to a nearby pixel (in the remotely-sensed imagery) that locally manifests the characteristics of a desired type of linear feature (e.g., road 40, trail, river 44, etc.) that the user wishes to extract. This capability enables the user, prior to extracting a linear feature with automatic image-based logic, to preview 314 which linear feature (e.g., road 40, river 44) is about to be extracted (based on the current cursor location 321) before it actually is extracted. It also allows the user to use the image-based-logic extraction methods described herein to extract the desired linear feature without having to place the cursor precisely on that linear feature (e.g., road 40, river 44) in order to extract it. It also allows the user to perform linear feature extractions without having to zoom in on as small a portion of the remotely-sensed image as would otherwise be necessary.

Figure 95:
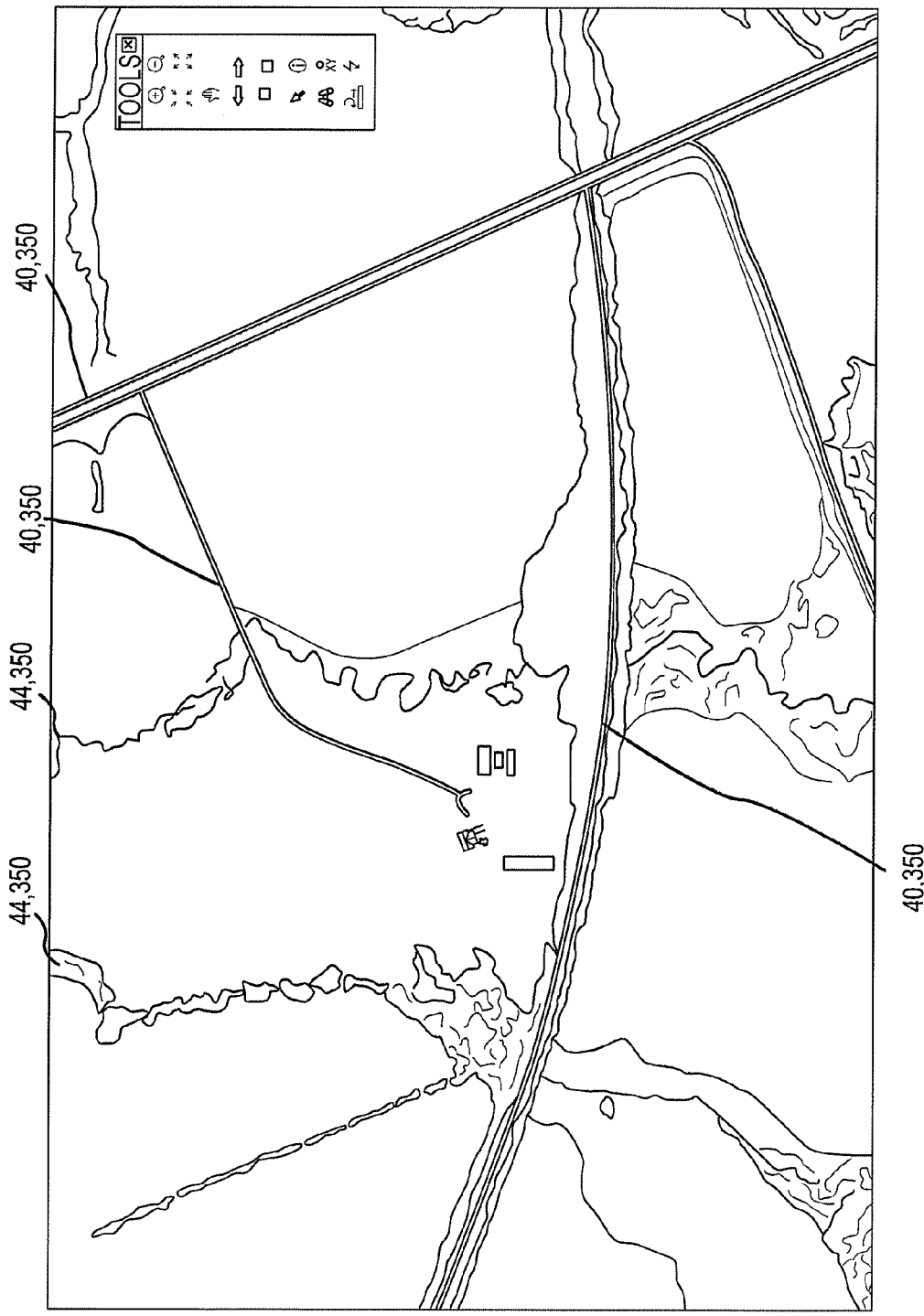
FIG. 95 shows a raster sub-image.

Snapping 310 to raw feature signal 350 comprises initially selecting a remotely—sensed image and forming from it a derived raster sub-image 352. Examples of derived raster sub-image 352 are the gradient or the Laplacian of the original raster image, but much more sophisticated derived images are possible. Derived raster sub-image 352 comprises a sub-image of the selected remotely-sensed image in which the pixels in derived raster sub-image 352 have been classified into groups. Each group corresponds to a particular kind of linear feature of interest (e.g., road 40 centerline pixels, trail centerline pixels, river 44 centerline pixels, etc.), except one group contains pixels that do not manifest as belonging to any linear feature of interest. Alternatively, the classification of pixels may be into just two groups: those that lie on linear features of interest, and those that do not. Either way, pixels that lie on linear features of interest (as dictated by the derived raster sub-image 352) are highlighted in the display relative to the remaining pixels of the original (selected) raster image. More than one type of linear feature may be so highlighted at a time with, for instance, different colors used for pixels that belong to different types of linear features. For example, as shown in FIG. 95, the desired linear features are road 40 centerline and river 44 centerline; road 40 centerline pixels appear as one shade of dark gray, and river 44 centerline pixels appear as a different shade of dark gray. The remaining pixels of the original (selected) raster image are not highlighted at all. The derived raster sub-image 352 may be created through pre-processing 218 or may be created in real time, on-the-fly as a function of the current cursor location 321.

Snapping 310 to raw feature signal 350 comprises aligning derived raster sub-image 352 with the selected remotely-sensed image, so that corresponding pixels (in the geo-spatial sense) line up. Derived raster sub-image 352 may be visually displayed as an overlay to the selected remotely-sensed image in the graphical display. However, this is not required, and in fact, derived raster sub-image 352 may not be displayed at all (though the capability of snapping 310 to raw feature signal 350 nevertheless understands the alignment.)

Once the derived raster sub-image 352 (which was created either at the outset of the extraction session during pre-processing 218 or created on the fly as a function of the cursor location 321) is aligned with the selected remotely-sensed image, the user's current cursor location 321 is snapped to the nearest pixel (or a nearby pixel) that lies on the linear feature of interest (e.g., road 40). In the case of FIG. 95, for example, if the user has designated at the outset that all road 40 centerline pixels are of interest (and thus represent raw feature signal 350) then placing the cursor in the vicinity of road 40 would cause the cursor to be automatically and instantaneously "snapped" to that the location of the nearest road 40 centerline pixel within the derived raster sub-image 352.

Figure 96A:
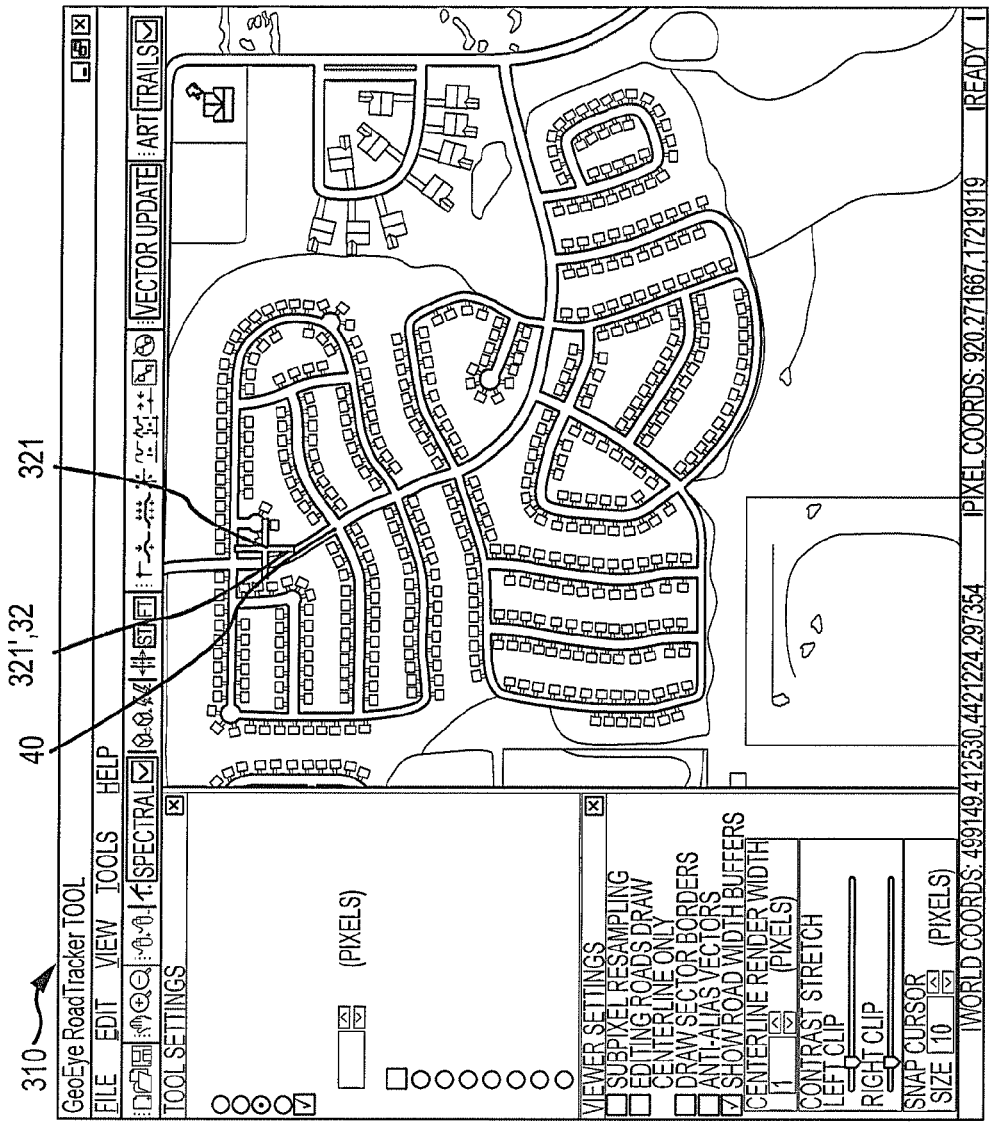
FIG. 96 shows an embodiment of snapping to a raw feature signal.
Figure 96B:
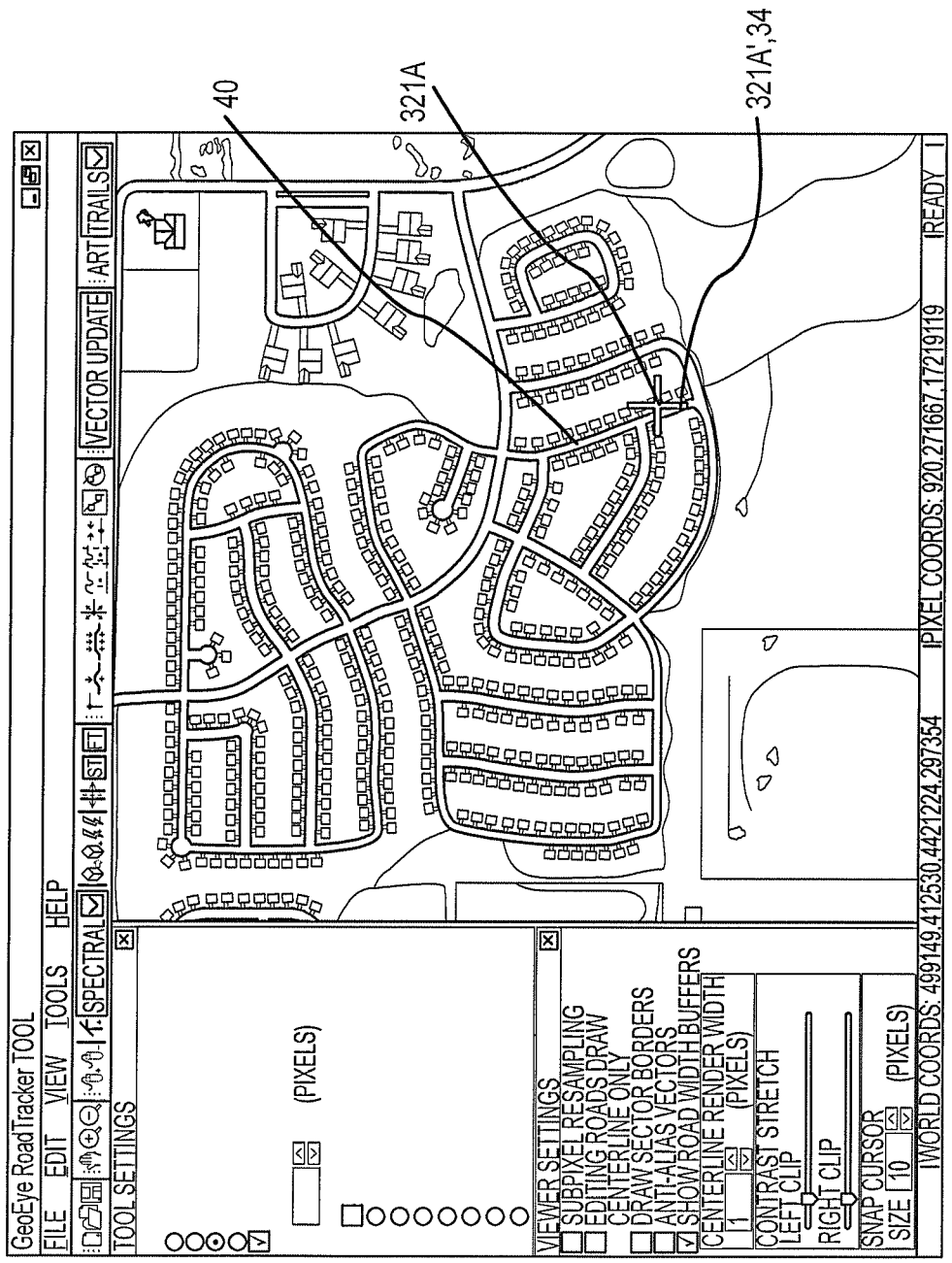

Similarly, in FIG. 96, the user has designated at the outset that all road 40 centerline pixels are of interest (and thus constitute raw feature signal 350). What appear as dark lines through the center of roads 40 are classified as road 40 centerline pixels in the derived raster sub-image 352, which is overlaying the selected remotely-sensed image in the graphical display. As the user places the cursor near road 40 at cursor location 321, the cursor location 321 automatically and instantaneously snaps 310 the cursor to raw feature signal 350, which in this case is the nearest road centerline pixel (in the derived raster sub-image 352) for road 40. The new cursor location 321' is indicated on FIG. 96(A) at the crosshair. The user now clicks to establish a terminating anchor point 32 at location 321' for path 30 that is about to be extracted using image-based logic. Next, the user moves the cursor to location 321A which is similarly snapped to road 40 centerline pixel. The user now clicks to establish terminating anchor point 34 at location 321A' for path 30a that is about to be extracted using image-based logic. The fact that both cursor locations 321, 321A were snapped to centerline pixels of road 40 indicates to the user that road 40 is in fact the linear feature that is about to be extracted (versus another nearby linear feature). Now when the user double clicks, the road 40 will be extracted with image-based logic as was described earlier herein, creating path 30 automatically.

Having herein set forth various and preferred embodiments of the present invention, it is anticipated that suitable modifications can be made thereto which will nonetheless remain within the scope of the invention. The invention shall therefore be construed in accordance with the following claims:

What is claimed is:

1. A method for editing a vector set associated with an extracted linear feature in a remotely sensed image, the vector set defining a path and being tied to a geographical location, comprising:
    displaying the path in the remotely sensed image in a graphical display;
    by user interface, activating a smart editing tool;
    using a motion sensitive device linked to a cursor on the graphical display, establishing a region of influence operatively associated with the motion sensitive device and the smart editing tool, the region of influence being centered around the cursor, displayed on the graphical display and being configured to change location in the graphical display in response to movement of the cursor as directed by the motion sensitive device;
    using the motion sensitive device to move the cursor to a user-specified point in the vicinity of the path, thereby changing the location of the region of influence to encompass at least a portion of the path;
    automatically evaluating the path for an error in the vector set based on the location of the region of influence;
    automatically suggesting a proposed correction for the error based on the location of the region of influence and displaying the proposed correction in real time on the graphical display;
    by user interface, previewing the proposed correction on the graphical display;
    using the motion-sensitive device, implementing the proposed correction in a final correction to the vector set resulting in a revised path; and
    displaying the revised path in real time on the graphical display.

2. The method of claim 1, further comprising saving the final correction to the vector set in a file.

3. The method of claim 2, further comprising using the final correction and revised path to make a map.

4. The method of claim 1, wherein the smart editing tool comprises one selected from the group consisting of a corner break installation tool, a 1-point detour tool, an N-point detour tool, and a move terminals tool.

5. The method of claim 1, further comprising:
    using the motion sensitive device to move the cursor to an alternate user-specified point in the vicinity of the path, thereby changing the location of the region of influence to encompass at least an alternate portion of the path;
    automatically suggesting an alternate proposed correction for the error based on the location of the region of influence and displaying the alternate proposed correction in real time on the graphical display;
    by user interface, previewing the alternate proposed correction on the visual display; and
    by user interface, rejecting the alternate proposed correction by using the motion sensitive device to move the cursor to the user-specified point in the vicinity of the path.

6. The method of claim 5, wherein the alternate proposed correction is not saved to the file.

7. The method of claim 1, further comprising:
    partitioning the remotely sensed image on the graphical display into a plurality of cells, the plurality of cells being displayed in the graphical display as a visual overlay to the remotely sensed image;
    selecting one of the plurality of cells to be a focus cell; and wherein
    displaying the path in the remotely sensed image in the graphical display comprises displaying the path within the focus cell.

8. The method of claim 7, further comprising advancing the focus cell.

9. The method of claim 1, wherein the automatically suggesting the proposed correction for the error comprises automatically and continuously rerouting the path through the cursor location.

10. A method for performing a universal action on a plurality of vector sets contained within a final polygon, the plurality of vector sets defining paths associated with a plurality of extracted linear features in a remotely sensed image, the vector sets being tied to geographical locations and stored in a file, comprising:
    displaying the paths on a graphical display;
    using a motion sensitive device operatively associated with a cursor to select a first vertex in the vicinity of the paths by marking the first vertex with the cursor;
    using the motion sensitive device to move the cursor to select at least a second vertex and a third vertex, the first vertex, second vertex and third vertex being connected in real time in the graphical display to form a polygon encompassing the vector sets;
    converting the polygon into the final polygon;
    automatically performing the universal action on the vector sets contained within the final polygon in real time in the graphical display; and
    modifying the vector sets contained within the final polygon in the file in accordance with the universal action.

11. The method of claim 10, further comprising rendering the vector sets within the final polygon in a manner visually different from the path on the graphical display.

12. The method of claim 10, wherein the first vertex, second vertex and third vertex being connected comprises being connected by a closed graphical rubber band through the first vertex, second vertex and third vertex.

13. The method of claim 10, further comprising:
    partitioning the remotely sensed image on the graphical display into a plurality of cells, the plurality of cells being displayed in the graphical display;
    selecting one of the plurality of cells to be a focus cell; and wherein
    displaying the paths in the remotely sensed image in the graphical display comprises displaying the paths within the focus cell.

14. The method of claim 10, wherein the universal action comprises at least one of smoothing, excising or straightening.

15. A method for modifying a plurality of vector sets associated with extracted linear features in a remotely sensed image displayed in a graphical display, comprising:
    partitioning the remotely sensed image on the graphical display into a plurality of cells, the plurality of cells being displayed in the graphical display;
    selecting one of the plurality of cells to be a focus cell;
    activating a paint selection mode within the focus cell;

selecting the plurality of vector sets within the focus cell by using a motion sensitive device operatively associated with a cursor to move the cursor along a trajectory in the remotely sensed image;

automatically with the selecting, adding each vector set in the trajectory to a selection ensemble; and performing a universal modification action on the vector sets in the selection ensemble, thereby modifying the remotely sensed image in the graphical display.

16. The method of claim 15, further comprising saving the selection ensemble to a file.

17. The method of claim 15, wherein the performing a universal modification action results in modified vector sets; and further comprising saving the modified vector sets to the file.

18. A method for reviewing the accuracy of extracted linear features in a remotely sensed image, each extracted linear feature being defined by a vector set, comprising:

displaying the remotely sensed image on a graphical display;

partitioning the remotely sensed image into a plurality of cells, the plurality of cells comprising multiple vector sets and being displayed in real time in the graphical display;

selecting one of the plurality of cells to be a focus cell;

reviewing at least one vector set within the focus cell, the at least one vector set being a reviewed vector set and other vector sets being unreviewed vector sets;

in real time, designating the reviewed vector set as a committed vector set and the unreviewed vector sets as uncommitted vector sets; and keeping track of the unreviewed vector sets by storing the committed vector set.

19. The method of claim 18, further comprising:

continuing to review additional vector sets within the focus cell until all the vector sets within the focus cell are reviewed vector sets;

in real time, continuing to designate the reviewed vector sets as committed;

deleting the focus cell from the graphical display when the reviewed vector sets have been designated as committed.

20. The method of claim 19, further comprising advancing to a new focus cell.

21. The method of claim 18, wherein reviewing the at least one vector set within the focus cell comprises determining whether the at least one vector set has an error and further comprising correcting the error using a smart editing tool.

22. A method for modifying a plurality of vector sets associated with a plurality of extracted linear features in a remotely sensed image, the vector sets being tied to geographical locations and stored in a file, comprising:

displaying the remotely sensed image on a graphical display;

using a motion sensitive device operatively associated with a cursor to select a first vertex in the remotely sensed image, marking the first vertex with the cursor;

using the motion sensitive device to move the cursor to select at least a second vertex, the first vertex and the second vertex being connected in real time in the graphical display to form a polyline crossing the vectors sets resulting in selected vector sets;

automatically distinguishing the selected vector sets in the graphical display; and modifying the selected vector sets.

23. The method of claim 22, further comprising saving the selected vector sets in the file and using the selected vector sets to make a map.

24. The method of claim 22, further comprising using the motion sensitive device to move the cursor to select at least a third vertex, the third vertex being connected to the first vertex and second vertex in real time in the graphical display to form the polyline, and, wherein the polyline forms a polygon.

25. A method for extracting a linear feature in a remotely sensed image comprising pixels, the linear feature being of a user-selected type and associated with a geographical location, comprising:

displaying the linear feature on a graphical display;

dividing the pixels of the remotely sensed image into a first group and a second group, the first group of pixels being associated with the user-selected type and lying on the linear feature;

storing the first group of pixels and second group of pixels in a file;

selecting by user-interface a point in the vicinity of the linear feature in the remotely sensed image;

using image-based logic and the first group of pixels, automatically snapping the point to the linear feature; and extracting the linear feature, the extracted linear feature being defined by a vector set.

26. The method of claim 25, further comprising:

selecting by user-interface an additional point in the vicinity of an additional linear feature, the additional linear feature being of the user-selected type and associated with an additional geographical location;

using image-based logic and the first group of pixels, automatically snapping the additional point to the additional linear feature; and extracting the additional linear feature, the extracted linear feature being defined by an additional vector set.

27. The method of claim 26, further comprising using the vector set and the additional vector set to make a map.

28. The method of claim 25, wherein the file comprises a sub-image and wherein the pixels of the remotely sensed image are aligned with the first group of pixels and the second group of pixels of the sub-image.

29. The method of claim 25, wherein the selecting by user-interface comprises using a motion sensitive device to select the point.

30. The method of claim 25, wherein the displaying the linear feature on the graphical display comprises displaying without having to enlarge the remotely sensed image in the graphical display.

31. A method for extending a first path in a remotely sensed image, the first path being defined by a first vector set associated with an extracted linear feature and a first geographical location, comprising:

displaying the first path in a graphical display;

by user-interface, selecting an additional linear feature oriented substantially in tandem with the path;

by user interface, selecting an anchor point for the additional linear feature;

using image-based logic and the anchor point, automatically calculating a second vector set, the second vector set being associated with the additional linear feature and a second geographical location and defining a second path; and in real time, automatically connecting the second path to the first path, the first path and the second path being replaced by a super path in the graphical display.

32. The method of claim 31, further comprising using the super path to make a map.

33. A method of processing data relating to a remotely sensed image, comprising:
- displaying at least a portion of the remotely sensed image on a graphical display, at least a portion of the displayed remotely sensed image having at least one vector set associated therewith;
- with a user interface, activating a vector set processing tool, the vector set processing tool being configured to operate on at least a portion of the vector set;
- using a motion sensitive device linked to a cursor on the graphical display to move the cursor to desired points on the remotely sensed image displayed on the graphical display;
- producing, with the vector set processing tool, proposed operations on the vector set, the proposed operations on the vector set changing with the movement of the cursor to desired points on the remotely sensed image displayed on the graphical display;
- displaying, on the graphical display, a continuous preview of the proposed operations to the vector set, said producing and displaying being performed substantially continuously during movement of the cursor so that the graphical display shows substantially real-time, automatic, on-the-fly operations on the vector set as the cursor is moved to desired points on the remotely sensed image displayed on the graphical display; and
- accepting at least one proposed operation on the vector set, thereby changing the remotely sensed image in the graphical display.

34. A method for processing a vector data set associated with a remotely sensed image, comprising:
- displaying at least a portion of the remotely sensed image on a graphical display;
- displaying at least one vector data set on the remotely sensed image in the graphical display;
- with a user interface, activating a vector set processing tool, the vector set processing tool being at least one selected from the group consisting of a correcting tool, a reviewing tool and an extracting tool, and the vector set processing tool being configured to operate on at least a portion of the vector data set;
- using a motion sensitive device linked to a cursor on the graphical display to move the cursor to a desired location on the remotely sensed image displayed on the graphical display;
- with the vector set processing tool, producing proposed operations on the vector data set, the proposed operations on the vector data set changing with said using of the motion sensitive device in relation to the desired location on the remotely sensed image displayed on the graphical display;
- displaying, on the graphical display, a continuous preview of the proposed operations to the vector data set, said producing and displaying being performed substantially continuously during said using of the motion sensitive device so that the graphical display shows substantially real-time, automatic, on-the-fly operations on the vector data set as the cursor is moved to the desired location on the remotely sensed image displayed on the graphical display; and
- accepting a proposed operation on the vector data set, thereby changing the remotely sensed image in the graphical display.

* * * * *